US012036902B2

(12) United States Patent
Mason et al.

(10) Patent No.: US 12,036,902 B2
(45) Date of Patent: Jul. 16, 2024

(54) METHODS, APPARATUS AND SYSTEMS FOR SECURING AN INFANT CAR SEAT TO A VEHICLE SEAT WITH A TIGHT FIT AND WITHOUT USING A DETACHABLE VEHICLE INSTALLATION BASE OR A VEHICLE SEAT BELT, AND RIDE-HAILING METHODS RELATING TO SAME

(71) Applicant: WONDERLAND SWITZERLAND AG, Steinhausen (CH)

(72) Inventors: Kyle S. Mason, Lititz, PA (US); Nathaniel W. Keebler, Perkiomenville, PA (US); Curtis Hartenstine, Birdsboro, PA (US); Bruce Williams, Narvon, PA (US); Brad Bickley, Vancouver, WA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/332,217

(22) Filed: Jun. 9, 2023

(65) Prior Publication Data
US 2023/0311723 A1 Oct. 5, 2023

Related U.S. Application Data

(63) Continuation of application No. 17/609,590, filed as application No. PCT/US2020/045576 on Aug. 10, 2020.
(Continued)

(51) Int. Cl.
*B60N 2/28* (2006.01)
(52) U.S. Cl.
CPC ......... *B60N 2/2887* (2013.01); *B60N 2/2845* (2013.01); *B60N 2/289* (2013.01)

(58) Field of Classification Search
CPC ..... B60N 2/2887; B60N 2/289; B60N 2/2845
See application file for complete search history.

(56) References Cited

U.S. PATENT DOCUMENTS 5,487,588 A 1/1996 Burleigh et al.
5,971,479 A 10/1999 Jacquemot et al.
(Continued)

FOREIGN PATENT DOCUMENTS

CN 201587342 U 9/2010
CN 106218459 A 12/2016
(Continued)

OTHER PUBLICATIONS

Coroflot.com [online]; retrieved on Oct. 4, 2021; retrieved from the internet Product Design by Paul Morgado at Coroflot.com, "Simplicity Infant Car Seat," Coroflot.com, 11/12, Oct. 4, 2021; pp. 1-1https://www.coroflot.com/pmorgado/Product-Design.
(Continued)

*Primary Examiner* — Philip F Gabler
(74) *Attorney, Agent, or Firm* — CANTOR COLBURN LLP

(57) ABSTRACT

An infant car seat system includes an infant car seat with an integrated anchor system to conveniently secure the infant car seat to a vehicle seat, without using a detachable vehicle installation base and without using a vehicle seat belt. The anchor system is coupled to the infant car seat at one or more mechanical constraining points positioned based on the center of gravity of the infant car seat and respective anchor points at which the anchor system engages with vehicle lower anchors. The anchor system may be a rigid anchor system or a belted anchor system, and the system may include one or more of a release actuator for a quick disconnect mechanism, an adjustment foot to accommodate different vehicle seats and ensure a tight fit, and/or one or more storage compartments to store parts of the anchor
(Continued)

system when unused. Such features render the infant car seat system particularly useful for ride-hailing and ridesharing services.

17 Claims, 126 Drawing Sheets

Related U.S. Application Data

(60) Provisional application No. 62/884,863, filed on Aug. 9, 2019.

(56) References Cited

U.S. PATENT DOCUMENTS

| | | | |
|---|---|---|---|
| 6,209,957 B1 | 4/2001 | Baloga et al. | |
| 6,375,260 B1 | 4/2002 | Hiramatsu et al. | |
| 6,425,632 B1 | 7/2002 | Anthony et al. | |
| 6,478,376 B2 | 11/2002 | Hayashi et al. | |
| 6,543,846 B2* | 4/2003 | Cone | B60N 2/2863 297/254 |
| 6,592,183 B2* | 7/2003 | Kain | B60N 2/289 297/256.16 |
| 6,779,842 B2* | 8/2004 | McNeff | B60N 2/2806 297/250.1 |
| 7,159,948 B1* | 1/2007 | Wolf | B60N 2/2887 297/253 |
| 7,168,762 B2* | 1/2007 | Maciejczyk | B60N 2/2806 297/250.1 |
| 7,322,648 B2 | 1/2008 | Nakagawa et al. | |
| 7,488,034 B2 | 2/2009 | Ohren et al. | |
| 8,123,295 B2 | 2/2012 | Hutchinson et al. | |
| 8,141,950 B2* | 3/2012 | Boyer | B60N 2/2887 297/475 |
| 8,282,165 B2 | 10/2012 | Kespohl | |
| 8,444,222 B2* | 5/2013 | Buckingham | B60N 2/2806 297/256.16 |
| 8,596,718 B2 | 12/2013 | Gaudreau, Jr. et al. | |
| 8,926,014 B2 | 1/2015 | Su | |
| 9,004,593 B2* | 4/2015 | Banghart | B60N 2/28 297/256.16 |
| 9,102,249 B2* | 8/2015 | Mo | B60N 2/28 |
| 9,221,368 B2 | 12/2015 | Hou et al. | |
| 9,452,695 B2 | 9/2016 | Sedlack | |
| 9,616,782 B2* | 4/2017 | Cohen | B60N 2/2806 |
| 10,266,078 B2 | 4/2019 | Mason et al. | |
| 10,299,609 B2 | 5/2019 | Taylor et al. | |
| 10,589,644 B2 | 3/2020 | Henseler et al. | |
| 2003/0151282 A1 | 8/2003 | Williams et al. | |
| 2005/0062321 A1 | 3/2005 | Maier et al. | |
| 2009/0273215 A1 | 11/2009 | Barker et al. | |
| 2012/0261958 A1 | 10/2012 | Hutchinson et al. | |
| 2013/0099535 A1 | 4/2013 | Su | |
| 2013/0200672 A1 | 8/2013 | Mo | |
| 2016/0059744 A1 | 3/2016 | Cohen et al. | |
| 2018/0086236 A1 | 3/2018 | Henseler et al. | |
| 2018/0236900 A1 | 8/2018 | Nieto et al. | |
| 2018/0251051 A1 | 9/2018 | Anderson et al. | |
| 2022/0194271 A1 | 6/2022 | Mason et al. | |
| 2022/0250513 A1 | 8/2022 | Mason et al. | |
| 2023/0242017 A1 | 8/2023 | Mason et al. | |
| 2024/0092236 A1 | 3/2024 | Williams | |

FOREIGN PATENT DOCUMENTS

| | | | |
|---|---|---|---|
| CN | 108099704 A | 6/2018 | |
| CN | 108688527 A | 10/2018 | |
| CN | 108790973 A | 11/2018 | |
| EP | 3453563 A1 | 3/2019 | |
| TW | 200916350 A | 4/2009 | |
| WO | 2016183156 A1 | 11/2016 | |
| WO | 2021030243 A1 | 2/2021 | |
| WO | 2022159797 A1 | 7/2022 | |

OTHER PUBLICATIONS

Final Office Action for U.S. Appl. No. 17/669,838, filed Feb. 11, 2022; Date of Notification: Nov. 8, 2022, 09 pages.
ISOFIX—Wikipedia, retrieved Dec. 7, 2022 from: https://en.wikipedia.org/w/index.php?title+isofix&oldid+884783492, 3 pages.
Non-Final Office Action for U.S. Appl. No. 17/669,838, filed Feb. 11, 2022; Date of Notification: Jul. 28, 2022, 19 pages.
Third Party Observation for European Application No. 20852328.2; Date of Communication: Dec. 15, 2022; Date of Search: Dec. 8, 2022; 5 pages.
PCT International Search Report ISR; International Application No. PCT/US2020/045576; International Filing Date: Aug. 10, 2020; Date of Mailing: Oct. 22, 2020; pp. 1-3.
PCT ISR—Written Opinion of the International Searching Authority; International Application No. PCT/US2020/045576; International Filing Date: Aug. 10, 2020; Date of Mailing: Oct. 22, 2020; pp. 1-26.
PCT Notification of Transmittal of the International Search Report and The Written Opinion of the International Searching Authority, or the Declaration; International Application No. PCT/US2022/013472; International Filing Date: Jan. 24, 2022; Date of Mailing: Apr. 5, 2022; pp. 1-20.
Taiwanese Patent Application No. 109127112 filed Aug. 10, 2020; Taiwanese Search Report dated Nov. 30, 2021; 3 pages.
Chinese Application No. 202021649884.0 filed Aug. 10, 2020; Notice of Allowance dated Nov. 3, 2021; 2 pages.
Chinese Application No. 202220219392.0 filed Jan. 25, 2022; Notice of Allowance dated Jun. 30, 2022; 4 pages.
European Application No. 20852328.2 filed Aug. 10, 2020; EPO Communication pursuant to Rules 161 and 162 EPC dated Mar. 16, 2022; 3 pages.
European Application No. 20852328.2 filed Mar. 3, 2022; European Search Report dated Aug. 3, 2023; 8 pages.
German Application No. 212020000696 filed Aug. 10, 2020; German Office Action dated Mar. 14, 2022; 2 pages.
German Application No. 212020000696 filed Aug. 10, 2020; German Office Action dated May 18, 2022; 1 page.
German Application No. 212020000696 filed Aug. 10, 2020; German Office Action dated Jul. 4, 2022; 1 page.
International Preliminary Report on Patentability; International Application No. PCT/US2022/013472; International Filing Date: Jan. 24, 2022; Date of Mailing: Aug. 3, 2023; 10 pages.
Taiwanese Patent Application No. 109127112 filed Aug. 10, 2020; Taiwanese Office Action dated Sep. 27, 2022; 7 pages.
Non-Final Office Action for U.S. Appl. No. 17/609,590, filed Nov. 8, 2021; Date of Notification: Oct. 4, 2023, pp. 1-33.
Extended European Search Report Communication; Application No. 23191952.3-1012/4253141; Date Mailed: Dec. 7, 2023; pp. 1-7.
Advisory Action; U.S. Appl. No. 17/609,590, filed Nov. 8, 2021; Kyle S. Mason; Date Mailed: Apr. 2, 2024; pp. 1-5.
Invitation to Pay Additional Fees; International Application No. PCT/US2024/012746; International Filing Date: Jan. 24, 2024; Date of Mailing: Apr. 23, 2024; 3 pages.
Invitation to Pay Additional Fees; International Application No. PCT/US2024/014768; International Filing Date: Feb. 7, 2024; Date of Mailing: Apr. 23, 2024; 2 pages.
Non-Final Office Action for U.S. Appl. No. 17/609,590; Application Filing Date: Nov. 8, 2021; Date of Notification: May 6, 2024, pp. 1-14.

\* cited by examiner

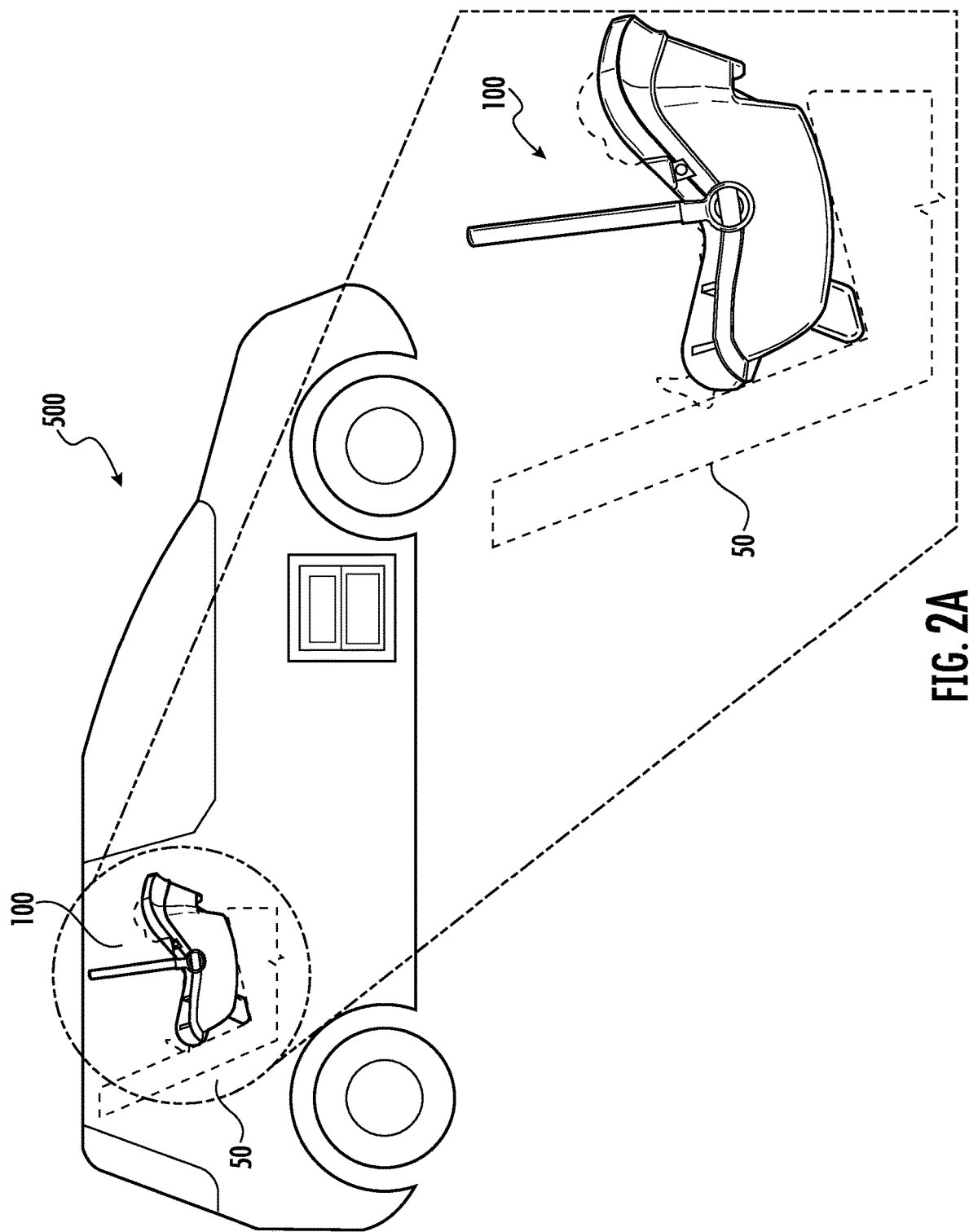

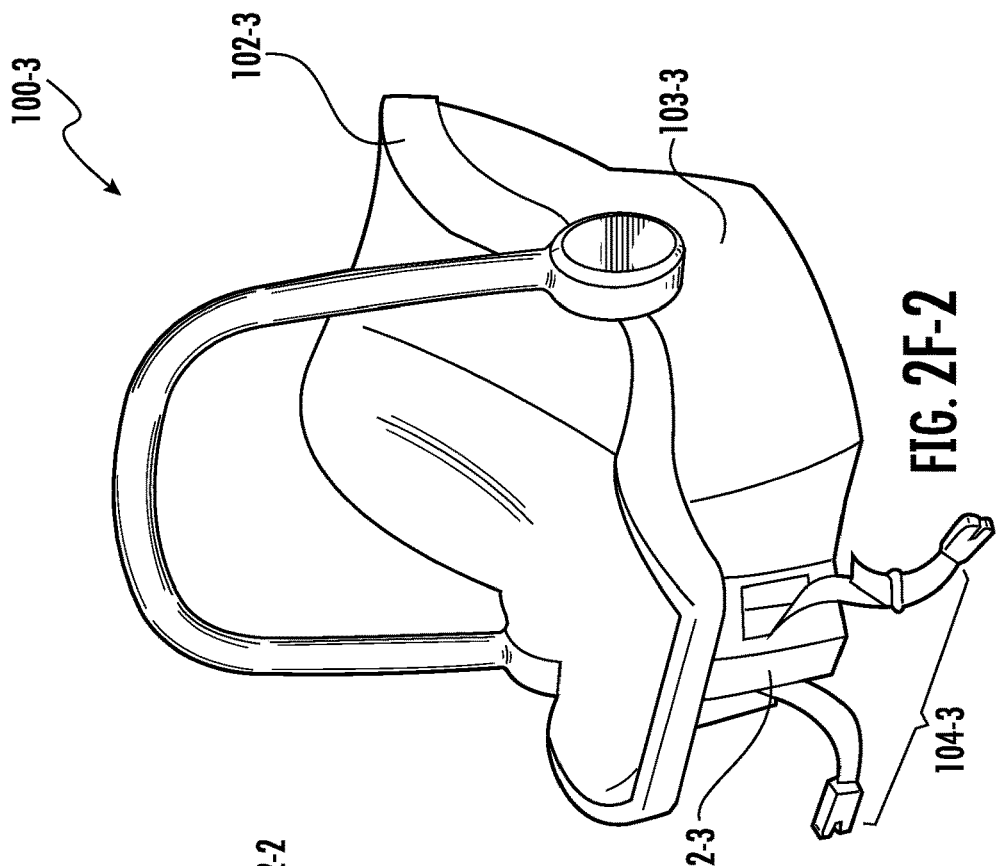
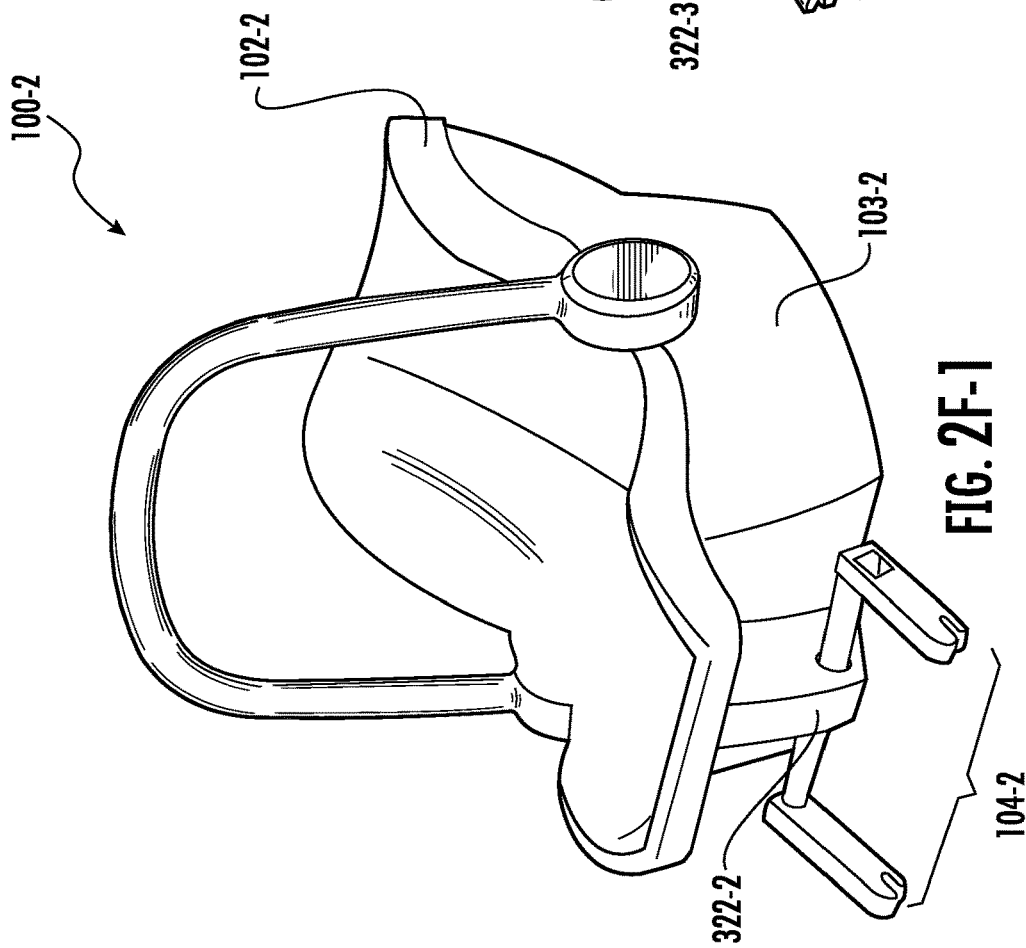

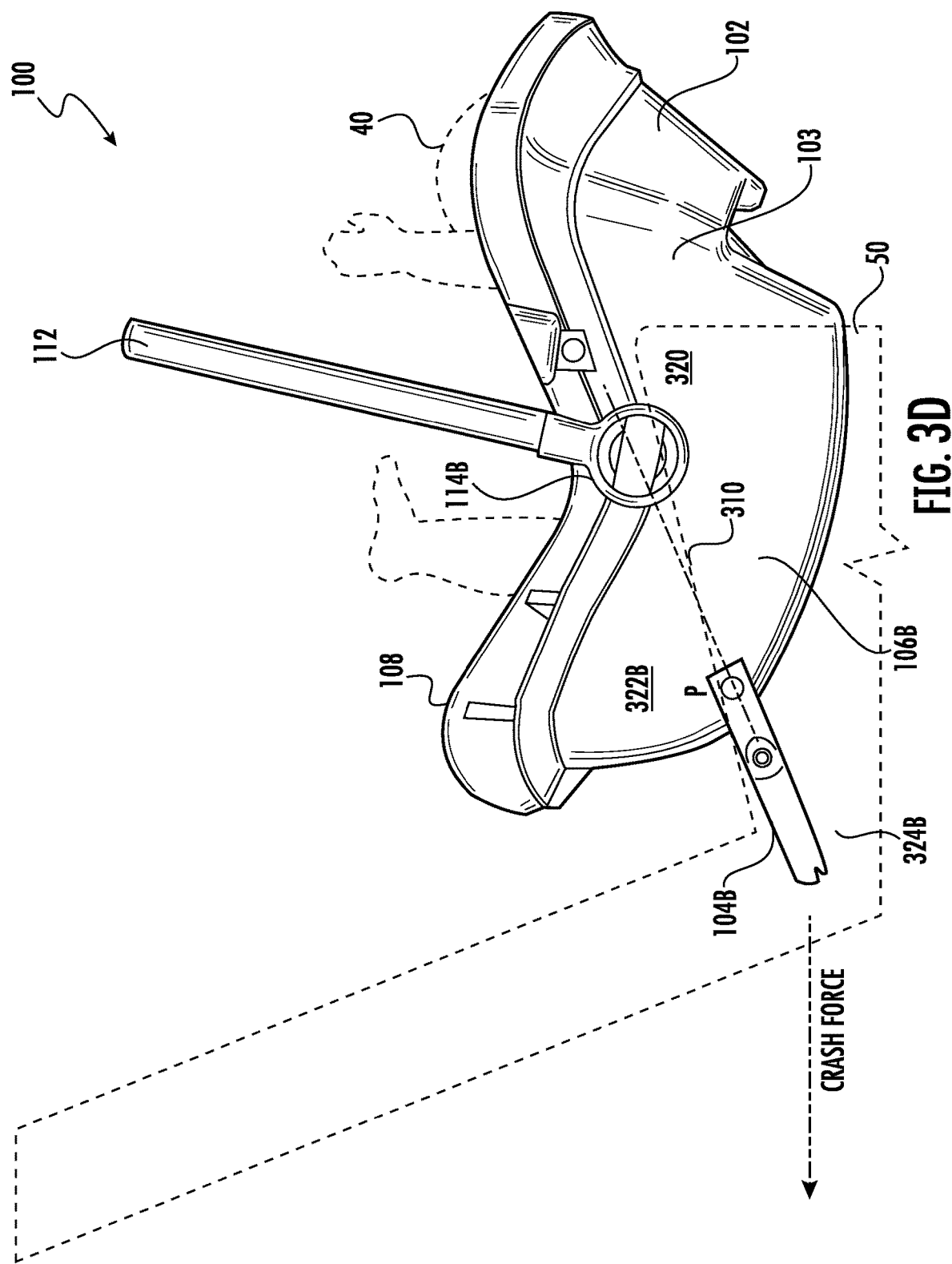

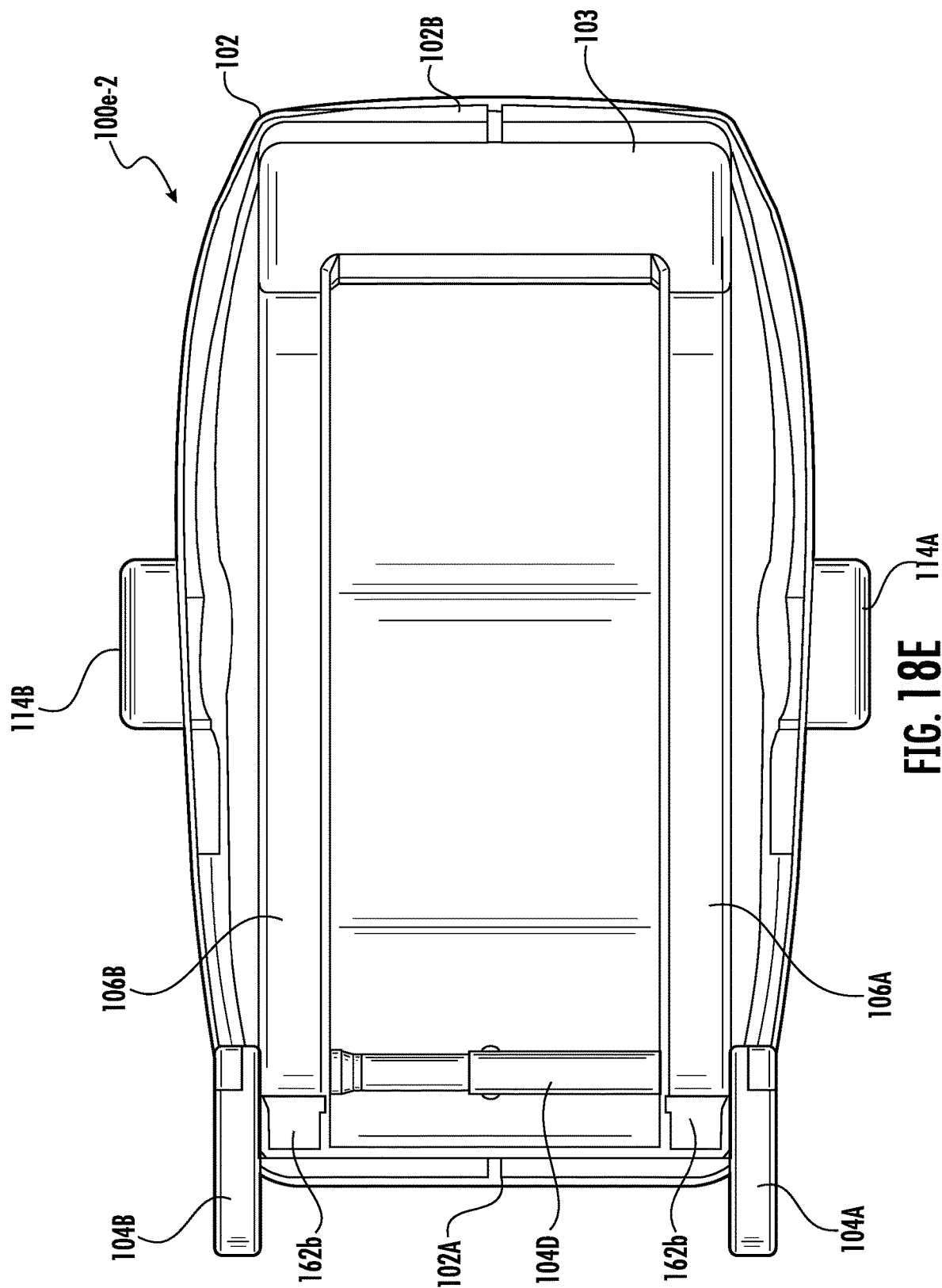

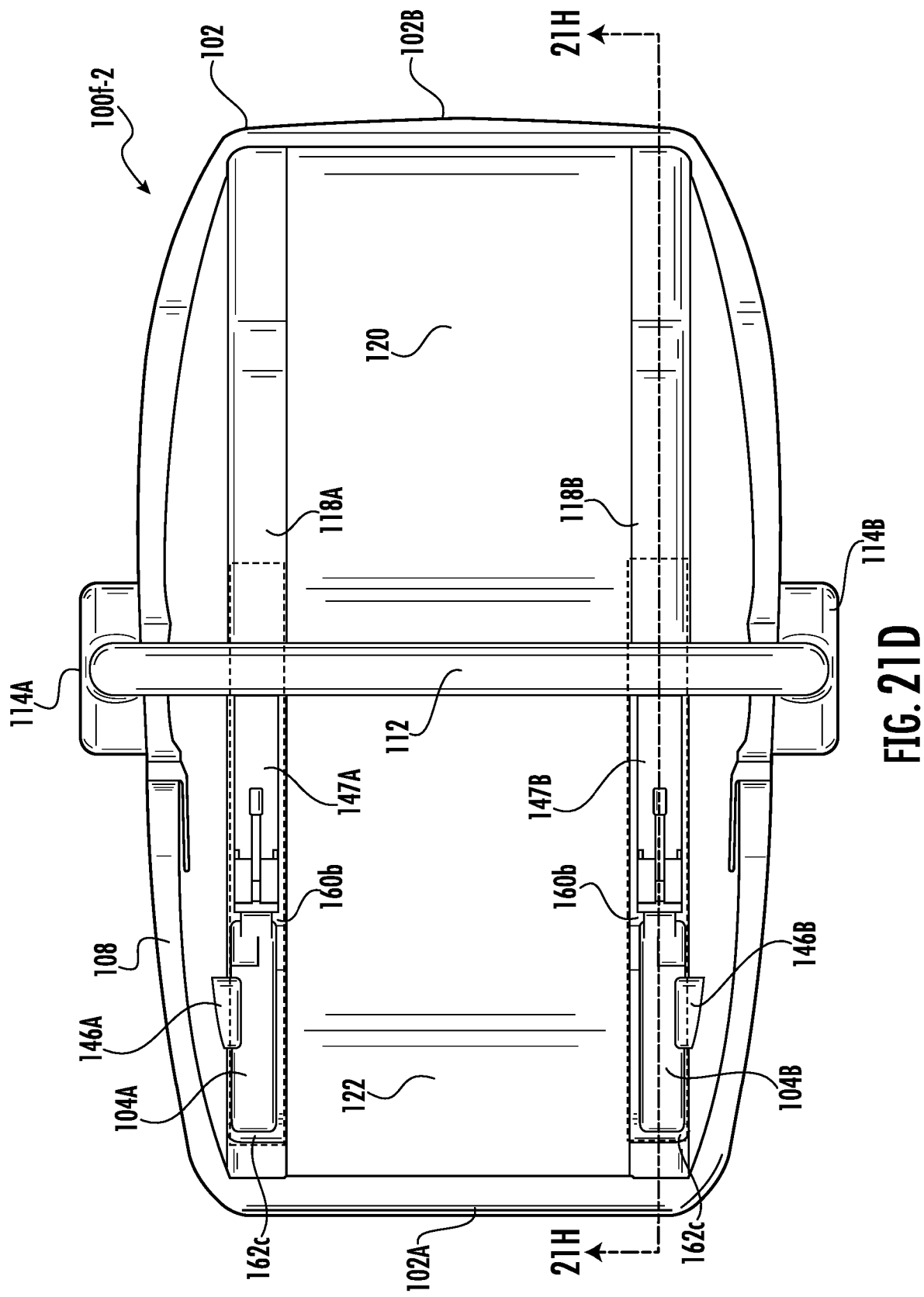

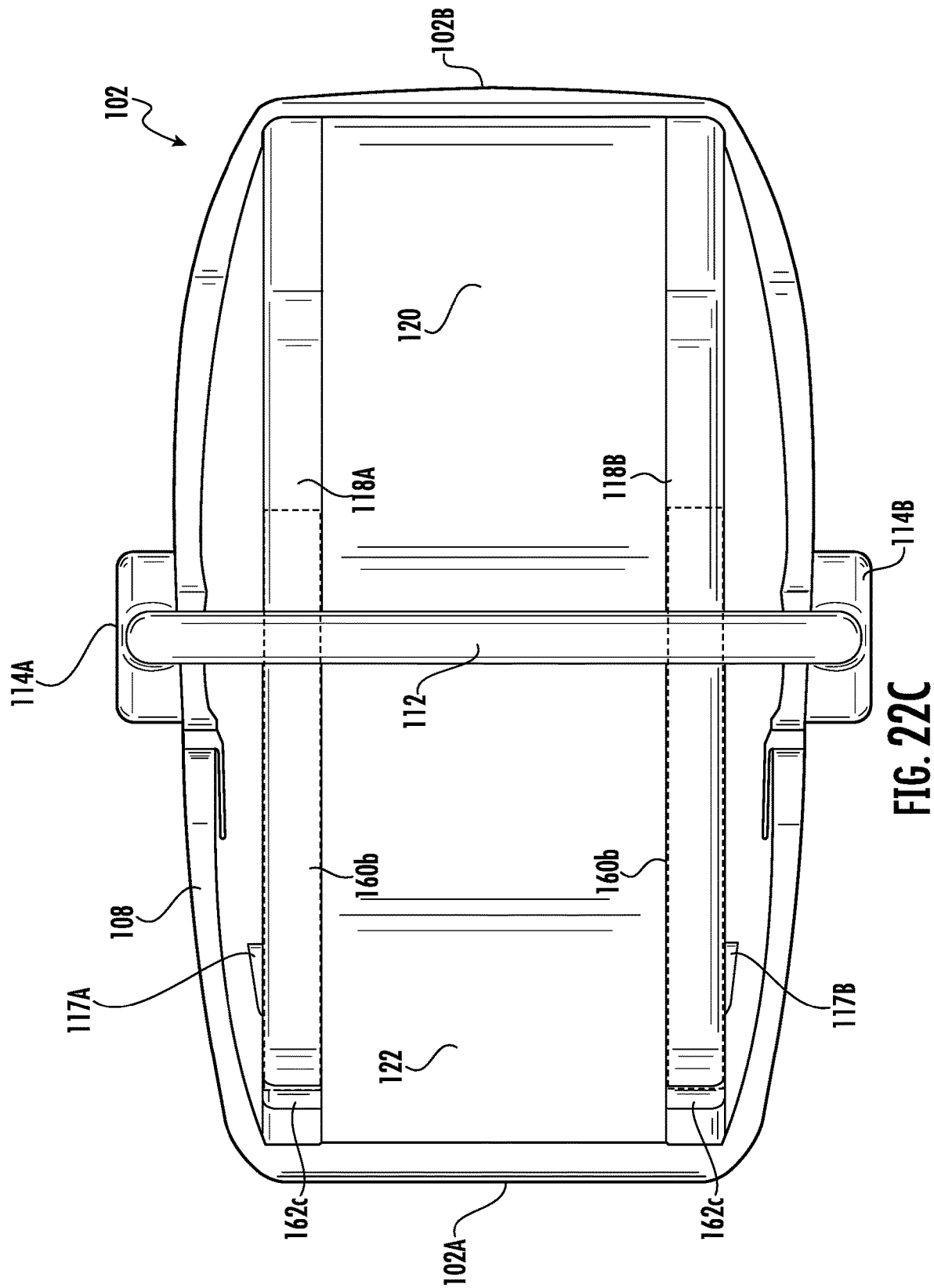

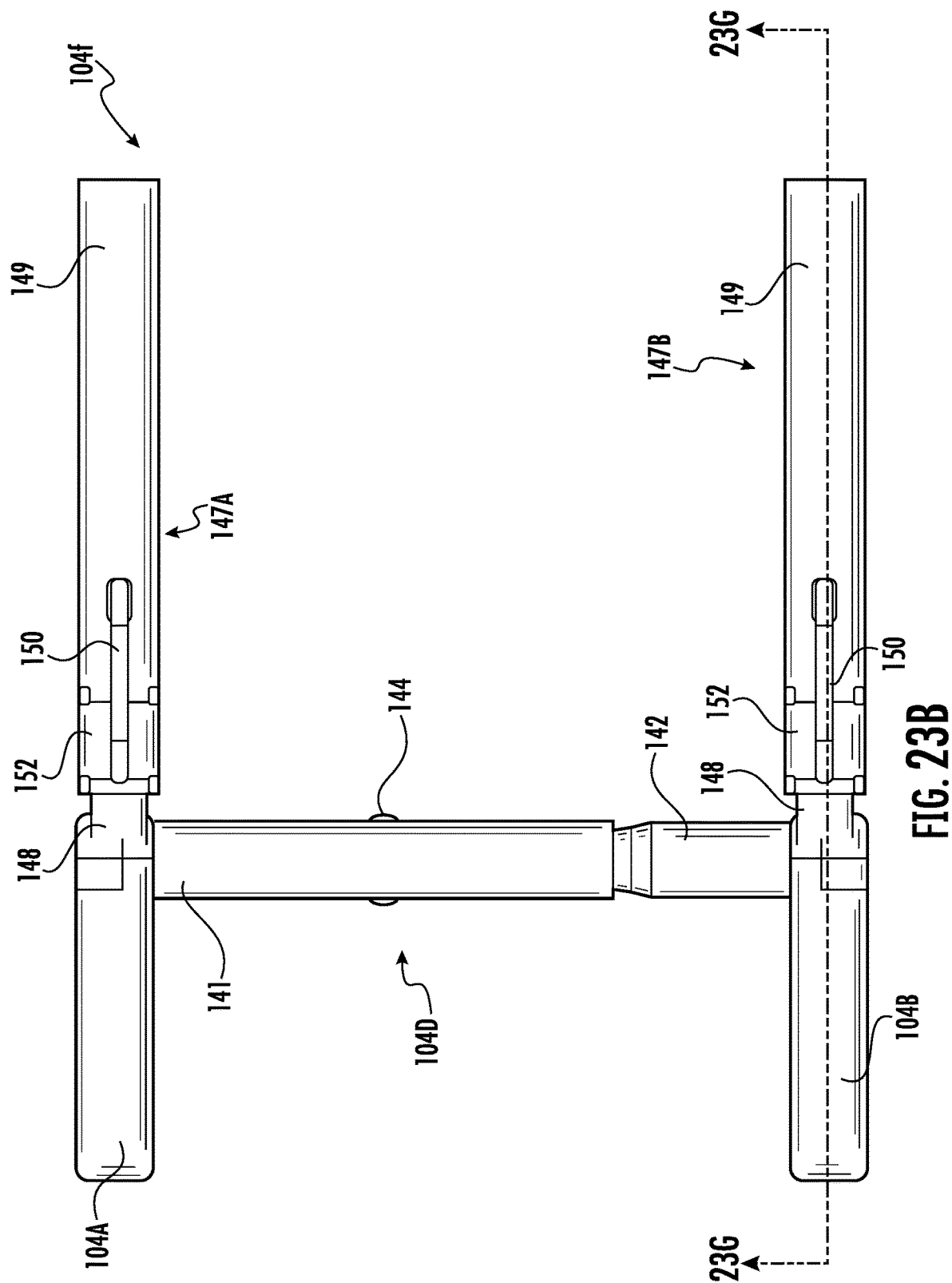

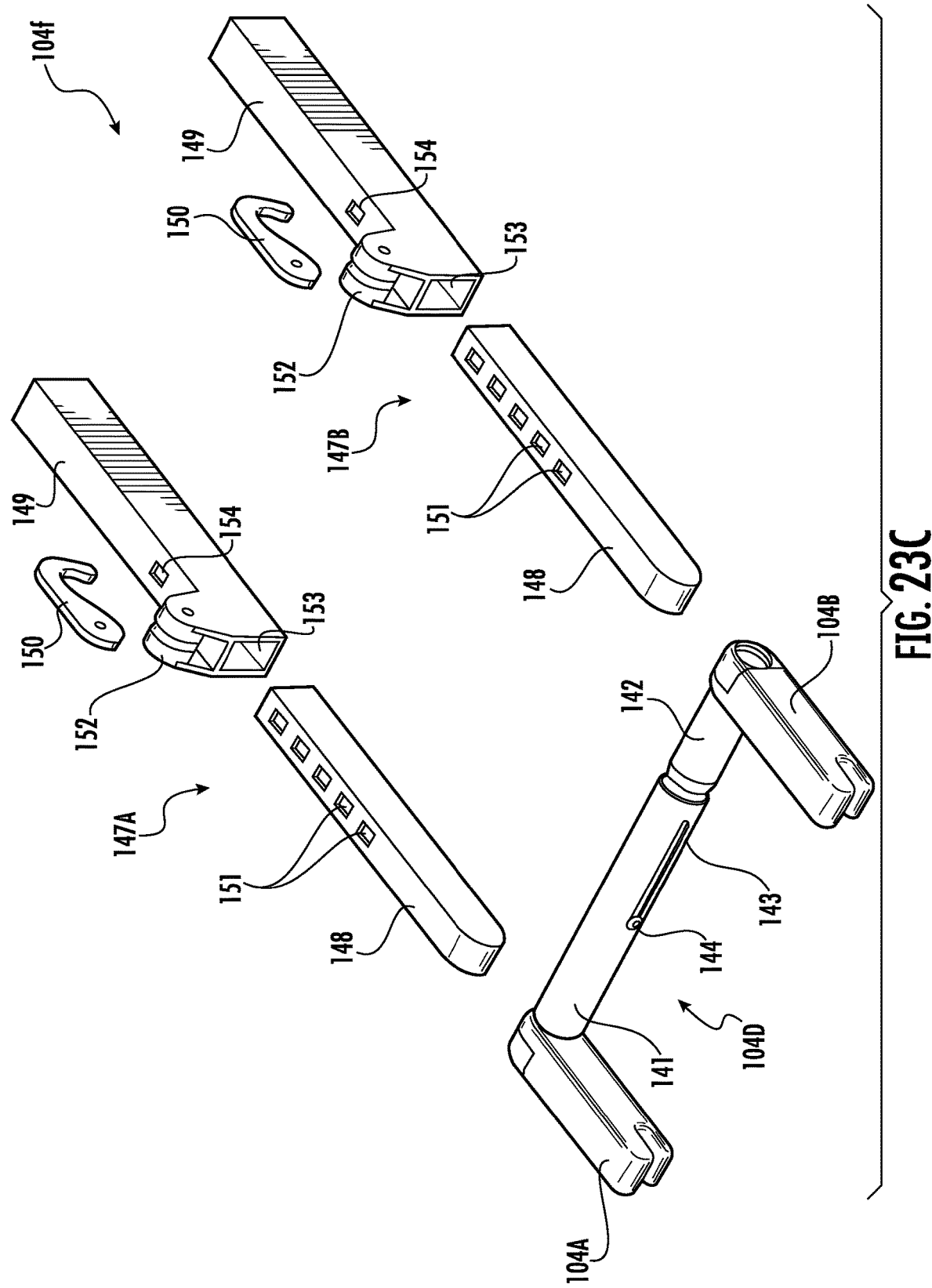

```
┌─────────────────────────────────────────────────────────────┐
│ ENTERING INTO A CONTRACT, AS A TRANSPORTATION NETWORK       │
│ COMPANY, WITH A DRIVER OF THE VEHICLE TO USE AN APP         │
│ EXECUTING ON A MOBILE DEVICE OF THE DRIVER TO RECEIVE AND   │
│ ACCEPT A BOOKING FROM A PARTY, WHEN THE APP IS EXECUTING    │  5500
│ ON THE MOBILE DEVICE OF THE DRIVER, FOR A RIDE-HAIL OR      │
│ RIDESHARE JOURNEY IN THE VEHICLE, WHEREIN A FEE IS CHARGED  │
│ TO THE PARTY BY THE TRANSPORTATION NETWORK COMPANY, AND     │
│ WHEREIN THE APP WHEN EXECUTING ON THE MOBILE DEVICE OF THE  │
│ DRIVER SPECIFIES AN ORIGIN AND A DESTINATION OF THE         │
│ RIDE-HAIL OR RIDESHARE JOURNEY                              │
│ 5510                                                        │
└─────────────────────────────────────────────────────────────┘
                              │
                              ▼
┌─────────────────────────────────────────────────────────────┐
│ PURSUANT TO THE CONTRACT IN STEP 5610, PROVIDING, AS THE    │
│ TRANSPORTATION NETWORK COMPANY, THE APP VIA ELECTRONIC      │
│ DOWNLOAD TO THE MOBILE DEVICE OF THE DRIVER                 │
│ 5520                                                        │
└─────────────────────────────────────────────────────────────┘
                              │
                              ▼
┌─────────────────────────────────────────────────────────────┐
│ AFTER INDICATION TO THE TRANSPORTATION NETWORK COMPANY BY   │
│ THE DRIVER USING THE APP EXECUTING ON THE MOBILE DEVICE OF  │
│ THE DRIVER THAT THE DESTINATION FOR THE RIDE-HAIL OR        │
│ RIDESHARE JOURNEY HAS BEEN REACHED, PROVIDING TO THE        │
│ DRIVER, AS THE TRANSPORTATION NETWORK COMPANY, A PORTION    │
│ OF THE FEE CHARGED TO THE PARTY                             │
│ 5530                                                        │
└─────────────────────────────────────────────────────────────┘
```

FIG. 55A

```
┌─────────────────────────────────────────────────────────────────────┐
│  USING AN APP EXECUTING ON A MOBILE DEVICE TO BOOK AND PAY FOR A    │
│  RIDE-HAIL OR RIDESHARE JOURNEY IN A VEHICLE, WITH A TRANSPORTATION │
│  NETWORK COMPANY, BY SPECIFYING VIA THE APP AN ORIGIN AND A         │
│  DESTINATION FOR THE RIDE-HAIL OR RIDESHARE JOURNEY                 │
│                            5610                                     │
└─────────────────────────────────────────────────────────────────────┘
                                  │
                                  ▼
┌─────────────────────────────────────────────────────────────────────┐
│  UPON ARRIVAL OF THE VEHICLE AT THE ORIGIN, CARRYING AN INFANT IN   │
│  AN INFANT CAR SEAT TO THE VEHICLE AND INSTALLING THE INFANT CAR    │
│  SEAT IN THE VEHICLE, WITHOUT USING AN INFANT CAR SEAT DETACHABLE   │
│  BASE AND WITHOUT USING A VEHICLE SEAT BELT OF THE VEHICLE, WITH    │
│  THE FRONT OF THE INFANT CAR SEAT FACING THE REAR OF THE VEHICLE    │
│                            5620                                     │
└─────────────────────────────────────────────────────────────────────┘
                                  │
                                  ▼
┌─────────────────────────────────────────────────────────────────────┐
│  UPON ARRIVAL OF THE VEHICLE AT THE DESTINATION, RELEASING BOTH OF  │
│  THE FIRST INFANT CAR SEAT ANCHOR FROM MECHANICAL ENGAGEMENT WITH   │
│  THE FIRST VEHICLE ANCHOR AND THE SECOND INFANT CAR SEAT ANCHOR     │
│  FROM MECHANICAL ENGAGEMENT WITH THE SECOND VEHICLE ANCHOR, VIA A   │
│  SINGLE ACTUATION OF AT LEAST ONE ACTUATOR COUPLED TO THE INFANT    │
│  CAR SEAT AND THE ANCHOR SYSTEM                                     │
│                            5630                                     │
└─────────────────────────────────────────────────────────────────────┘
```

FIG. 56   5600

METHODS, APPARATUS AND SYSTEMS FOR SECURING AN INFANT CAR SEAT TO A VEHICLE SEAT WITH A TIGHT FIT AND WITHOUT USING A DETACHABLE VEHICLE INSTALLATION BASE OR A VEHICLE SEAT BELT, AND RIDE-HAILING METHODS RELATING TO SAME

CROSS-REFERENCE TO RELATED APPLICATION

This application is a continuation of U.S. patent application Ser. No. 17/609,590, filed on Nov. 8, 2021, which is a National Stage Application of PCT/US2020/045576, filed on Aug. 10, 2020, which claims priority to U.S. Provisional Application No. 62/884,863, filed on Aug. 9, 2019, entitled, "INFANT CAR SEAT WITH INTEGRATED LOWER ANCHORS," which is incorporated herein by reference in its entirety.

BACKGROUND

An automobile is a common form of transportation for many parents and caregivers of children worldwide. From time to time, parents and caregivers also may rely on other sources of transportation, such as busses, airplanes and trains—collectively, these various modes of transportation are referred to herein generally as "vehicles." Many conventional vehicles, and particularly automobiles, often include restraints (e.g., seat belts) that are designed to protect adults and/or children of a certain age (e.g., at least 9 years old) and/or size (e.g., at least 57 inches in height). For relatively younger and/or smaller children and particularly infants, however, the restraints in various vehicles do not generally provide adequate protection. In view of the foregoing, to provide adequate protection for children during travel, parents and caregivers often utilize a child safety seat when transporting a child in a vehicle.

Since a child typically experiences substantial physical development during their first five years of life, different types of child safety seats are used to ensure that the child remains sufficiently restrained and protected during transport in a vehicle as the child grows. More specifically, a given child safety seat generally is selected, and installed in the vehicle in a certain manner, based on the size, weight, and/or age of the child. Various government and regulatory bodies around the world recommend, specify, regulate and/or require different types of child safety seats based on these factors. One example of government guidance regarding child safety seats includes the document "Child Passenger Safety" published by the U.S. Centers for Disease Control (CDC) and Prevention and the National Center for Injury Prevention and Control, which publication is hereby incorporated by reference herein (see www.cdc.gov/injury/features/child-passenger-safety/index.html). Another relevant example of government oversight regarding child safety seats is given by the United Nations European Regional standard ECE R44/04, "Uniform provisions concerning the approval of restraining devices for child occupants of power-driven vehicles," which standard is hereby incorporated herein by reference. ECE R44/04 categorizes child safety seats into four groups (e.g., Group 0, Group 1, Group 2 and Group 3) based in part on various characteristics of the respect seats.

An "infant car seat" is a type of child safety seat (i.e., a "Group 0 or Group 0+" seat according to ECE R44/04) tailored specifically for infants being transported in a vehicle. An "infant" generally refers to a child who has not yet learned how to walk and typically corresponds to children who are 0 to about 12 months in age and/or weigh up to about 20 to 30 pounds. FIG. 1A illustrates a conventional infant car seat system including an infant car seat 10 and detachable vehicle installation base 20. Although FIG. 1A shows these respective components as detached, during use in a vehicle the detachable base 20 is first installed in the vehicle, and then the infant car seat 10 is mechanically engaged with (e.g., clicked into) the detachable base 20 via locking mechanisms on the bottom of the car seat 10 (not visible in FIG. 1A) and locks 15A and 15B on the base 20. The conventional infant car seat system shown in FIG. 1A may also be combined with a stroller (not shown) to which the infant car seat mechanically engages; this combination is generally referred to as a "travel system" to facilitate portable transport of an infant in the infant car seat 10 when it is either clicked into the stroller or clicked into the detachable base 20 installed in a vehicle.

The infant car seat 10 may be used more generally to carry and hold an infant beyond a vehicle or stroller. In particular, an infant car seat used by itself to secure and carry an infant in the home environment or other environments is generally referred to as an "infant carrier." The organization ASTM International has developed and provided globally recognized international consensus standards governing infant carriers, namely, ASTM F2050-19, "Standard Consumer Safety Specification for Hand-Held Infant Carriers," which is hereby incorporated herein by reference (see www.astm.org/Standards/F2050.htm). The U.S. Consumer Product Safety Commission (CPSC) also has a consumer product safety standard for hand-held infant carriers, which incorporates by reference ASTM F2050-19, and which is codified in U.S. law in the Code of Federal Regulations, 16 C.F.R. § 1225 (see www.federalregister.gov/documents/2020/05/20/2020-09166/safety-standard-for-hand-held-infant-carriers). 16 C.F.R. § 1225 also is hereby incorporated herein by reference.

The conventional infant car seat 10 shown in FIG. 1A is distinguished from other types of child safety seats, in part, by including various structural features to accommodate the smaller size of the infant and the infant's limited mobility and to facilitate portability of the infant. First, the infant car seat 10 and the detachable base 20 must be installed in a vehicle such that the infant car seat is facing the rear of the vehicle when it is clicked into the detachable base. Second, the infant car seat 10 is designed so that the infant may remain in the infant car seat when it is clicked into and/or removed from the detachable base installed in the vehicle. To this end, unlike other types of car safety seats, the infant car seat 10 includes a carrying handle 12 to facilitate portability and ease of handling for parents and/or caregivers transporting the infant. Third, again unlike other types of car safety seats, the infant car seat 10 often includes a curved bottom 17 to provide a rocking function to comfort the infant when the infant car seat is not locked into the detachable base 20 (or the stroller of a travel system).

Generally, an infant car seat comfortably accommodates infants up to the age of about 9 to 12 months and a weight of about 20 pounds; at this stage, the infant is getting more active and heavy (and less convenient for the parent/caregiver to carry in the infant car seat). Once a child outgrows the infant car seat, the infant car seat system in the vehicle is generally replaced by a "convertible" car seat (i.e., a Group 0+/1 seat according to the United Nations European Regional standard ECE R44/04). In contrast to the infant car seat system, the convertible car seat is larger in size and generally supports both rear-facing and forward-facing configurations to accommodate the physical development of the child. Additionally, unlike the infant car seat, the convertible car seat is not portable and rather is a stationary device that remains within the vehicle, i.e., the child is placed into and/or taken out of the convertible car seat at the beginning and end of a vehicle journey. Since it is not intended to carry a child outside of a vehicle, a conventional convertible car seat does not include a carrying handle as found on infant car seats; similarly, the convertible car seat would not include a curved rocker bottom for rocking an infant. Once the child outgrows the convertible car seat, the convertible car seat may then be replaced by an even larger seat (e.g., a Group 1 or Group 2 child safety seat, which is a permanent fixture in the vehicle and uses an adult seat belt to hold it in place), or ultimately a booster seat (i.e., a Group 3 seat, which also utilizes the vehicle's seat belts to restrain the child). The child may continue to use the booster seat until they are able to safely use the vehicle's seats and restraints without the aid of the booster seat.

With respect to installation in a vehicle, early versions of child safety seats (some of which were introduced generally in the mid-1990's) utilized the existing seat belts in a vehicle to secure the child safety seat in the vehicle. To this end, various child safety seats include a vehicle belt path through which the vehicle's existing seat belt can pass to hold the child safety seat to the vehicle's seat. One type of conventional seat belt in a vehicle is a "lap belt" for pelvic restraint, and another type of conventional seat belt is a "shoulder belt" to restrain movement of the chest and shoulder regions (in the U.S., a shoulder belt is only used in conjunction with a lap belt as a vehicle seat belt assembly). For purposes of the present disclosure, both a lap belt by itself or in combination with a shoulder belt are referred to generally as a "vehicle seat belt." A child safety seat installed in a vehicle using one or more existing vehicle safety belts provide improved protection for a child (as opposed to securing the child directly in the vehicle using the vehicle safety belt(s)); however, with early versions of child safety seats, installation in various vehicles using existing vehicle seat belts lacked significant standardization at the time, as there were different types of vehicle seat belt configurations utilized in different makes and models of vehicles.

As a result, in the late 1990s and early 2000s, various guidelines for child safety seats and their installation in vehicles were developed around the world in an effort to improve standardization and, in some respects, provide alternatives to using existing vehicle seat belts. For example, ISOFIX is the international standard for attachment points for child safety seats using "vehicle lower anchors" located in the bight of vehicle seats in passenger cars, and presently utilized in Europe. A similar standardized anchor system in the U.S. for vehicle lower anchors and other attachment points, effective as of Sep. 1, 2002, is referred to as LATCH ("Lower Anchors and Tethers for Children") and another similar standardized anchor system in Canada is referred to as LUAS ("Lower Universal Anchorage System") or CAN-FIX.

Additionally, safety regulations were introduced in different jurisdictions around the world that defined various criteria for vehicle safety, the use of child safety seats and the installation of such seats in a vehicle, as well as the type of loads the child safety seat should withstand in the unfortunate event of a collision or a crash. In the United States, the Federal Motor Vehicle Safety Standards (FMVSS) are federal regulations specifying design, construction, performance, and durability requirements for motor vehicles and regulated automobile safety-related components, systems, and design features. The FMVSS are developed and enforced by the National Highway Traffic Safety Administration (NHTSA) and codified in U.S. law in the Code of Federal Regulations, 49 C.F.R. § 571. FMVSS Standard no. 213 (FMVSS-213) specifies requirements for child restraint systems used in passenger cars, multipurpose passenger vehicles, trucks, and busses, and to child restraint systems for use in other types of motor vehicles and aircraft. FMVSS-213 is codified in U.S. law in the Code of Federal Regulations, 49 C.F.R. § 571.213, which is incorporated herein by reference. As noted above, the European Union and related jurisdictions have established similar safety regulations in the United Nations European Regional standard ECE R44/04; similarly, Canada has codified similar regulations in CMVSS-213, "Motor Vehicle Restraint Systems and Booster Seats Safety Regulations," which is hereby incorporated herein by reference (see laws-lois.justice.gc.ca/eng/regulations/SOR-2010-90/), and Australia and New Zealand have codified similar regulations in AS/NZS 1754, "Safety Standard: Child Restraint Systems For Use In Motor Vehicles," which is hereby incorporated herein by reference.

In addition to the foregoing safety regulations to improve standardization for child safety seats and their installation, in the U.S. the National Child Passenger Safety (CPS) Certification Training Program certifies people in the U.S. as child passenger safety technicians and instructors to provide hands-on assistance to parents and caregivers for proper use of child restraining systems and safety belts. The U.S. CPS certification program is widely considered to be the "gold standard" across the globe for child passenger safety certification. According to the CPS, a child safety seat when properly installed in a vehicle should pass the "inch test," i.e., a properly-installed child safety seat should not move more than one inch front to back or side to side when pulled at the seat belt path. This rule applies for forward-facing child safety seats and rear-facing child safety seats, such as an infant car seat, and when the child safety seat is secured to the vehicle seat using either an existing vehicle seat belt or a standardized anchor system including vehicle lower anchors (e.g., LATCH).

With reference again to FIG. 1A, the detachable vehicle installation base 20 of the conventional infant car seat system was essentially introduced in the 2000's as a design improvement arising from the various global standardization and certification efforts and safety regulations noted above. In particular, the detachable vehicle installation base 20 is carefully and securely mounted to a vehicle seat (using either existing vehicle seat belts or a standardized anchor system employing vehicle lower anchors) and generally remains within the vehicle for extended periods of time (e.g., over multiple journeys in the vehicle). Over the years since the introduction of the two-piece system of the infant car seat 10 and detachable base 20, the design of the infant car seat itself has remained essentially unchanged; however, the detachable base 20 has evolved with successive improvements to ensure safety and facilitate compliance with applicable standards and regulations. Notably, the inclusion of the detachable base 20 in the infant car seat system allows the system to pass the CPS "inch test" (whereas a legacy infant car seat installed by itself using an existing vehicle seat belt would not pass this test).

With respect to installation of the detachable base 20 using a standardized anchor system employing vehicle lower anchors, FIG. 1B shows that the detachable base 20 includes seat anchors 32 to couple the base 20 to respective vehicle lower anchors (not shown) in the seat bight of a vehicle seat. As illustrated in FIG. 1B, the seat anchor 32 is connected to a belt 34 which is permanently attached to the base 20 via a tether 38. The belt 34 includes a belt tightening mechanism 36 to securely position the base 20 against the vehicle seat. Once the base 20 is safely and securely installed in the vehicle, the infant car seat 10 carrying the infant may then be locked into the base 20 before beginning a journey in the vehicle, and released from the base 20 to remove the infant from the vehicle at the end of a journey.

Over the years, various types of mechanical connections have been introduced for the seat anchors 32 between the detachable vehicle installation base 20 and the vehicle lower anchors. For example, FIG. 1C shows a belted anchor system 30a that could be employed in the detachable base 20, including a belt 34 connected to a pair of seat anchors 32a and 32b and a belt tightening mechanism 36. In another example, FIG. 1D shows a rigid anchor system 30b, in which a pair of seat anchors 32a and 32b are coupled together via a rigid cross-member 38 that passes through the base 20. As with the belted anchor system, the rigid anchor system 30a is directly and permanently mounted to the base 20.

SUMMARY

As discussed above, the combination of an infant car seat together with a detachable vehicle installation base provides parents and/or caregivers a convenient way to safely transport an infant in a vehicle, particularly when the vehicle is owned and/or operated by the parent and/or caregiver. In such situations, the parent and/or caregiver, or alternatively a certified CPS (Child Passenger Safety) technician that is counseling or working together with the parent/caregiver, are able to take their time to carefully attend to the important step of properly installing the detachable vehicle installation base in the parent/caregiver's vehicle (e.g., passing the CPS "inch test") to ensure the safety of the infant during transport in the vehicle over multiple journeys.

For a parent and/or caregiver that does not own a vehicle themselves or is otherwise unable to readily access and operate a vehicle themselves, hired transportation services may in some instances provide an alternative mode of transportation. Various conventional options for hired transportation services (also referred to in the relevant arts as "transportation-for-hire"), such as taxis and appointment-based car services, have been available for many years. However, taxis and conventional appointment-based car services historically have posed multiple challenges to parents and/or caregivers traveling with infants.

For example, in some instances older taxis are not even equipped with standardized vehicle lower anchors, and therefore the existing vehicle seat belts in the taxi would need to be used to install the detachable base of a conventional infant car seat system. The parent/caregiver could consider installing the infant car seat by itself in the taxi, without using the detachable base and using the existing vehicle seat belts; however, doing so would result in an inferior (and hence possibly unsafe) installation of the infant car seat that would not pass the CPS "inch test."

Even if a taxi is equipped with vehicle lower anchors, parents and/or caregivers face the inconvenience of hailing and/or waiting for a taxi while maintaining in tow the infant in the infant car seat, the separate detachable base, and any other travel baggage/luggage, and may be doing so in a crowded taxi/cab station with long lines and/or long wait periods, and/or navigating through inclement weather. Once the taxi arrives, the parent/caregiver faces another immediate challenge, namely, how to keep an eye on the infant while installing the detachable base of the infant car seat system. Presumably, the parent/caregiver would need to put the infant car seat with the infant aside somewhere and then hurriedly attend to the installation and adjustment of the detachable base in the back of the taxi, while at the same time trying to somehow pay proper attention to the infant. An additional frustration is that the generally poor sanitation of some taxis creates an environment that may further deter parents and/or caregivers from using taxis as a mode of travel.

Conventional appointment-based car services also pose certain challenges of their own. For example, a journey in a car service often needs to be scheduled well in advance of the trip, which may be inconvenient for the parent and/or caregiver's schedule (e.g., given the many, unpredictable, and often-changing needs of the infant). Additionally, a parent and/or a caregiver may be unable to schedule a journey with an appointment-based car service due to lack of availability of the service, especially during peak traffic times. The cost of conventional appointment-based car services also is typically higher than taxis, which in some instances may be a financial deterrent as well.

Thus, various challenges associated with using a taxi and/or a conventional appointment-based car service have historically limited their use as an alternative mode of transportation for parents and/or caregivers traveling with an infant. However, the Inventors have recognized and appreciated that the recent growth and popularity of ride-hailing and ridesharing services, such as Uber and Lyft, provide new hired transportation options for parents and/or caregivers of infants. For purposes of the present disclosure, "ride-hailing" refers to the process of booking a journey in a vehicle and paying for the journey via an "app" operating on a mobile device and provided by a transportation network company (TNC), such as Uber or Lyft. The term "ridesharing" has been used similarly to describe the services provided by a TNC, but more generally this term may be used in a manner similar to "carpooling," in which a person shares a vehicle with one or more other individuals on a commute (e.g., to work).

From the perspective of either ride-hailing or ridesharing, these newer types of hired transportation services alleviate at least some of the past challenges associated with taxis and conventional appointment-based car services for parents and/or caregivers of infants. For example, ride-hailing or ridesharing services typically provide a more flexible schedule for parents and/or caregivers by allowing rides to be scheduled on demand and/or on short notice (e.g., a ride may be scheduled when an infant is able and ready to travel). In another example, ride-hailing or ridesharing services generally permit the parent and/or the caregiver to wait with their infant in a sheltered and/or indoor environment (e.g., their home) until the driver arrives. This, in turn, also enables the parent and/or the caregiver to avoid crowded locations with long lines and/or long wait times. Furthermore, as a general observation, the vehicles used in ride-hailing or ride-sharing services tend to be cleaner and more hospitable to infants and their parents/caregivers than taxis.

In recognizing the potential benefits of ride-hailing and ridesharing services for parents and/or caregivers traveling with an infant, the Inventors have further recognized that conventional infant car seat systems including a detachable vehicle installation base are not particularly well-suited for hired transportation such as ride-hailing and ridesharing services for a variety of reasons.

First, as with taxis or conventional appointment based car services, the parent and/or the caregiver would need to carry along both the infant car seat (with the infant in it) and the detachable base when using a ride-hailing or ridesharing service (along with any other luggage/baggage attendant to the journey with the infant), which is a notable inconvenience given the bulk and weight of the detachable base (which may be as much as the infant car seat itself). Alternatively, the parent/caregiver could consider not bringing along the detachable base and installing just the infant car seat itself using the existing vehicle seat belts in the ride-hail/rideshare vehicle. However, as noted above, doing so would result in an inferior and risky installation of the infant car seat that would not pass the CPS "inch test."

Second, appropriate installation of the detachable base in the vehicle seat (e.g., to pass the "inch test") takes some time and requires attention from the person performing the installation. However, upon arrival of a ride-hailing or ridesharing service vehicle to the origin of a journey, there may be little to no opportunity for the parent/caregiver to take the time required to quickly and safely install the detachable base of the infant car seat system, while at the same time continuing to pay careful attention to the infant. If the parent/caregiver is traveling alone with an infant, it may be virtually impossible for the parent/caregiver to appropriately monitor the infant while simultaneously installing the detachable base to the vehicle seat. Moreover, the parent/caregiver would need to install and then uninstall the detachable base for each ride-hail/rideshare journey.

In view of the challenges of using hired transportation when travelling with an infant, the present disclosure is directed to various inventive implementations of an infant car seat system in which an infant car seat is particularly configured to be secured directly to a vehicle seat without using a detachable base or a vehicle seat belt. In various examples described herein, in addition to not requiring either a detachable base or a vehicle seat belt, the inventive infant car seat systems also do not require a top tether or a load leg to achieve improved crash test performance and reduced injury criteria. Instead of requiring a detachable base, infant car seat systems according to the present disclosure include other useful features that, respectively and in various combinations, help a parent or caregiver of an infant to: 1) easily and comfortably transport an infant to and from a vehicle without the bulk of a detachable base; 2) quickly secure the infant car seat and the infant in a vehicle at the beginning of a journey, with a tight fit directly to the vehicle seat, to ensure the comfort and safety of the infant; and 3) quickly remove the infant and the infant car seat from the vehicle at the end of the journey.

In exemplary implementations, these objectives are facilitated in part by an anchor system directly coupled to the infant car seat and positioned to provide convenient access and attachment to vehicle lower anchors. In one aspect, the anchor system is particularly positioned at mechanical constraining points, based in part on the center of gravity of the infant car seat, so as to significantly mitigate rotation of the backside of the infant car seat away from the back of the vehicle seat during a crash event (and also notably reduce other injury criteria).

To facilitate installation without a detachable base, in another aspect the infant car seat system includes an adjustment foot mounted proximate to the front of the infant car seat to mitigate rotation of the backside of the infant car seat toward the back of the vehicle seat during installation. In this manner, the adjustment foot helps a parent and/or caregiver to position the infant car seat in the vehicle so as to maintain the comfort of the infant, more easily align and engage the anchor system with the vehicle lower anchors, and at the same time provide leverage against the seat pan of the vehicle seat to facilitate a tight fit to the vehicle seat.

In other aspects, the infant car seat also includes a carrying handle to facilitate portability and ease of handling when transferring the infant car seat into or out of the vehicle, and a curved rocker bottom to provide a rocking function to comfort the infant when the infant car seat is used outside of the vehicle. Regarding the curved rocker bottom, which in some instances may complicate the fit of the infant car seat to different configurations of vehicle seats, the adjustment foot noted above is also particularly useful to compensate for the curved profile of the rocker bottom to ensure that a reliable, tight fit with the vehicle seat is achieved according to Child Passenger Safety (CPS) guidelines (e.g., the infant car seat installation passes the CPS "inch test").

In other advantageous respects, in some implementations the parent/caregiver can disengage the anchor system from the vehicle seat at the end of a journey with a single-touch actuator to easily remove the infant and the infant car seat from the vehicle. Additionally, one or more storage areas built into or on the infant car seat provide convenient storage of the anchor system when not in use, to prevent damage or injury (as well as interference with a stroller if the infant car seat is used as part of a travel system) and provide for a sleek design of the infant car seat.

Eliminating the detachable base from the infant car seat system makes transporting the infant to and from the vehicle significantly more convenient and expedient, as the parent/caregiver does not have to worry about the bulk, weight, and storage of a detachable base. The system design without a detachable base, and with multiple features supporting safety and convenience, make the system particularly suitable for ride-hailing or ridesharing situations, in which a caregiver often must quickly get into and out of the ride-hail/rideshare vehicle with the infant in the infant car seat (together with any other travel baggage/luggage), while at the same time ensuring the comfort and safety of the infant.

The anchor system of the inventive infant car seat systems disclosed herein generally may include one or more connectors (also sometimes referred to as "anchors") having a mechanical design that adheres to various global standards for securing the infant car seat system to the vehicle seat. As noted above, examples of such standards include, but are not limited to, Lower Anchors and Tethers for Children (LATCH), ISOFIX, the Lower Universal Anchorage System (LUAS), and the Universal Child Safety Seat System (US-CSS). Pursuant to these various standards, the infant car seat anchor system connectors include a latching mechanism that allows a fast and secure connection to respective vehicle lower anchors found in the bight of the vehicle seat.

In some implementations, the anchor system of the inventive infant car seat systems may be a rigid anchor system that includes a pair of connectors rigidly coupled to the infant car seat. In one aspect, the connectors of a rigid anchor system may be rotatably and/or translationally adjustable with respect to the infant car seat to facilitate a secure connection to the vehicle lower anchors in the bight of the vehicle seat. In another aspect, rotation and/or translation of the connectors of a rigid anchor system also facilitates easy storage of the connectors when not in use.

In other implementations, the anchor system may be a belted anchor system including a pair of connectors coupled to the infant car seat via one or more belts. The belted anchor system may further include a belt tightening mechanism as well as a locking mechanism (e.g., a cam) to ensure the infant car seat is easily and tightly fitted to the vehicle seat once the connectors are mechanically engaged with the vehicle lower anchors.

Regarding one or more integrated storage compartments to store all or a portion of the anchor system, the storage compartment(s) may be tailored based on the type of anchor system (e.g., a rigid anchor system or a belted anchor system). For example, a rigid anchor system may include a telescopically adjustable cross-member to transition between a stored position (e.g., the cross-member is collapsed and the anchor system connectors are rotated for storage) and an operational position (e.g., the cross-member is extended and the anchor system connectors are deployed for attachment to the vehicle lower anchors). The storage compartment for a rigid anchor system may be tailored to store the connectors within connector cavities (e.g., defined by or within the seat shell rails of the infant car seat). In another example, the infant car seat may include various storage compartments inside and/or outside the infant car seat to store the belt and/or connectors of a belted anchor system.

The anchor system, whether rigid or belted, obviates the need to use an existing vehicle seat belt to secure an infant car seat to a vehicle seat without using a detachable base; in so doing, the anchor system also mitigates having a restraint pass over the top of an infant (e.g., through a conventional vehicle belt path and across the top of the legs, lap, or pelvis of the infant). Moreover, by providing a viable alternative to using a vehicle seat belt for installation without a detachable base, the anchor system helps ensure that installation of the infant car seat without using the detachable base nonetheless passes the CPS "inch test."

As briefly noted above and discussed in further detail below, the anchor system may be mounted directly to respective sides of a seat shell of the infant car seat at one or more mechanical constraining points (e.g., one or more openings, slots, or notches in the seat shell). In example implementations, the mechanical constraining points are particularly positioned based on a system center of gravity of the infant car seat and a representative infant (e.g., anthropomorphic test device or ATD) so as to significantly improve crash test performance and reduce injury criteria. To this end, in some implementations the mechanical constraining point(s) for the anchor system are located above a plane defined by a first axis through the center of gravity and a second axis through respective anchor points at which the connectors of the anchor system are engaged with the vehicle lower anchors in the bight of the vehicle seat. This particular positioning of the anchor system mechanical constraining point(s) is observed to not only reduce the magnitude of the forces applied to the infant's head and chest during a crash event, but it more particularly reduces the rotational displacement of the seat back of the infant car seat (relative to vertical) during a crash event. In example implementations, the anchor system mechanical constraining points ensure that the rotational displacement of the seat back of the infant car seat during a crash event is less than 70 degrees relative to vertical.

In sum, the inventive infant car seat systems described herein provide several advantages to address the limitations of conventional infant car seat systems particularly when using a ride-hailing or ridesharing service. First, the infant car seat system may include an anchoring system with connectors that are configured to quickly and securely attach the infant car seat to a vehicle seat, and an adjustment foot to readily compensate for a curved rocker bottom of the infant car seat as well as different types of vehicle seats and/or different seat pan angles, to ensure the infant car seat is tightly fitted to the vehicle seat (e.g., to pass the CPS "inch test"). Second, the infant car seat system may include one or more release actuators, which provide a quick-disconnect mechanism to easily remove the infant car seat system from the vehicle. Third, storage compartments may be integrated into the infant car seat to reduce the number of dangling and/or exposed components in the infant car seat system. Fourth, the direct installation of the infant car seat to the vehicle seat allows the parent and/or the caregiver to pay attention to the infant residing within the infant car seat while installing and/or uninstalling the infant car seat system in the vehicle. Fifth, the removal of the detachable vehicle installation base from the infant car seat system reduces the number of components the parent and/or the caregiver has to carry and store during a journey with the infant.

Although the various features of infant car seat systems disclosed herein may particularly facilitate use of ride-hailing or ridesharing services when transporting infants, these systems are not limited in applicability only to ride-hailing or ridesharing services and/or hired transportation services. Of course, parents and/or caregivers may readily benefit from using the disclosed infant car seat systems in their own vehicles—and in so doing, they would also free-up valuable space in the back seats of their vehicles that otherwise would have been taken up by a detachable vehicle installation base of a conventional infant car seat system.

In sum, one implementation is directed to an infant car seat system (100x), comprising: an infant car seat (102), having a front (102A) and a backside (102B), to carry an infant to and from a vehicle (500) and securely transport the infant in the vehicle with the front of the infant car seat facing the rear of the vehicle, the infant car seat comprising: a first seat shell rail (106A) having a first curved rocker bottom (107A); a second seat shell rail (106B) having a second curved rocker bottom (107B); a carrying handle (112); a first carrying handle attachment mechanism (114A) to attach the carrying handle to the infant car seat; and a second carrying handle attachment mechanism (114B) to attach the carrying handle to the infant car seat; an anchor system (104) coupled to the infant car seat to secure the infant car seat directly to a vehicle seat (50) of the vehicle with a tight fit, without using an infant car seat detachable base (20) and without using a vehicle seat belt, and requiring the front of the infant car seat to face the rear of the vehicle, the anchor system comprising: a first infant car seat anchor (104A), mechanically coupled to and constrained by a first portion of the first seat shell rail between the front of the infant car seat and the first carrying handle attachment mechanism, to mechanically engage with a first vehicle anchor (52A) of the vehicle seat; and a second infant car seat anchor (104B), mechanically coupled to and constrained by a first portion of the second seat shell rail between the front of the infant car seat and the second carrying handle attachment mechanism, to mechanically engage with a second vehicle anchor (52B) of the vehicle seat; an adjustment foot (170) disposed proximate to the front of the infant car seat between the first seat shell rail and the second seat shell rail; at least one storage area (160) to store the first infant car seat anchor and the second infant car seat anchor when the anchor system is not in use to secure the infant car seat to the vehicle seat; and at least one actuator (180), coupled to the infant car seat and the anchor system, to release both of the first infant car seat anchor from mechanical engagement with the first vehicle anchor and the second infant car seat anchor from mechanical engagement with the second vehicle anchor via a single actuation of the at least one actuator.

Another implementation is directed to an infant car seat system (100), comprising: an infant car seat (102), having a front (102A) and a backside (102B), to carry an infant to and from a vehicle (500) and securely transport the infant in the vehicle with the front of the infant car seat facing the rear of the vehicle, the infant car seat having a center of gravity (330A) and comprising: a carrying handle (112); a first carrying handle attachment mechanism (114A) to attach the carrying handle to a first side of the infant car seat; and a second carrying handle attachment mechanism (114B) to attach the carrying handle to a second side of the infant car seat; and an anchor system (104) coupled to the infant car seat to secure the infant car seat directly to a vehicle seat (50) of the vehicle with a tight fit, without using an infant car seat detachable base (20) and without using a vehicle seat belt over a top of the infant when the infant is in the infant car seat for transport in the vehicle, and with the front of the infant car seat facing the rear of the vehicle, the anchor system comprising: a first infant car seat anchor (104A) coupled to the infant car seat at a first constraining point (322A) to mechanically engage with a first vehicle anchor (52A) of the vehicle seat; and a second infant car seat anchor (104B) coupled to the infant car seat at a second constraining point (322B) different from the first constraining point to mechanically engage with a second vehicle anchor (52B) of the vehicle seat, wherein the first constraining point and the second constraining point are respectively positioned relative to the infant car seat based at least in part on the center of gravity of at least the infant car seat so as to significantly mitigate rotation of the backside of the infant car seat away from a seat back (56) of the vehicle seat during a crash event; and an adjustment foot (170) disposed proximate to the front of the infant car seat to significantly mitigate rotation of the backside of the infant car seat toward the seat back of the vehicle seat during installation of the infant car seat in the vehicle, the adjustment foot including at least one of an adjustable telescoping mechanism or an adjustable rotating mechanism to provide adjustable leverage against at least one of the seat back or a seat pan (58) of the vehicle seat to facilitate the tight fit to the vehicle seat.

Another implementation is directed to an infant car seat system, comprising an infant car seat (102) having a front (102A) and a backside (102B), the infant car seat comprising: a first seat shell rail (106A); and a second seat shell rail (106B); and an anchor system (104) coupled to the infant car seat to attach the infant car seat directly to a vehicle seat (50) with a tight fit and without using an infant car seat detachable base (20), the anchor system comprising: a rigid cross-member (104D) passing through the first seat shell rail and the second seat shell rail; a first infant car seat anchor (104A) attached to the rigid cross-member to mechanically engage with a first vehicle anchor (52A) of the vehicle seat, the first anchor being rotatable about a rotation axis defined by the rigid cross-member; and a second infant car seat anchor (104B) attached to the rigid cross-member to mechanically engage with a second vehicle anchor (52B) of the vehicle seat, the second anchor being rotatable about the rotation axis defined by the rigid cross-member.

Another implementation is directed to an infant car seat system, comprising: an infant car seat (102), having a front (102A) and a backside (102B), to carry an infant to and from a vehicle and securely transport the infant in the vehicle with the front of the infant car seat facing the rear of the vehicle, the infant car seat comprising: a first seat shell rail (106A) having a first curved rocker bottom (107A); a second seat shell rail (106B) having a second curved rocker bottom (107B); a carrying handle (112); a first carrying handle attachment mechanism (114A) to attach the carrying handle to the first seat shell rail; and a second carrying handle attachment mechanism (114B) to attach the carrying handle to the second seat shell rail; and an anchor system (104) coupled to the infant car seat to secure the infant car seat directly to a vehicle seat (50) of the vehicle with a tight fit and without using an infant car seat detachable base (20), the anchor system comprising: at least one belt (104C) permanently attached to the infant car seat, the at least one belt having an adjustable length and being mechanically constrained by at least one of: a first portion of the first seat shell rail between the front of the infant car seat and the first carrying handle attachment mechanism; or a first portion of the second seat shell rail between the front of the infant car seat and the second carrying handle attachment mechanism; a first infant car seat anchor (104A) attached to the at least one belt to mechanically engage with a first vehicle anchor (52A) of the vehicle seat; and a second infant car seat anchor (104B) attached to the at least one belt to mechanically engage with a second vehicle anchor (52B) of the vehicle seat.

Another implementation is directed to an infant car seat system, comprising: an infant car seat (102) comprising at least one storage area (160A); and an anchor system (104) coupled to the infant car seat to attach the infant car seat directly to a vehicle seat (50) with a tight fit and without using an infant car seat detachable base (20), the anchor system comprising: at least one belt (104C) permanently attached to the infant car seat, the at least one belt having an adjustable length; a first infant car seat anchor (104A) attached to the at least one belt to mechanically engage with a first vehicle anchor (52A) of the vehicle seat; and a second infant car seat anchor (104B) attached to the at least one belt to mechanically engage with a second vehicle anchor (52B) of the vehicle seat, wherein the at least one storage area of the infant car seat facilitates storage of at least one of the first infant car seat anchor and the second infant car seat anchor when the anchor system is not in use to attach the infant car seat to the vehicle seat.

Another implementation is directed to an infant car seat system, comprising: an infant car seat (102) having a front (102A) and a backside (102B), the infant car seat comprising: a first seat shell rail (106A); a second seat shell rail (106B); and an adjustment foot (170) disposed proximate to the front of the infant car seat between the first seat shell rail and the second seat shell rail; and an anchor system (104) coupled to the infant car seat to attach the infant car seat directly to a vehicle seat (50) with a tight fit and without using an infant car seat detachable base (20), the anchor system comprising: a first infant car seat anchor (104A) to mechanically engage with a first vehicle anchor (52A) of the vehicle seat; and a second infant car seat anchor (104B) to mechanically engage with a second vehicle anchor (52B) of the vehicle seat.

Another implementation is directed to an infant car seat system, comprising: an infant car seat (102); an anchor system (104) coupled to the infant car seat to attach the infant car seat directly to a vehicle seat (50) with a tight fit and without using an infant car seat detachable base (20), the anchor system comprising: a first infant car seat anchor (104A) to mechanically engage with a first vehicle anchor (52A) of the vehicle seat; and a second infant car seat anchor (104C) to mechanically engage with a second vehicle anchor (52B) of the vehicle seat; and at least one actuator (180), coupled to the infant car seat and the anchor system, to release both of the first infant car seat anchor from mechanical engagement with the first vehicle anchor and the second infant car seat anchor from mechanical engagement with the second vehicle anchor upon a single actuation of the at least one actuator.

Another implementation is directed to an infant car seat (102) comprising: a first seat shell rail (106A) having a first flat bottom; a first extendable curved rocker (190A) coupled to the first seat shell rail; a second seat shell rail (106B) having a second flat bottom; and a second extendable curved rocker (190B) coupled to the second seat shell rail.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A shows a vehicle in which an inventive infant car seat system according to various example implementations disclosed herein is installed, without using a detachable vehicle installation base and without using a vehicle seat belt.

FIGS. 2F-1 and 2F-2 show examples of infant car seat systems according to other inventive implementations.

FIGS. 3B-1, 3B-2, 3B-3 and 3B-4 show respective views representing changes in the center of gravity of an infant car seat by itself, and a combination of the infant car seat and different ATDs disposed in the infant car seat.

FIG. 3D shows the same side view of FIG. 3C after a crash force is applied to the vehicle seat and the infant car seat system.

FIG. 18E shows a bottom view of the infant car seat system of FIG. 18B.

FIG. 21D shows a top view of the infant car seat system of FIG. 21A.

FIG. 22C shows a top view of the infant car seat of FIG. 22A.

FIG. 23B shows a top view of the anchor system of FIG. 23A where the telescopic rail guides are in a retracted position.

FIG. 23C shows an exploded top perspective view of the anchor system of FIG. 23A.

FIG. 49 shows an exemplary infant car seat system with a belted anchor system and respective front storage compartments located in each seat shell rail to store respective seat anchors in the anchor system.

FIG. 50 shows a right-side view of an exemplary infant car seat system with an adjustment foot to adjust the recline angle of the infant car seat with respect to a vehicle seat.

FIG. 51A shows an exemplary infant car seat system with a telescoping adjustment foot.

FIG. 51B shows a bottom view of the infant car seat system of FIG. 51A where the adjustment foot is also used as storage for one or more seat anchors in an anchor system.

FIG. 52 shows an exemplary infant car seat system with a rotatable adjustment foot.

FIG. 53 shows an exemplary infant car seat system with a pop out rocker foot disposed in each seat shell rail of the infant car seat.

FIG. 54 shows an exemplary infant car seat system with an anchoring system that includes a mini base separate from the infant car seat for greater portability.

FIGS. 55A, 55B, 55C and 56 illustrate flow charts, and screen shots from an app, relating to ride-hailing/ridesharing methods involving an infant car seat system according to various implementations disclosed herein.

DETAILED DESCRIPTION

Following below are more detailed descriptions of various concepts related to, and implementations of, an infant car seat system that includes an infant car seat with an integrated anchor system for securing the infant car seat to a vehicle seat without using a detachable vehicle installation base and without using a vehicle seat belt. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive infant car seat systems are provided, wherein a given example or set of examples showcases one or more particular features of an infant car seat, a rigid anchor system, a belted anchor system, a release actuator, a storage compartment, an adjustment foot, and a pop-out rocker bottom. It should be appreciated that one or more features discussed in connection with a given example of an infant car seat system may be employed in other examples of infant car seat systems according to the present disclosure, such that the various features disclosed herein may be readily combined in a given infant car seat system according to the present disclosure (provided that respective features are not mutually inconsistent).

An Infant Car Seat System with an Integrated Anchor System

FIG. 2A shows a vehicle 500 (e.g., a ride-hail or rideshare vehicle) including a vehicle seat 50 to which an inventive infant car seat system 100 according to various example implementations disclosed herein is installed. FIG. 2A also shows a magnified view of the infant car seat system 100 in the vehicle seat 50 as an inset (further details of this inset are discussed in greater detail below in connection with FIG. 50).

Figure 2B:
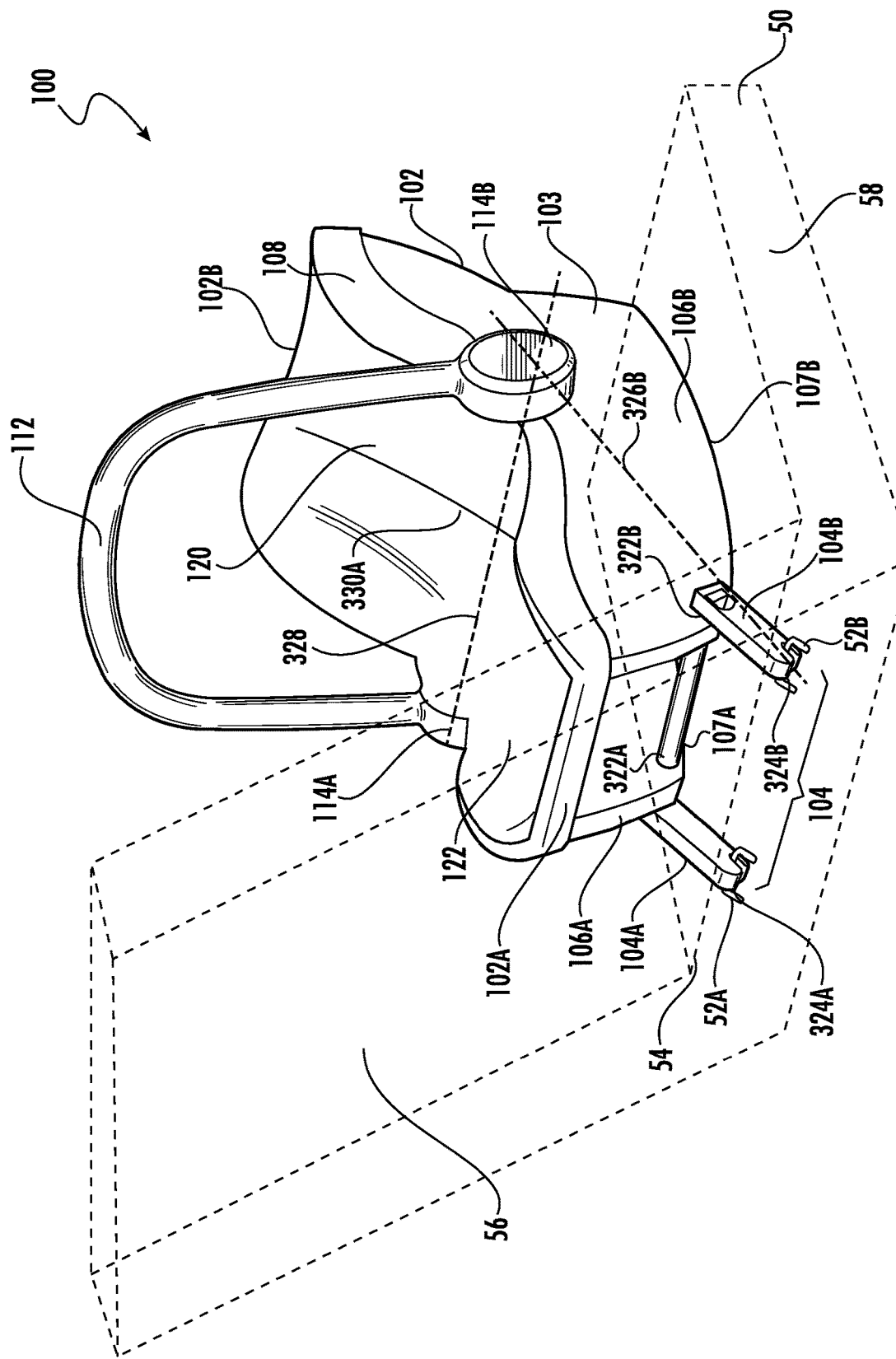
FIG. 2B shows an example of an infant car seat system coupled to the vehicle seat of the vehicle of FIG. 2A, according to one inventive implementation.

FIG. 2B illustrates an example of an infant car seat system 100 in which an infant car seat 102 is secured, via an integrated anchor system 104, to the vehicle seat 50 of the vehicle 500 of FIG. 2A. The vehicle seat 50 has a vehicle seat back 56, a vehicle seat pan 58, and a seat bight 54 (i.e., the intersection of the seat back 56 and the seat pan 58). The anchor system 104 secures the infant car seat 102 to the vehicle seat 50 without using a detachable vehicle installation base and without using a vehicle seat belt (e.g., passing over the top of the legs, lap or pelvis of the infant when the infant is in the infant car seat for transport in the vehicle). In various example implementations described in detail herein, the anchor system 104 helps ensure that installation of the infant car seat without using a detachable base (and additionally without using a vehicle seat belt) nonetheless provides a tight fit to the vehicle seat 50 that passes the CPS "inch test."

To preliminarily highlight the manner in which the anchor system 104 secures the infant car seat 102 to the vehicle seat 50, the infant car seat system 100 is shown in FIG. 2B without multiple features that may be present in various other example implementations of the infant car seat system described in later figures (e.g., including such features as a release actuator, one or more storage compartments, and/or an adjustment foot, which are described in detail below). As shown in FIG. 2A and FIG. 2B, the infant car seat 102 is secured to the vehicle seat 50 in a rear-facing orientation, in which a front 102A of the infant car seat 102 faces the vehicle seat back 56 and a backside 102B of the infant car seat 102 faces away from the vehicle seat back.

In the example of FIG. 2B, the infant car seat 102 includes a seat shell 103 and a seat shell rim 108 that together define a seat back 120 and a seat pan 122, in which a seat pad is disposed to support an infant that is placed in the seat 102. In some examples, the seat shell 103 may be a single substantially solid or partially hollow structure defining the seat back and seat pan and supporting the seat pad for the infant (discussed further below in connection with FIGS. 2F-1 and 2F-2). In other examples, as shown in FIG. 2B, the seat shell 103 may include seat shell rails 106A and 106B on respective opposing sides of the infant car seat 102. As can be readily observed in FIG. 2B, the seat shell rails 106A and 106B are in contact with the vehicle seat pan 58 when the infant car seat is secured to the vehicle seat 50. In some implementations, the seat shell rails 106A and 106B may have corresponding curved rocker bottoms 107A and 170B, respectively, to provide for a rocking motion to comfort the infant when the infant car seat is used outside of the vehicle (e.g., in a home environment).

The infant car seat 102 in the example of FIG. 2B also includes a carrying handle 112 coupled to opposing sides of the seat shell 103 (e.g., to the seat shell rails 106A and 106B) via attachment mechanisms 114A and 114B. In some implementations, the attachment mechanisms 114A and 114B may allow the carrying handle 112 to rotate with respect to the seat shell 103 to provide for access to the infant. The attachment mechanisms 114A and 114B may also include integrated locking mechanisms to maintain the carrying handle 112 at a desired orientation with respect to the seat shell 103.

As shown in the example of FIG. 2B, the integrated anchor system 104 of the infant car seat system 100 is mounted generally to a front lower portion of the seat shell 103. In the illustrated example, the anchor system 104 is a rigid anchor system, whereas in other examples the anchor system may be a belted anchor system (both rigid and belted anchor systems are described in greater detail below in connection with various figures). In FIG. 2B, the anchor system 104 includes a pair of seat anchors 104A and 104B pivotably coupled to mechanical constraining points 322A and 322B, respectively, on the seat shell rails 106A and 106B of the seat shell 103. As discussed below, although two mechanical constraining points 322A and 322B are shown on respective sides of the infant car seat 102 in FIG. 2B, in other example implementations the anchor system 104 more generally may be coupled to the infant car seat at one or more mechanical constraining points that are not necessarily positioned on the side(s) of the infant car seat (e.g., see FIGS. 2F-1 and 2F-2).

The seat anchors 104A and 104B of the anchor system 103 generally have an elongated shape (e.g., an oblong rectangle) and include a locking mechanism (e.g., a latch) that engages with corresponding vehicle lower anchors 52A and 52B in or proximate to the seat bight 54 of the vehicle seat at anchor points 324A and 324B, respectively. In this manner, the anchor system 104 may directly couple the infant car seat 102 to the vehicle seat 50 without using a detachable vehicle installation base and without using a vehicle seat belt. Additionally, the seat anchors 104A and 104B may include (or be coupled to) a release mechanism (e.g., a button, a knob, a slidable tab) to unlatch the seat anchors 104A and 104B from the vehicle seat anchors 52A and 52B for removal of the infant car seat system from the vehicle. In various implementations, the seat anchors 104A and 104B and the vehicle lower anchors 52A and 52B may be configured to meet well-established safety standards and/or regulations, examples of which include, but not limited to, LATCH, ISOFIX, LUAS, and UCSS standards.

In example implementations (e.g., as discussed further below in connection with FIGS. 3A and 3C), the seat anchors 104A and 104B are configured and arranged, and the mechanical constraining point(s) for the anchor system 104 is/are particularly positioned, for relatively easy engagement with the vehicle seat anchors 52A and 52B located in or proximate to the seat bight 54 so as to facilitate installation of the infant car seat system in the vehicle. Furthermore, the seat anchors 104A and 104B are configured and arranged, and the mechanical constraining point(s) is/are particularly positioned, such that upon engagement of the seat anchors 104A and 104B with the vehicle lower anchors 52A and 52B, there is a tight fit between the infant car seat system 100 and the vehicle seat 50 (e.g., the installed infant car seat system passes the CPS "inch test").

Figure 2C:
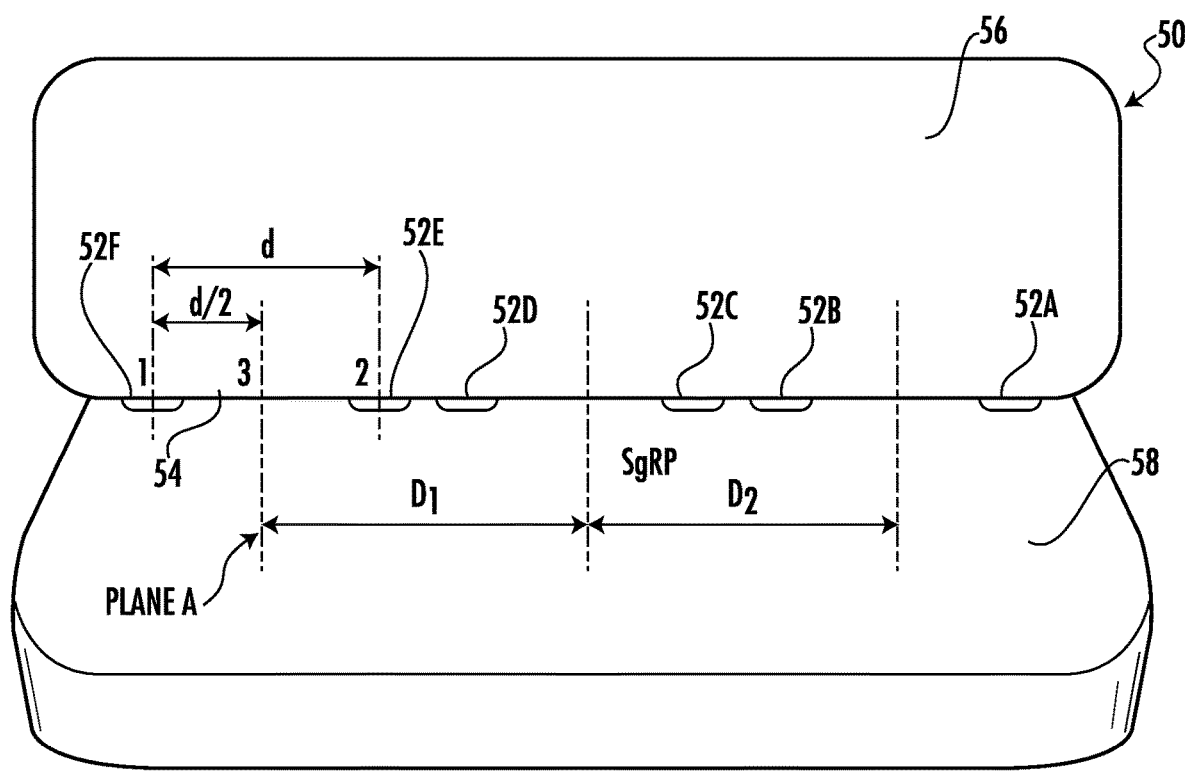
FIG. 2C shows a diagram of a typical vehicle seat and vehicle lower anchors to which the infant car seat system of FIG. 2A engages.

In one aspect, the seat anchors 104A and 104B in the anchor system 104 are arranged to facilitate alignment with standard arrangements of vehicle lower anchors 52A and 52B in the vehicle seat 50. For example, FIG. 2C shows a diagram of a standard vehicle seat 50 with three sets (pairs) of vehicle lower anchors 52A-52B, 52C-52D, and 52E-52F. As shown in FIG. 2C, the respective pairs of vehicle lower anchors are disposed in or proximate to the seat bight 54 of the vehicle seat 50 between the vehicle seat back 56 and the vehicle seat pan 58. Given the location of the vehicle lower anchors in or proximate to the seat bight 54 of the vehicle seat, the anchor system 104 of the infant car seat system 100 generally is positioned on a front lower portion of the seat shell 103 to facilitate a convenient connection with the vehicle lower anchors (e.g., the seat anchors 104A and 104B respectively are positioned along front lower sides of the first and second seat shell rails 106A and 106B).

In FIG. 2C, each pair of vehicle lower anchors 52A-52B, 52C-52D, and 52E-52F corresponds to a particular seating position on the vehicle seat 50 (i.e., left, center, and right seating positions). The relative positions of the respective vehicle lower anchors 52A-52F are defined with respect to a seating reference point (SgRP) according to 49 CFR § 571.3. As shown, the nominal center-to-center distance between a pair of vehicle lower anchors at a given seating position (e.g., the distance "d" between the pair of lower anchors 52E-52F) is about 280 mm. Thus, the seat anchors 104A and 104B in the anchor system 104 may be similarly arranged to have a center-to-center distance of about 280 mm.

Figure 2D:
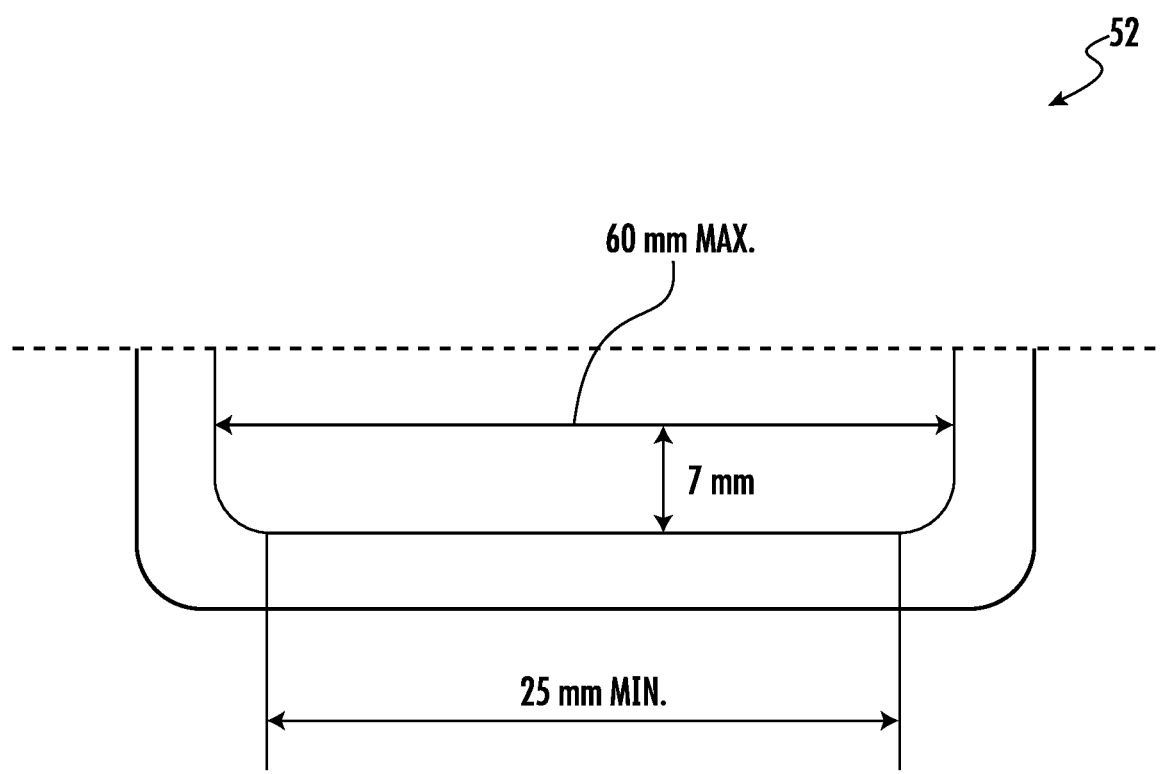
FIG. 2D shows a diagram of a typical vehicle seat lower anchor in the vehicle seat of FIG. 2C.

FIG. 2D further shows a magnified view of an individual vehicle lower anchor 52. As shown, the vehicle lower anchor 52 may be a U-shaped rail with a nominal width that ranges between about 25 mm and about 60 mm. The seat anchors 104A and 104B of the anchor system 104 may be configured to attach to the smallest-sized vehicle seat anchor 52 to ensure compatibility across different vehicle seats 50 for different makes and/or models of vehicles.

Figure 2E:
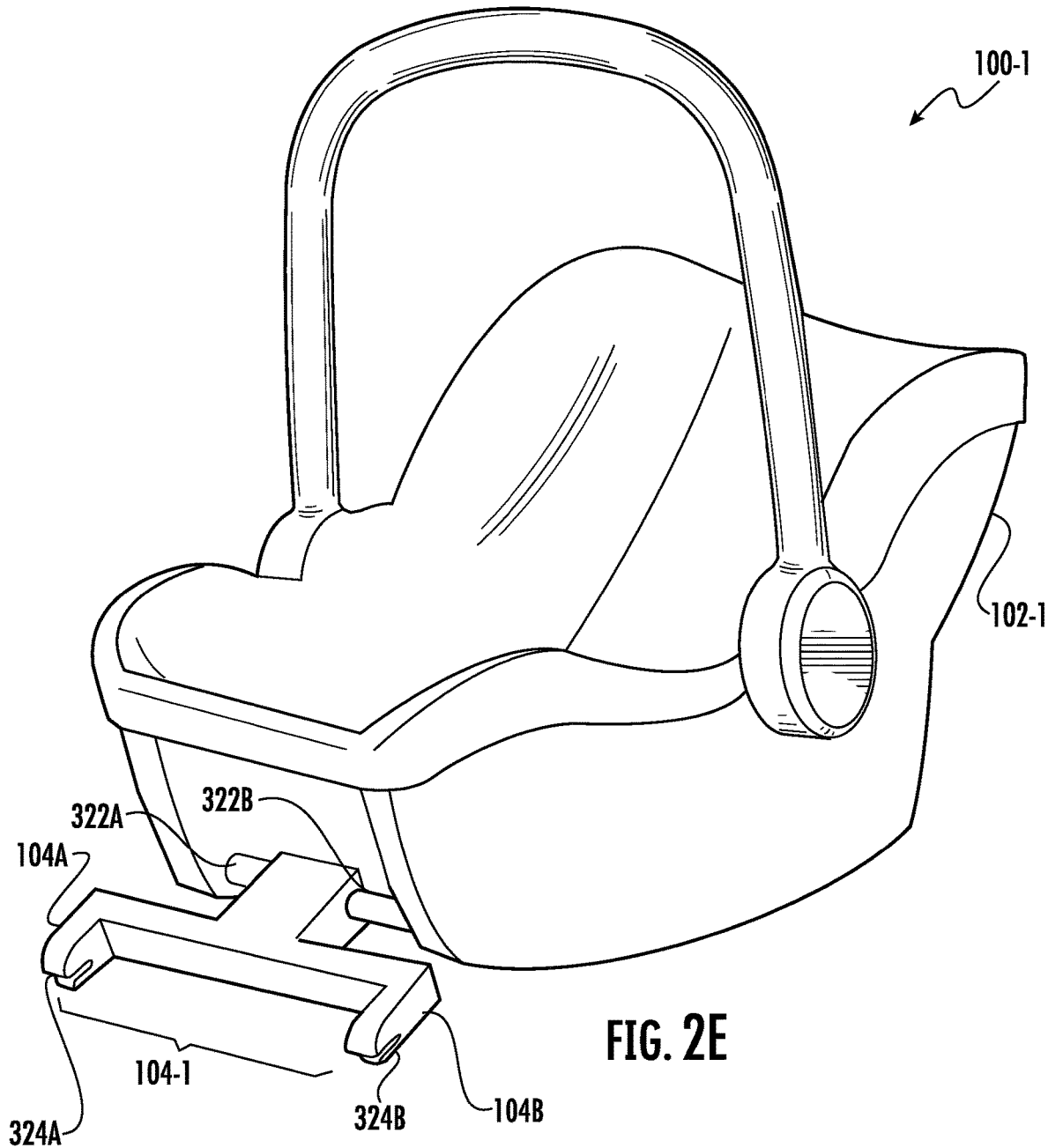
FIG. 2E shows an example of infant car seat system according to another inventive implementation.
Figure 3A:
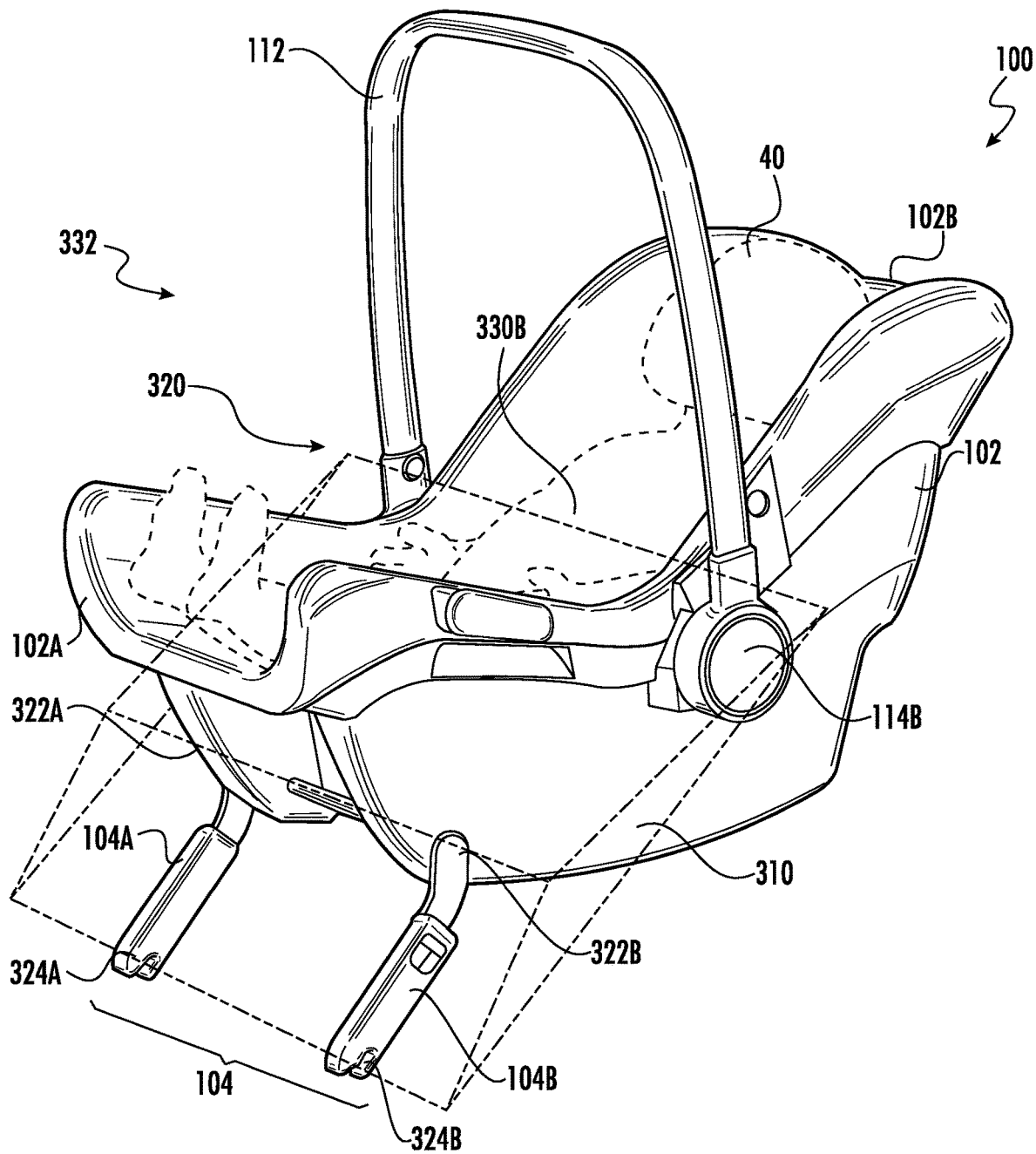
FIG. 3A shows a perspective view of an infant car seat system similar to that shown in FIG. 2A, in which an anthropomorphic test device (ATD) is disposed in the infant car seat of the system.
Figures 1, 3B:
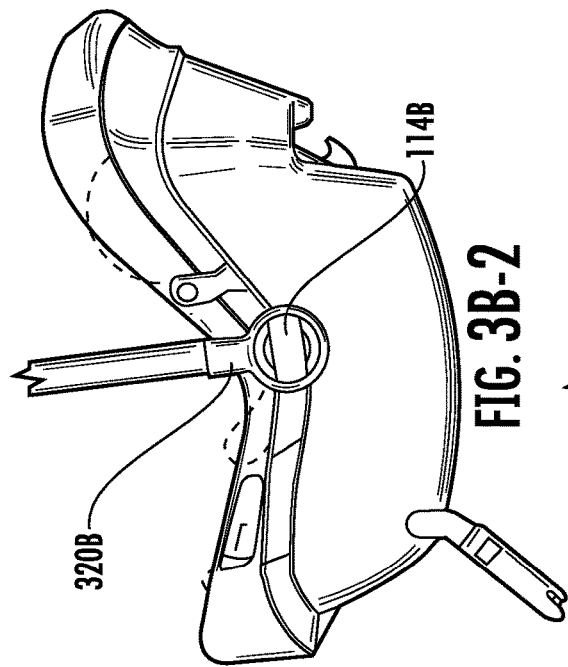
Figures 2, 3B:
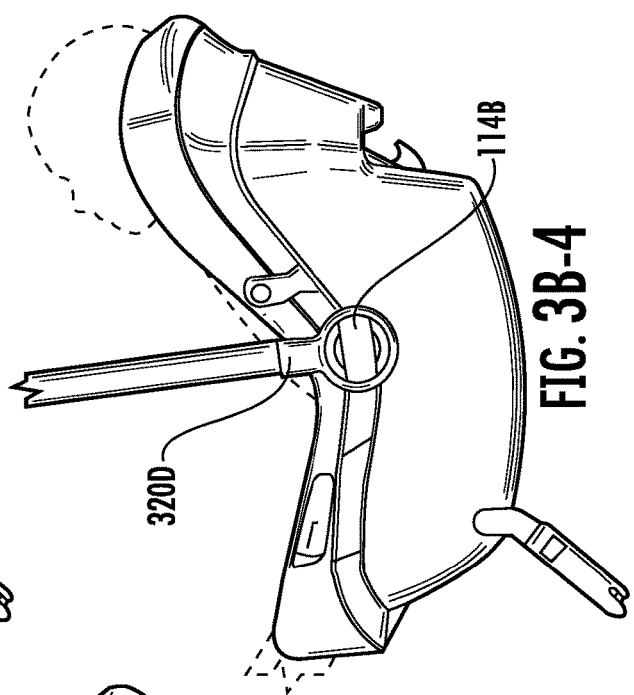

FIG. 2E and FIGS. 2F-1 and 2F-2 illustrate inventive infant car seat systems 100-1, 100-2, and 100-3 according to other example implementations. FIG. 2E is a system 100-1 substantially similar to that shown in FIG. 2B but includes a differently configured anchor system 104-1, in which the seat anchors 104A and 104B are formed as a unitary structure that is pivotably coupled to the mechanical constraining points 322A and 322B on the respective seat shell rails of the infant car seat 102-1. In FIGS. 2F-1 and 2F-2, the respective infant car seats 102-2 and 102-3 do not have respective seat shell rails; instead, these infant car seats 102-2 and 102-3 respectively have seat shells 103-2 and 103-3, each of which is a single substantially solid or partially hollow structure defining the seat back and seat pan and supporting the seat pad for the infant. In the example system 100-2 shown in FIG. 2F-1, the anchor system 104-2 is a rigid anchor system pivotably coupled to a mechanical constraining point 322-2 on the front portion of the seat shell 103-2. In the example system 100-3 shown in FIG. 2F-2, the anchor system 104-3 is a belted anchor system pivotably and flexibly coupled to a mechanical constraining point 322-3 on the front portion of the seat shell 103-3.

In various examples of infant car seat systems discussed herein, the anchor system 104 serves as the direct physical link between the vehicle seat 50 and the infant car seat 102, and the seat anchors 104A and 104B provide the only restraints to secure the infant car seat 102 to the vehicle seat 50 in the event of a vehicle crash event. In particular, the example systems disclosed herein not only obviate the need for a detachable vehicle installation base or a vehicle seat belt to secure the infant car seat 102 to the vehicle seat 50, but further they do not require or include other restraining devices, such as a tether (e.g., a top tether strap attached to the backside of the infant car seat to attach the infant car seat to a top tether anchor in the vehicle) or a load leg (e.g., a support leg between the infant car seat 102 and the floor of the vehicle).

Thus, the placement and orientation of the seat anchors 104A and 104B in relation to the infant car seat 102 and the vehicle seat 50 determines, at least in part, the various forces exerted on the infant car seat 102 during a crash event (e.g., forces that would be exerted on an infant's head and chest, as well as the rotational displacement of the seat back 120 of the infant car seat with respect to vertical) and the kinematics of the infant car seat system resulting from such forces. With the foregoing in mind, in one aspect the anchor system is pivotably coupled to one or more particularly positioned mechanical constraining points, based in part on the center of gravity of the infant car seat, so as to significantly mitigate rotation of the backside of the infant car seat away from the back of the vehicle seat during a crash event (and also notably reduce other injury criteria relating to forces that would be exerted on the infant's head and chest).

With improved crash performance and reduced injury criteria in mind, as noted above the placement and orientation of the seat anchors 104A and 104B also takes into consideration ease of use and convenience issues for parents and/or caregivers by facilitating engagement of the seat anchors 104A and 104B with respective vehicle lower anchors 52A and 52B. Moreover, the placement and orientation of the seat anchors 104A and 104B ensures a tight fit of the infant car seat to the vehicle car seat such that the installation passes the CPS "inch test." Thus, improved crash performance and reduced injury criteria, a tight fit to the vehicle, and ease of installation are all realized by appropriate positioning of one or more constraining points at which the anchor system is pivotably coupled to the infant car seat.

In FIG. 2B, a center of gravity 330A of the infant car seat is indicated near the intersection of the seat back 120 and the seat pan 122 of the infant car seat 102, which approximately coincides with an axis 328 passing through the respective attachment mechanisms 114A and 114B. As would be readily appreciated by one of skill in the art, the center of gravity of an object is a point from which the weight of a body or system may be considered to act (in uniform gravity, the center of gravity is the same as the center of mass of an object/system). In the example system of FIG. 2B, the axis 328 is taken to suitably approximate a projection of the center of gravity 330A toward the respective sides of the infant car seat 102.

As can be readily observed in the perspective view of FIG. 2B, a first constraining point 322A for the first seat anchor 104A and a second constraining point 322B for the second seat anchor 104B are positioned closer to the front 102A of the infant car seat than to the backside 102B of the infant car seat. More specifically, the first constraining point 322A is positioned between the front of the infant car seat and the first carrying handle attachment mechanism 114A, and the second constraining point 322B is positioned between the front of the infant car seat and the second carrying handle attachment mechanism 114B. As also shown in FIG. 2B, the first infant car seat anchor 104A has a first connection end 324A that mechanically engages with the first vehicle lower anchor 52A and defines a first anchor point when the system is installed in the vehicle, and the second infant car seat anchor 104B has a second connection end 324B that mechanically engages with the second vehicle lower anchor 52B and defines a second anchor point when the system is installed in the vehicle.

In FIG. 2B, a line 326B is drawn to extend from the attachment hub 114B, passing the axis 328 and the second connection end 324B of the second seat anchor 104B, to the vehicle lower anchor 52B. In example implementations, the second constraining point 322B is positioned above the line 326B. While not visible in the perspective view of FIG. 2B, a similar line may be drawn on the opposite side of the infant car seat (i.e., to extend from the attachment hub 114A, passing through the axis 328 and the first connection end 324A of the first seat anchor 104A, to the vehicle lower anchor 52A), and the first constraining point 322A may be positioned above this line. The placement of the mechanical constraining points 322A and 322B above these lines is based in part on improving crash performance and reducing injury criteria in consideration of the center of gravity, as well as ensuring a tight fit between the infant car seat system and the vehicle seat. These concepts are further explained with the assistance of FIG. 3A.

FIG. 3A shows a perspective view of an infant car seat system 100 similar to that shown in FIG. 2A and FIG. 2B, in which an anthropomorphic test device (ATD) 40 is disposed in the infant car seat 102 of the system 100 (and the vehicle seat 50 is not shown to facilitate clarity). As noted above, in example implementations, one or more mechanical constraining points for the respective seat anchors 104A and 104B (e.g., the points 322A and 322B) may be based at least in part on a center of gravity 330A of the infant car seat itself (see FIG. 2B) or on a combined center of gravity 330B of the infant car seat and an ATD 40 disposed in the infant car seat (as shown in FIG. 3A). In one implementation discussed further below in connection with FIG. 3E, the center of gravity on which the mechanical constraining point(s) for the seat anchors is/are based alternatively may be sufficiently approximated by a seat pan offset and a seat back offset of the infant car seat. Generally speaking, as noted above, the mechanical constraining point(s) for the seat anchors is/are respectively positioned to significantly improve crash performance and reduce injury criteria of the infant car seat, without using a tether strap attached to the backside of the infant car seat to attach the infant car seat to a top tether anchor in the vehicle and without using a load leg between the infant car seat and a floor of the vehicle.

In FIG. 3A, the infant car seat 102 has a longitudinal plane 332 (also referred to as a "sagittal plane") that divides the infant car seat into right and left parts. An axis 320 (labeled as CG) is shown perpendicular to the longitudinal plane of the infant car seat and passing through the center of gravity 330B; similarly, an axis A passes through anchor points defined by the first connection end 324A and the second connection end 324B of the respective seat anchors 104A and 104B, and an axis P passes through the first and second constraining points 322A and 322B. These three axes define three planes in addition to the longitudinal plane 332, namely, the plane A-P, the plane P-CG, and the plane A-CG. This latter plane A-CG is referred to herein as a lower constraining boundary plane 310.

More specifically, the lower constraining boundary plane 310 of the infant car seat is defined by the axis 320, the first connection end 324A of the first infant car seat anchor 104A when engaged with the first vehicle anchor 52A, and the second connection end 324B of the second infant car seat anchor 104B when engaged with the second vehicle anchor 52B. As readily observed in FIG. 3A, the first constraining point 322A and the second constraining point 322B, through which the axis P passes, are above the lower constraining boundary plane 310.

In FIG. 3A, the center of gravity 330B relates to the combination of the infant car seat and the ATD 40; however, as noted above, for purposes of defining the lower constraining boundary plane 310, the center of gravity 330A of the infant car seat itself (see FIG. 2B) may be alternatively used. Furthermore, in implementations in which the center of gravity 330B of the combination of the ATD 40 and the infant car seat system is used, the ATD 40 may be one of multiple different types of ATD's representative of the different ages and/or sizes of infants that may be placed into the infant car seat 102.

As a general observation, the Inventors have recognized and appreciated that although the center of gravity changes between the infant car seat itself and the combination of the infant car seat with different ATDs, these changes are relatively nominal with respect to one another. In particular, the center of gravity of the infant car seat itself provides a suitable reference for effectively defining the lower constraining boundary plane 310 and, in turn, the particular placement of the mechanical constraining points 322A and 322B to sufficiently improve crash performance and reduce injury criteria. That said, these results may in some instances be even further improved when using the center of gravity of the combination of the infant car seat with different ATDs to define the lower constraining boundary plane 310. To this end, in one example implementation the ATD 40 may be chosen such that the axis 320 through the center of gravity of the combination of the infant car seat and the ATD is at its highest and forward-most position along the infant car seat 102. Examples of different ATDs that may be used in combination with the infant car seat to establish a center of gravity for these purposes include, but are not limited to, a newborn test dummy, a six-month old infant test dummy, a nine-month old child test dummy, a Child Restraint Air Bag Interaction (CRABI) 12-month-old test dummy, or a Hybrid III three-year old child test dummy, as defined in the U.S. Code of Federal Regulations, 49 C.F.R. § 572, which is hereby incorporated herein by reference (a newborn test dummy is defined in Subpart K, §§ 572.90, 572.91; a six-month old infant test dummy is defined in Subpart D, § 572.25; a nine-month old child test dummy is defined in Subpart J, §§ 572.80-572.86; a 12-month-old CRABI test dummy is defined in Subpart R, §§ 572.150-572.155; and a Hybrid III three-year old child test dummy is defined in Subpart P, §§ 572.140-572.146).

Figures 3, 3B:
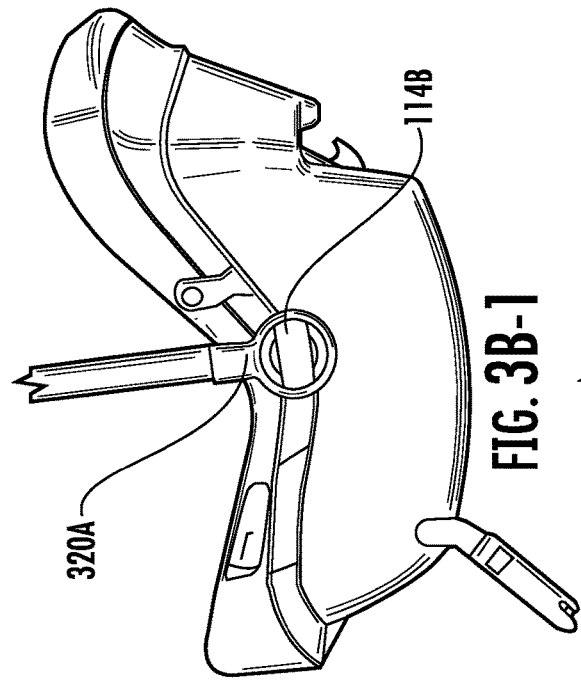
Figures 3, 3B, 4:
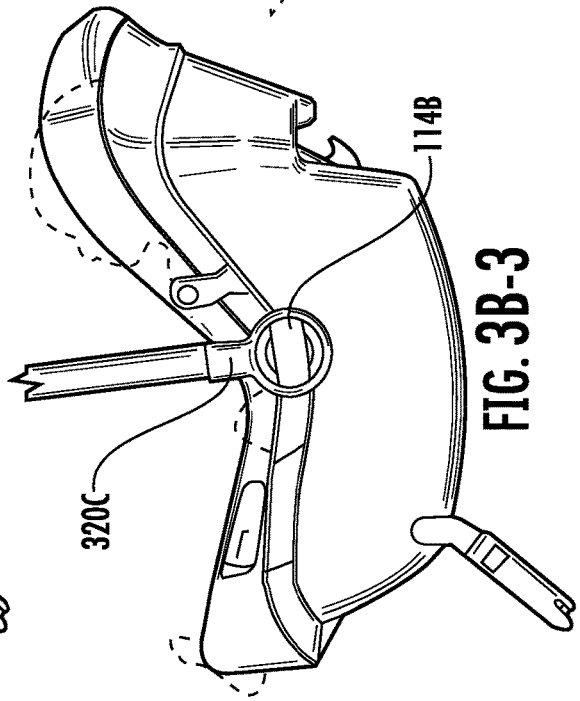

FIGS. 3B-1, 3B-2, 3B-3 and 3B-4 show respective side views illustrating changes in the center of gravity of an infant car seat by itself, and a combination of the infant car seat and different ATDs disposed in the infant car seat. More specifically, FIG. 3B-1 shows an infant car seat by itself and an axis 320A running perpendicular to the longitudinal plane through the infant car seat (i.e., which is parallel to the plane of the figure) and through the center of gravity. Similarly, FIG. 3B-2 shows a combination of an infant car seat and a newborn test dummy and an axis 320B running through the center of gravity of the combination, FIG. 3B-3 shows a combination of an infant car seat and a 12-month old CRABI test dummy and an axis 320C running through the center of gravity of the combination, and FIG. 3B-4 shows a combination of an infant car seat and a Hybrid III three-year old child test dummy and an axis 320D running through the center of gravity of the combination. According to FMVSS-213, only a newborn and a 12-month-old CRABI test dummy is required for crash testing; however, a Hybrid III three-year old child test dummy is often utilized as well to ensure compliance with FMVSS-213 crash test requirements for completeness. In any event, as may be readily observed in these figures, changes in center of gravity are relatively nominal, particularly with respect to the carrier handle attachment mechanism 114B (such that the axis 328 shown in FIG. 2B through the carrier handle attachment mechanisms 114A and 114B is, in some example implementations, a suitable approximation for the axis 320 shown in FIG. 3A).

Figure 3C:
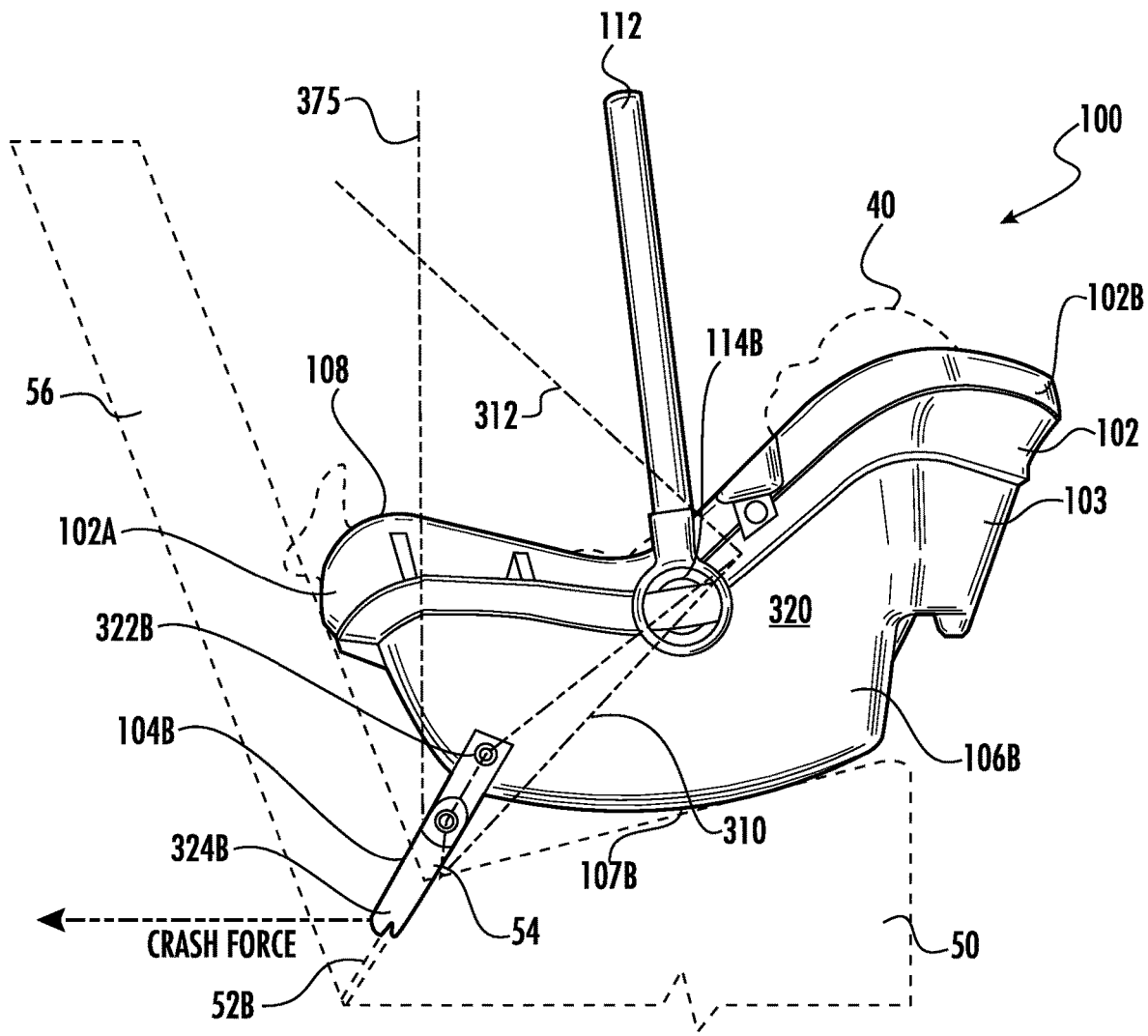
FIG. 3C shows a side view of the infant car seat system of FIG. 3A prior to a crash event ("pre-crash" condition).

FIG. 3C is a side view of the infant car seat system 100 shown in FIG. 3A with the ATD 40 placed therein. In FIG. 3C, the infant car seat system 100 is secured to the vehicle seat 50 with a tight fit and in a normal vehicle-operating position representative of a "pre-crash" condition (i.e., prior to a crash event). As in the FIG. 3B series of figures, the longitudinal plane (sagittal plane) through the infant car seat 102 is not explicitly shown, as it is parallel to the plane of the figure. Accordingly, the lower constraining boundary plane 310 is viewed along a side of the plane and thus appears as a line in the side view of FIG. 3C. FIG. 3C also shows that an upper constraining boundary plane 312 of the infant car seat may be defined to be perpendicular to the lower constraining boundary plane 310 and includes the axis 320 (passing through the center of gravity 330B). In the example of FIG. 3C, the first constraining point 322A and the second constraining point 322B are particularly positioned above the lower constraining boundary plane 310 and, more specifically, between the lower constraining boundary plane 310 and the upper constraining boundary plane 312.

FIG. 3C also shows an arrow indicating the direction of a crash force during a crash event. As a further illustration, FIG. 3D shows the resultant displacement of the infant car seat system 100 and the ATD 40 after a crash force is applied. Although the backside of the infant car seat rotates away from the seat back of the vehicle seat 50 in FIG. 3D upon application of the crash force, the particular positioning of the first and second constraining points 322A and 322B above the lower constraining boundary plane 310 and, more specifically, between the lower constraining boundary plane 310 and the upper constraining boundary plane 312, ensures that the rotational displacement of the seat back of the infant car seat during a crash event is less than 70 degrees relative to vertical.

As also may be observed in FIG. 3C, the Inventors have recognized and appreciated that further refinements of the particular positioning of the constraining points 322A and 322B relative to the axis 320 through the center of gravity and, more specifically, the lower constraining boundary plane 310, lead to not only favorable improvements in crash performance and reduced injury criteria, but also to ease of installation and tight fit of the infant car seat to the vehicle seat. To this end, FIG. 3C also shows a vertical plane 375 passing through the seat bight 54 of the vehicle seat 50 (the vertical plane 375 is viewed on edge in FIG. 3C and is normal to the plane of the figure). In example implementations, the positioning of one or more constraining points at which the anchor system is pivotably coupled to the infant car seat (e.g., the constraining points 322A and 322B) is not only between the lower constraining boundary plane 310 and the upper constraining boundary plane 312, but between the vertical plane 375 through the seat bight 54 and the lower constraining boundary plane 310. By ensuring that the constraining point(s) is/are not positioned in the area between the seat back 56 and the vertical plane 375 through the seat bight 54, pivoting of the car seat during installation and thereafter (which may allow for excessive space between the seat back 56 and the infant car seat 102) is significantly mitigated. This in turn provides for an installation with a tight fit between the infant car seat and the vehicle seat that passes the CPS "inch test."

Figure 3E:
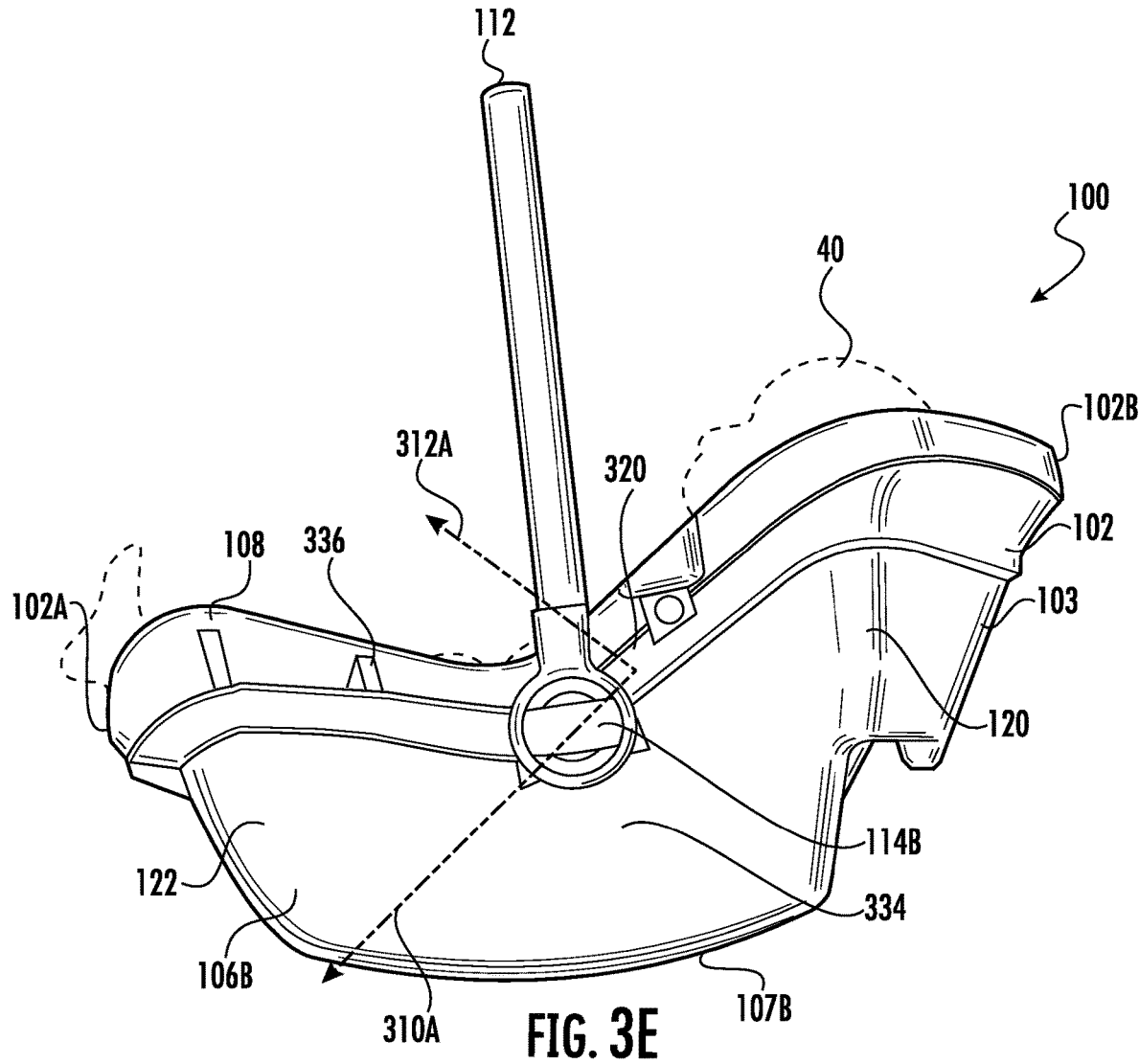
FIG. 3E shows a side view of the infant car seat system of FIG. 3A illustrating an approximation of a reference plane used to position the mechanical constraining points of the anchor system on the infant car seat.

FIG. 3E shows another side view of the infant car seat system 100 of FIG. 3A to illustrate a suitable approximation of the lower constraining boundary plane 310A based on a seat pan offset and a seat back offset of the infant car seat 102. In one aspect, approximating the lower constraining boundary plane in this manner is based on observing the changes in center of gravity illustrated in FIGS. 3B-1 through 3B-4 and taking an average measurement of these changes relative to the seat back and the seat pan of the infant car seat, with the proviso that the seat back is at an angle in a range of between 40 degrees and 60 degrees with respect to horizontal when the infant car seat is secured to the vehicle seat of the vehicle.

More specifically, in the example of FIG. 3E, the approximated lower constraining boundary plane 310A of the infant car seat is defined by a seat back offset 334 from a seat back plane sufficiently approximating a contour of the seat back of the infant car seat. Based on multiple measurements using different ATDs 40, in one example a suitable seat back offset is approximately seven centimeters (presuming that the seat back plane is at an angle in a range of between 40 degrees and 60 degrees with respect to horizontal when the infant car seat is secured to the vehicle seat of the vehicle). Furthermore, an approximated upper constraining boundary plane 312A is defined by a seat pan offset 336 from a seat pan plane sufficiently approximating a contour of the seat pan of the infant car seat. Based on multiple measurements using different ATDs 40, in one example a suitable seat pan offset is approximately twenty-two centimeters.

Figure 4A:
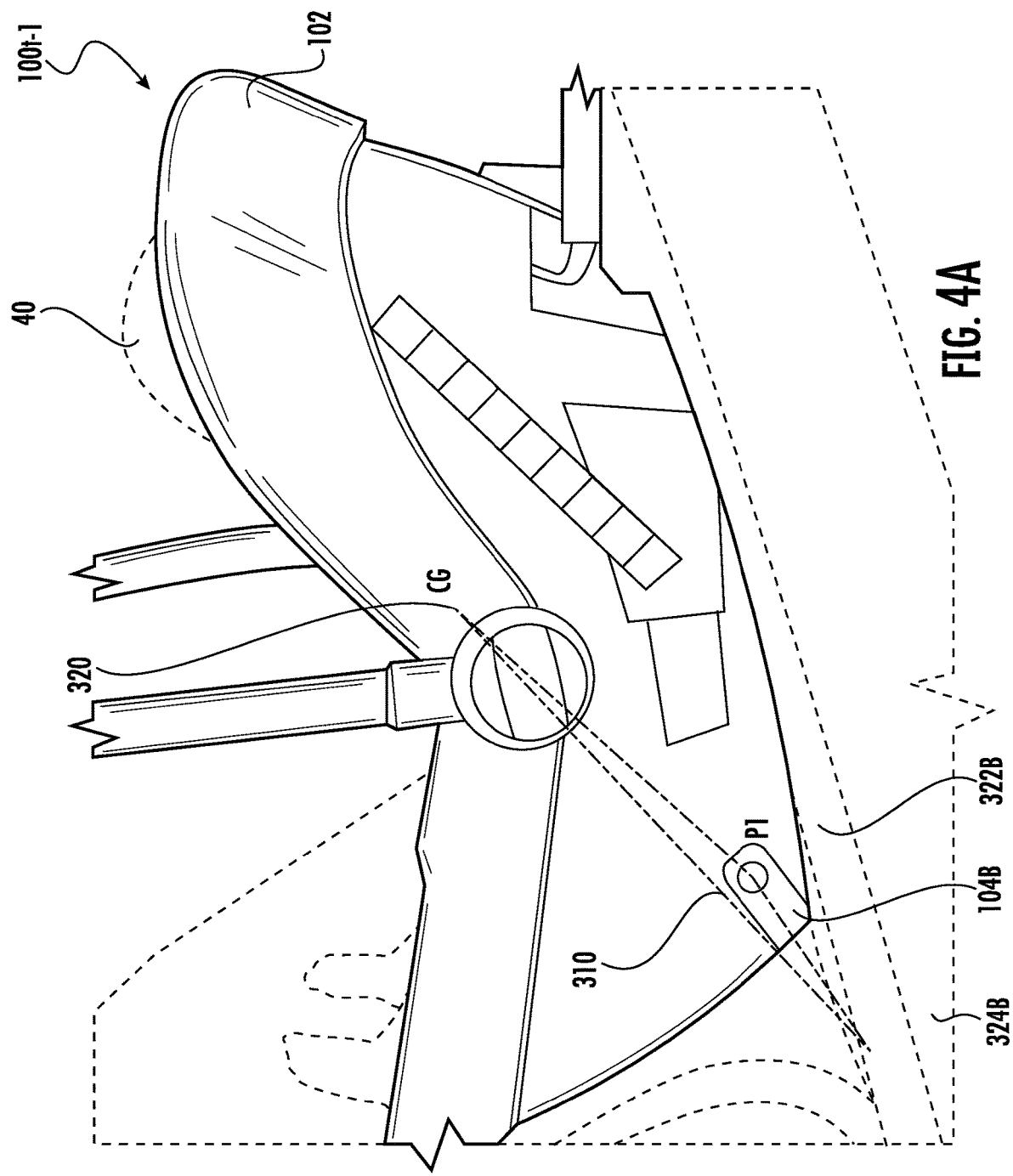
FIG. 4A shows a side view of an exemplary infant car seat system corresponding to the infant car seat system of FIG. 3A undergoing a crash test. The anchor system is shown coupled to the infant car seat at a location P1.
Figure 4B:
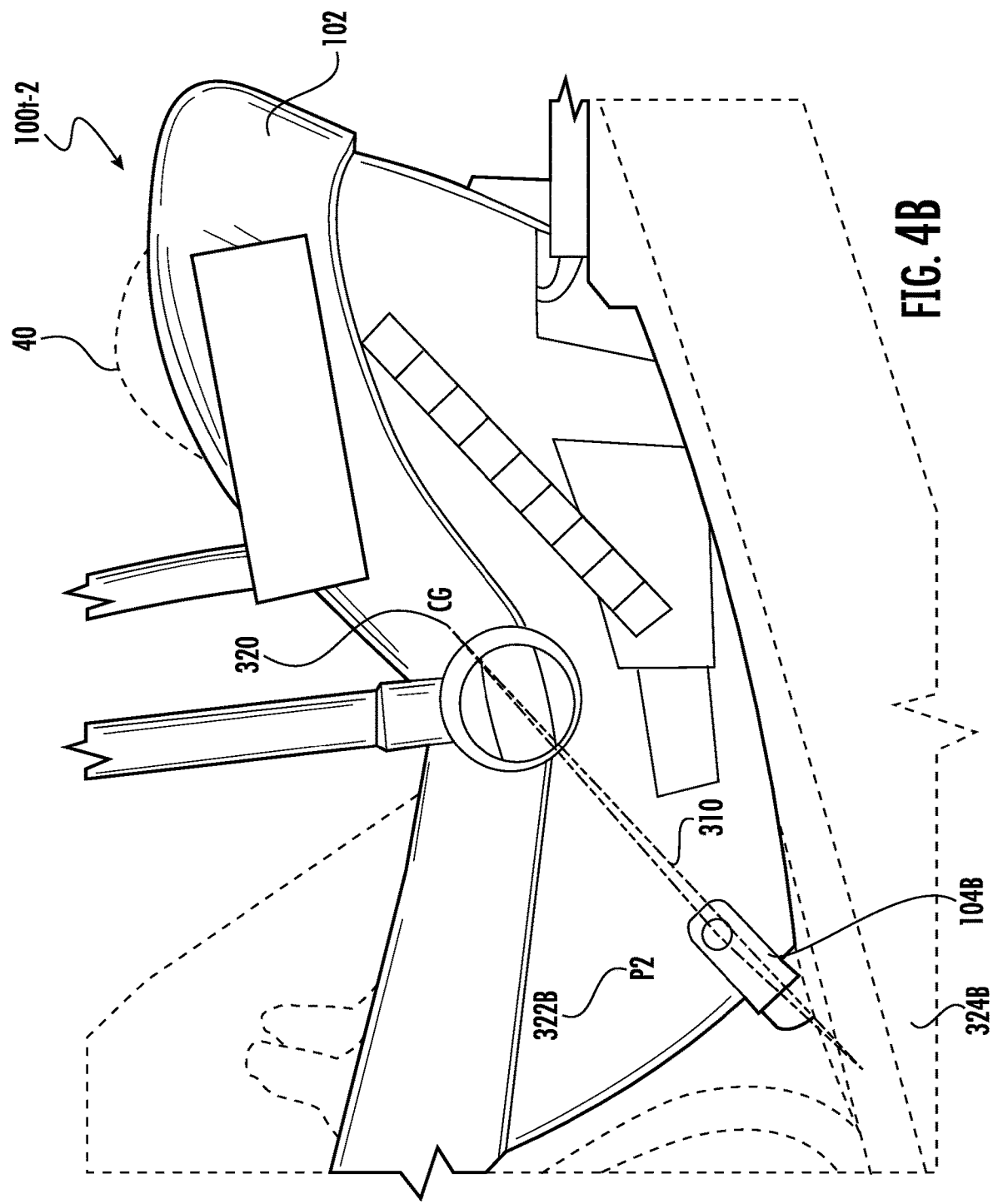
FIG. 4B shows a side view of an exemplary infant car seat system corresponding to the infant car seat system of FIG. 3A undergoing a crash test. The anchor system is shown coupled to the infant car seat at a location P2, which is higher along the infant car seat than P1.
Figure 4C:
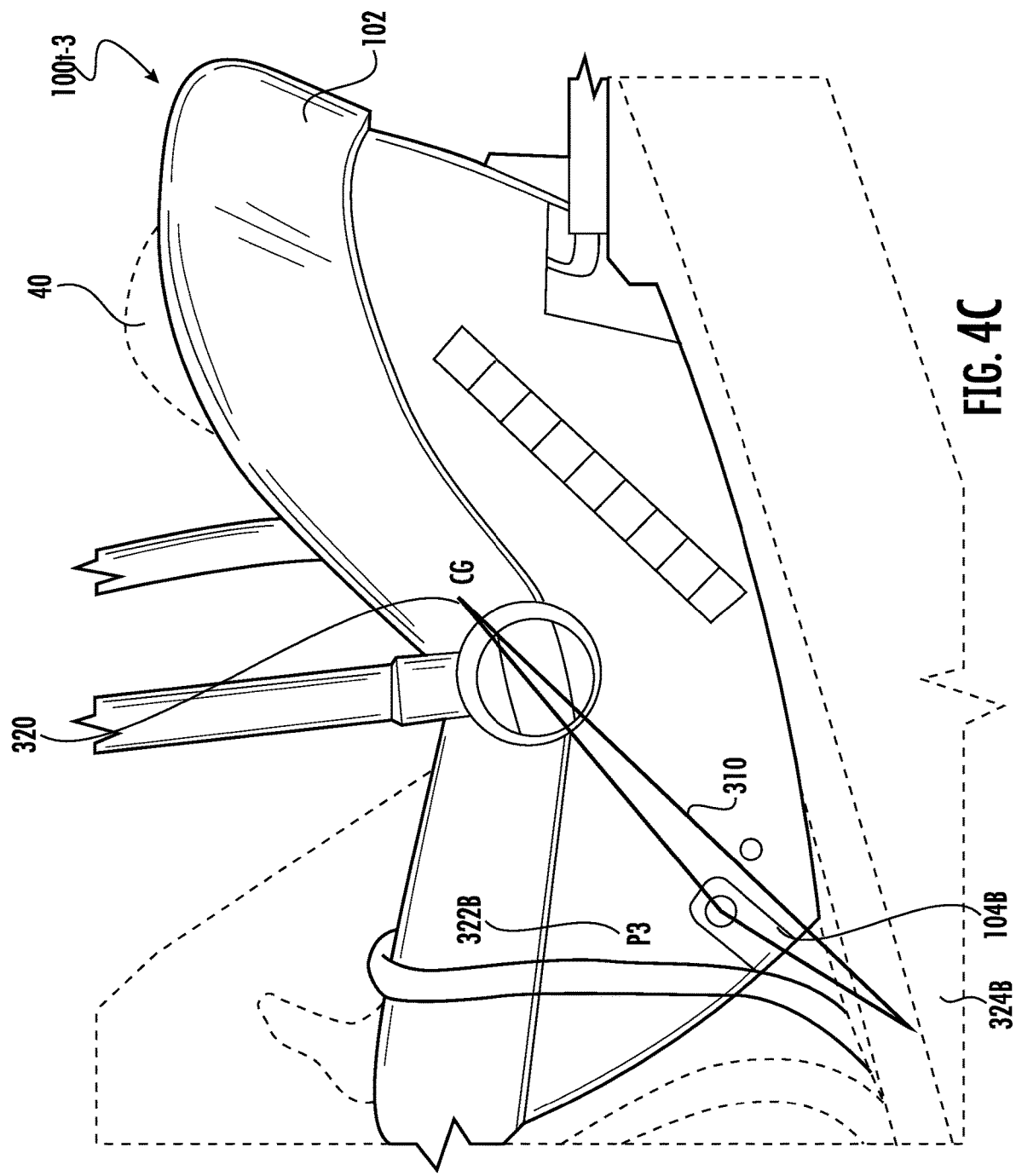
FIG. 4C shows a side view of an exemplary infant car seat system corresponding to the infant car seat system of FIG. 3A undergoing a crash test. The anchor system is shown coupled to the infant car seat at a location P3, which is higher along the infant car seat than P2.

As noted above, particularly positioning the mechanical constraining points 322A and 322B based on the various considerations discussed above significantly increases crash test performance and reduces injury criteria for the infant car seat system 100. To illustrate the efficacy of particularly positioning the mechanical constraining points, FIGS. 4A-4C show successive images of respective test infant car seat systems 100t-1, 100t-2, and 100t-3 attached to a vehicle seat without a detachable vehicle installation base, and their associated injury criteria. As shown in these figures, the infant car seat 102 of each test system is coupled to a vehicle seat 50 via an anchor system 104 and the locations of the mechanical constraining points 322A and 322B are varied in each test system with respect to the lower constraining boundary plane 310. Testing of the system is performed pursuant to the various criteria set forth in FMVSS-213.

FIG. 4A shows one test example where the mechanical constraining point 322B, as well as the mechanical constraining point 322A (not visible in the side view) are located below the lower constraining boundary plane 310, which resulted in a HIC (Head Injury Criterion) value of 479, a chest G force of 54.3 G, and a seat back rotational displacement of 71.1 degrees from vertical. Thus, this test example exhibited inferior crash test performance and, in particular, a seat back rotational displacement in excess of 70 degrees from vertical.

FIG. 4B shows another test example where the mechanical constraining points 322B and 322A are located above the lower constraining boundary plane 310. In this case, the infant car seat system yielded an improved HIC value of 411, an improved chest G force of 51.2 G, and an improved seat back rotational displacement of 69.2 degrees from vertical, all of which values are lower than the first case depicted in FIG. 4A. FIG. 4C shows yet another test example where the mechanical constraining points 322B and 322A are located even higher above the lower constraining boundary plane 310, resulting in an improved HIC value of 396, an improved chest G force of 47.1 G, and an improved seat back rotational displacement of 67.5 degrees from vertical. Based on FIGS. 4A-4C, the ATD 40 is subjected to progressively smaller magnitude forces and a smaller rotational displacement of the seat back 120 of the infant car seat as the mechanical constraining points 322A and 322B are positioned from below to above (and then higher above) the lower constraining boundary plane 310.

Figure 5:
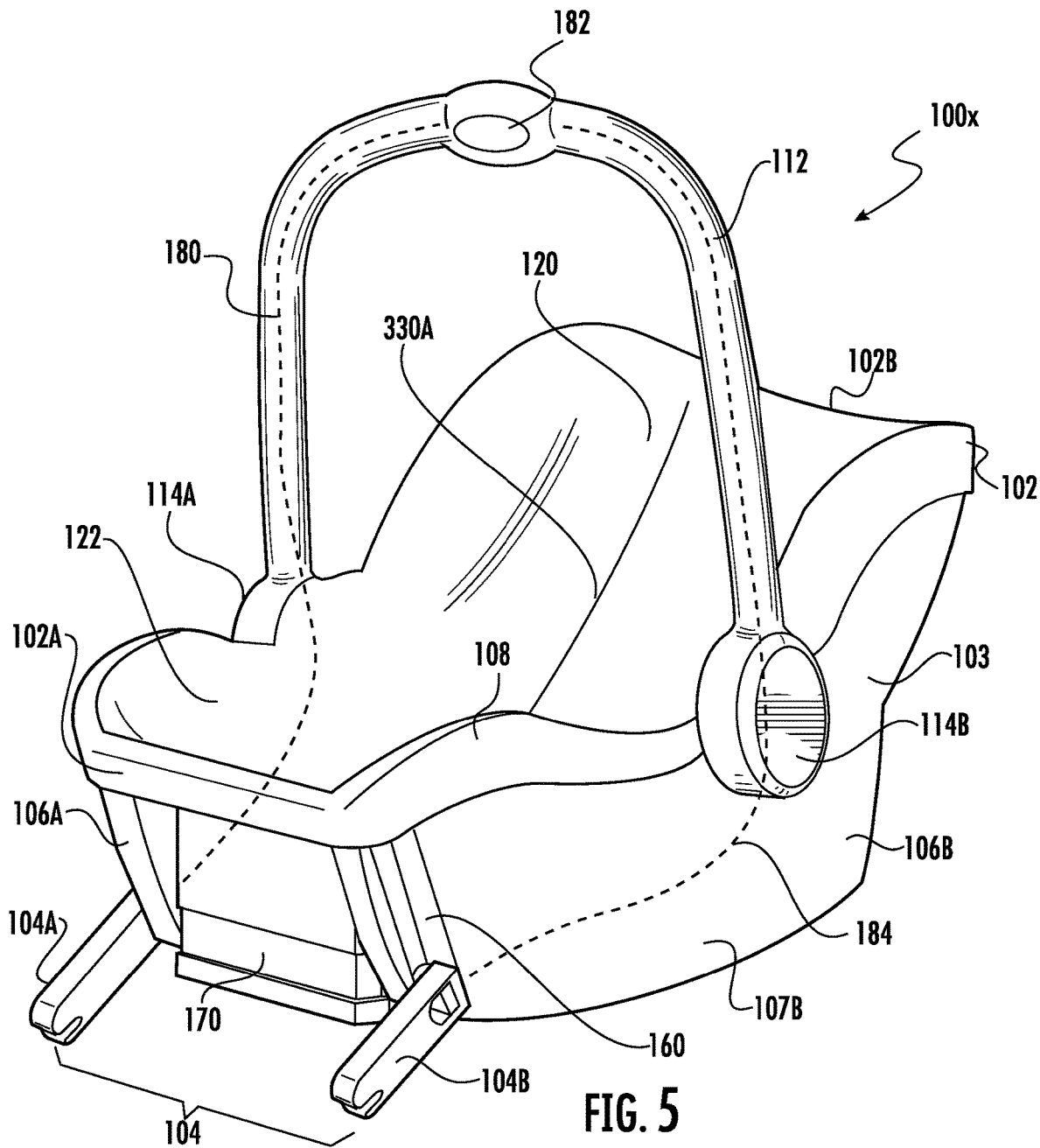
FIG. 5 shows an inventive infant car seat system according to another example implementation, including an integrated anchor system, a release actuator, a storage compartment, and an adjustment foot.

An Infant Car Seat System with Enhanced Features for Safety, Comfort and Convenience FIG. 5 shows another exemplary infant car seat 100x that includes multiple additional inventive features, beyond those discussed above in connection with FIG. 2A and FIGS. 3A-3E, relating to the safety and comfort of an infant as well as convenience for a parent and/or caregiver transporting the infant. Examples of such features which are discussed in turn below in greater detail, include a release actuator 180, a storage compartment 160, and an adjustment foot 170 integrated into the infant car seat 102. In one aspect, these additional features, employed respectively or in various combinations in different implementations of inventive infant car seat systems, provide multiple advantages that facilitate use of the infant car seat systems with ride-hailing/ride sharing services.

As noted above, the infant car seat 102 shown in FIG. 5 is configured to be a rear-facing seat with a frontside 102A facing the vehicle seat 50 and a backside 102B facing away from the vehicle seat 50 when installed in a vehicle (e.g., the vehicle 500 shown in FIG. 2A). The infant car seat 102 includes the seat shell 103 and the seat shell rim 108 defining the seat back 120 and the seat pan 122 to support a seat pad and the infant. The seat shell 103 further includes seat shell rails 106A and 106B that have curved bottom rockers 107A and 107B, respectively. A carrying handle 112 is mounted to the seat shell 103 via attachment mechanisms 114A and 114B. An anchor system 104 is mounted to the seat shell 103 to couple the infant car seat 102 to the vehicle seat 50 via the seat anchors 104A and 104B.

The release actuator 180 provides a quick disconnect mechanism to remove the infant car seat system 100 from the vehicle. The release actuator 180 may be integrated into the infant car seat 102 and include a cable 184 coupled to one or both of the seat anchors 104A and 104B and an actuator handle 182. When a parent and/or a caregiver wants to remove the infant car seat system 100 from the vehicle, they may actuate the actuator handle 182, which, in turn, actuates the release mechanism of the seat anchors 104A and 104B, thus releasing the seat anchors 104A and 104B from the vehicle seat anchors 52A and 52B. In this manner, the release actuator 180 may appreciably reduce the time to uninstall the infant car seat system 100, which may be especially beneficial when a parent and/or a caregiver traveling with an infant is using a ride-hailing or ridesharing service.

One or more storage compartments 160 provide space(s) within and/or on the infant car seat 102 to store various components of the anchor system 104, such as the seat anchors 104A and 104B, when not in use. The storage compartment 160 may thus reduce the number of dangling or protruding parts on the infant car seat 102, thus reducing the risk that the infant car seat system 100 gets caught on other portions of the vehicle (e.g., the door, the front seat pockets) when transferring the infant car seat system 100 into and/or out of the vehicle. Additionally, the storage compartment(s) 160 may allow the infant car seat 102 to retain a substantially similar shape and/or dimensions to previous infant car seats so that the infant car seat 102 may be readily installed onto other unmodified transport devices, such as a stroller. Furthermore, the storage compartment(s) 160 may reduce the risk of the anchor system 104 being damaged when not in use.

The adjustment foot 170 is mounted proximate to the front of the infant car seat 102 to mitigate rotation of the backside 120 of the infant car seat toward the back of the vehicle seat during installation of the infant car seat system in the vehicle. In this manner, the adjustment foot helps a parent and/or caregiver to position the infant car seat in the vehicle so as to maintain the comfort of the infant, more easily align and engage the anchor system 104 with the vehicle lower anchors, and at the same time provide leverage against the seat pan of the vehicle seat to facilitate a tight fit to the vehicle seat. The adjustment foot 170 is also particularly useful to compensate for the curved profile of the rocker bottoms 107A and 107B to ensure that a reliable, tight fit with the vehicle seat is achieved according to Child Passenger Safety (CPS) guidelines (e.g., the infant car seat installation passes the CPS "inch test").

With reference again to the inset of FIG. 2A (and as discussed in greater detail below in connection with FIG. 50), typically the vehicle seat pan 56 may be inclined relative to a horizontal plane at an angle, $\alpha_1$, that ranges between about 6 degrees and about 23 degrees. To ensure the comfort and safety of the infant, the infant car seat 102 and, in particular, the seat back 120 should be inclined relative to the horizontal plane at an angle, $\alpha_2$, that ranges between about 40 degrees and about 60 degrees. As shown, the adjustment foot 170 may be mounted to the front, bottom portion of the infant car seat 102 in order to provide leverage to adjust the recline angle, $\alpha_2$, of the seat back 120. In some implementations, the adjustment foot 170 may also be used to ensure a tight fit between the infant car seat 102 to the vehicle seat 50, for example, by providing leverage for the infant car seat 102 to stably sit on the vehicle seat pan 56, particularly if the seat shell rails 106A and 106B have curved bottom rockers 107A and 107B.

In the following sections of the present disclosure, further details of the various features of the infant car seat system 100x will be described in turn. It should be appreciated that these features may be used alone or in various combinations with other features described herein. Additional details will also be provided regarding the underlying mechanical considerations for different variants of a particular features, particularly when integrated into a rigid or a belted anchor system.

An Infant Car Seat System with a Rigid Anchor System

Figure 6:
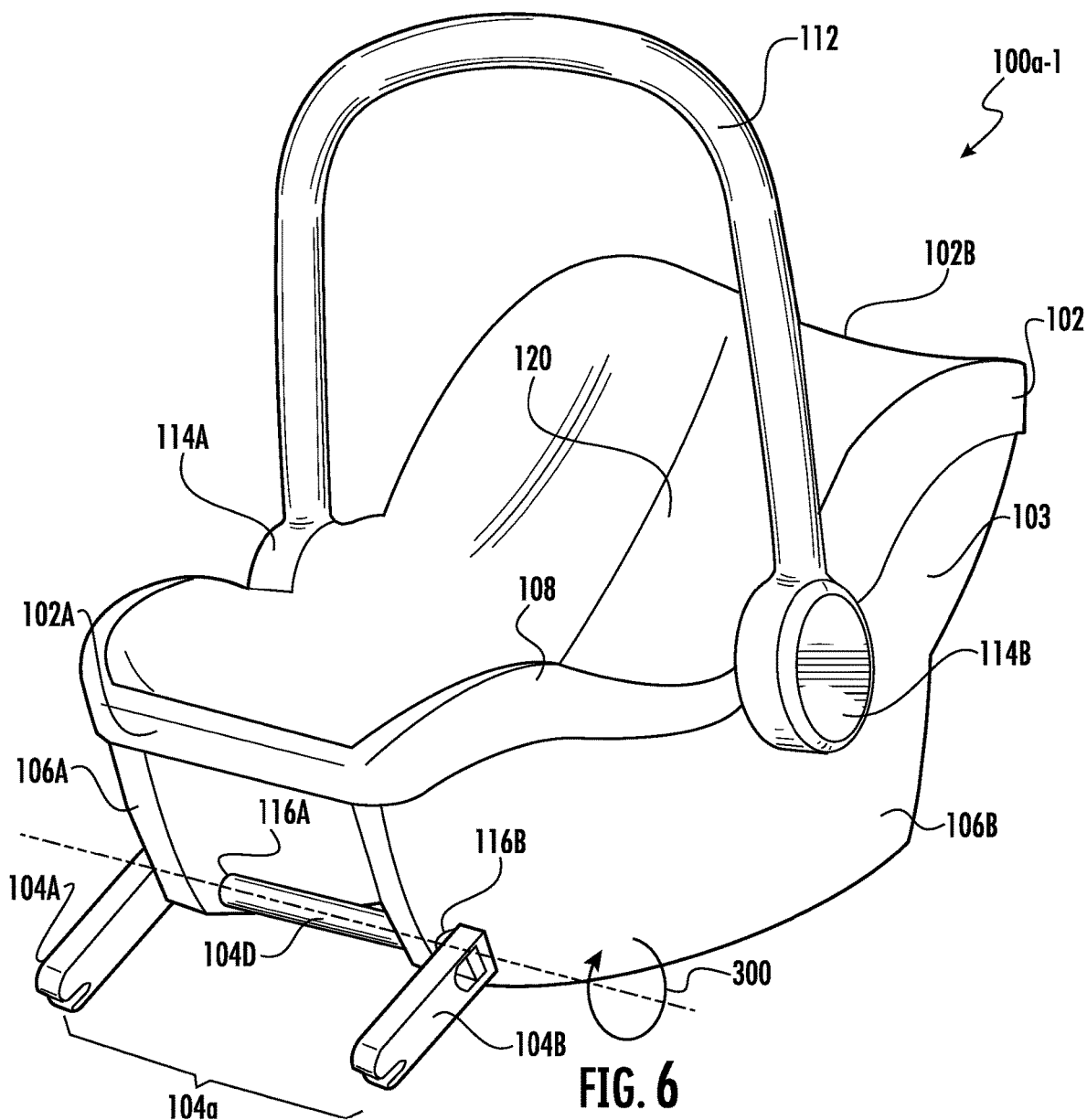
FIG. 6 shows an exemplary infant car seat system with a rigid anchor system.

Various types of anchor systems 104 may be integrated onto the infant car seat 102. For example, FIG. 6 shows an exemplary infant car seat system 100*a*-1 with a rigid anchor system 104*a*. The infant car seat system 100*a*-1 may include an infant car seat 102 with many of the same features previously described in relation to the infant car seat system 100*x*. For brevity, a detailed description of the various features associated with the infant car seat 102 will not be repeated here, but it should be appreciated one or more of the features described above may also be incorporated into the infant car seat 102 in the infant car seat system 100*a*-1.

The rigid anchor system 104*a* may include the seat anchors 104A and 104B as before to couple the infant car seat 102 to the vehicle seat anchors 52A and 52B of the vehicle seat 50. In this example, the seat anchors 104A and 104B may be coupled together via a rigid crossmember 104D. In some implementations, the cross member 104D may be a single part. In some implementations, the cross member 104D may be an assembly of multiple parts, which may be further configured to provide additional adjustment axes (e.g., telescopic adjustment to adjust the spacing between the seat anchors 104A and 104B).

As shown in FIG. 6, the seat anchors 104A and 104B may generally be disposed on the outer exterior of the infant car seat 102 (e.g., the outer sides of the seat shell rails 106A and 106B) and the crossmember 104D may be routed through respective openings 116A and 116B in the seat shell rails 106A and 106B for connection to the infant car seat 102. The openings 116A and 116B may thus define the mechanical constraining points 322A and 322B and, hence, may be located along the seat shell rails 106A and 106B in accordance to the above description regarding improvements to safety of the infant car seat system 100 in the event of a collision.

In some implementations, the rigid anchor system 104*a* may be rigidly fixed to the infant car seat 102. In other words, the orientation of the seat anchors 104A and 104B with respect to the seat shell 103 may not be changed by the parent and/or the caregiver. In some implementations, the rigid anchor system 104*a* may be movable with respect to the infant car seat 102 to provide parents and/or caregivers a way to adjust the position and/or orientation of the seat anchors 104A and 104B to better fit a particular vehicle seat 50.

For example, FIG. 6 shows the rigid anchor system 104*a* may be rotatably adjustable with respect to the infant car seat 102 about a rotation axis 300 that coincides with the center points of the openings 116A and 116B. In some implementations, the rotatable adjustment of the rigid anchor system 104*a* may be accomplished, in part, by utilizing circular-shaped openings 116A and 116B and a crossmember 104D with a circular-shaped cross-section along at least the portions that physically contact the infant car seat 102. In some implementations, a bearing may be incorporated into each of the openings 116A and 116B so that the anchor system 104*a* may smoothly rotate with respect to the infant car seat 102 and/or to reduce the wear between the cross member 104D and the seat shell rails 106A and 106B. The bearings may also allow the openings 116A and 116B and/or the crossmembers 104D to have a non-circular shape including, but not limited to an ellipse, a polygon (e.g., a square, a hexagon), and any combinations of the foregoing.

In some implementations, the infant car seat system 100*a*-1 may include a locking mechanism (not shown) to lock the seat anchors 104A and 104B at a desired rotational position relative to the infant car seat 102. For example, the locking mechanism may be a ratcheting mechanism that locks the seat anchors 104A and 104B at set increments. In another example, the locking mechanism include a thumbscrew that locks the seat anchors 104A and 104B when sufficiently tightened via friction. In some implementations, the locking mechanism may further enable the seat anchors 104A and 104B to be used as a recline adjustment mechanism. For example, the seat anchors 104A and 104B may be rotated to larger incline angles so that the contact point between the curved bottom rockers 107A and 107B of the infant car seat 102 and the vehicle seat pan 56 moves further towards the backside 102B of the infant car seat 102.

As described above, the seat anchors 104A and 104B may include an integrated latching mechanism to couple to the vehicle seat anchors 52A and 52B. The seat anchors 104A and 104B may further include a release mechanism to allow a parent and/or a caregiver to manually release the seat anchors 104A and 104B from the vehicle seat 50. In some implementations, each seat anchor 104A and 104B may include a respective release mechanism, such as a push, twist, or pull actuated release mechanism or a spring-loaded gate, that releases the seat anchors 104A and 104B separately.

Figure 7A:
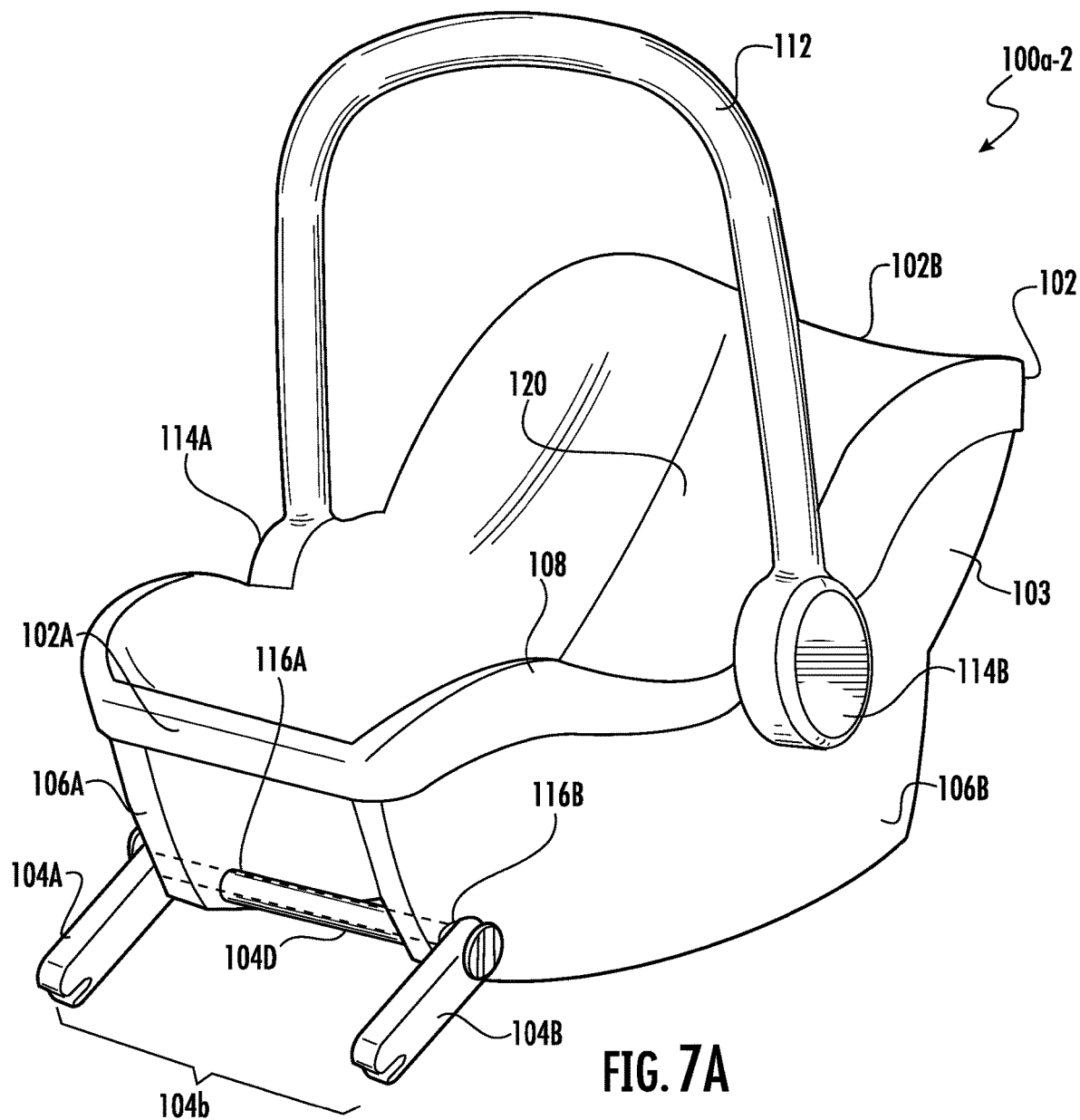
FIG. 7A shows a variant of the infant car seat system of FIG. 6 where the seat anchor includes a twist knob to actuate the seat anchor.
Figure 7B:
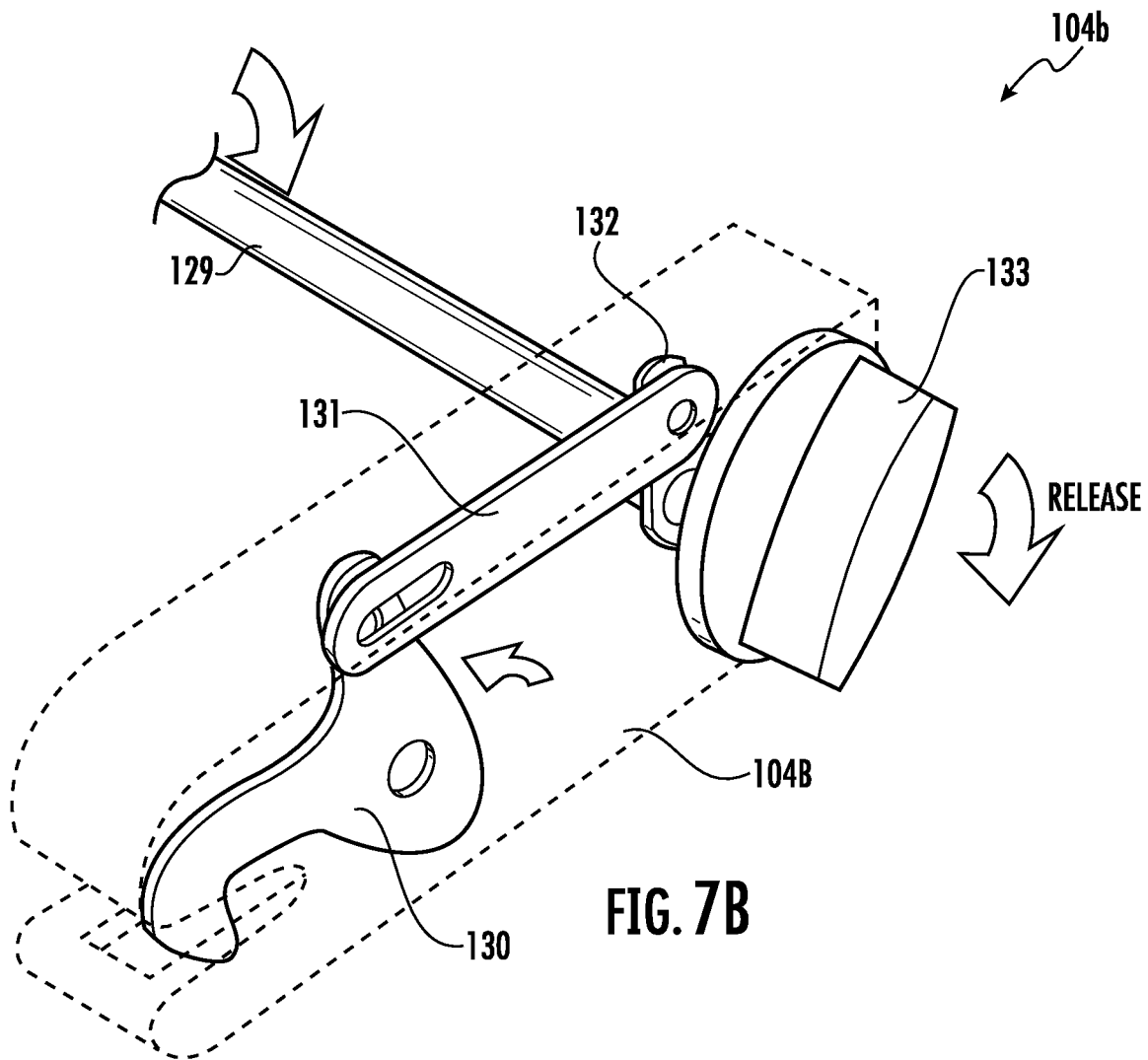
FIG. 7B shows a magnified view of the seat anchor of FIG. 7A.

In some implementations, the seat anchors 104A and 104B may be mechanically coupled together such that a single release mechanism releases both the seat anchors 104A and 104B at the same time. For example, FIGS. 7A and 7B show an exemplary infant car seat system 100*a*-2 with a rigid anchor system 104*b* that incorporates a twist release mechanism. Specifically, FIG. 7B shows the seat anchor 104B may include a latch 130 mechanically coupled to a release knob 133 via linkage members 131 and 132. The knob 133 may be disposed on the outward sides of the seat anchors 104A and 104B for greater ease of access. A spring (not shown) may be incorporated into the seat anchor 104B to apply a spring bias (e.g., a torque) that keeps the latch 130 closed. When the knob 133 is sufficiently rotated, a counteracting torque may be applied to the latch 130 that causes the latch 130 to open.

As shown, the knob 133 on the seat anchor 104B may be coupled to a corresponding knob 133 on the seat anchor 104A via a rod 129. The rod 129 may be positioned such that both knobs 133 rotate together when a single knob 133 is actuated. In this manner, the parent and/or caregiver only has to actuate one knob 133 on either side of the infant car seat 102 to release the infant car seat system 100*b* from the vehicle seat 50. In some implementations, the rod 129 may be disposed within the crossmember 104D. In some implementations, the rod 129 may function as the crossmember 104D in the anchor system 104*b*.

Figure 8A:
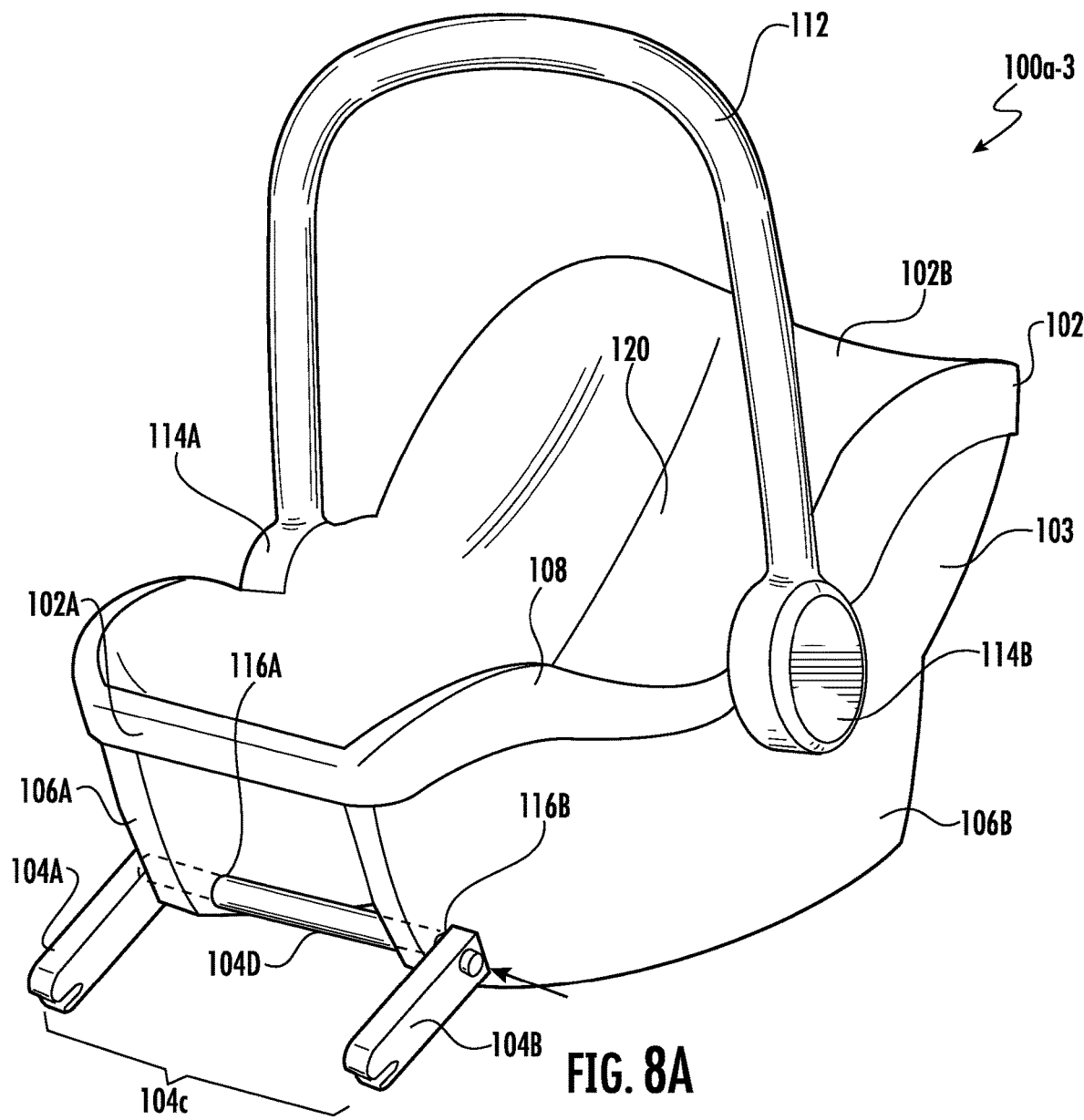
FIG. 8A shows a variant of the infant car seat system of FIG. 6 where the seat anchor includes a push button mechanism to actuate the seat anchor.
Figure 8B:
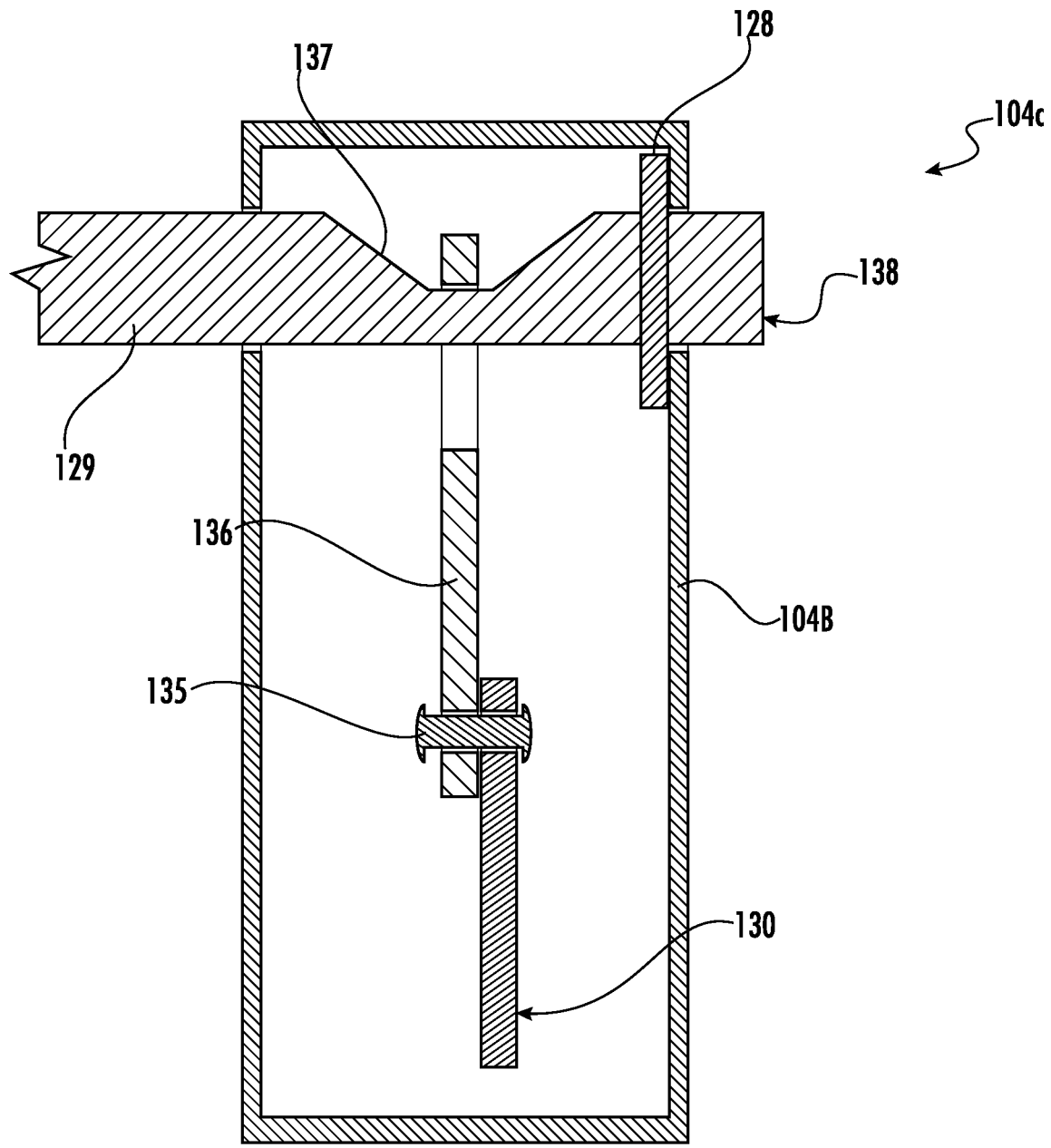
FIG. 8B shows a magnified view of the seat anchor of FIG. 8A.

In another example, FIGS. 8A and 8B show an exemplary infant car seat system 100*a*-3 with a rigid anchor system 104*c* that incorporates a push button release mechanism. In particular, FIG. 8B shows a cross-sectional view of the seat anchor 104B in the anchor system 104*c*. As shown, the seat anchor 104B may include a latch 130 that is rotatably coupled to a linkage member 136 via a pin 135. The linkage member 136 may include a hook that engages a notch 137 on the rod 129. The rod 129 may include an integrated button 138 that protrudes outwards from the seat anchor 104B. When the button 138 is pressed, the rod 129 slides horizontally inwards towards the seat anchor 104A causing the hook on the linkage member 136 to contact a ramped surface in the notch 137. This, in turn, causes the rod 129 to pull against the linkage member 136, thus rotating the latch 130 into an open position for release.

The notch 137 may include two ramped surfaces that are disposed on opposing sides of the hook in the linkage member 136 when the latch 130 is in a closed position. If the button 138 on the seat anchor 104A is pressed, the rod 129 may slide horizontally outwards away from the seat anchor 104A again causing the linkage member 136 to translate and, in turn the latch 130 to rotate into an open position. In this manner, the parent and/or the caregiver may press the button 138 on either the seat anchors 104A and 104B to release both seat anchors at the same time.

The anchor system 104c may include a spring (not shown) to provide a restoring force that maintains the rod 129 at a position where the hook in the linkage member 136 is centered about the notch 137, thus keeping the latch 130 in a close position. For example, a spring may be disposed inside the seat anchor 104B and connected at one end to the housing of the seat anchor 104B and at another end to the rod 129. The spring may be configured to be in a neutral state (i.e., no compression, no tension) when the linkage member 136 is centered about the notch 137 in order to provide a restoring force when the rod 129 is displaced along an inwards or outwards direction. In some implementations, the rod 129 may further include a lip 128 that acts as a mechanical stop to prevent the rod 129 from being displaced beyond a desired displacement (e.g., the depth of the button 138).

Figure 9:
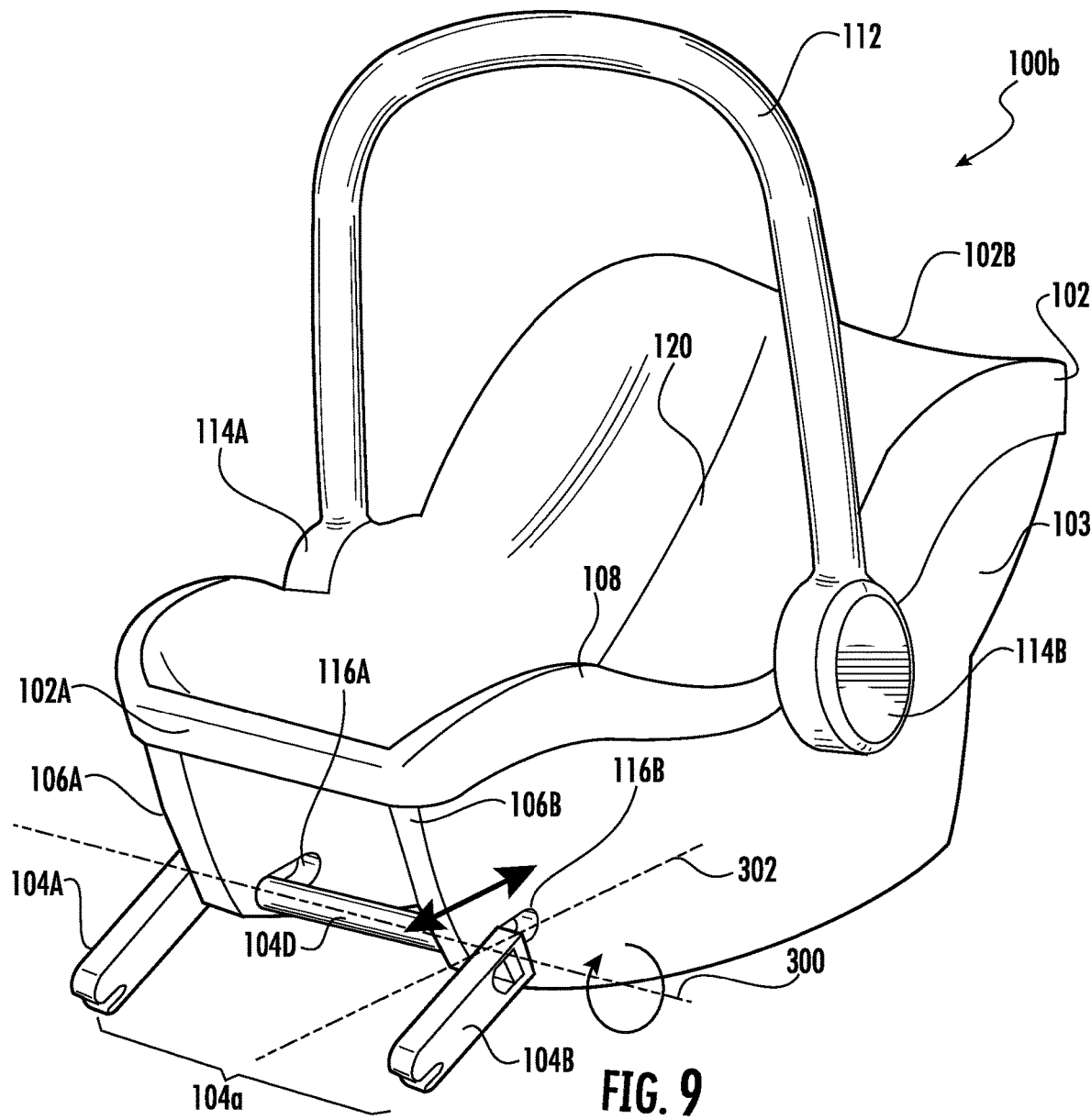
FIG. 9 shows an exemplary infant car seat system with a rotatably and translationally adjustable rigid anchor system.

FIG. 9 shows another exemplary infant car seat system 100b with a rigid anchor system 100a that is rotationally and translationally adjustable with respect to the infant car seat 102 in order to provide additional adjustment axes to position and/or orient the seat anchors 104A and 104B to better fit a vehicle seat 50. As shown, the openings 116A and 116B may be shaped as slots to allow the cross member 104D and, by extension, the seat anchors 104A and 104B to translate along a translation axis 302 defined by the openings 116A and 116B. The openings 116A and 116B may also allow the crossmember 104D to rotate about the rotation axis 300, which moves with the crossmember 104D as the anchor system 104a is translationally displaced.

Similar to the infant car seat system 100a-1, the translational motion of the anchor system 104a in the infant car seat system 100b may be accomplished, in part, by the crossmember 104D being shaped to have a similar width as the slotted openings 116A and 116B, thus constraining the motion of the anchor system 104a to a path defined by the openings 116A and 116B. In FIG. 9, the openings 116A and 116B are depicted as defining a translation axis 302 oriented substantially along a horizontal plane (e.g., from the frontside 102A of the infant car seat 102 to the backside 102B). However, it should be appreciated the slotted openings 116A and 116B may be oriented at different angles relative to the horizontal plane (e.g., the slot may be oriented at 30 degrees, 45 degrees, or 60 degrees incline).

In some implementations, the orientation of the slotted openings 116A and 116B may depend, in part, on the location of the openings 116A and 116B on the seat shell rails 106A and 106B. For example, the openings 116A and 116B may be more inclined when the openings 116A and 116B are positioned higher on the seat shell rails 106A and 106B. In some implementations, the slotted openings 116A and 116B may also define a curved path for the anchor system 104a to slide along.

In some implementations, only the seat anchors 104A and 104B of the rigid anchor system 104a may be translationally adjustable with respect to the infant car seat 102 instead of the entire anchor system 104a. In other words, the seat anchors 104A and 104B may be translationally adjustable relative to the crossmember 104D and the crossmember 104D may remain fixed in location on the infant car seat 102.

Figure 10A:
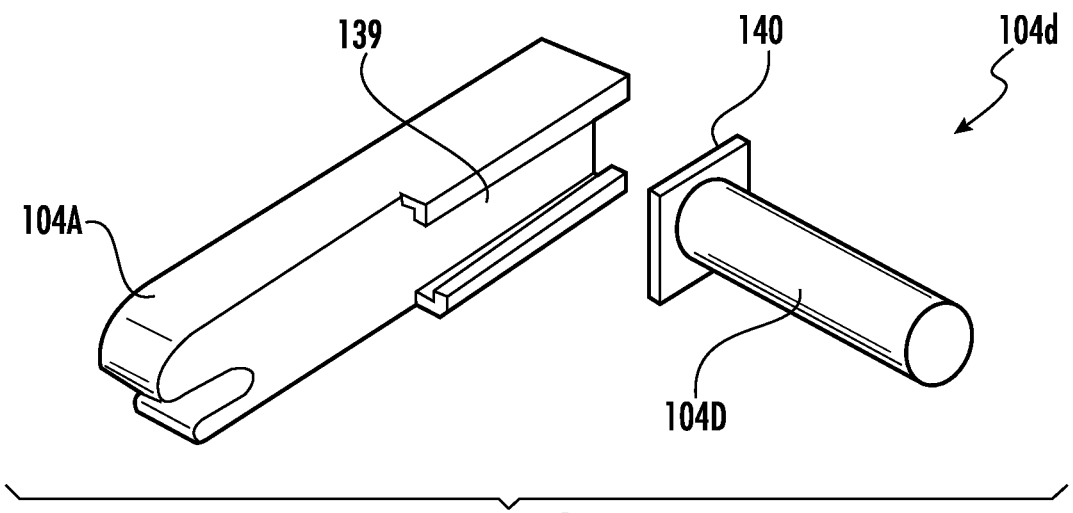
FIG. 10A shows an exploded view of an exemplary anchor system where the rigid anchor is translationally adjustable with respect to a rigid cross-member.
Figure 10B:
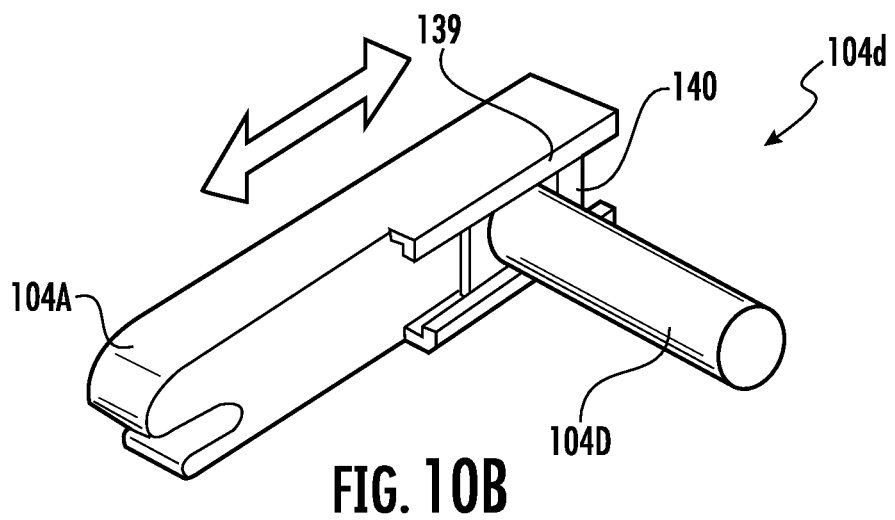
FIG. 10B shows a perspective view of the assembled anchor system of FIG. 10A.

For example, FIGS. 10A and 10B show an exemplary anchor system 104d where the seat anchor 104A includes a slot 139 located on an opposing end from the connection end 105A and the crossmember 104D includes a rail 140 that is slidably coupled to the slot 139. As shown, the rail 140 may have a square-shaped end so that the seat anchor 104A may translate along the slot 139 without rotation. In this manner, the seat anchor 104A and the crossmember 104D may rotate together as before in the anchor system 104a. It should be appreciated the rail 140 is not limited to a square-shape end, but instead may have other shapes including, but not limited to other polygons (e.g., a hexagon, an octagon). Additionally, the slot 139 may not be limited to defining a linear path, but instead may define a curved path along which the seat anchor 104A may slide relative to the crossmember 104D.

In some implementations, one or more mechanical stops may be coupled to the slot 139 after the rail 140 is inserted into the slot 139 to ensure the seat anchor 104A does not detach from the crossmember 104D when used. In some implementations, at least one mechanical stop may be integrated into the seat anchor 104A along a portion of the slot 139.

An Infant Car Seat System with a Rigid Anchor System and a Release Actuator

In some implementations, the infant car seat system may include a release actuator 180, which provides a quick disconnect mechanism to remove the infant car seat system from the vehicle. The integration of the release actuator 180 into the infant car seat system may depend, in part, on the type of anchor system 104 (e.g., a rigid anchor system, a belted anchor system) used. In the case of a rigid anchor system, release actuator 180 may generally include a cable 184 that is routed through various portions of the infant car seat 102 for attachment with the seat anchors 104A and 104D. The cable 184 may be coupled at one end to the release mechanism of each seat anchor and coupled at another end to an actuator handle 182.

Figure 11:
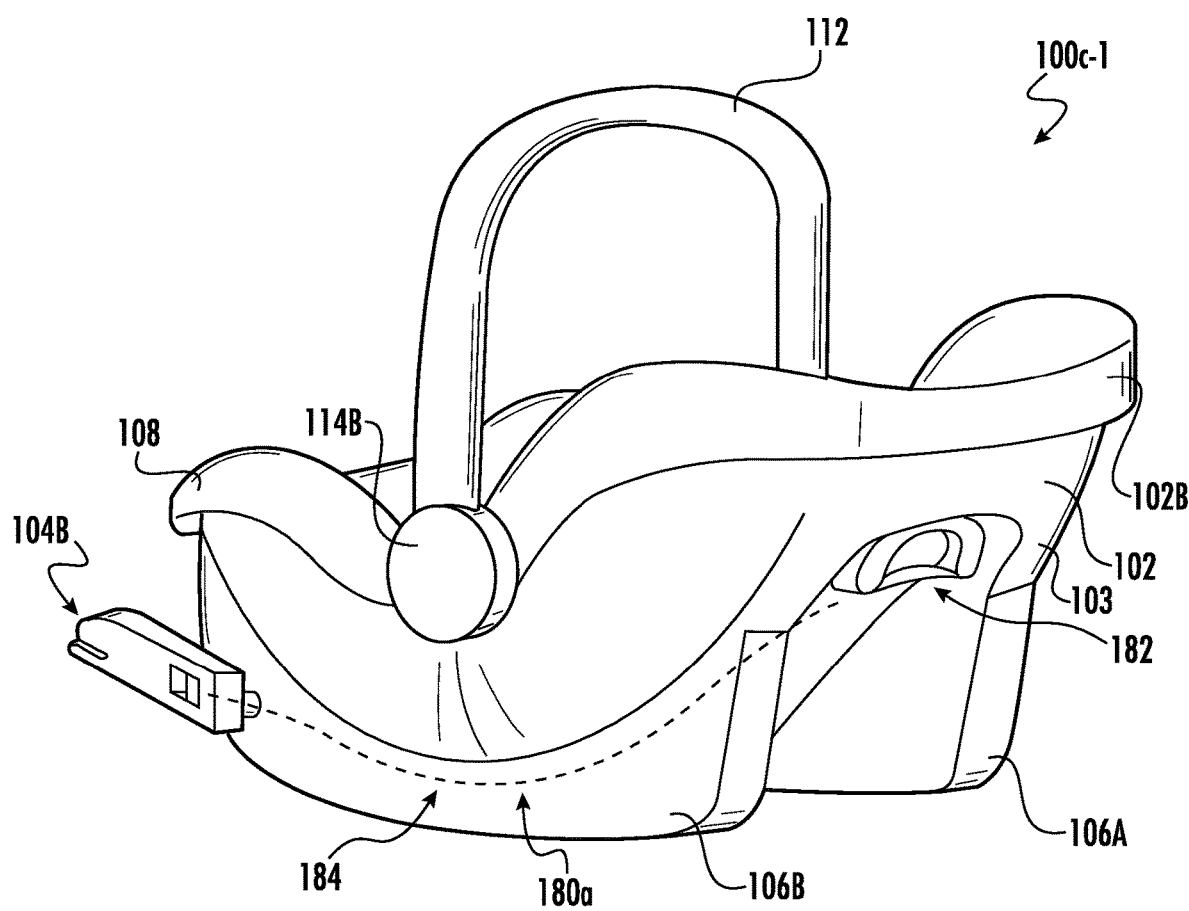
FIG. 11 shows an exemplary infant car seat system with a rigid anchor system and a release actuator mounted to the backside of the infant car seat.

For example, FIG. 11 shows an exemplary infant car seat system 100c-1 with a release actuator 182 where the cable 184 is disposed along a bottom portion of the infant car seat 102 (e.g., the bottom of the seat back 120) and the actuator handle 184 is disposed on the backside 102B of the seat shell 103. As shown, the cable 184 may be routed through the seat shell rail 106, protruding outwards from an opening (not shown) proximate to the seat anchor 104B and attached to the release mechanism of the seat anchor 104B. The length of the cable 184 exposed outside the infant car seat 102 may be kept sufficiently small to prevent the cable 184 from being hooked onto another object in the vehicle, which may cause an accidental release. A corresponding cable 184 (not shown) may be routed in a similar manner through the seat shell rail 106A and attached to the release mechanism of the seat anchor 104A.

The actuator handle 182 may be disposed within a recess formed along the backside 102B of the seat shell 103 between the seat shell rails 106A and 106B. Thus, the actuator handle 182 may be partially shielded by the seat shell 103, which may also reduce the likelihood of an accidental release caused, for example, by the actuator handle 182 contacting another object in the vehicle. The actuator handle 182 may be further coupled to respective cables 184 attached to the seat anchors 104A and 104B so that actuation of the actuator handle 182 causes both the seat anchors 104A and 104B to release at the same time.

When the parent and/or the caregiver actuates the actuator handle 182, the cable 184 may be retracted such that an actuating force is applied to the release mechanism of the seat anchor 104B. For example, the actuator handle 182 may be configured as a pull mechanism where pulling the actuator handle 182 causes displacement of the cable 184, which, in turn, causes the cable 184 to pull on the release mechanism of the seat anchor 104B. This arrangement may be analogous to a brake cable system on a bicycle. It should be appreciated, however, that the release actuator 180a is not limited to a pull mechanism, but may incorporate other mechanisms including, but not limited to a push mechanism (e.g., a button is pressed) and a twist mechanism (e.g., a knob is turned).

Figure 12:
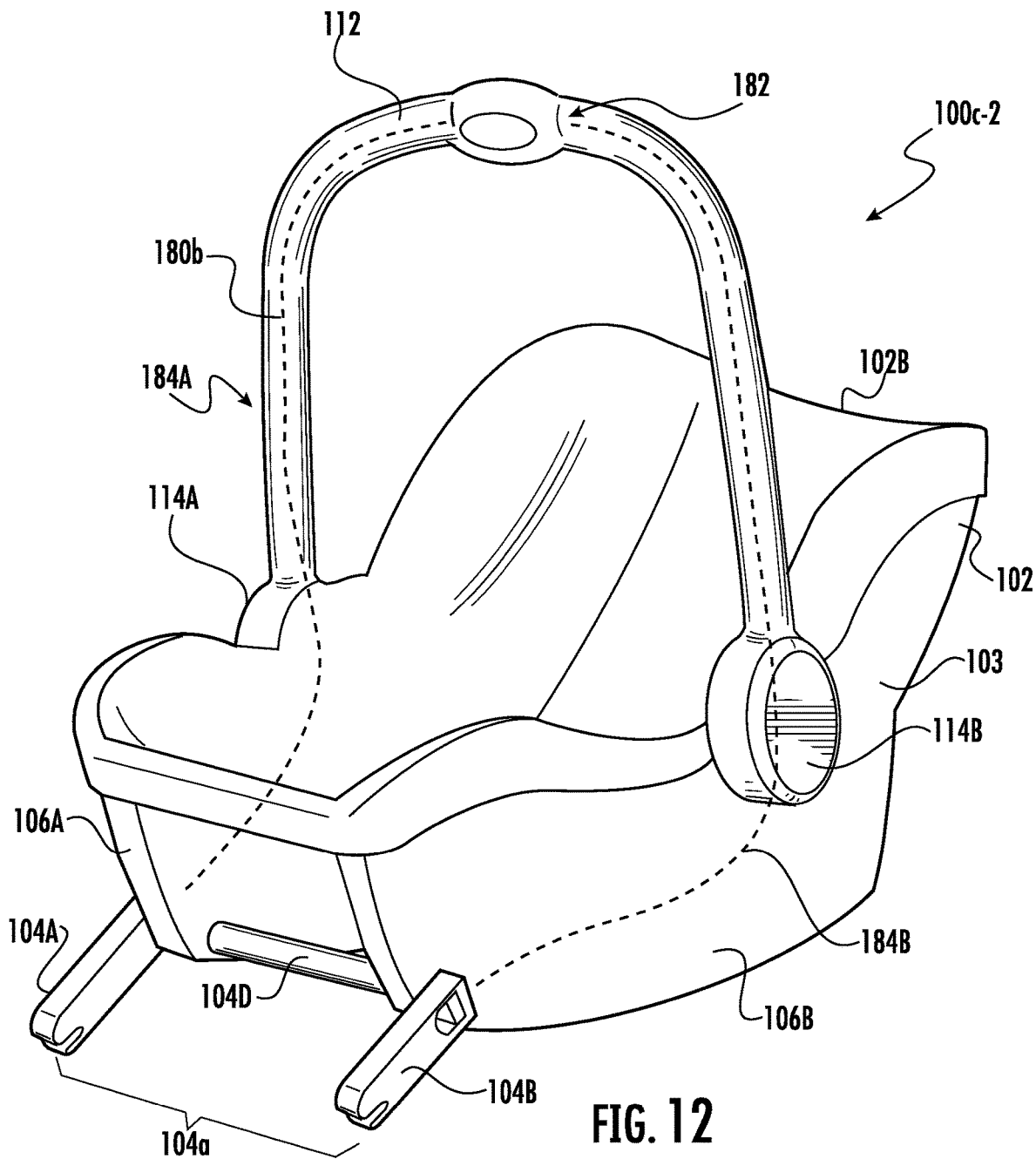
FIG. 12 shows an exemplary infant car seat system with a rigid anchor system and a release actuator mounted to the carrying handle of the infant car seat.

FIG. 12 shows another exemplary infant car seat system 100c-2 with a release actuator 180b that is partially integrated into the carrying handle 112. As before, the release actuator 180b may include respective cables 184A and 184B for connection with the seat anchors 104A and 104B, respectively. The cables 184A and 184B may further be connected together to the actuator handle 182. In this implementation, however, the cables 184A and 184B may be partially routed through the carrying handle and the actuator handle 182 may be disposed at the top of the carrying handle 112. This configuration may enable a parent and/or a caregiver to release the infant car seat system 100 from the vehicle seat 50 and transfer the infant car seat system 100 out of the vehicle using only one arm and/or hand (i.e., the parent and/or the caregiver may grab the carrying handle 112 during the entire uninstallation process).

The carrying handle 112 may be attached to the infant car seat 102 via the attachment mechanisms 114A and 114B. The attachment mechanisms 114A and 114B may generally allow the carrying handle 112 to be rotatable relative to the infant car seat 102 (e.g., to provide clearance when putting in and/or taking out the infant, to adjust the orientation in which the infant car seat 102 is carried). The cables 184A and 184B may thus be routed through openings (not shown) in the attachment mechanisms 114A and 114B with sufficiently large clearances to ensure the cables 184A and 184B are not pinched and/or otherwise constrained by the infant car seat 102 when the carrying handle 112 is rotated. The cables 184A and 184B may also be compliant components with sufficient play when installed into the infant car seat 102 so that the cables 184A and 184B may readily follow the rotational motion of the carrying handle 112.

An Infant Car Seat System with a Rigid Anchor System and One or More Storage Compartments The infant car seat system may also include a storage compartment 160 to store portions of the anchor system 104, such as the seat anchors 104A and 104B, when not in use (e.g., the infant car seat system 160 may be carried by the parent and/or the caregiver or mounted to a stroller). Similar to the release actuator 180, the integration of the storage compartment 160 in the infant car seat system may depend, in part, on the type of anchor system 104 used. For a rigid anchor system, the storage compartment 160 may generally be formed along the front portions of the infant car seat 102. In some implementations, the rigid anchor system may also be a collapsible and/or extendable mechanism that transitions between a stored position and an operational position.

Figure 13:
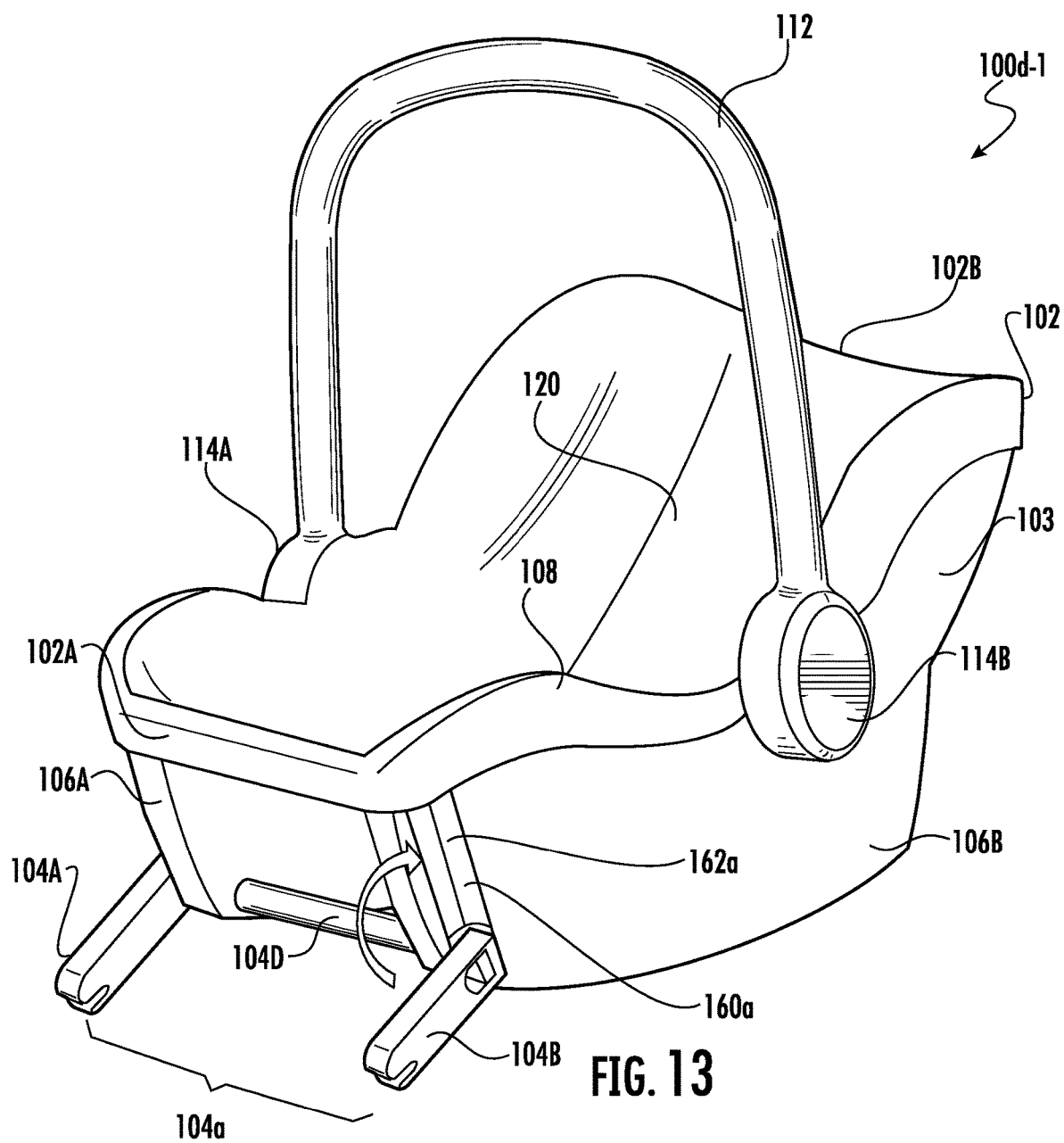
FIG. 13 shows an exemplary infant car seat system with a side storage compartment to store the seat anchors in the anchor system.

For example, FIG. 13 shows an exemplary infant car seat system 100d-1 with the rigid anchor system 104a described above and a storage compartment 160a. In this implementation, the seat anchors 104A and 104B may not protrude outwards from the outward facing sides of the seat shell rails 106A and 106B. Instead, the seat shell rails 106A and 106B may each have a larger width compared to the infant car seat system 100a-1 such that the storage compartment 160a may be formed as a recessed pocket along a front, side portion of the seat shell rails 106A and 106B. The shape of the storage compartments 160a may correspond with the shape of the side cross-section of the seat anchors 104A and 104B. Additionally, the storage compartment 160a may be dimensioned to be substantially similar in size as the side cross-section of the seat anchors 104A and 104B to ensure the seat anchors 104A and 104B may be fully disposed within the storage compartment 160a without occupying an appreciable volume within the infant car seat 102.

When deployed, the seat anchors 104A and 104B may protrude from the front of the infant car seat 102 (i.e., the seat anchors 104A and 104B extend past the frontside 102A). In order to store the seat anchors 104A and 104B, the anchor system 104a may be rotated until the seat anchors 104A and 104B are positioned within the respective storage compartments 160a (e.g., the seat anchors 104A and 104B are oriented nearly vertical). In order to retain the seat anchors 104A and 104B in the storage compartments 160a, the storage compartment 160a and/or the seat anchors 104A and 104B may include an integrated locking mechanism. For example, the seat anchors 104A and 104B may include the locking mechanisms described above (e.g., a ratcheting mechanism, a thumbscrew).

In some implementations, the storage compartment 160a may include a snap-fit locking mechanism that includes a tab and/or a bump disposed on, for example, a portion of the seat shell rail 106B that extends into the storage compartment 160a. In order to store the seat anchor 104B in the storage compartment 160a, the parent and/or the caregiver may provide a sufficiently large force to rotatably move the seat anchor 104B past the tab and/or bump and into the storage compartment 160a. Thereafter, the tab and/or bump may prevent the seat anchor 104B from moving unless a sufficiently large force is applied by the parent and/or the caregiver.

Figure 14A:
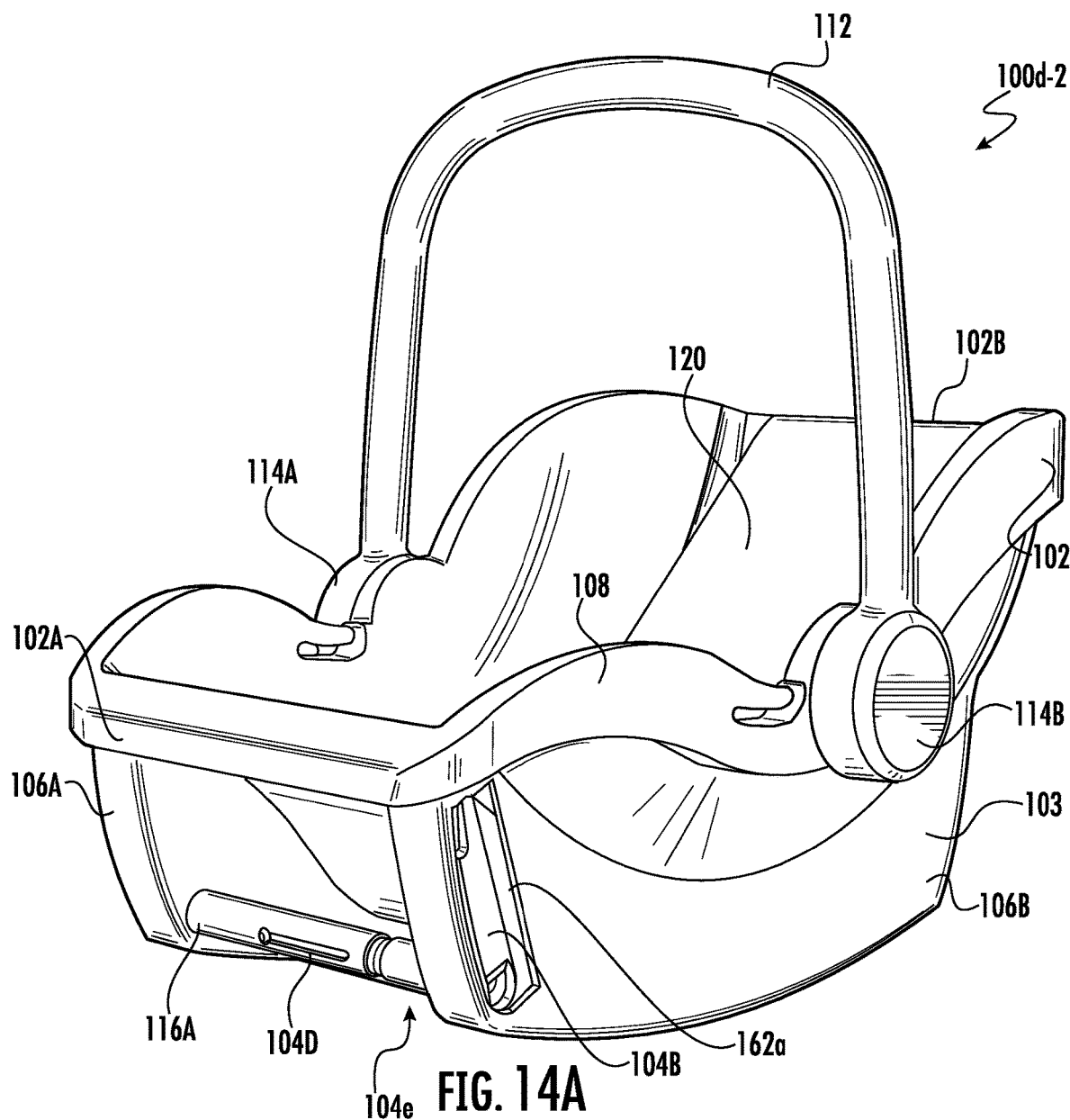
FIG. 14A shows a top perspective view of an exemplary infant car seat system with a telescoping anchor system and a side storage compartment. The anchor system is shown in a stored position.
Figure 14B:
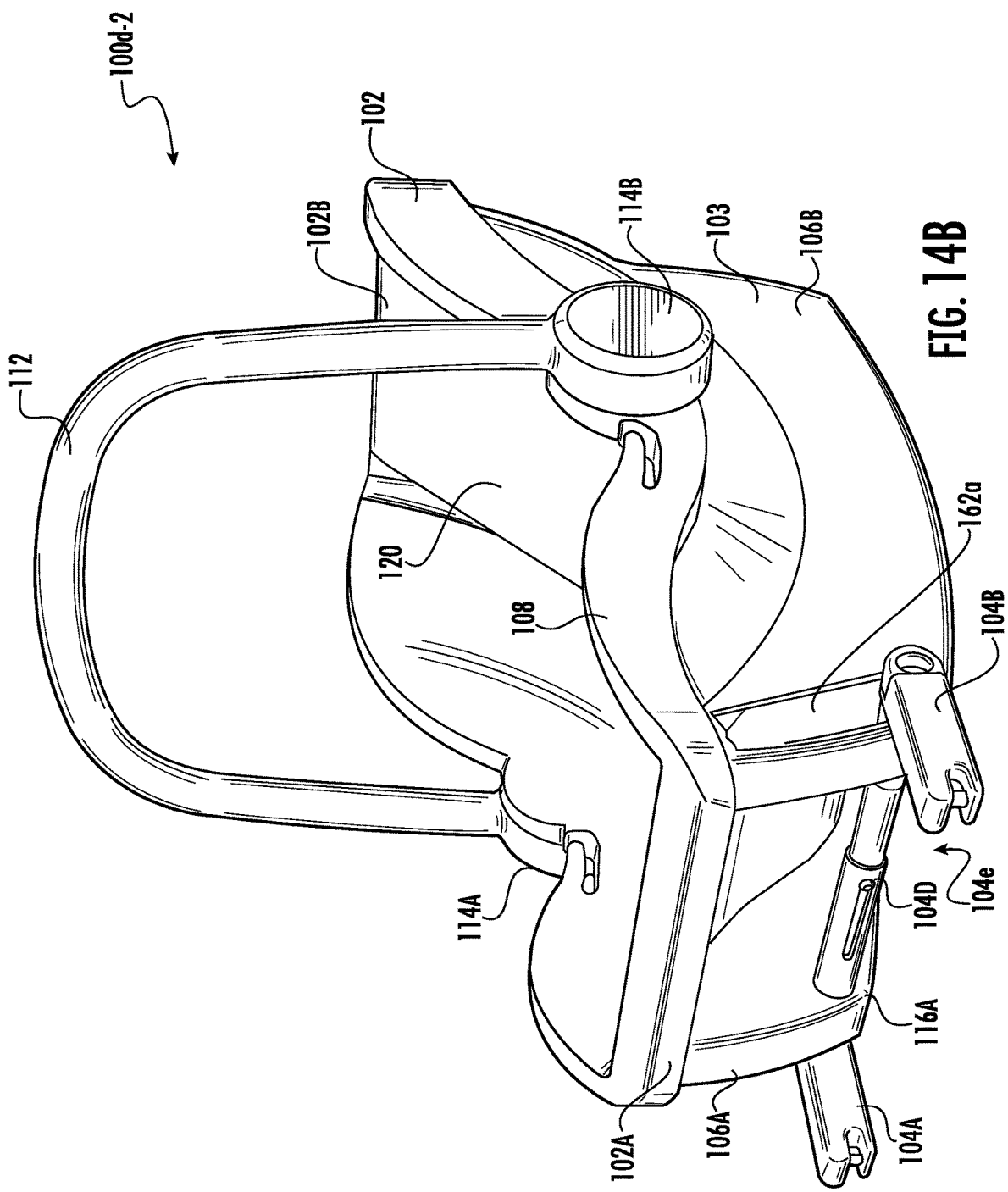
FIG. 14B shows a top perspective view of the infant car seat system of FIG. 14A where the anchor system is shown in an operational position.

FIGS. 14A and 14B show another exemplary infant car seat system 100d-2 with a telescopically adjustable anchor system 104e and storage compartments 160a formed along a front, side portion of the seat shell rails 106A and 106B. In this implementation, the anchor system 104e may include a telescopically adjustable crossmember 104D to adjust the distance between the seat anchors 104A and 104B. In this manner, the anchor system 104e may transition between a stored position where the anchor system 104e is disposed entirely within the infant car seat 102 and an operational position where the anchor system 104e and, in particular, the seat anchors 104A and 104B are deployed for attachment to a vehicle seat 50.

For example, FIG. 14B shows the anchor system 104e in an operational position where the crossmember 104D is extended so that the seat anchors 104A and 104B protrude out from the sides of the seat shell rails 106A and 106B and forward of the infant car seat 102 for installation to the vehicle seat 50. For storage, the seat anchors 104A and 104B may be rotated upwards so that the seat anchors 104A and 104B align with respective openings 162a for entry into the storage compartments 160a. Once aligned, the crossmember 104d may be retracted telescopically so that the seat anchors 104A and 104B move into the respective storage compartments 160a. Thus, the seat anchors 104A and 104B may be held in place by sliding or rotating. A spring-loaded mechanism may be employed to deploy the seat anchors; alternatively, the seat anchors may be equipped with a scoop that can be grabbed with fingers for deployment.

Figure 14C:
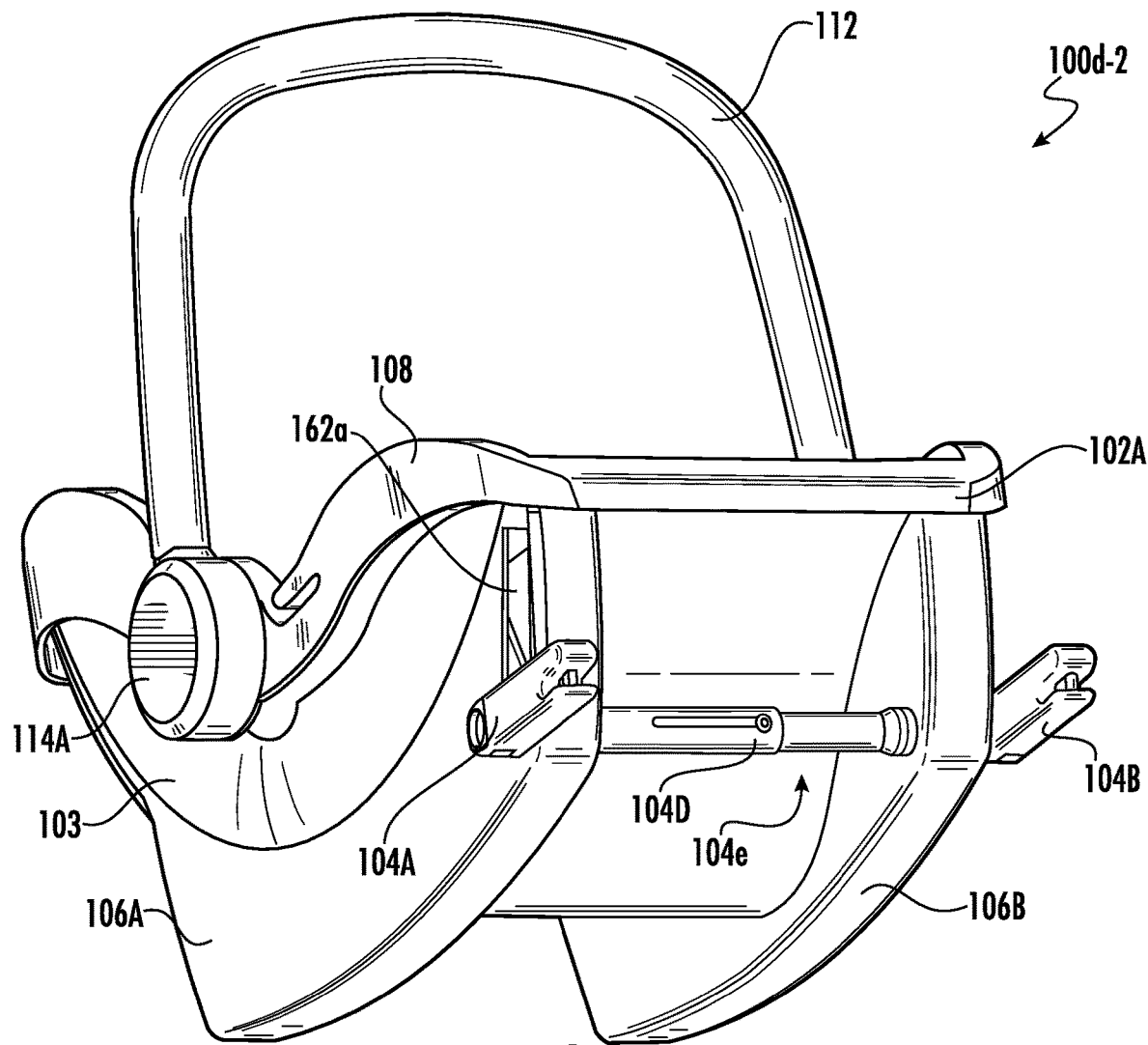
FIG. 14C shows a bottom perspective view of the infant car seat system of FIG. 14B.
Figure 14D:
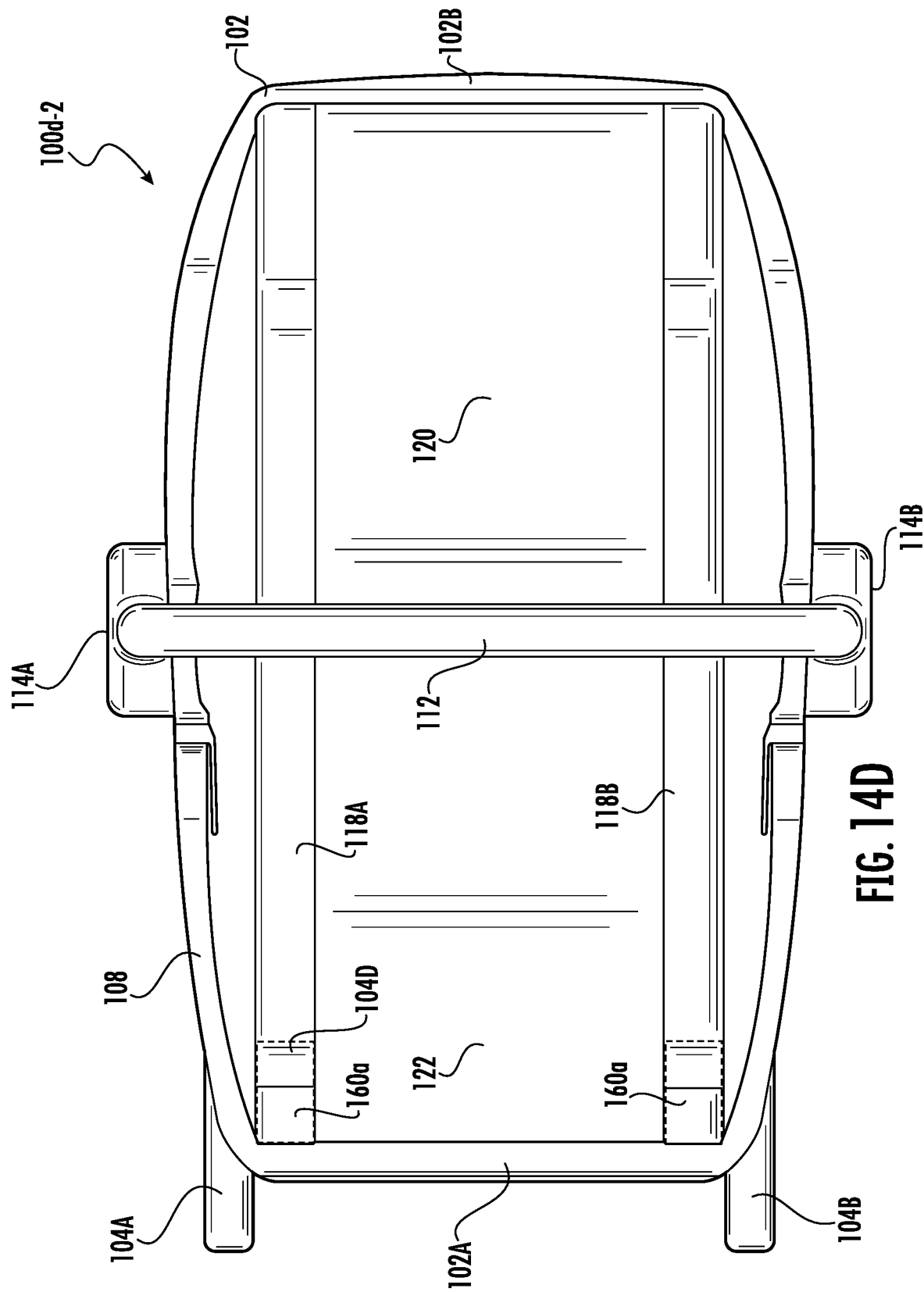
FIG. 14D shows a top view of the infant car seat system of FIG. 14B.
Figure 14E:
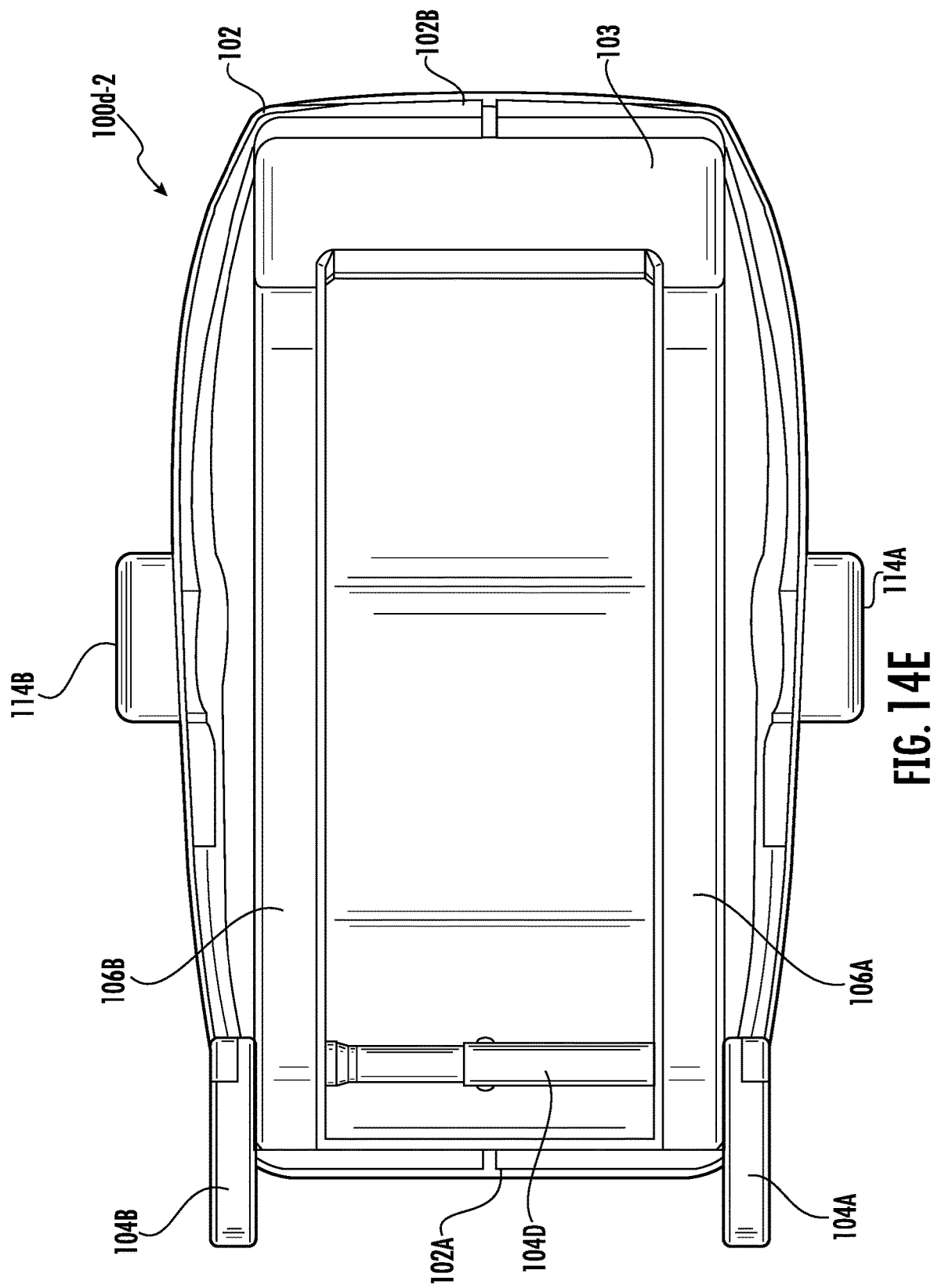
FIG. 14E shows a bottom view of the infant car seat system of FIG. 14B.
Figure 14F:
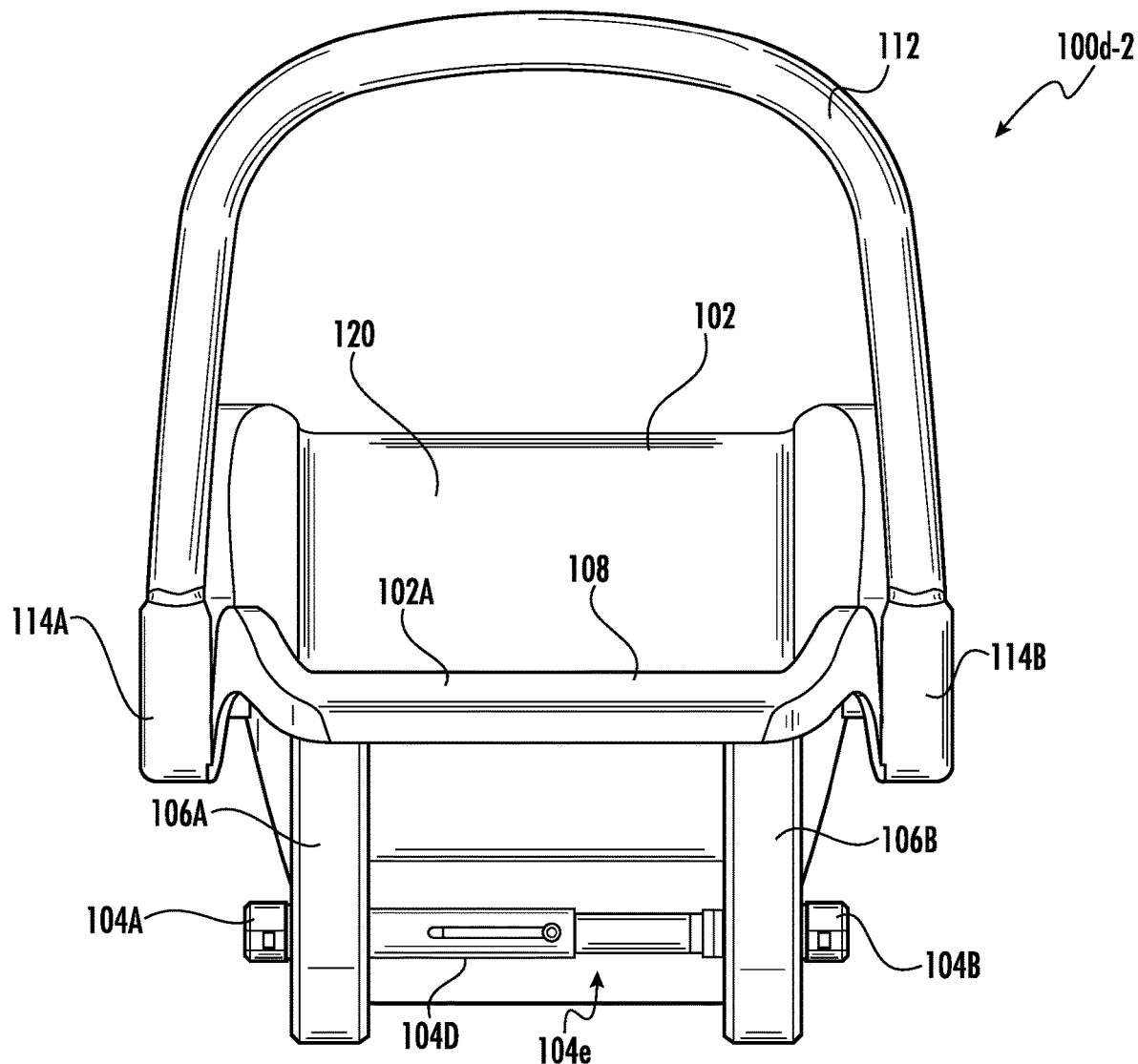
FIG. 14F shows a front view of the infant car seat system of FIG. 14B.
Figure 14G:
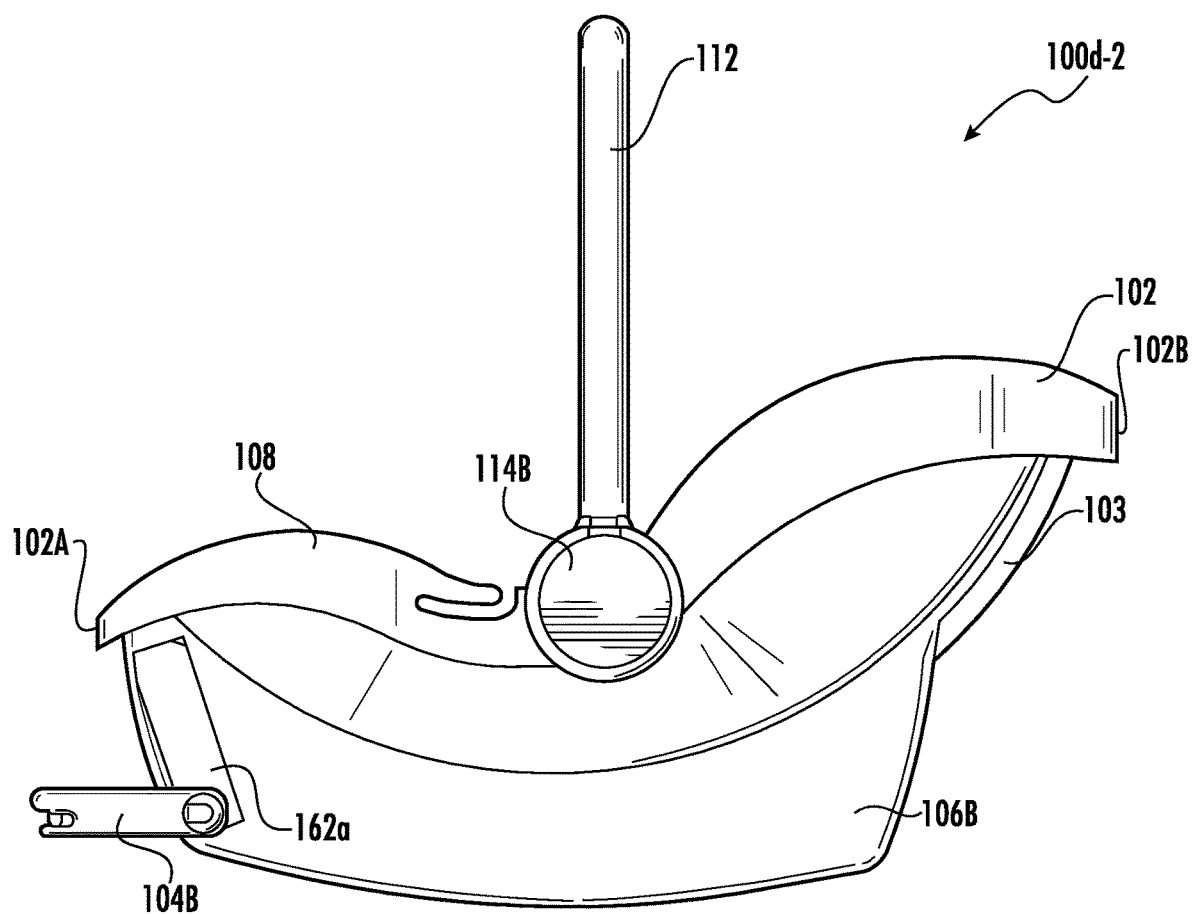
FIG. 14G shows a right-side view of the infant car seat system of FIG. 14B.

FIGS. 14C-14F show additional views of the infant car seat system 100*d*-2 with the anchor system 104*e* in the operational position. As shown in FIGS. 14C and 14D, the storage compartments 160*a* may be formed from portions of respective rocker cavities 118A and 118B defined by the seat shell rails 106A and 106B, respectively. The seat shell rails 106A and 106B may be hollowed, thin-wall structures such that the rocker cavities 118A and 188B are located below and to the sides of the seat back 120 and the seat pan 122. In this manner, the storage compartments 160*a* may occupy a space within the infant car seat 102 that is typically unused other than for the routing of various cabling.

When in the stored position, the anchor system 104*e* may be fully disposed within the infant car seat 102, thus the overall envelope of the infant car seat system 100*d*-2 may correspond to the envelope of the infant car seat 102. In other words, the inclusion of a telescopically adjustable anchor system 104*e* integrated into the infant car seat 102 allows for a baseless infant car seat system to remain similar in size as conventional infant carriers. This, in turn, enables compatibility of the infant car seat system 100*d*-2 with other devices, such as a stroller.

FIGS. 15A-15F show several views of the infant car seat 102 in the infant car seat system 100*d*-2 without the anchor system 104*e*. As shown, the openings 162*a* for entry into the storage compartments 160*a* may be formed onto the respective sides of the seat shell rails 106A and 106B. In some implementations, the openings 162A may be shaped and/or dimensioned based on the side cross-section of the seat anchors 104A and 104B. Additionally, the openings 162A may be oriented to correspond with the desired orientation of the seat anchors 104A and 104B when in the stored position.

Figure 15A:
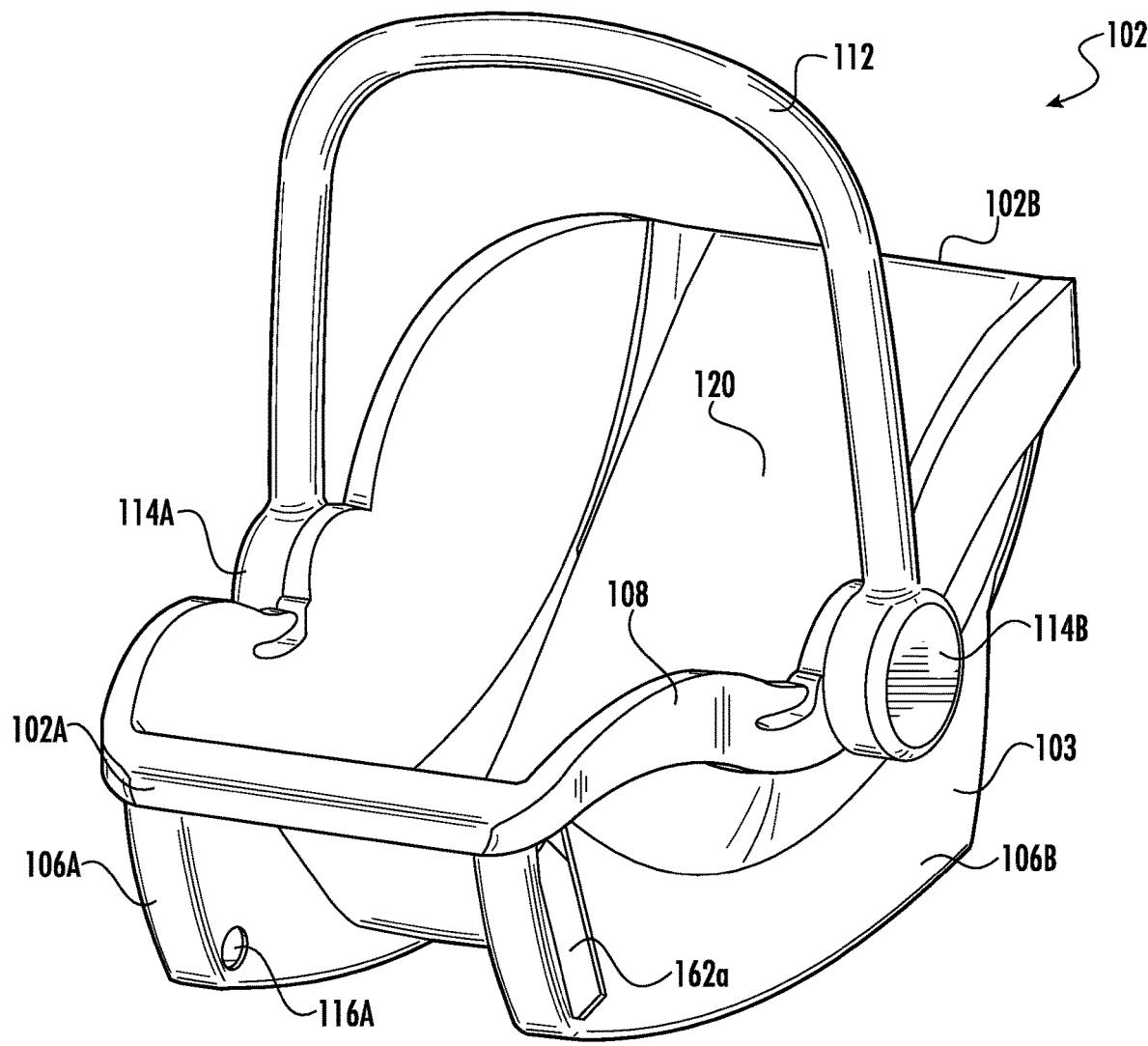
FIG. 15A shows a top perspective view of the infant car seat in the infant car seat system of FIG. 14A.
Figure 15B:
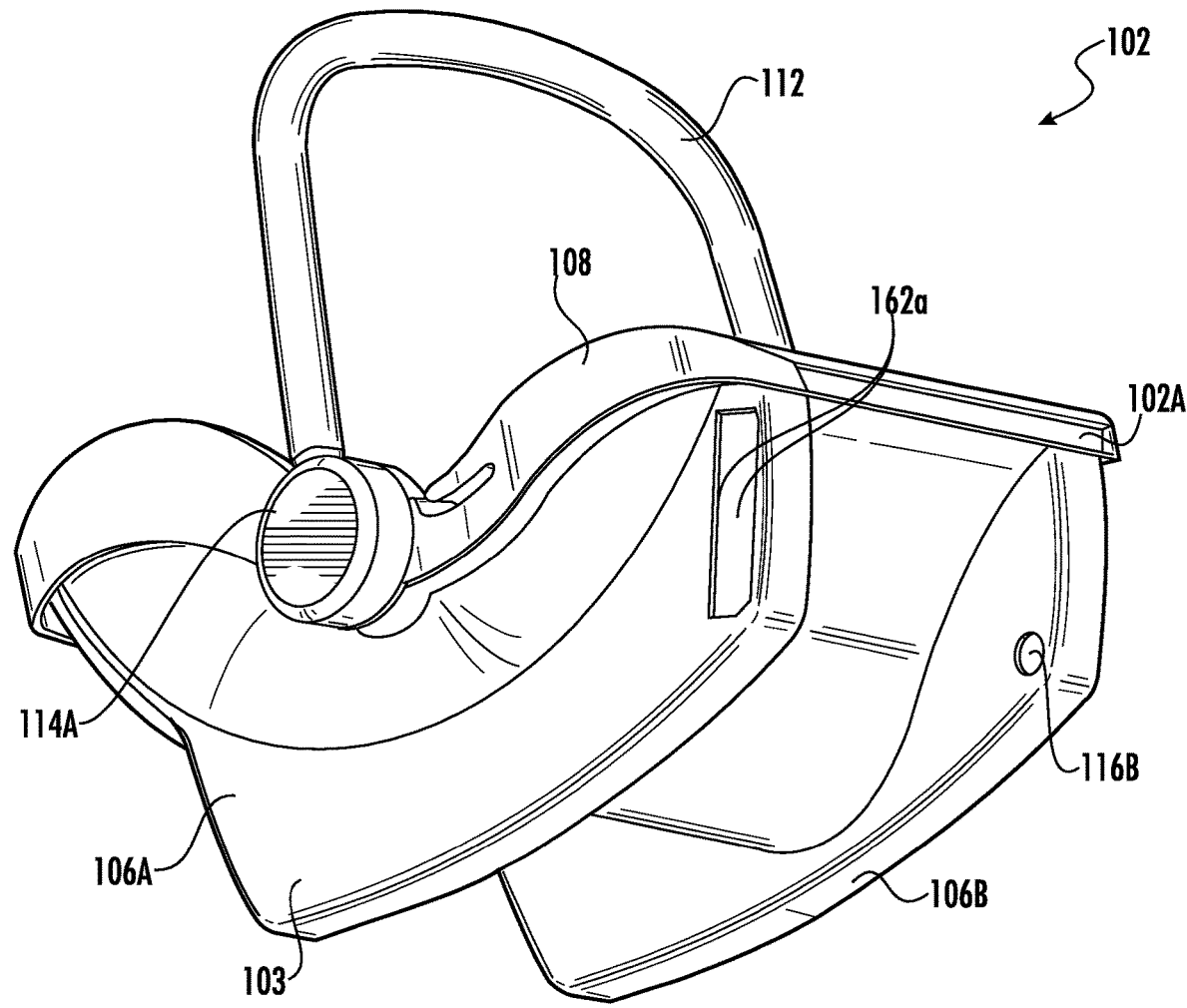
FIG. 15B shows a bottom perspective view of the infant car seat of FIG. 15A.
Figure 15C:
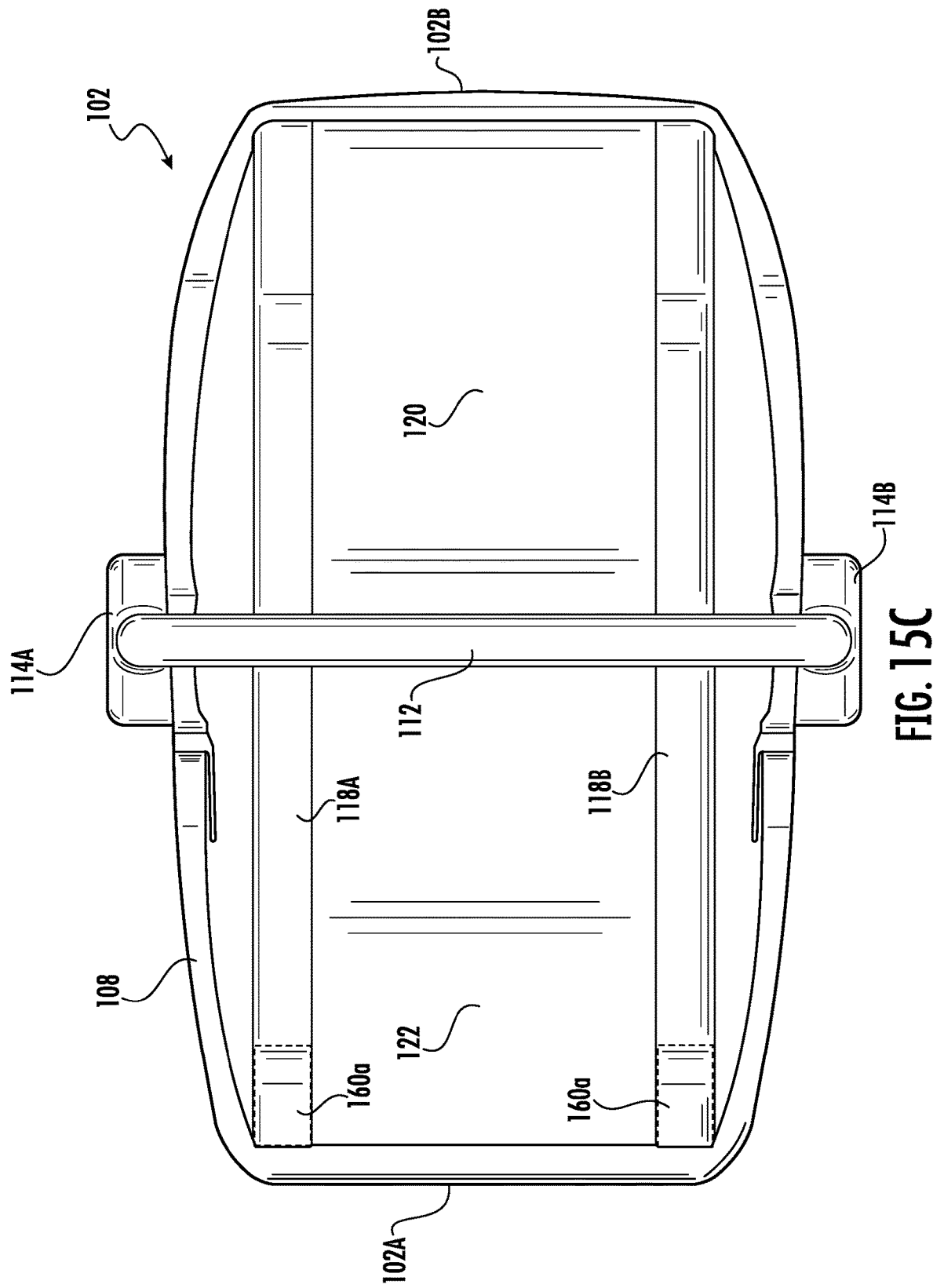
FIG. 15C shows a top view of the infant car seat of FIG. 15A.
Figure 15D:
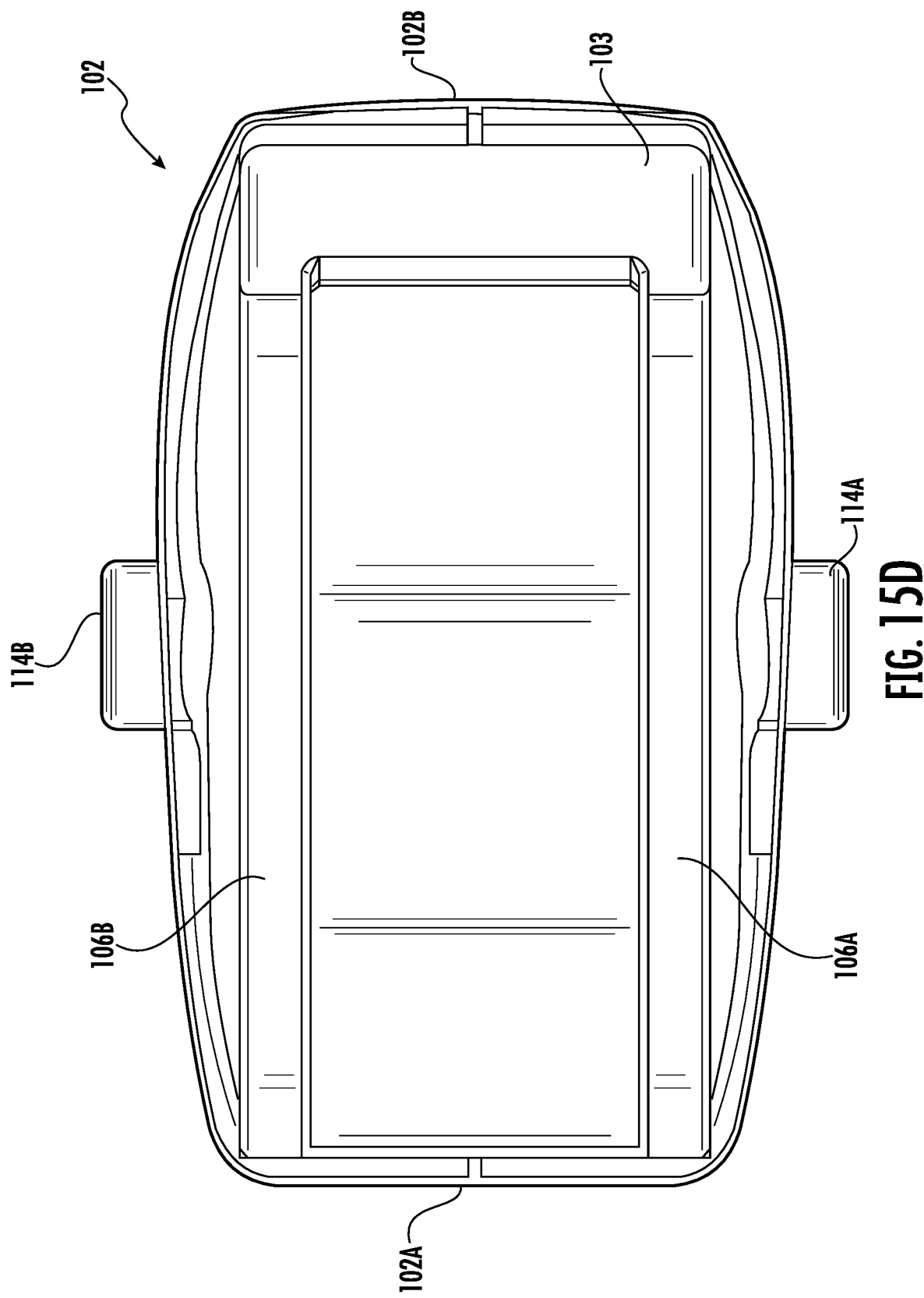
FIG. 15D shows a bottom view of the infant car seat of FIG. 15A.
Figure 15E:
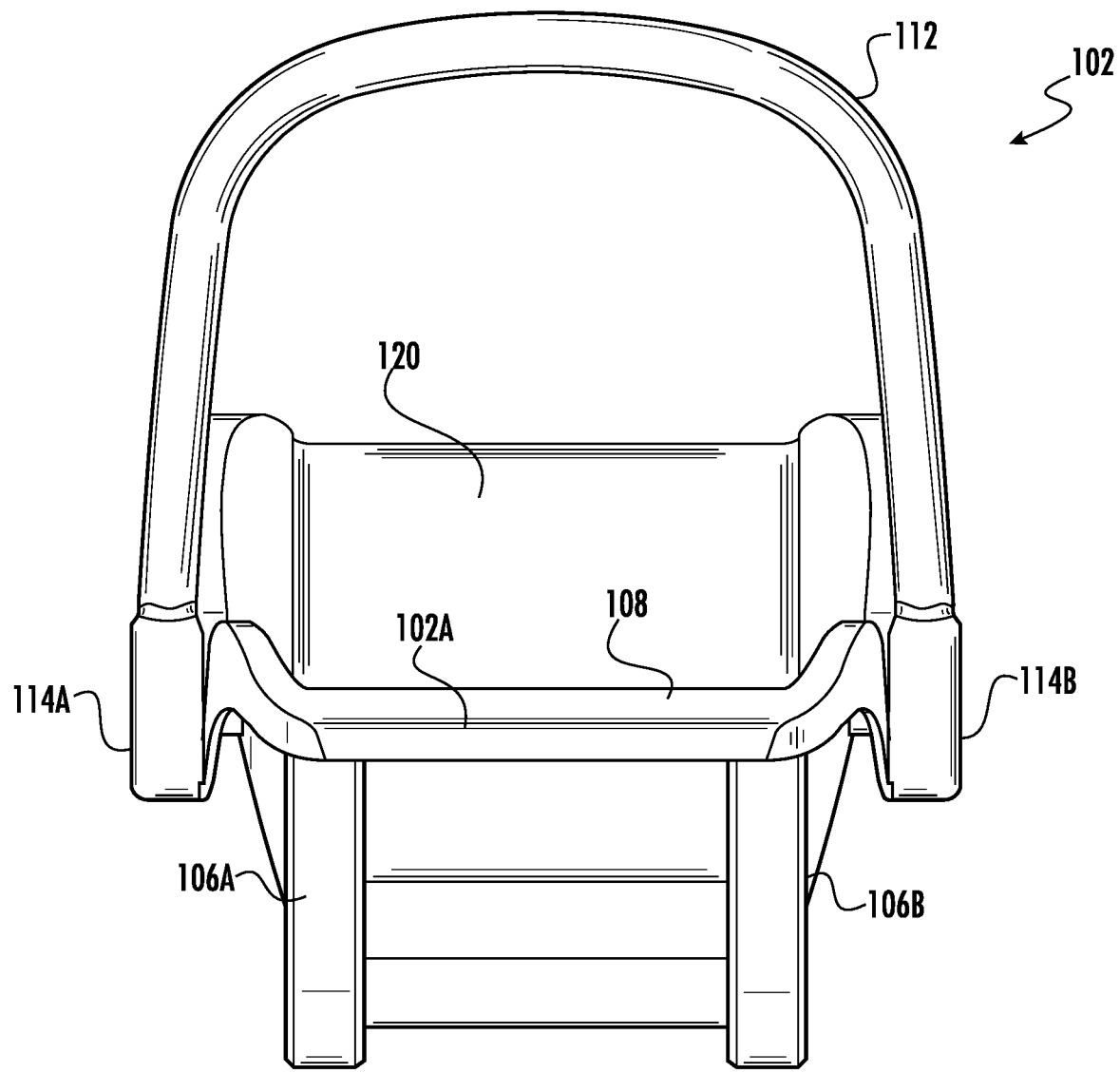
FIG. 15E shows a front view of the infant car seat of FIG. 15A.

FIGS. 15A and 15B further show the openings 116A and 116B may be formed on the interior sides of the seat shell rails 106A and 106B. The openings 116A and 116B may be shaped according to the cross-sectional shape of the crossmember 104D. Thus, the openings 116A and 116B may define the location of the mechanical constraining points 322A and 322B where the seat anchors 104A and 104B are mounted on the infant car seat 102. In some examples, the openings may be reinforced with additional plastic of the seat shell proximate to the openings, and or plastic or metal reinforcement pieces applied around or otherwise proximate to the openings.

Figure 15F:
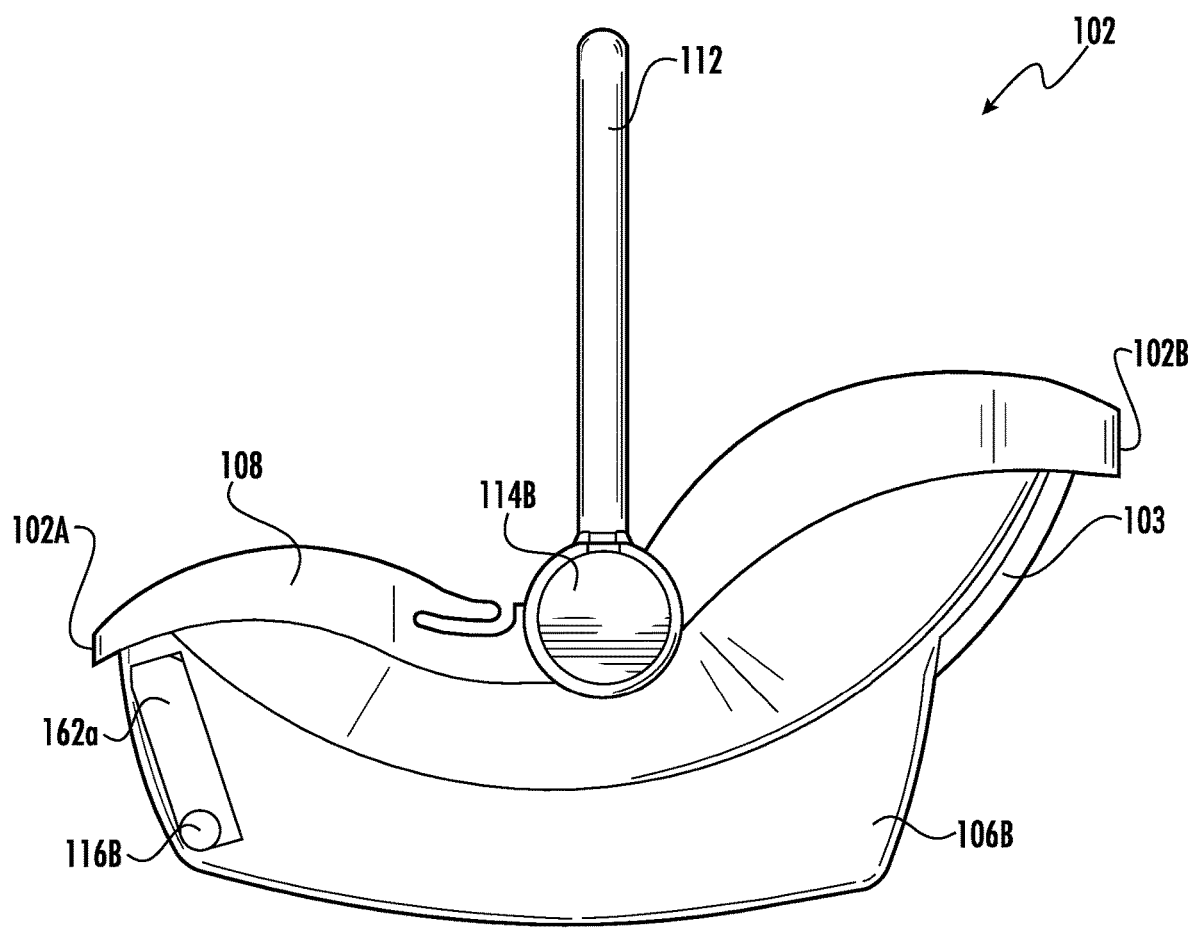
FIG. 15F shows a right-side view of the infant car seat of FIG. 15A.

As shown in FIG. 15F, the opening 116B may overlap with the opening 162*a*. In some implementations, the relative position between the openings 116A and 116B and the openings 162*a* may depend, in part, on the shape and/or arrangement of the crossmember 104D and the seat anchors 104A and 104B in the anchor system 104*e*. In some implementations, the openings 116A and 116B may be placed sufficiently below the seat rim 108 (but above the plane 310) in order to provide sufficient clearance for the seat anchors 104A and 104B to be inserted into the infant car seat 102 without contacting the seat rim 108.

Figure 16A:
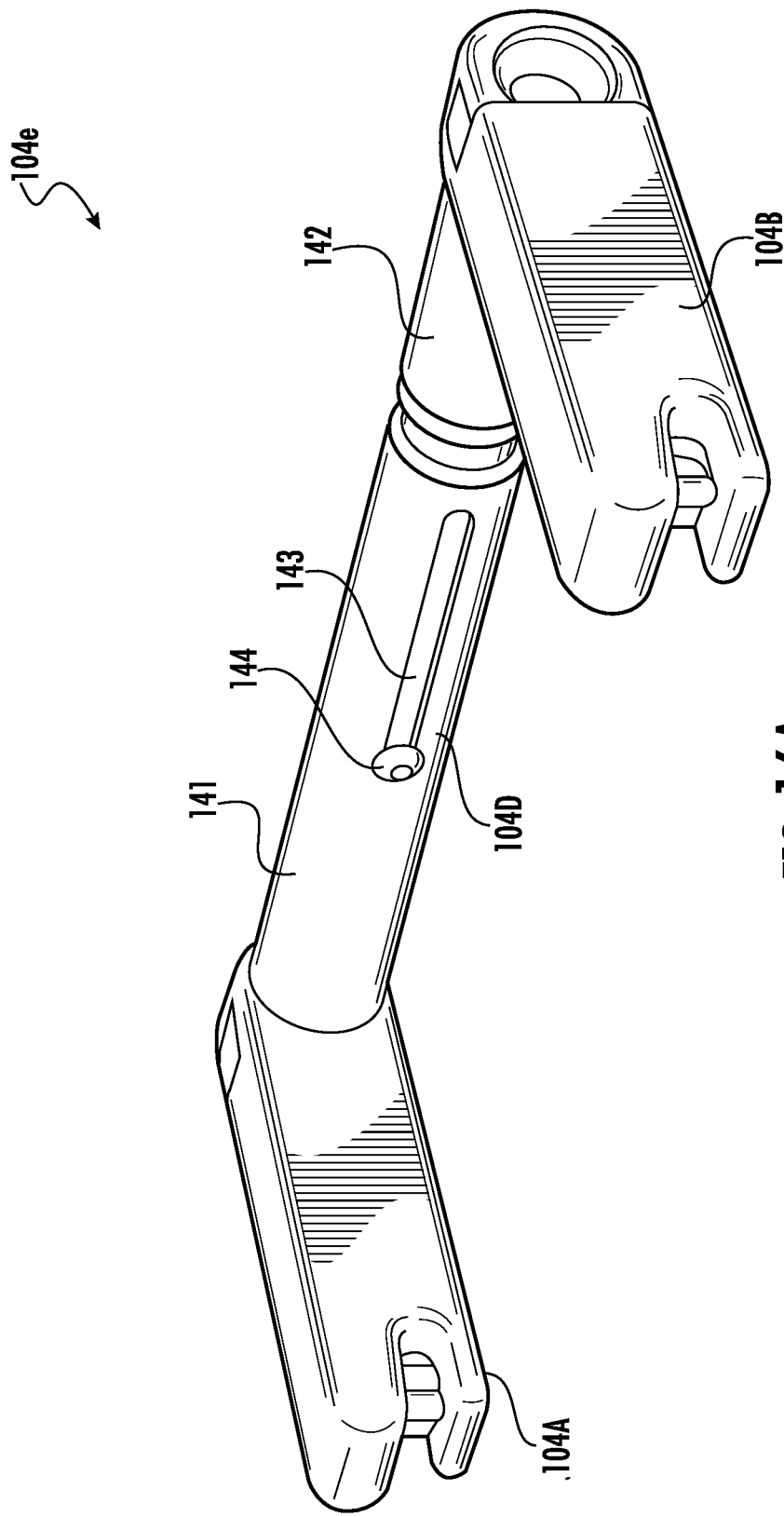
FIG. 16A shows a top perspective view of the anchor system of FIG. 14A in a stored position.
Figure 16B:
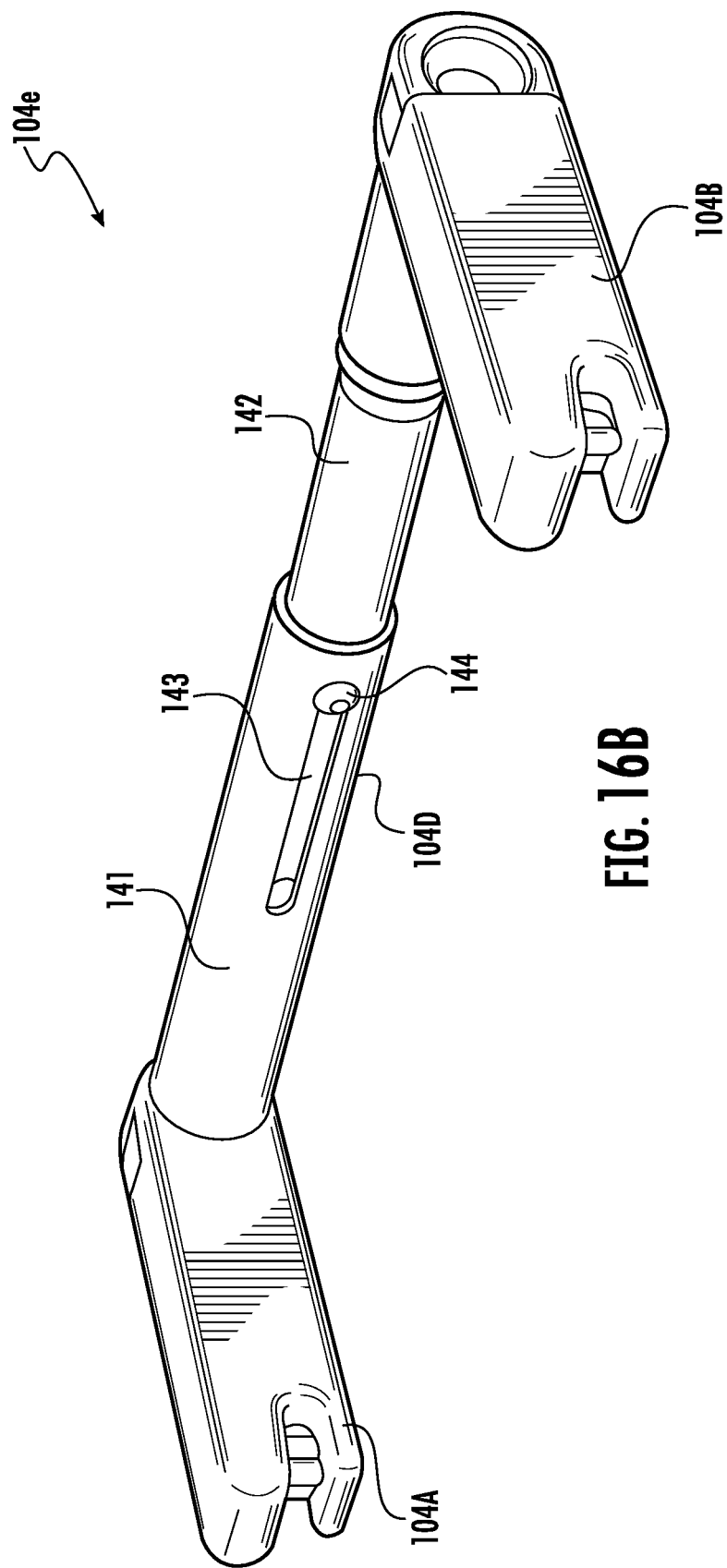
FIG. 16B shows a top perspective view of the anchor system of FIG. 16A in an operational position.
Figure 16C:
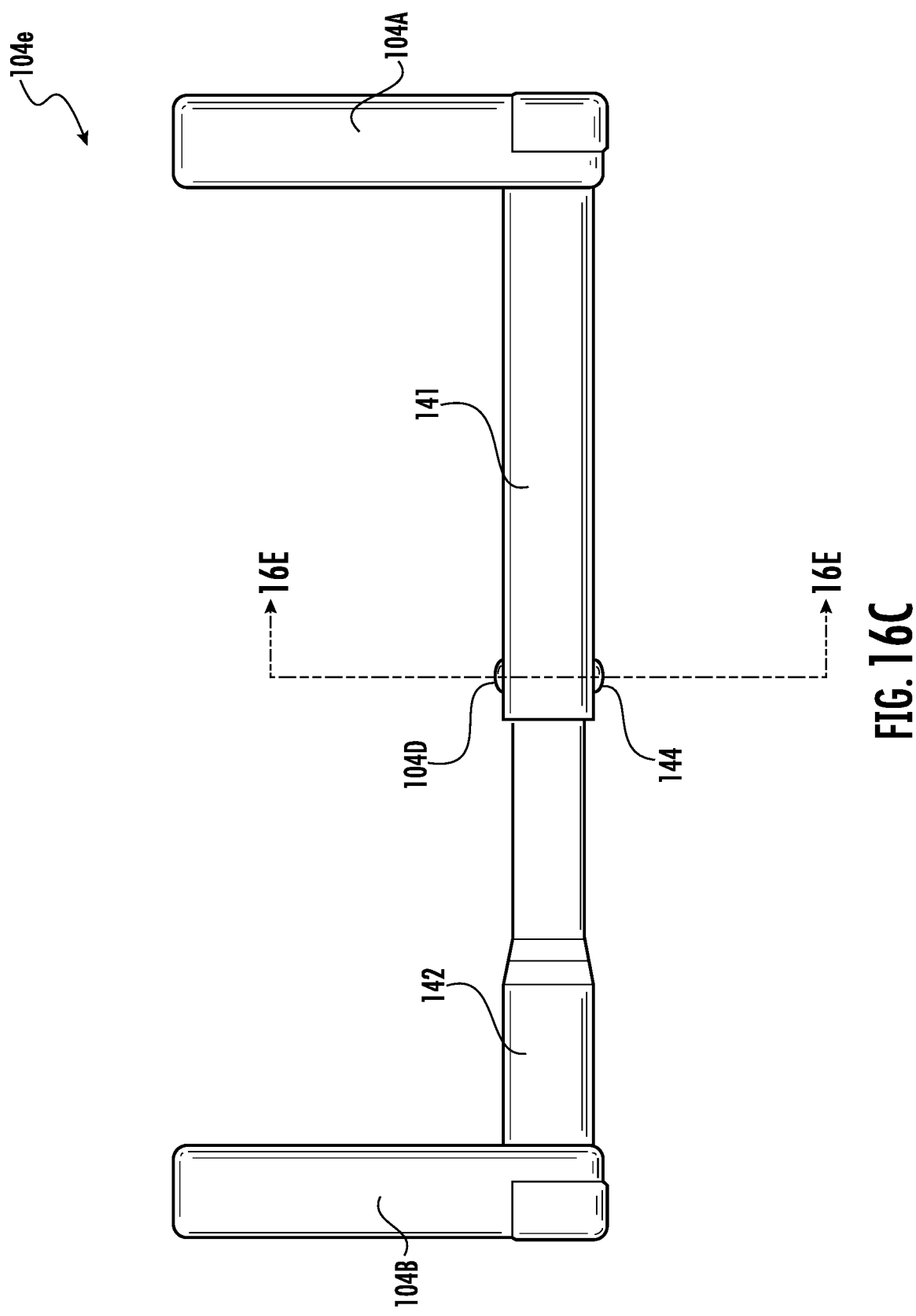
FIG. 16C shows a top view of the anchor system of FIG. 16A.
Figure 16D:
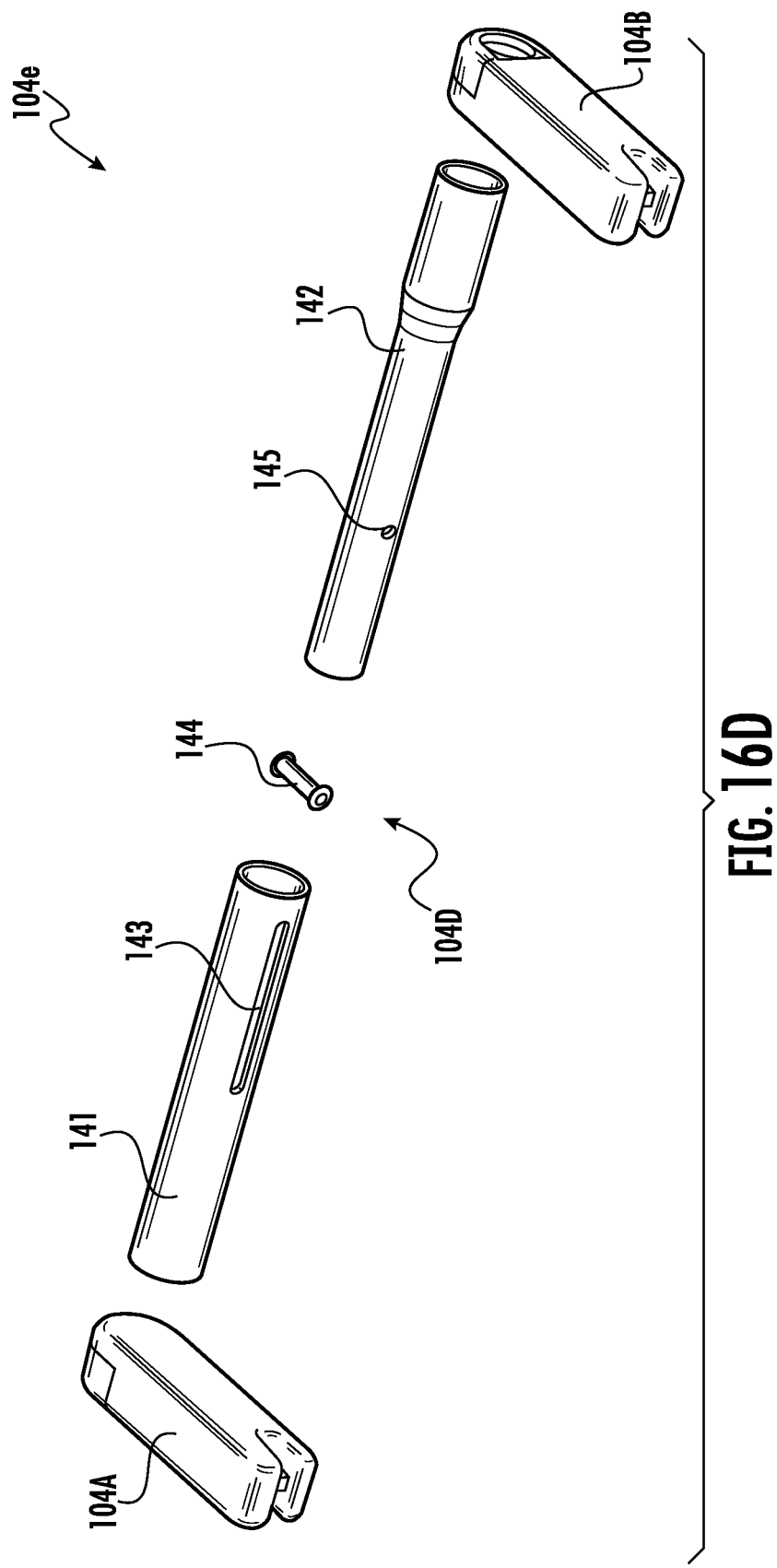
FIG. 16D shows an exploded top perspective view of the anchor system of FIG. 16A.
Figure 16E:
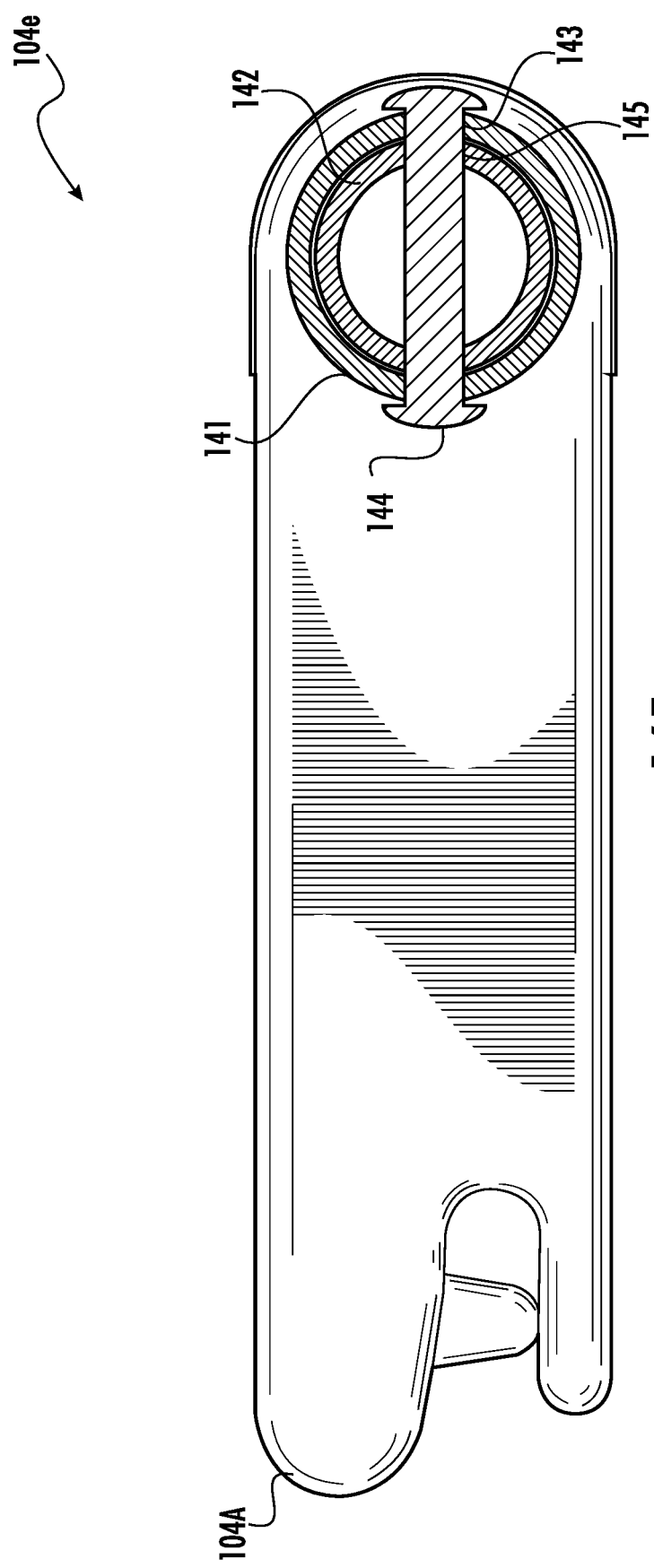
FIG. 16E shows a cross-sectional view of the anchor system corresponding to the plane A-A of FIG. 16C.

FIGS. 16A and 16B further show the anchor system 104*e* in a stored position and an operational position, respectively. FIGS. 16C-16E show additional views of the anchor system 104*e*. As shown, the anchor system 104*e* may include the seat anchors 104A and 104B and a crossmember 104D. As before, the crossmember 104D may be coupled to the ends of the seat anchors 104A and 104B opposite from the connection ends 105A and 105B.

In this implementation, the crossmember 104D may be an assembly of components that includes an outer tube 141 and an inner tube 142. The inner tube 142 may be shaped and/or dimensioned to fit within the outer tube 141 as shown in FIG. 16E such that the inner tube 142 is telescopically slidable with respect to the outer tube 141. The outer tube 141 may further include one or more slots 143 and the inner tube 142 may include one or more openings 145 as shown in FIG. 16D. A pin 144 may be inserted through the openings 145 of the inner tube 142 and the slots 143 of the outer tube 141, thus constraining the relative movement of the inner tube 142 and the outer tube 141 along a path defined by the slots 143. In this manner, the slots 143 may define the range of motion relative to the infant car seat 102 in which the seat anchors 104A and 104B are telescopically adjustable.

Figure 17:
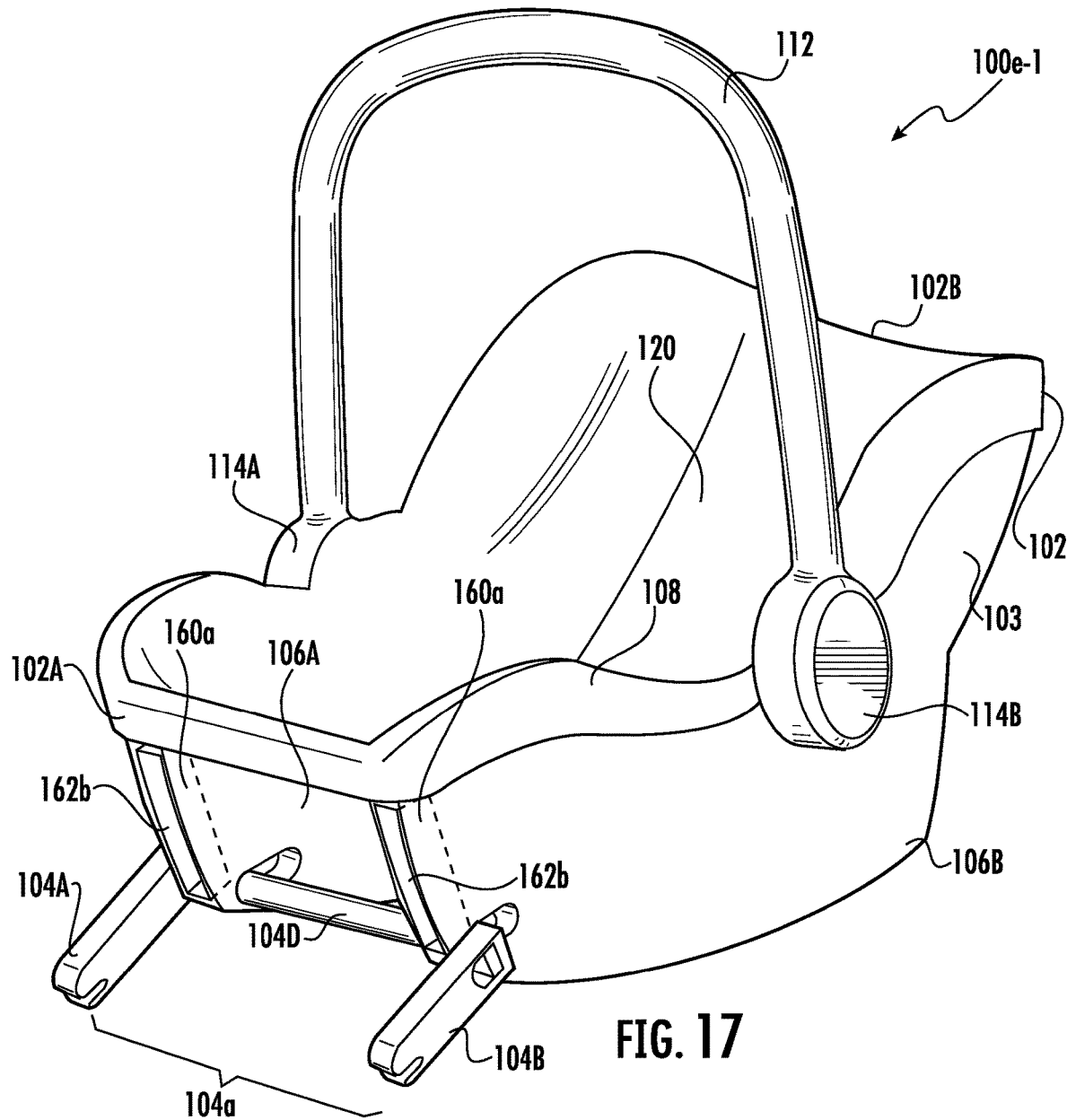
FIG. 17 shows an exemplary infant car seat system with a front storage compartment to store the seat anchors in the anchor system.

FIG. 17 shows another exemplary infant car seat system 100*e*-1 with openings 162*b* formed only on the front sides of the seat shell rails 106A and 106B to provide entry for the seat anchors 104A and 104B to enter the storage compartments 160*a*. The infant car seat system 100*e*-1 may once again include the rigid anchor system 104*a*. The seat anchors 104A and 104B in the infant car seat system 100*e*-1 may be stored using a substantially similar process as the infant car seat system 100*d*-1. For example, the anchor system 104*a* may be rotated from a deployed position (i.e., the seat anchors 104A and 104B extend out in front of the infant car seat 102) to a stored position (i.e., the seat anchors 104A and 104B are stored substantially within the storage compartments 160*a* located within the infant car seat 102) with the seat anchors 104A and 104B passing through respective openings 162*b*. The primary difference is that the seat anchors 104A and 104B pass through the openings 162*b*, which are formed only on the front sides of the seat shell rails 106A and 106B.

Figure 18A:
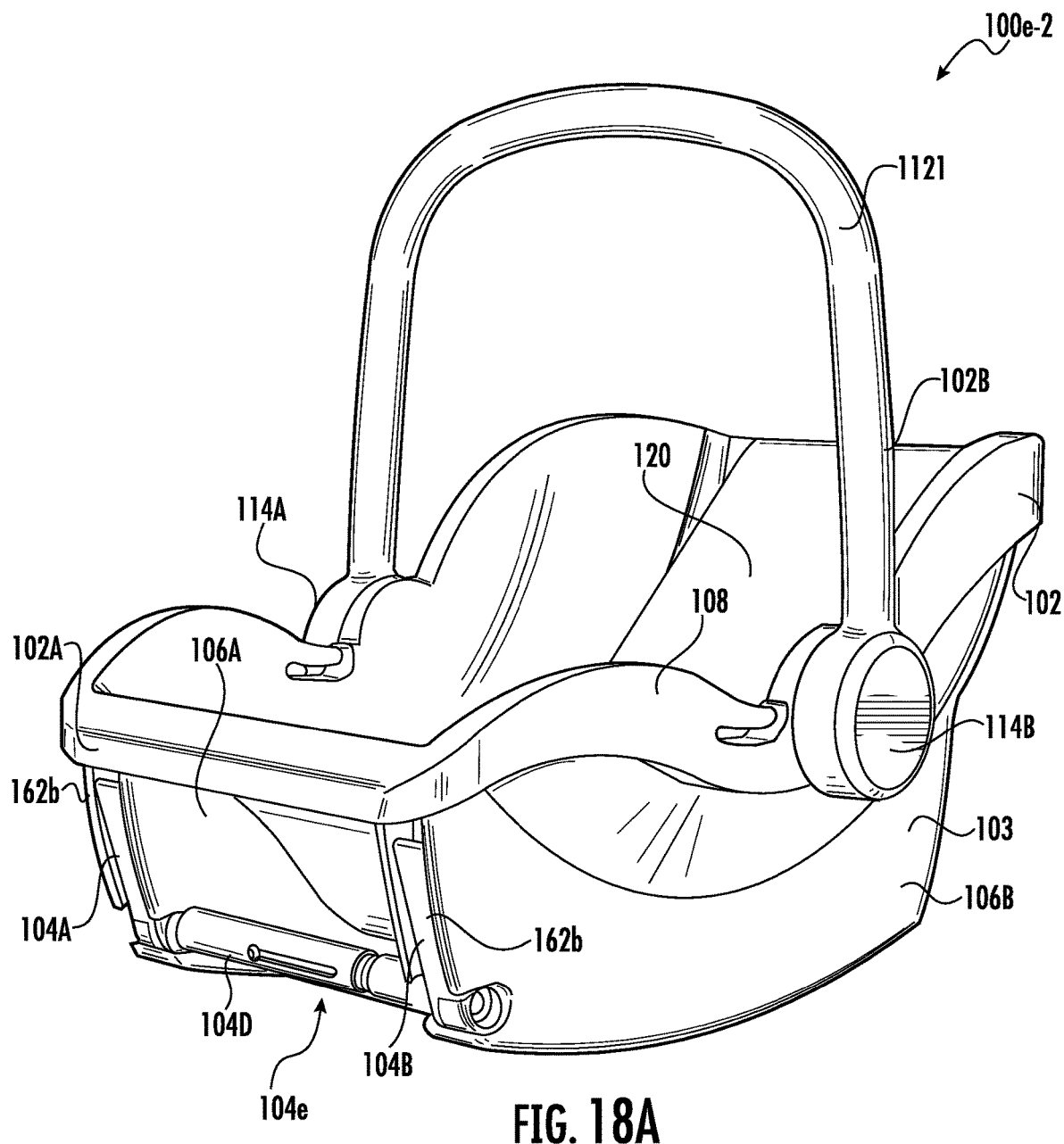
FIG. 18A shows a top perspective view of an exemplary infant car seat system with a telescoping anchor system and a front storage compartment. The anchor system is shown in a stored position.
Figure 18B:
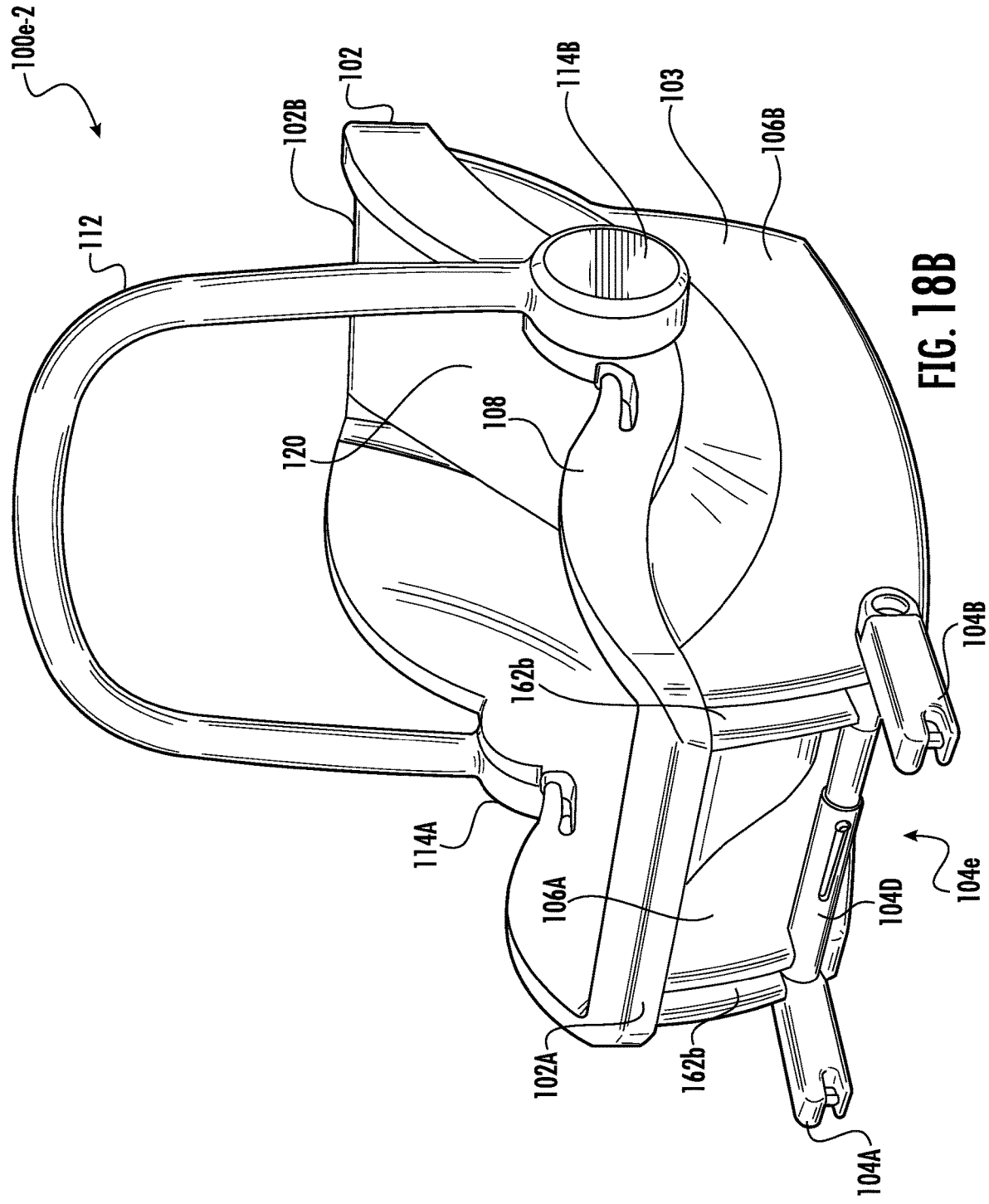
FIG. 18B shows a top perspective view of the infant car seat system of FIG. 18A where the anchor system is shown in an operational position.
Figure 18C:
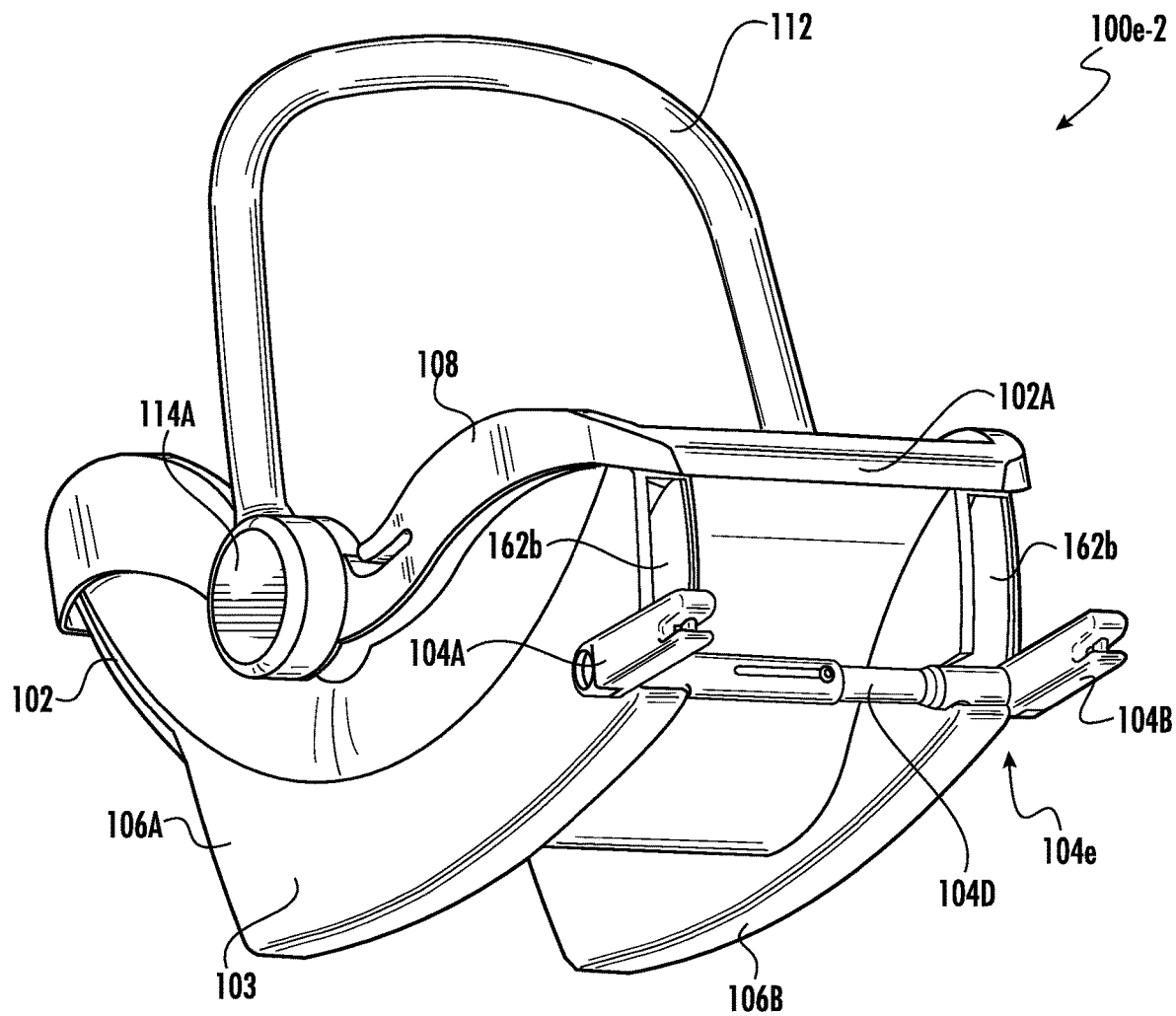
FIG. 18C shows a bottom perspective view of the infant car seat system of FIG. 18B.
Figure 18D:
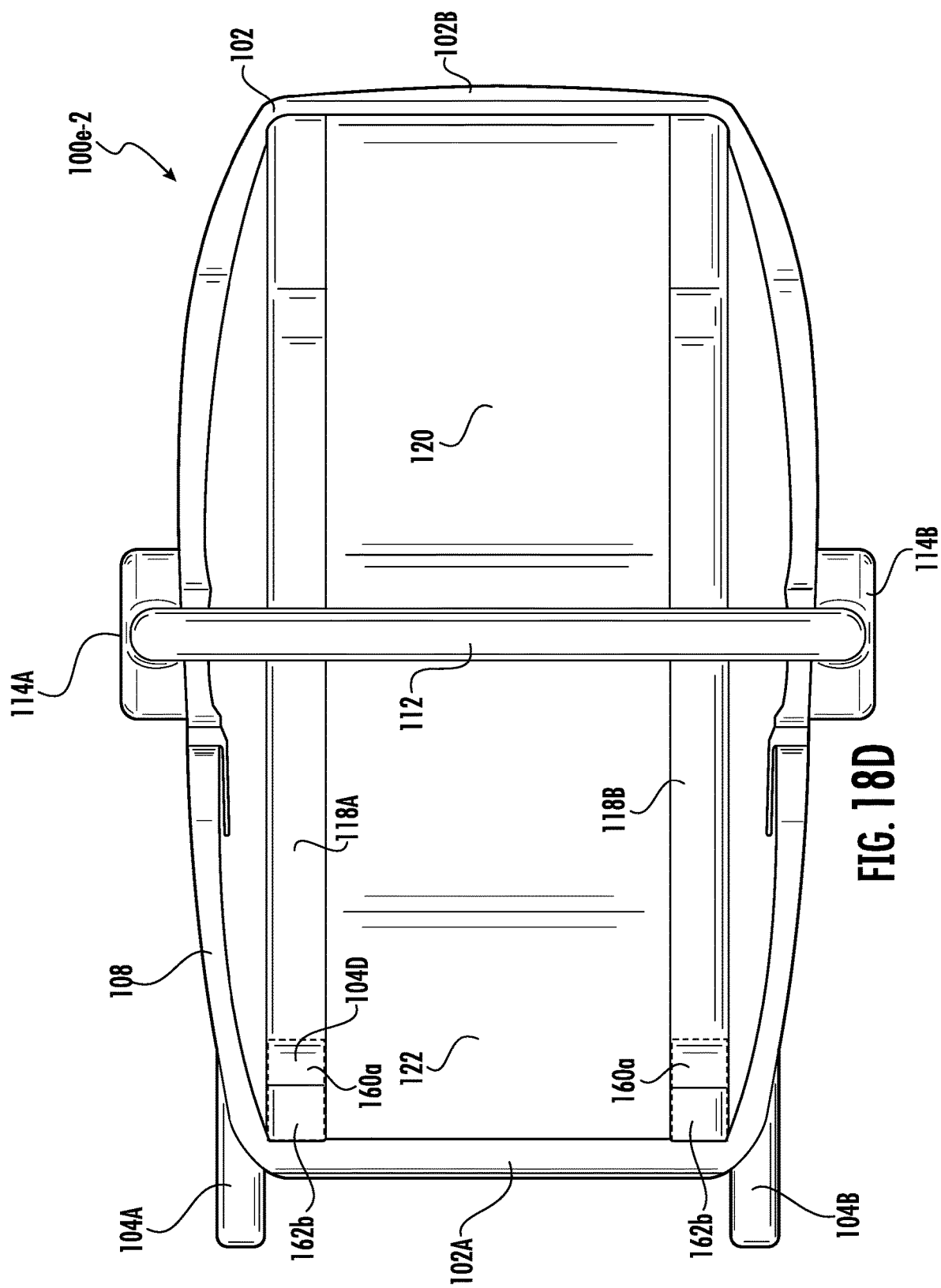
FIG. 18D shows a top view of the infant car seat system of FIG. 18B.
Figure 18F:
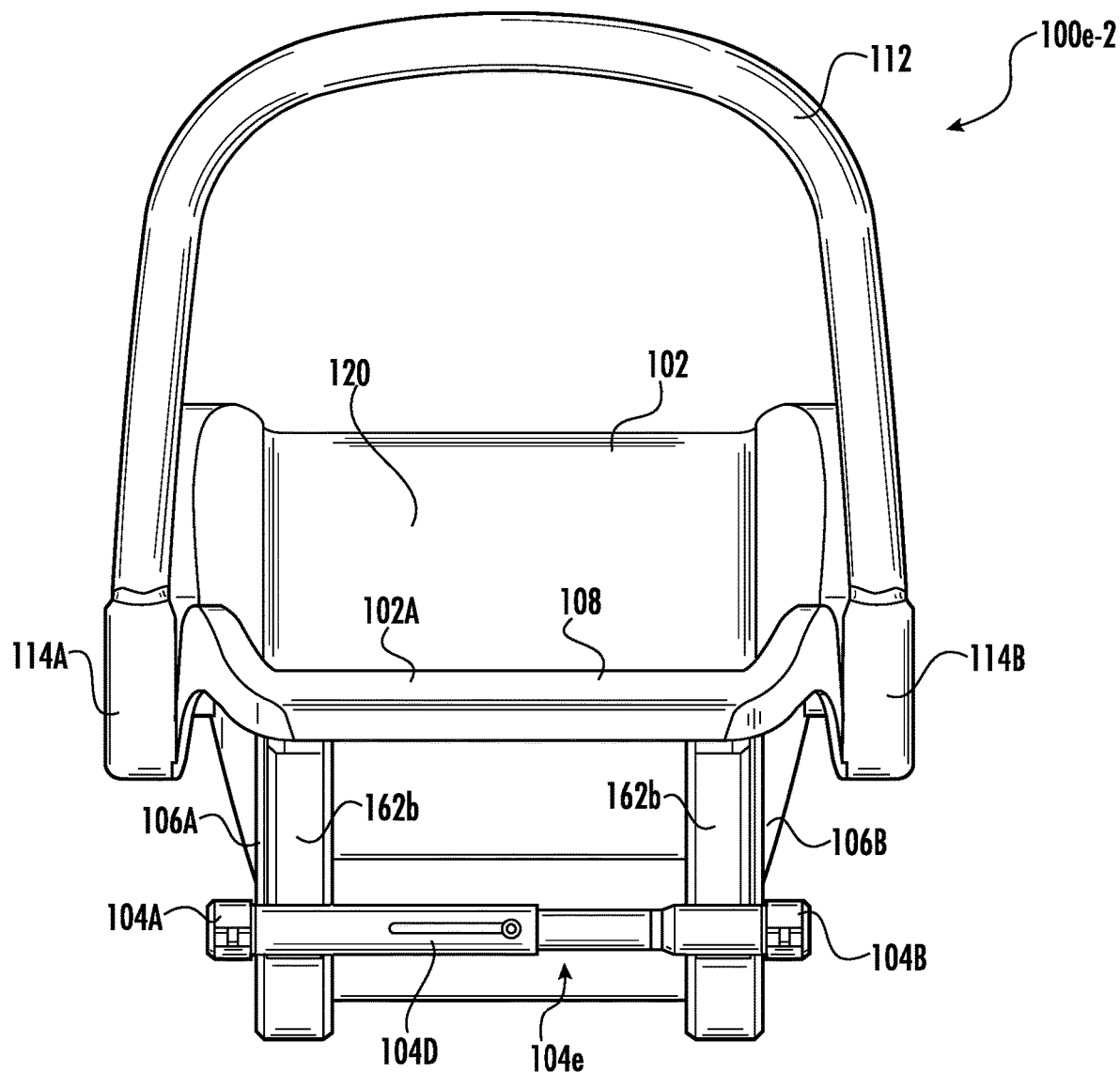
FIG. 18F shows a front view of the infant car seat system of FIG. 18B.
Figure 18G:
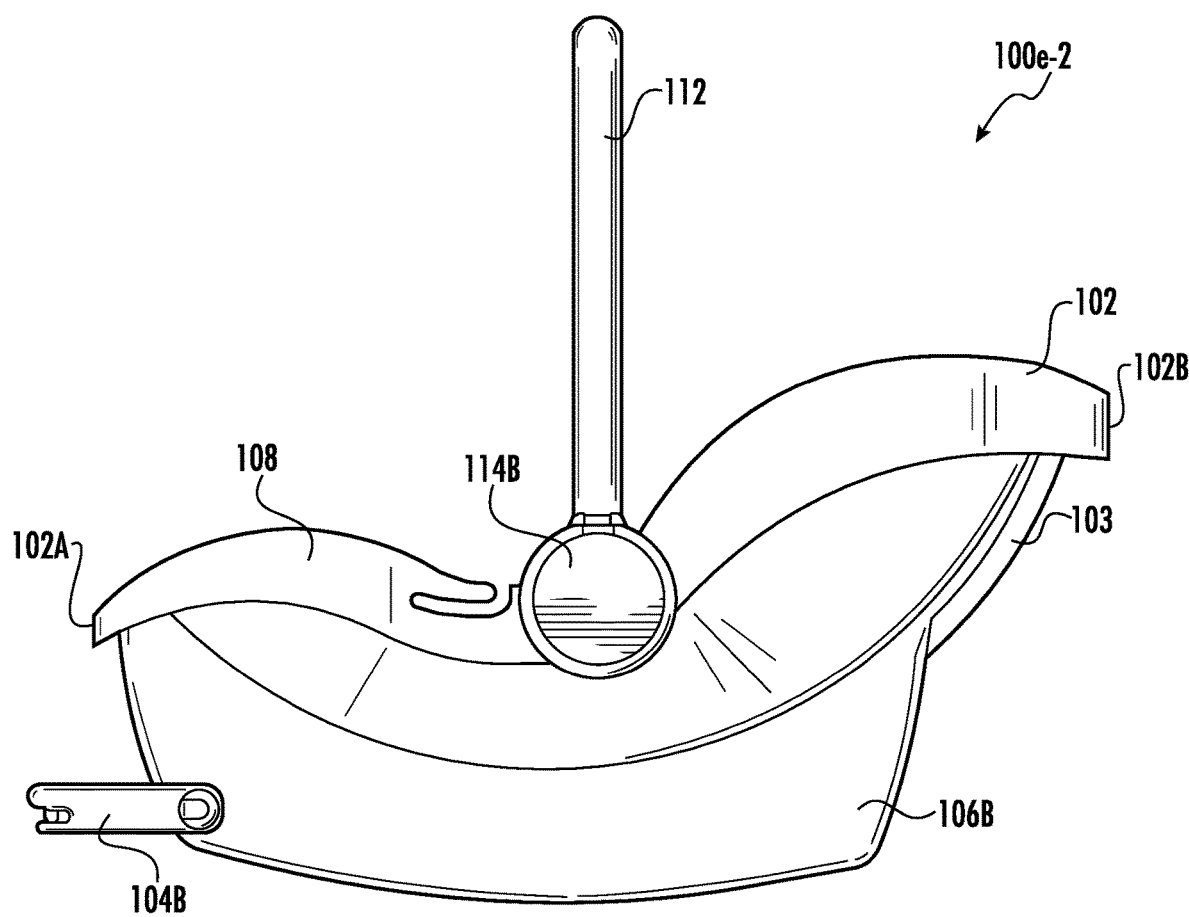
FIG. 18G shows a right-side view of the infant car seat system of FIG. 18B.

FIGS. 18A and 18B show another exemplary infant car seat system 100*e*-2 that includes the telescopically adjustable rigid anchor system 104*e* and the front openings 162*b*. In particular, FIG. 18A shows the anchor system 104*e* in a stored position and FIG. 18B shows the anchor system 104*e* in an operational position. In this implementation, the anchor system 104*e* may transition from the operation position to the stored position by first telescopically retracting the seat anchors 104A and 104B. Once the seat anchors 104A and 104B are aligned with the openings 162*b*, the anchor system 104*e* may be rotated until the seat anchors 104A and 104B are positioned within the storage compartments 160*a* in the infant car seat 102.

FIGS. 18C-18G show several views of the infant car seat system 100*e*-2 with the anchor system 104*e* deployed in the operational position. As before, the storage compartments 160*a* may be located within portions of the rocker cavities 118A and 118B defined by the seat shell rails 106A and 106B.

Figure 19A:
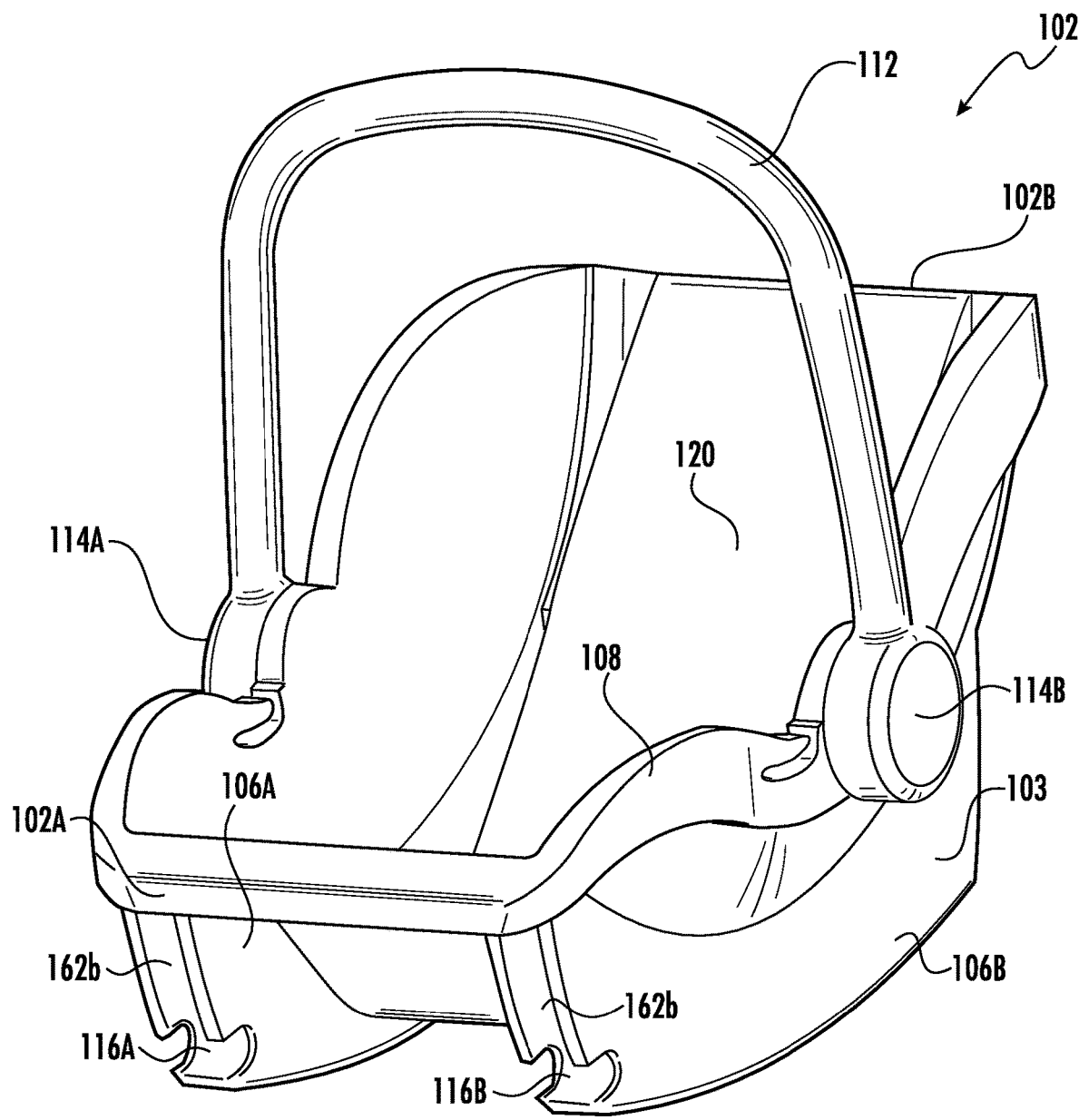
FIG. 19A shows a top perspective view of the infant car seat in the infant car seat system of FIG. 18A.
Figure 19B:
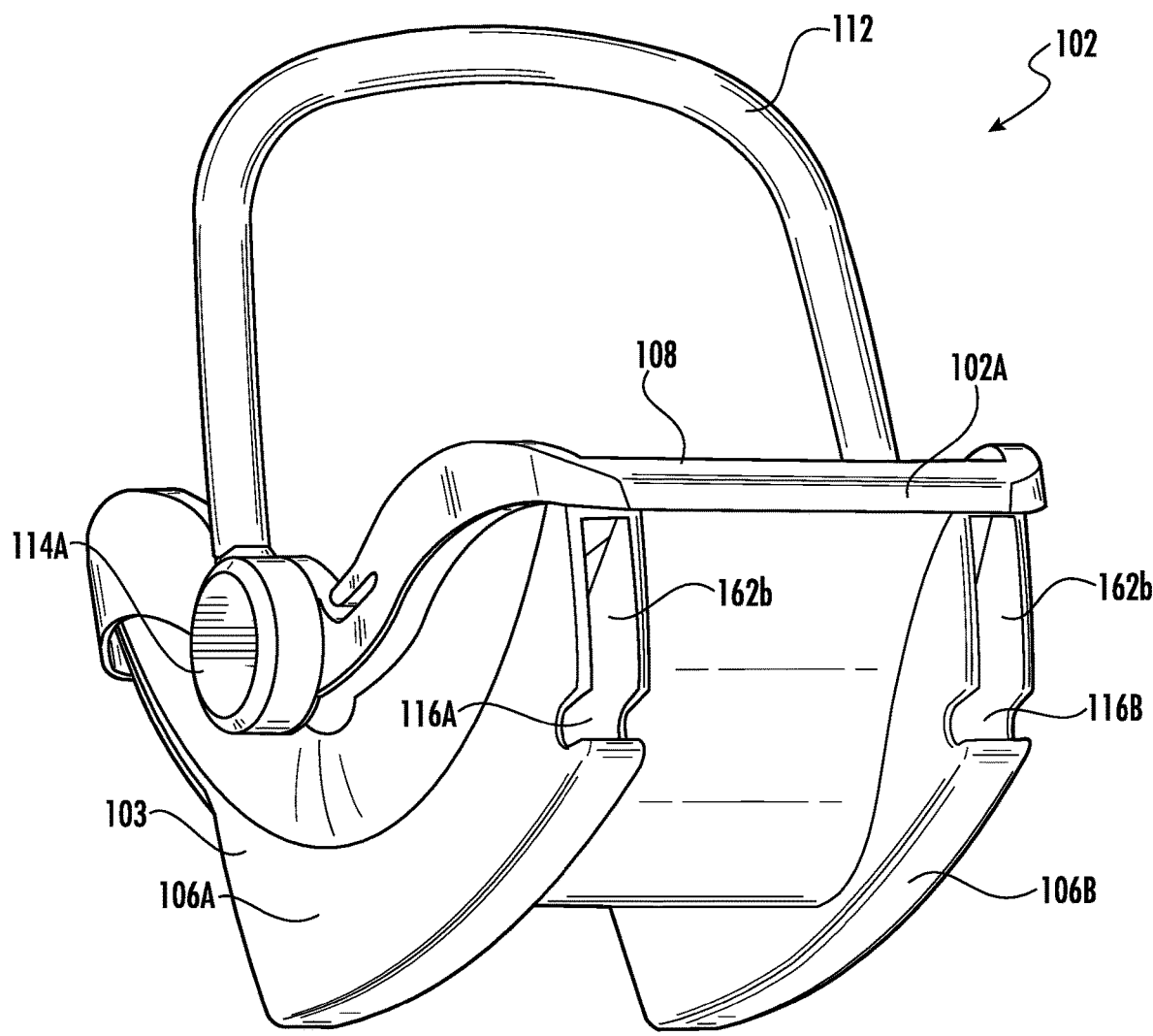
FIG. 19B shows a bottom perspective view of the infant car seat of FIG. 19A.
Figure 19C:
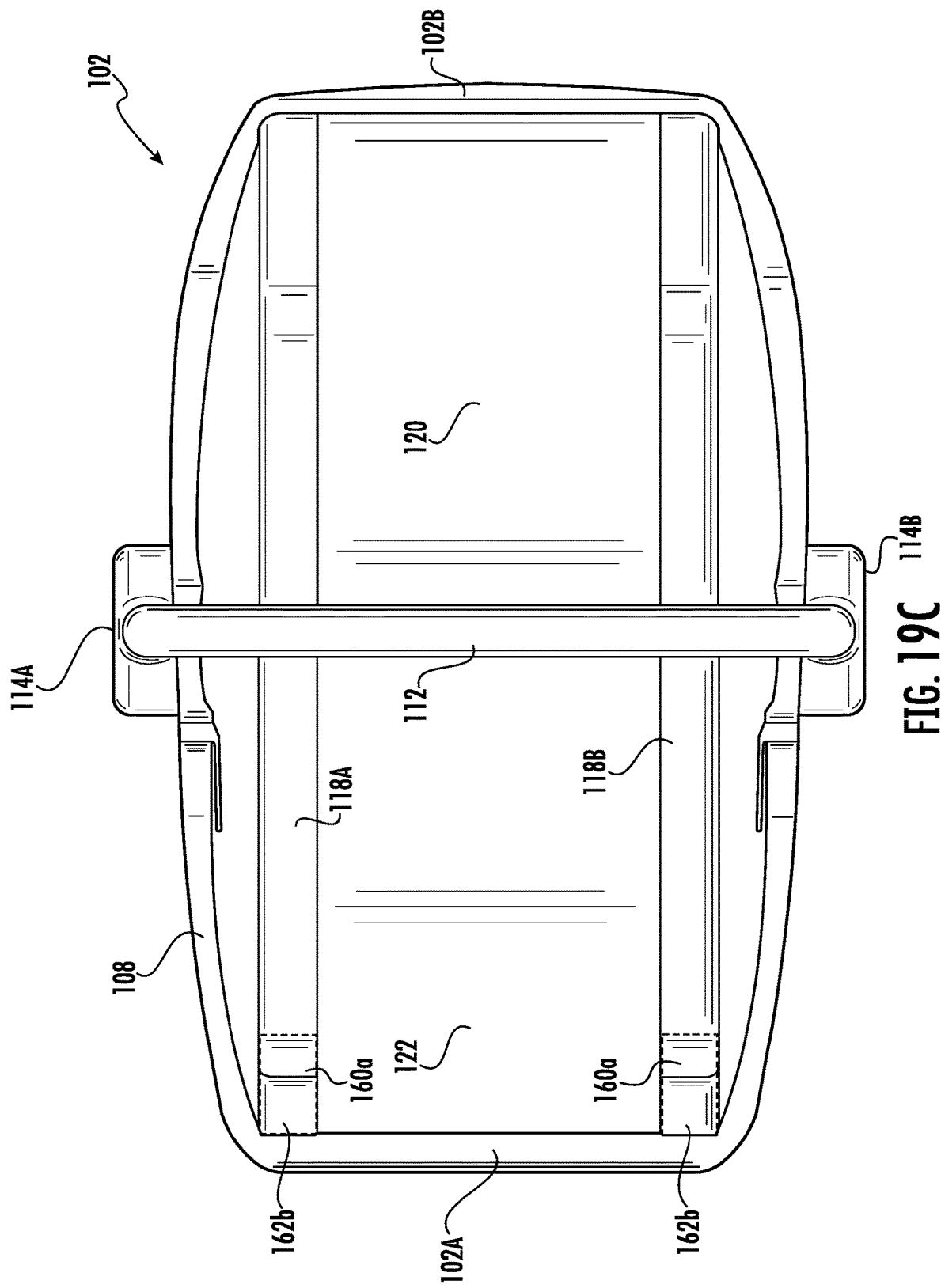
FIG. 19C shows a top view of the infant car seat of FIG. 19A.
Figure 19D:
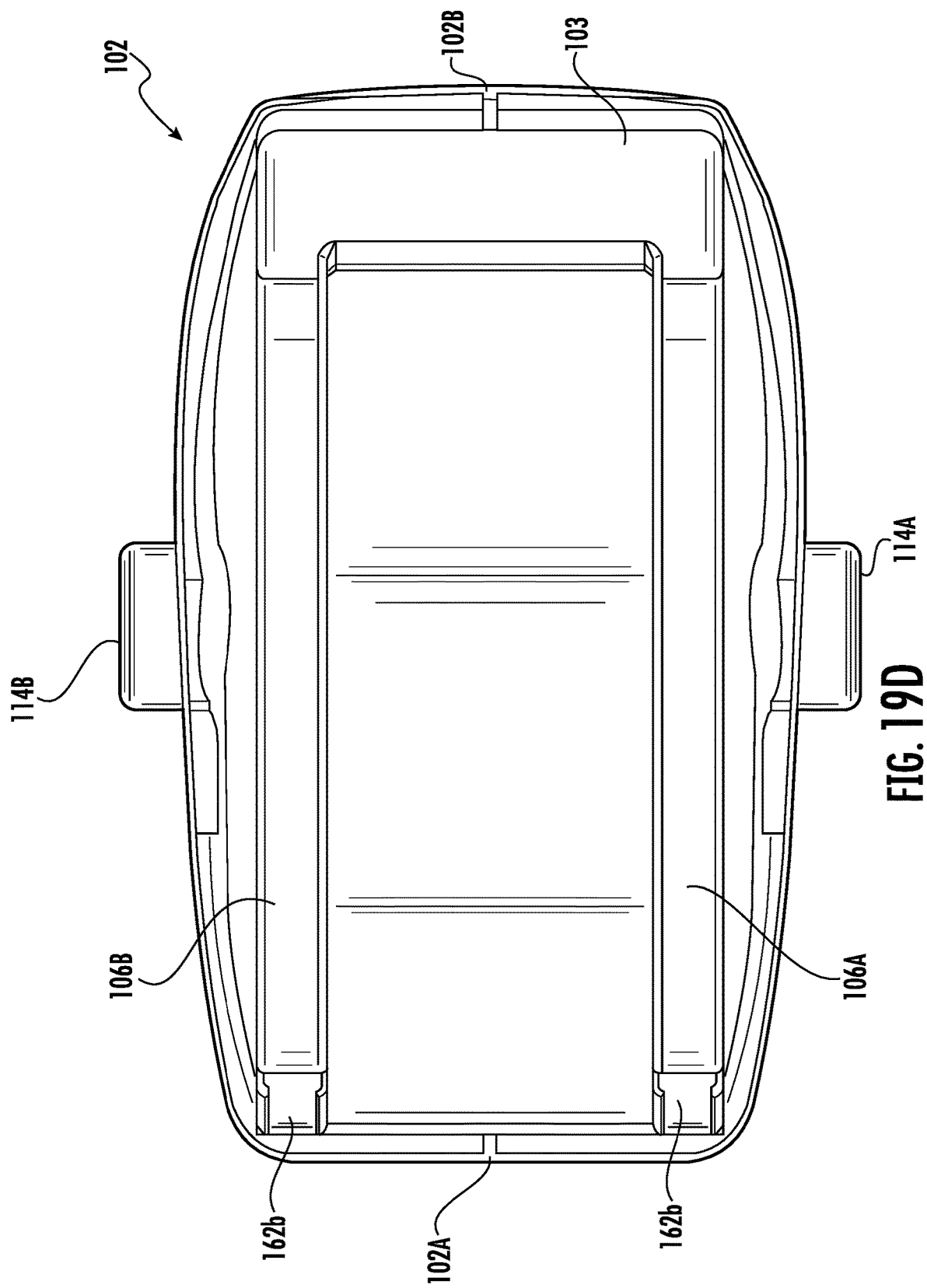
FIG. 19D shows a bottom view of the infant car seat of FIG. 19A.
Figure 19E:
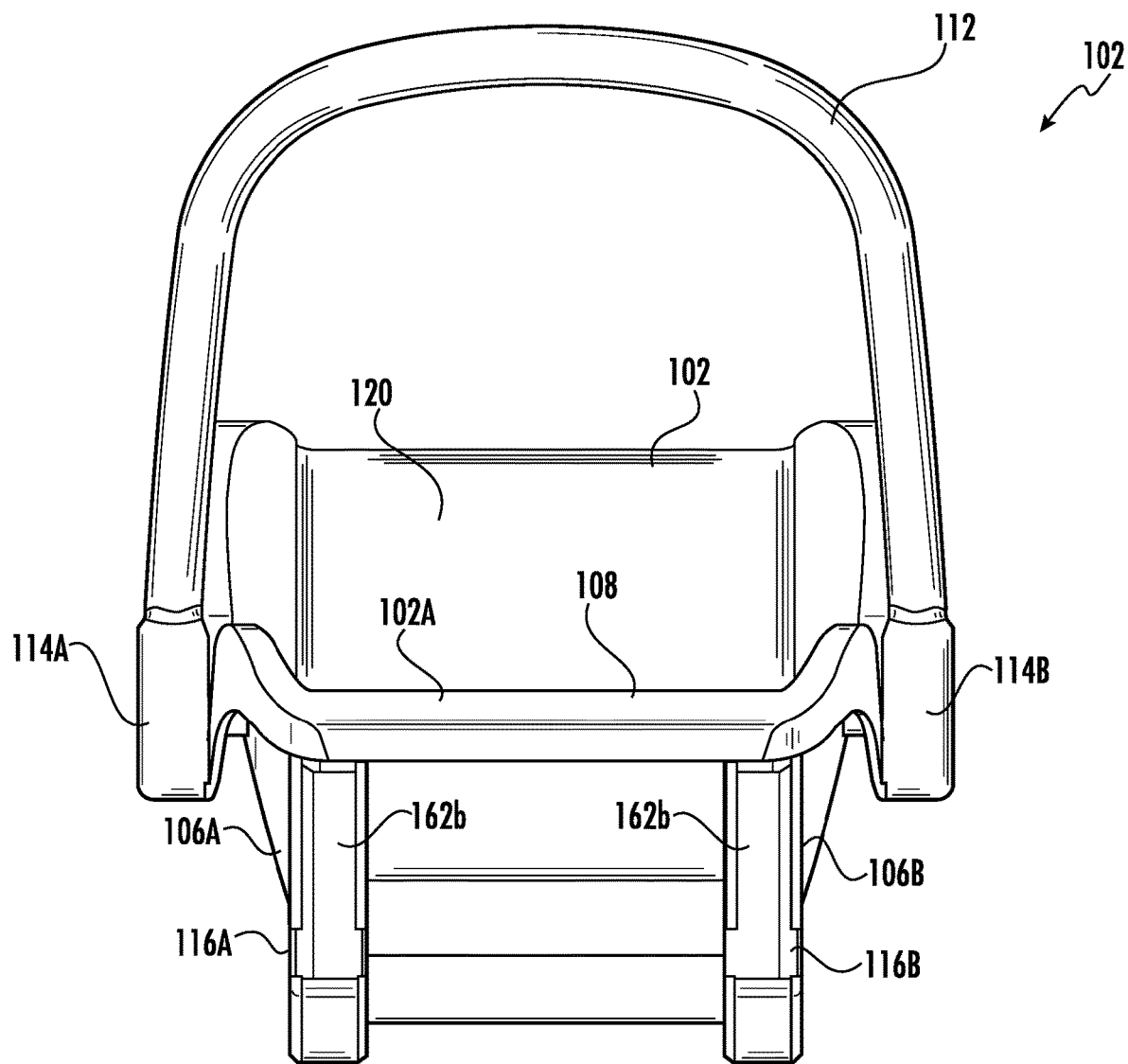
FIG. 19E shows a front view of the infant car seat of FIG. 19A.
Figure 19F:
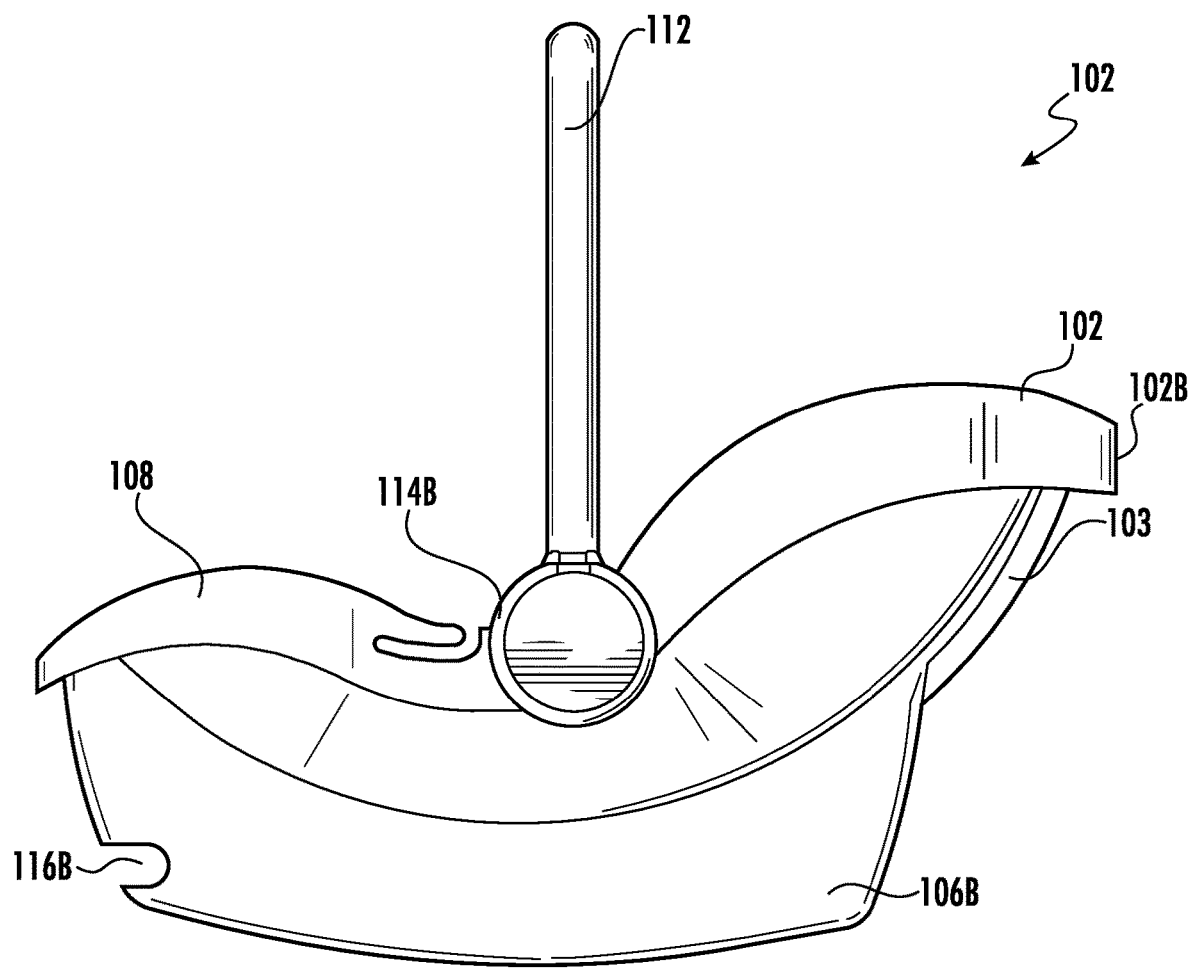
FIG. 19F shows a right-side view of the infant car seat of FIG. 19A.

FIGS. 19A-19F show several views of the infant car seat 102 without the anchor system 104*e*. As shown in FIGS. 19A and 19B, the openings 162*b* may substantially occupy the front portions of the seat shell rails 106A and 106B. In other words, the curved bottom rockers 107A and 107B and the sides of the seat shell rails 106A and 106B may define the openings 162*b*. In some implementations, the shape and/or dimensions of the openings 162*b*, which are defined, in part, by the shape and/or dimensions of the seat shell rails 106A and 106B and the bottom curved rockers 107A and 107B, may be tailored to substantially conform with the top and/or bottom cross-sectional shape and dimensions of the seat anchors 104A and 104B.

FIGS. 19A and 19B further shows the infant car seat 102 may include openings 116A and 116B to physically engage and support the crossmember 104D in the anchor system 104*e*. As shown, the openings 116A and 116B may be formed as respective notches that intersect a portion of the openings 162*b*. Thus, the anchor system 104*e* may be inserted as a single assembly from the frontside 102A to engage the openings 116A and 116B on the infant car seat 102 during assembly. For example, the crossmember 104D may be pressed into the openings 116A and 116B until the crossmember 104D physically contacts the back edges of the seat shell rails 106A and 106B forming the openings 116A and 116B. The depth in which the openings 116A and 116B extend into the seat shell rails 106A and 106B may be chosen, in part, to ensure the seat anchors 104A and 104B are disposed entirely within the storage compartment 160*a* when rotated about the crossmember 104D. While not explicitly visible in the figure, in some examples the inner walls of the seat shell rails would fully surround the crossmember (in a manner similar to that shown in FIG. 21A).

Figure 20:
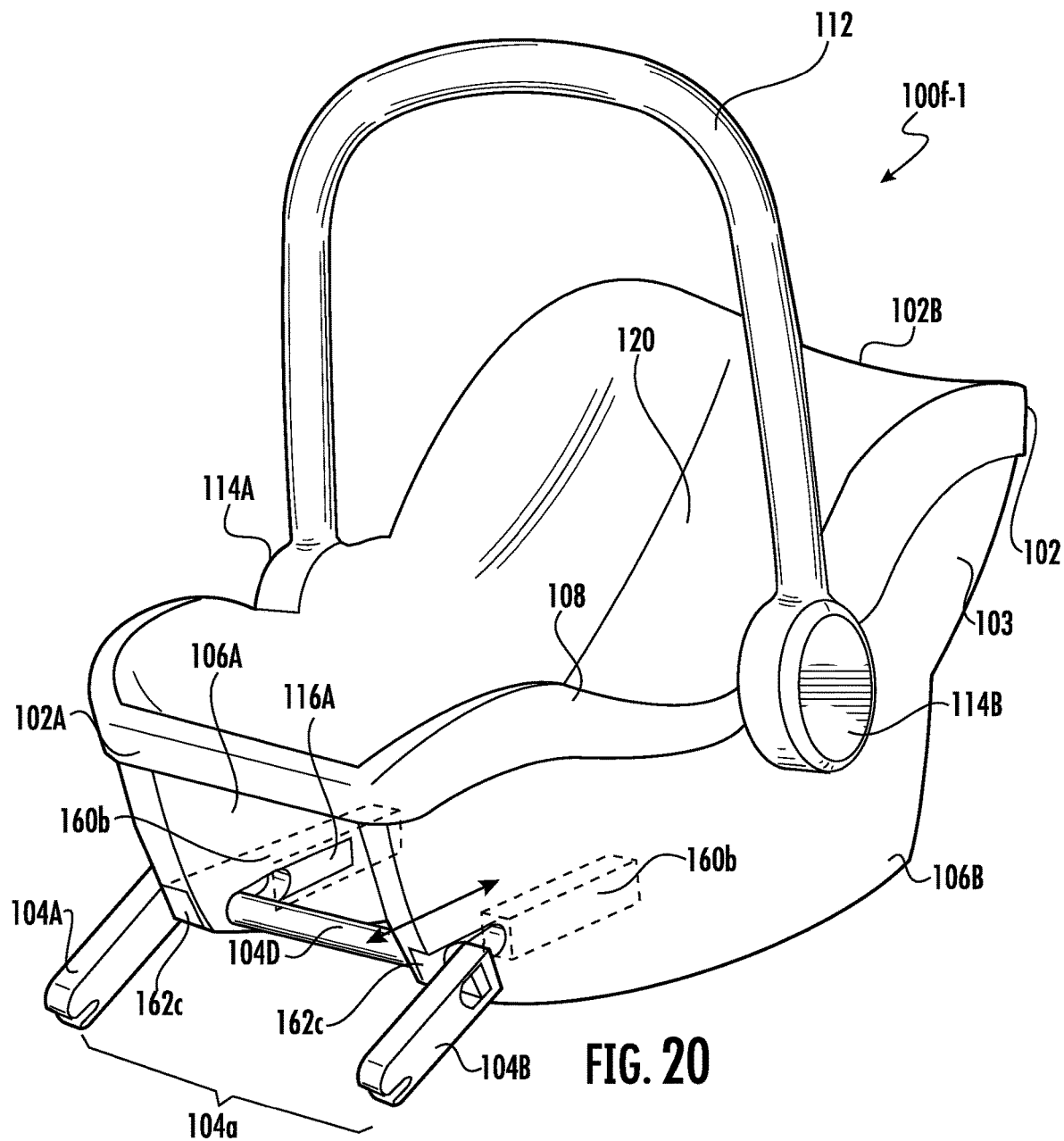
FIG. 20 shows an exemplary infant car seat system with a front storage compartment and an anchor system with telescopic rail guides.

FIG. 20 shows another exemplary infant car seat system 100*f*-1 with an anchor system 104*a* configured to transition between a stored position and an operational position via a slidable adjustment mechanism. As shown, the infant car seat 102 may include an opening 116A on the seat shell rail 106A that is shaped as a slot to constrain the translational motion of the crossmember 104D along a path defined by the opening 116A. A similar opening (not shown) may be formed on the seat shell rail 106B. Thus, the anchor system 104*a* may be translationally and rotationally adjustable with respect to the infant car seat 102 when deployed.

A storage compartment 160*b* may be disposed proximate to the opening 116A and oriented such that the seat anchor 104A, when disposed within the storage compartment 160*b*, is oriented substantially horizontal within the infant car seat 102. The infant car seat 102 may further include corresponding openings 162*c* that are shaped and/or dimensioned based on the front/rear cross-sectional shape and dimensions of the seat anchors 104A and 104B. Compared to the openings 162*a* and 162*b* in the infant car seat systems 100*d*-1 and 100*e*-1, respectively, the openings 162*c* may be appreciably smaller, which may be beneficial in preserving the structural rigidity of the seat shell rails 106A and 106B.

In order to store the seat anchors 104A and 104B in the storage compartments 160*b*, the anchor system 104*a* may first be rotated such that the seat anchors 104A and 104B are oriented horizontally and, hence, aligned with the openings 162*c* formed along the front portions of the seat shell rails 106A and 106B. The parent and/or the caregiver may then push the seat anchors 104A and 104B through the openings 162*c* to slidably move the crossmember 104D along the opening 116A until the seat anchors 104A and 104B are fully disposed in the storage compartments 160*b*. In some implementations, the position and length of the opening 116A may be tailored so that the crossmember 104D contacts the respective front and back ends of the opening 116A when the anchor system 104*a* is in an operational position or a stored position, respectively.

Figure 21A:
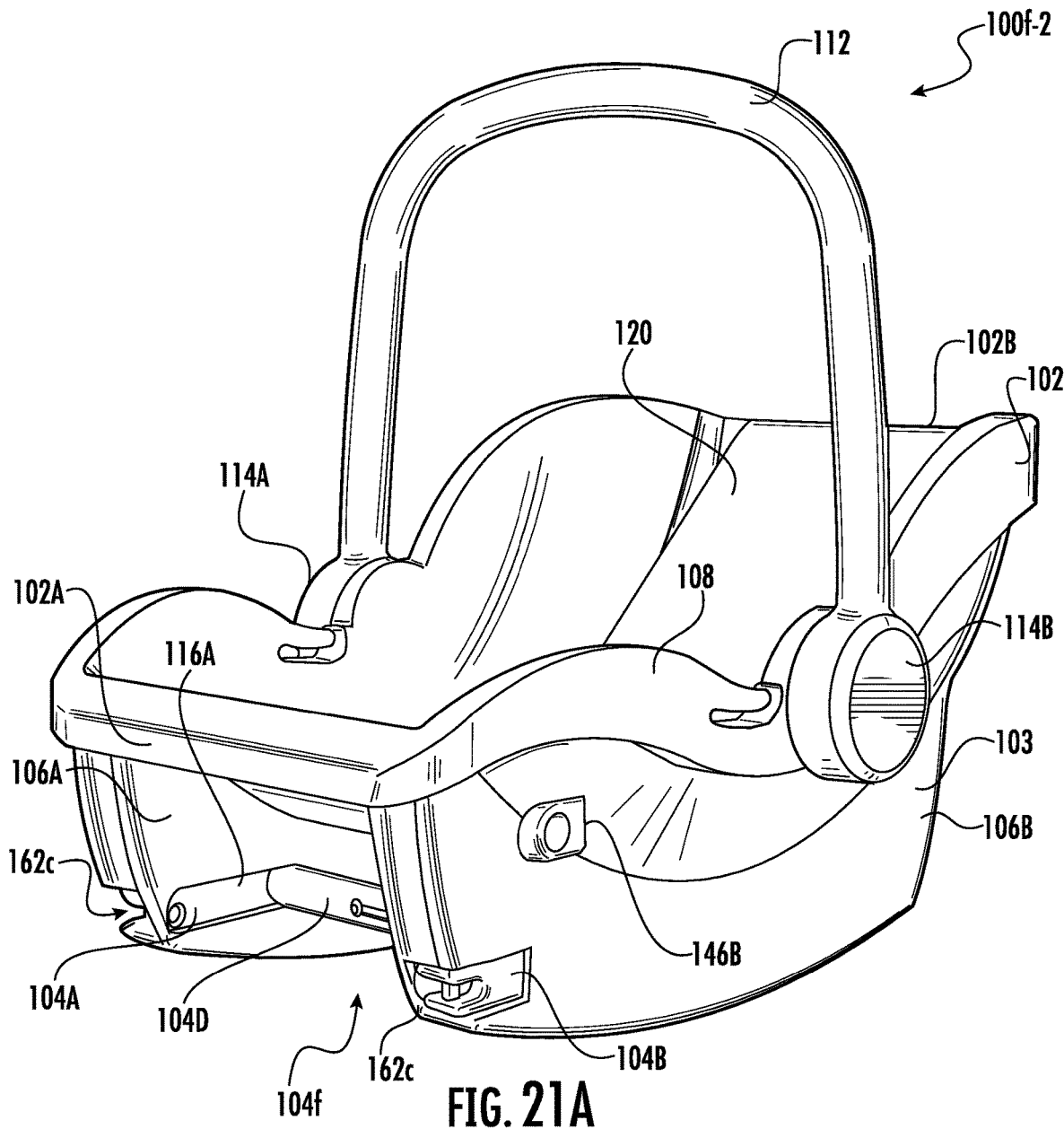
FIG. 21A shows a top perspective view of an exemplary infant car seat system with a telescoping anchor system with telescopic rail guides and a front storage compartment. The anchor system is shown in a stored position.
Figure 21B:
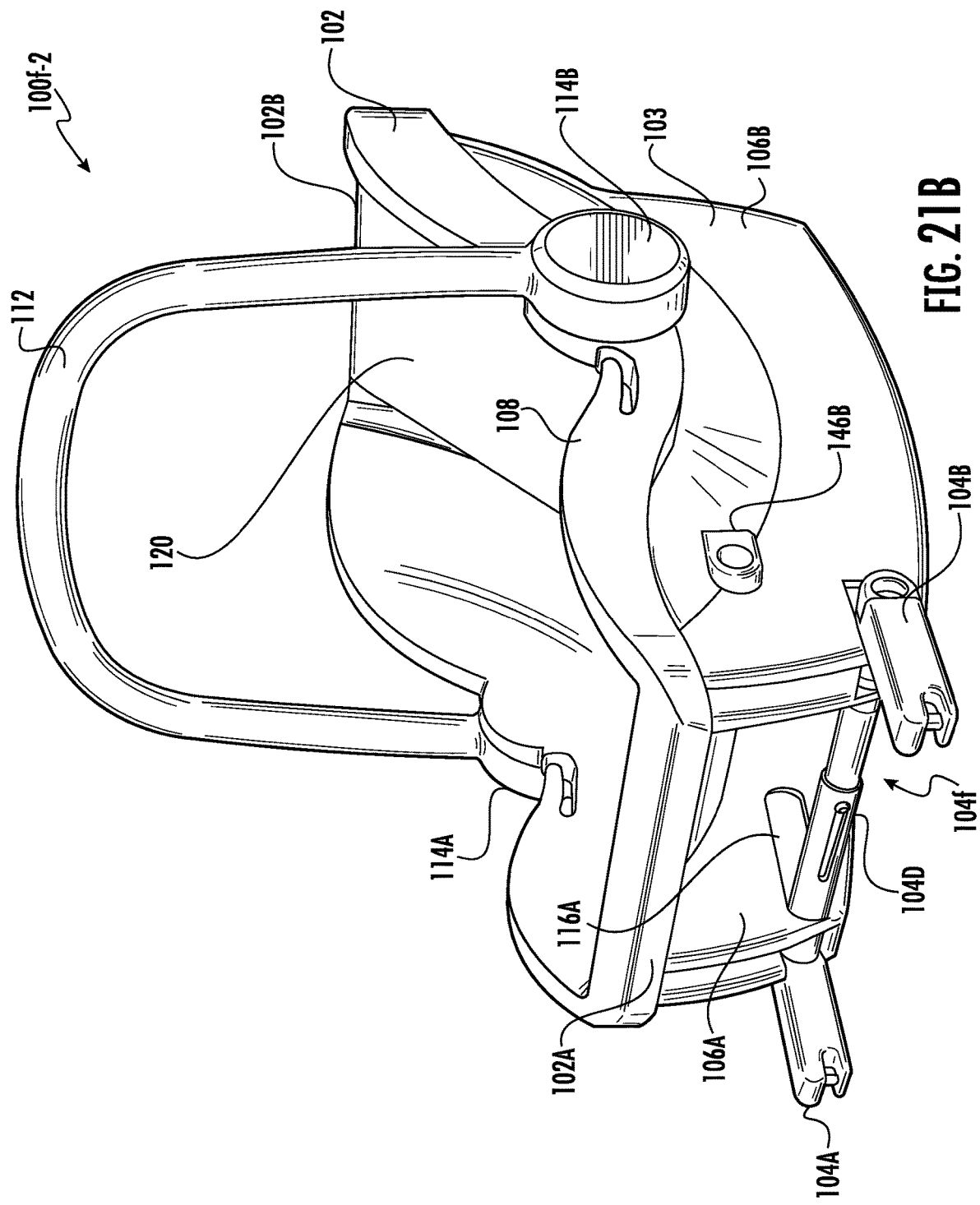
FIG. 21B shows a top perspective view of the infant car seat system of FIG. 21A where the anchor system is shown in an operational position.
Figure 21C:
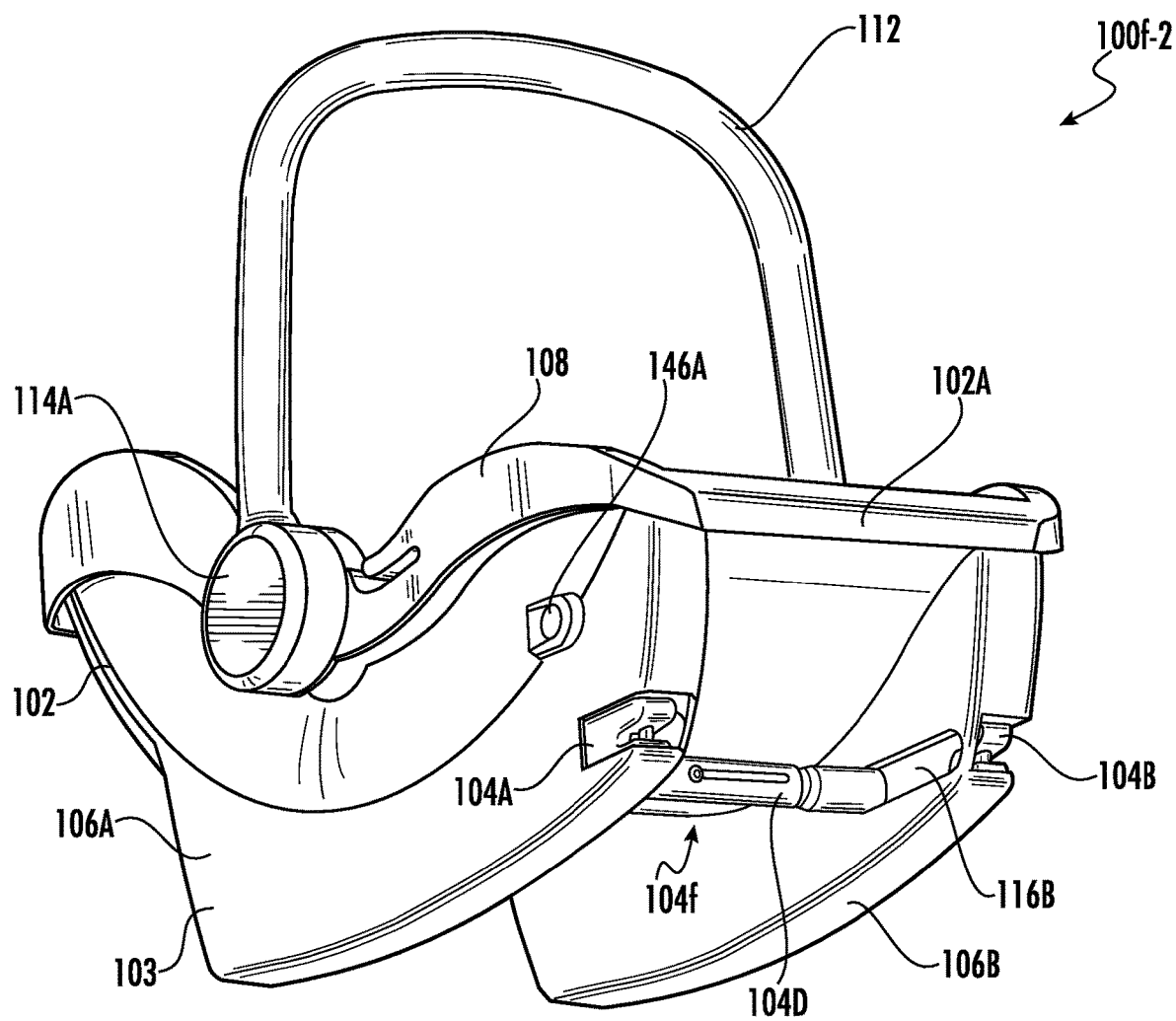
FIG. 21C shows a bottom perspective view of the infant car seat system of FIG. 21A.
Figure 21E:
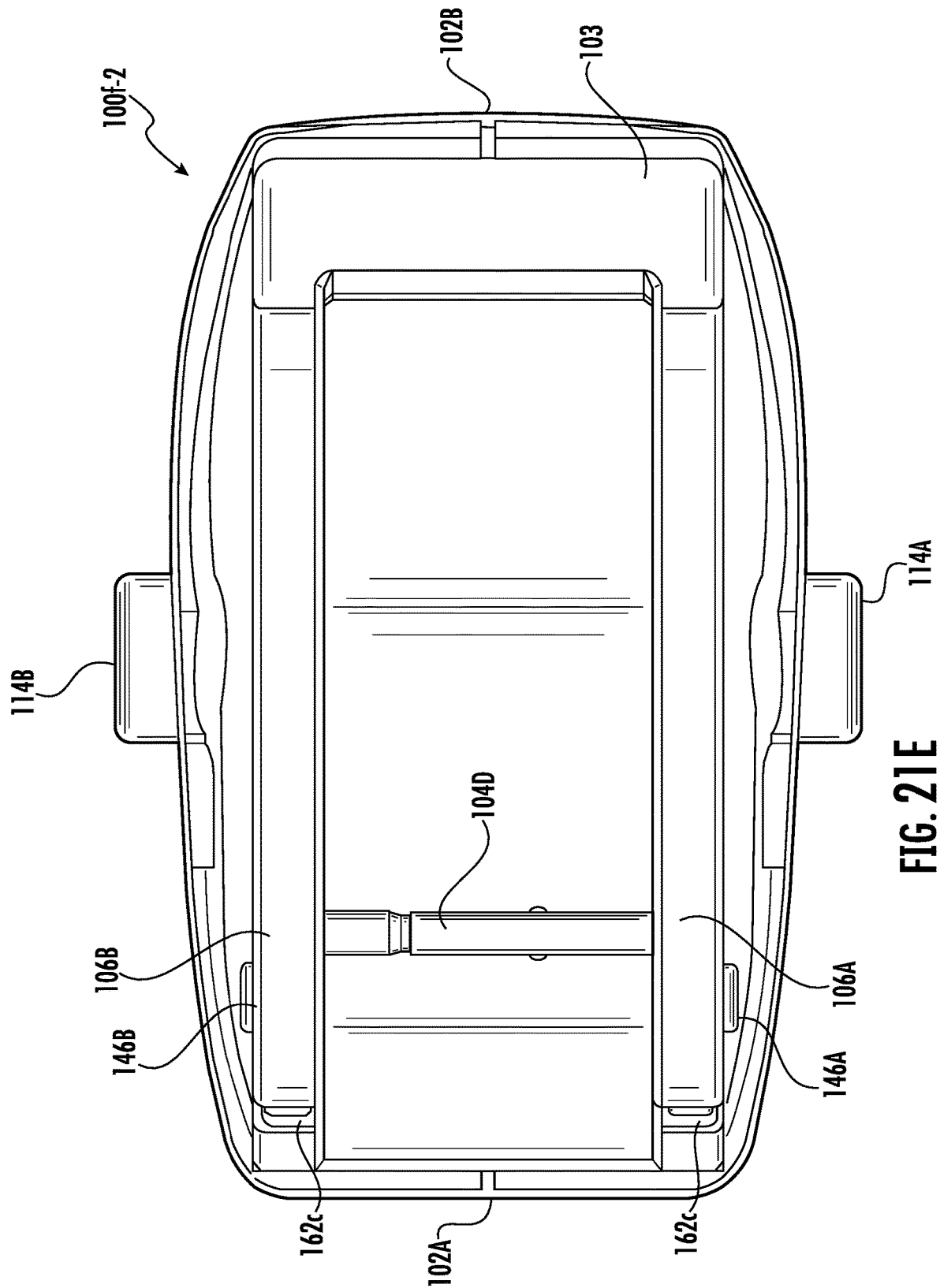
FIG. 21E shows a bottom view of the infant car seat system of FIG. 21A.
Figure 21F:
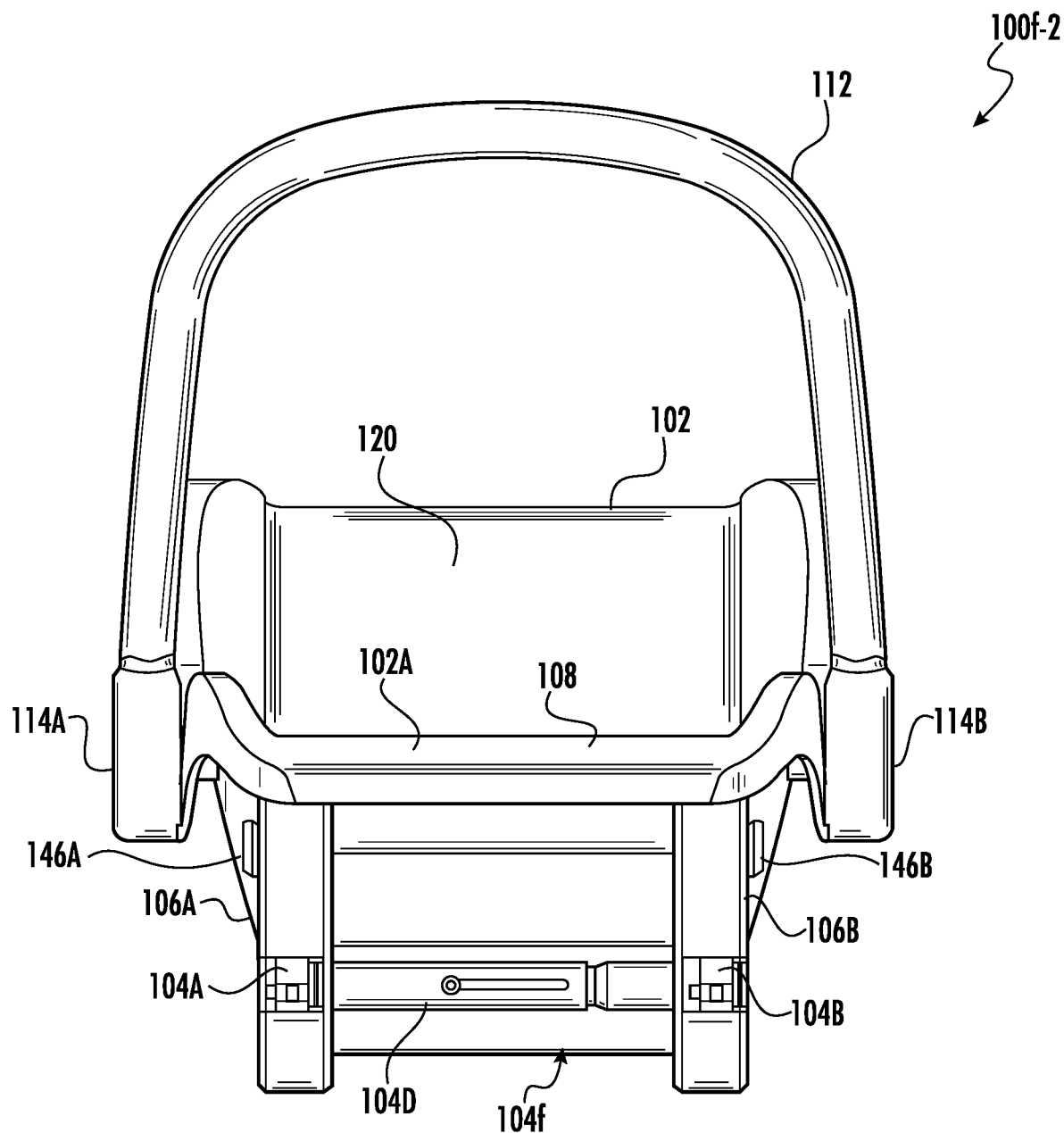
FIG. 21F shows a front view of the infant car seat system of FIG. 21A.
Figure 21G:
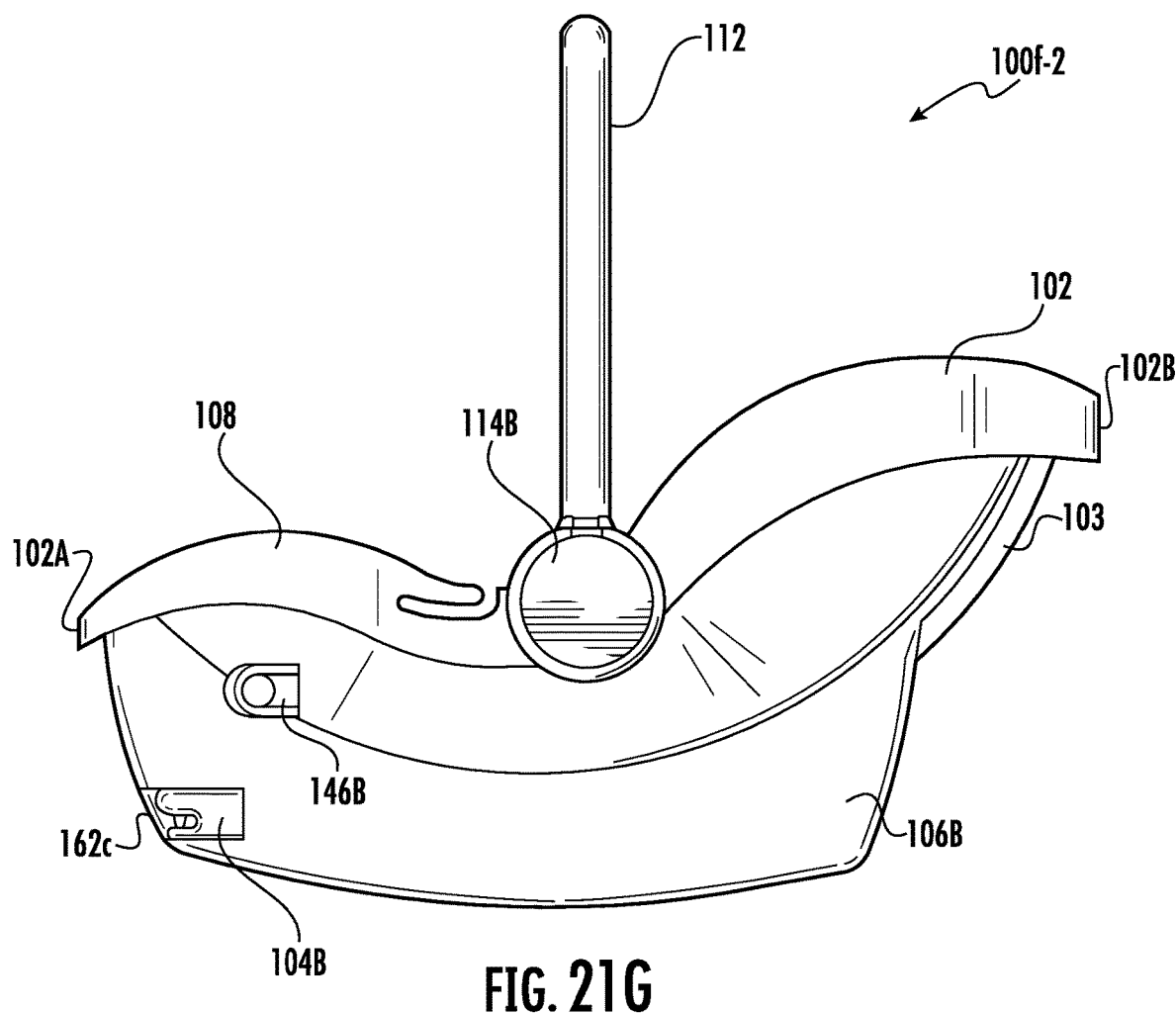
FIG. 21G shows a right-side view of the infant car seat system of FIG. 21A.

FIGS. 21A and 21B show another exemplary infant car seat system 100*f*-2 with a telescopically adjustable anchor system 104*f* and the storage compartments 160*b*. In particular, FIG. 21A shows the anchor system 104*f* in a stored position and FIG. 21B in an operational position. In this example, the openings 162*c* may be formed along a front and side portion of the seat shell rails 106A and 106B so that the spacing between the seat anchors 104A and 104B may be telescopically adjustable between the operational and stored positions. Similar to the infant car seat system 100*f*-1, the infant car seat 102 in the infant car seat system 100*f*-2 may include openings 116A and 116B shaped as slots and aligned with the openings 162*c*. In one aspect, a spring in the telescopic rail guides pushes the seat anchors out of the infant car seat (e.g., when the button 146B is pressed).

In the operational position, the FIG. 21B shows the telescopic mechanism of the crossmember 104D may be adjusted to increase the spacing between the seat anchors 104A and 104B. When transitioning to the stored position, the seat anchors 104A and 104B may be rotated to a horizontal orientation and the crossmember 104D may be telescopically retracted, thus reducing the spacing between the seat anchors 104A and 104B. During this step, a portion of the seat anchors 104A and 104B may pass through respective side portions of the openings 162*c* formed along the sides of the seat shell rails 106A and 106B. The seat anchors 104A and 104B may then be pushed into the storage compartments 160*b* by passing through the front portions of the openings 162*c*. As before, the openings 116A and 116B may determine the range of slidable adjustment between the operational and stored positions.

The anchor system 104*f* may further include telescopic rail guides 147A and 147B disposed within the storage compartments 160*b* to control the slidable adjustment of the seat anchors 104A and 104B along the openings 116A and 116B. In particular, the telescopic rail guides 147A and 147B may each include a guide 149 mounted to the infant car seat 102 (e.g., a portion of the seat shell rails 106A and 106B within the rocker cavities 118A and 118B) and a rail 148 mounted to the seat anchors 104A and 104B and the crossmember 104D. The rail 148 may be telescopically adjustable with respect to the guide 149.

The telescopic rail guides 147A and 147B may further include an integrated locking mechanism that locks the position of the seat anchors 104A and 104B and the crossmember 104D at set locations along the openings 116A and 116B. The infant car seat system 100*f*-2 may also include a pair of buttons 146A and 146B located along the sides of the seat shell rails 106A and 106B, which are mechanically coupled to the locking mechanisms of the telescopic rail guides 147A and 147B, respectively. When a parent and/or a caregiver wishes to adjust the position of the of the seat anchors 104A and 104B and the crossmember 104D, they may press the buttons 146A and 146B to release the locking mechanisms of the telescopic rail guides 147A and 147B and then slidably adjust the seat anchors 104A and 104B accordingly.

Figure 21H:
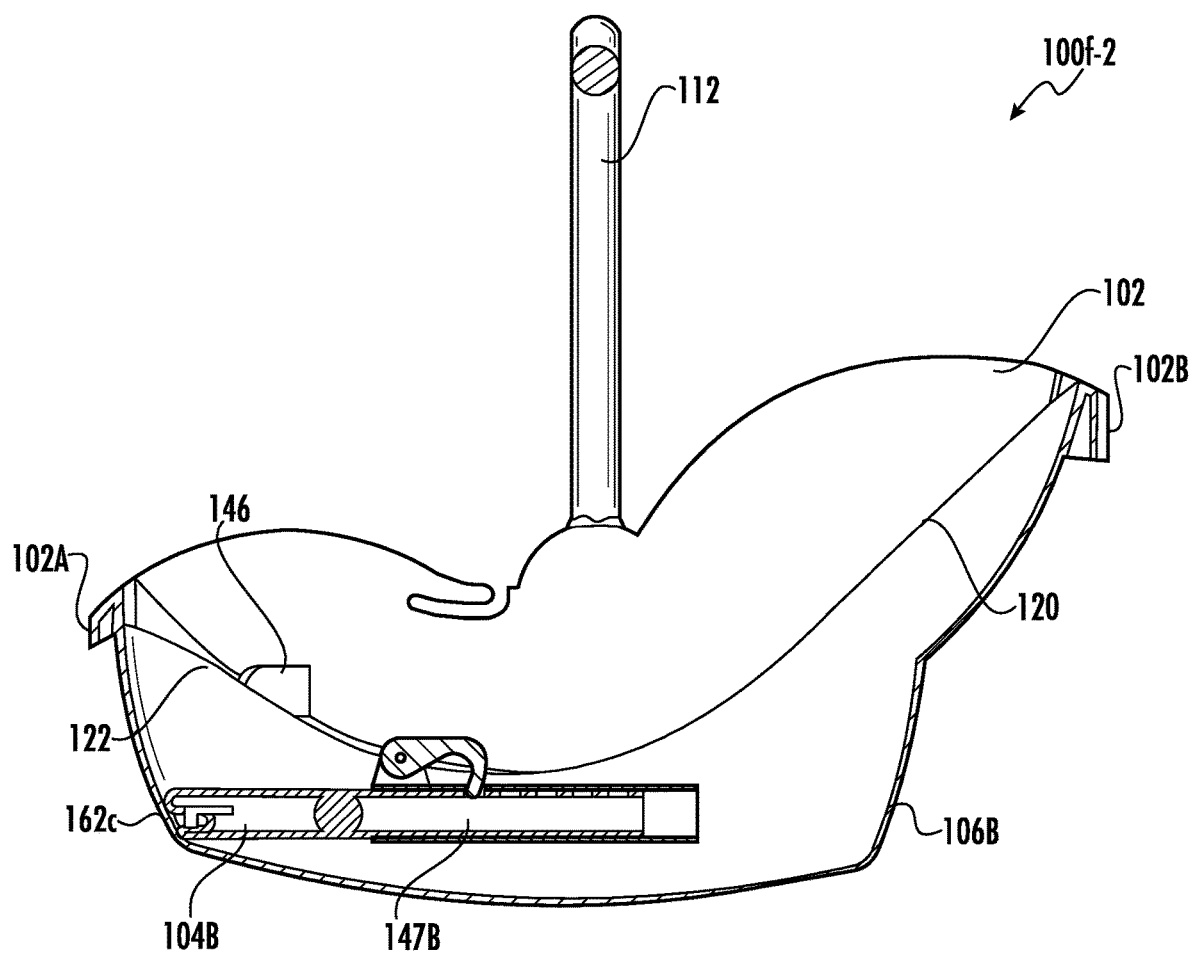
FIG. 21H shows a cross-sectional view of the infant car seat system corresponding to the plane A-A of FIG. 21D.

FIGS. 21C-21H show several additional views of the infant car seat system 100*f*-2 with the anchor system 104*f* in a stored position. In particular, FIG. 21D shows the seat anchors 104A and 104B and the telescopic rail guides 147A and 147B may be disposed within the rocker cavities 118A and 118B defined by the seat shell rails 106A and 106B, respectively. As before, the seat anchors 104A and 104B may be disposed entirely within the infant car seat 102 when stored to ensure the overall envelope of the infant car seat system 100*f*-2 is similar to previous infant car seats. FIG. 21H shows a cross-sectional view of the infant car seat system 100*f*-2 and, in particular, shows the placement of the telescopic rail guide 147B and the seat anchor 104B in the rocker cavity 118B in relation to the seat pan 122 and the seat back 120.

Figure 22A:
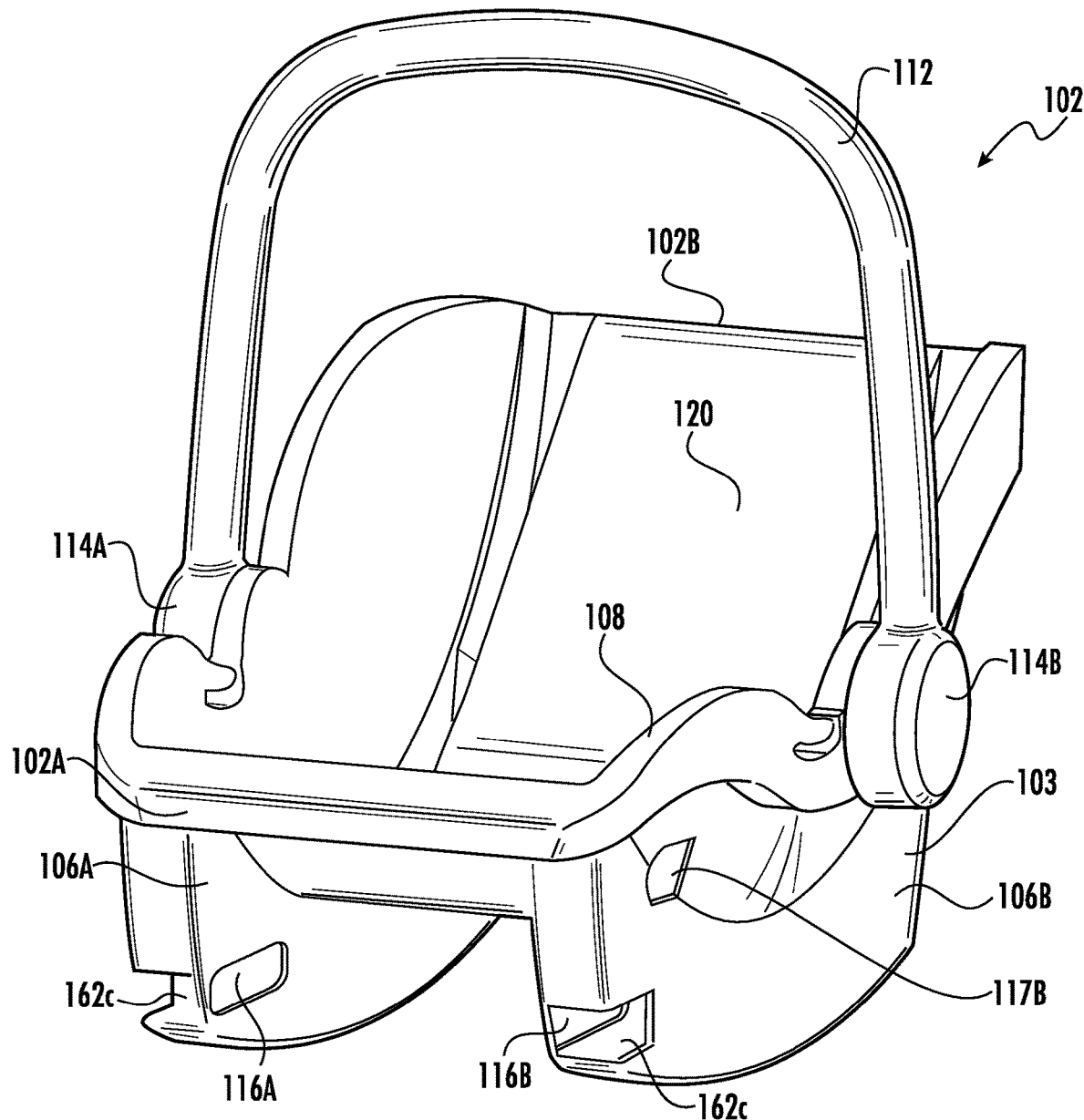
FIG. 22A shows a top perspective view of the infant car seat in the infant car seat system of FIG. 21A.
Figure 22B:
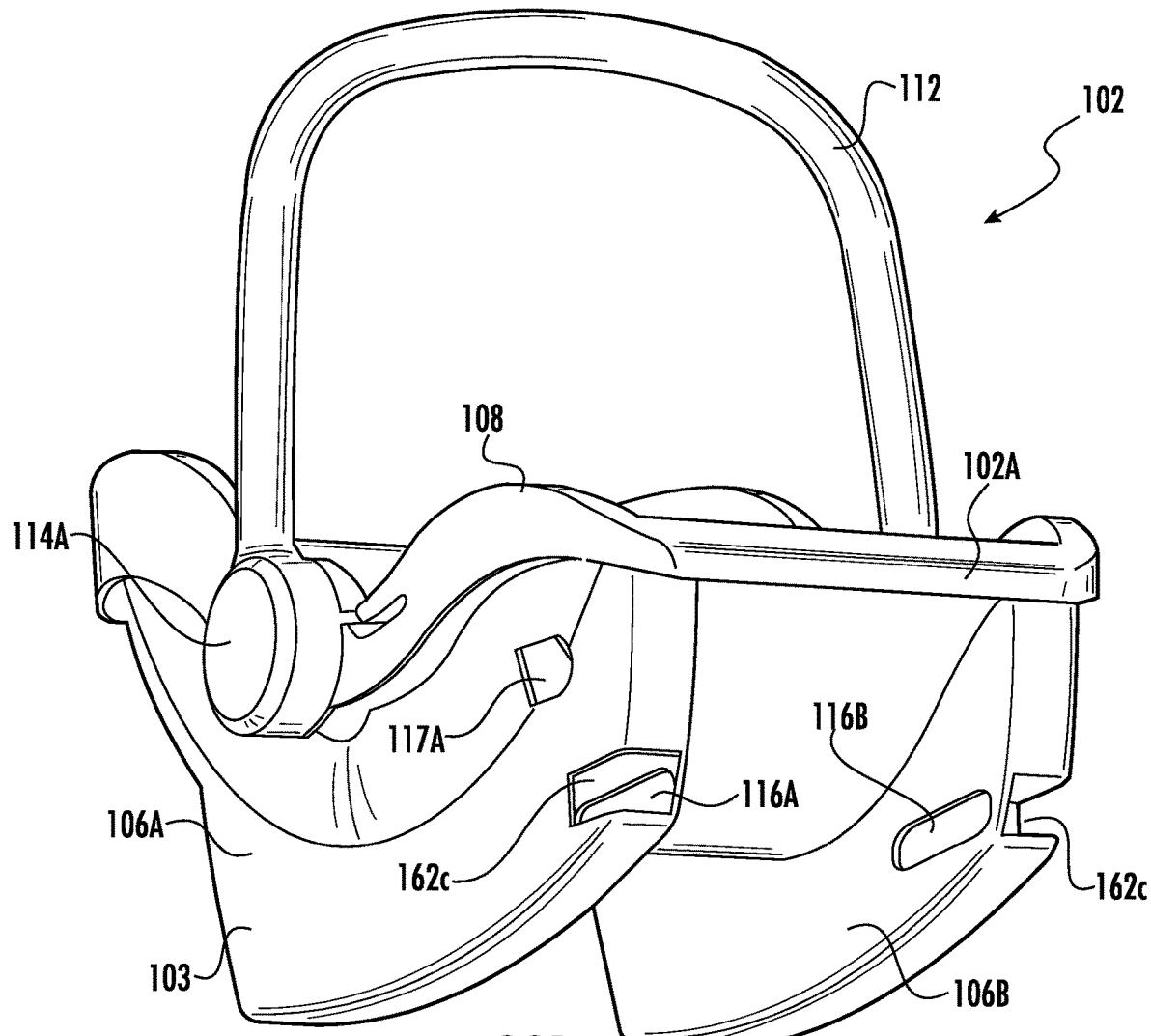
FIG. 22B shows a bottom perspective view of the infant car seat of FIG. 22A.
Figure 22D:
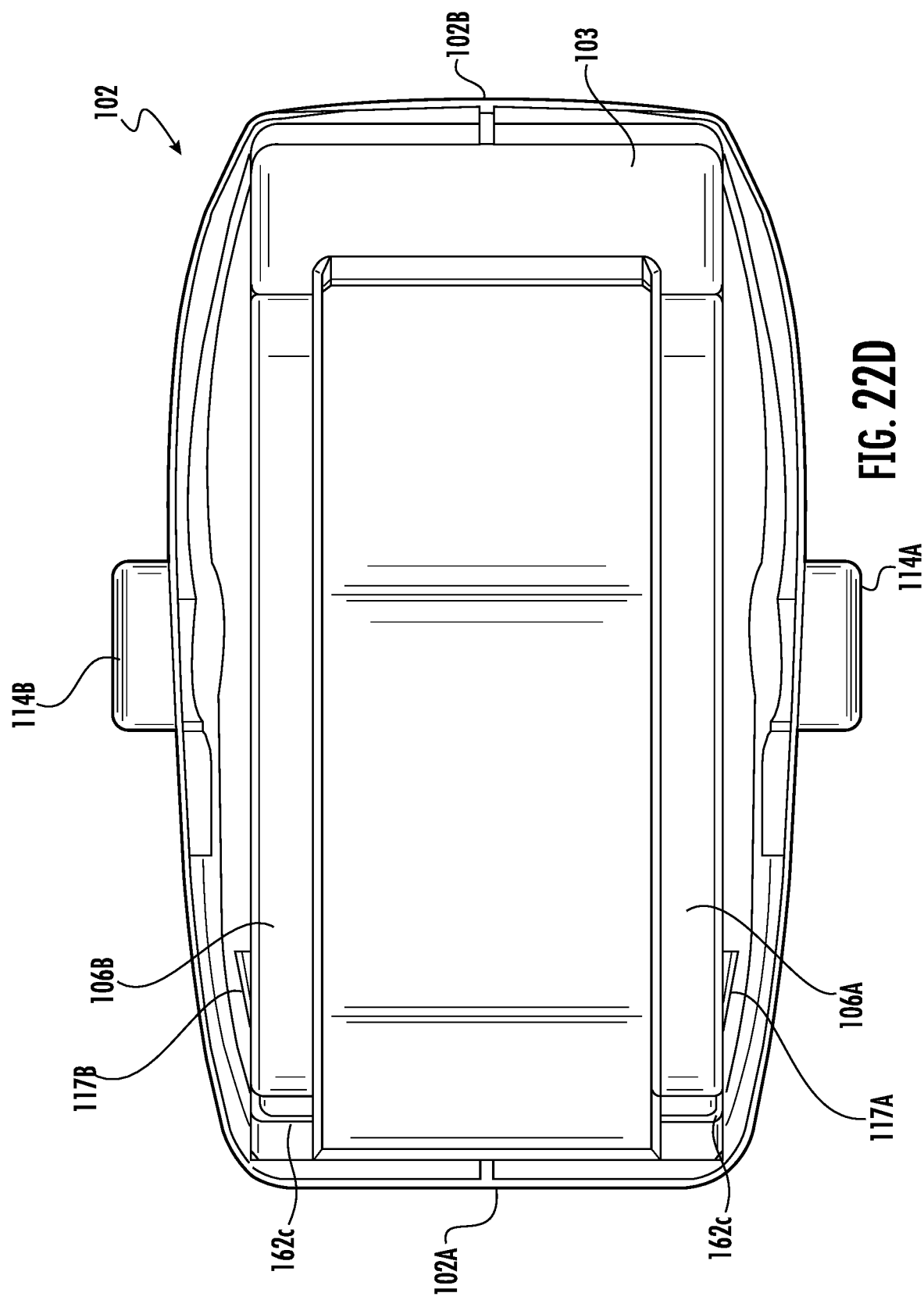
FIG. 22D shows a bottom view of the infant car seat of FIG. 22A.
Figure 22E:
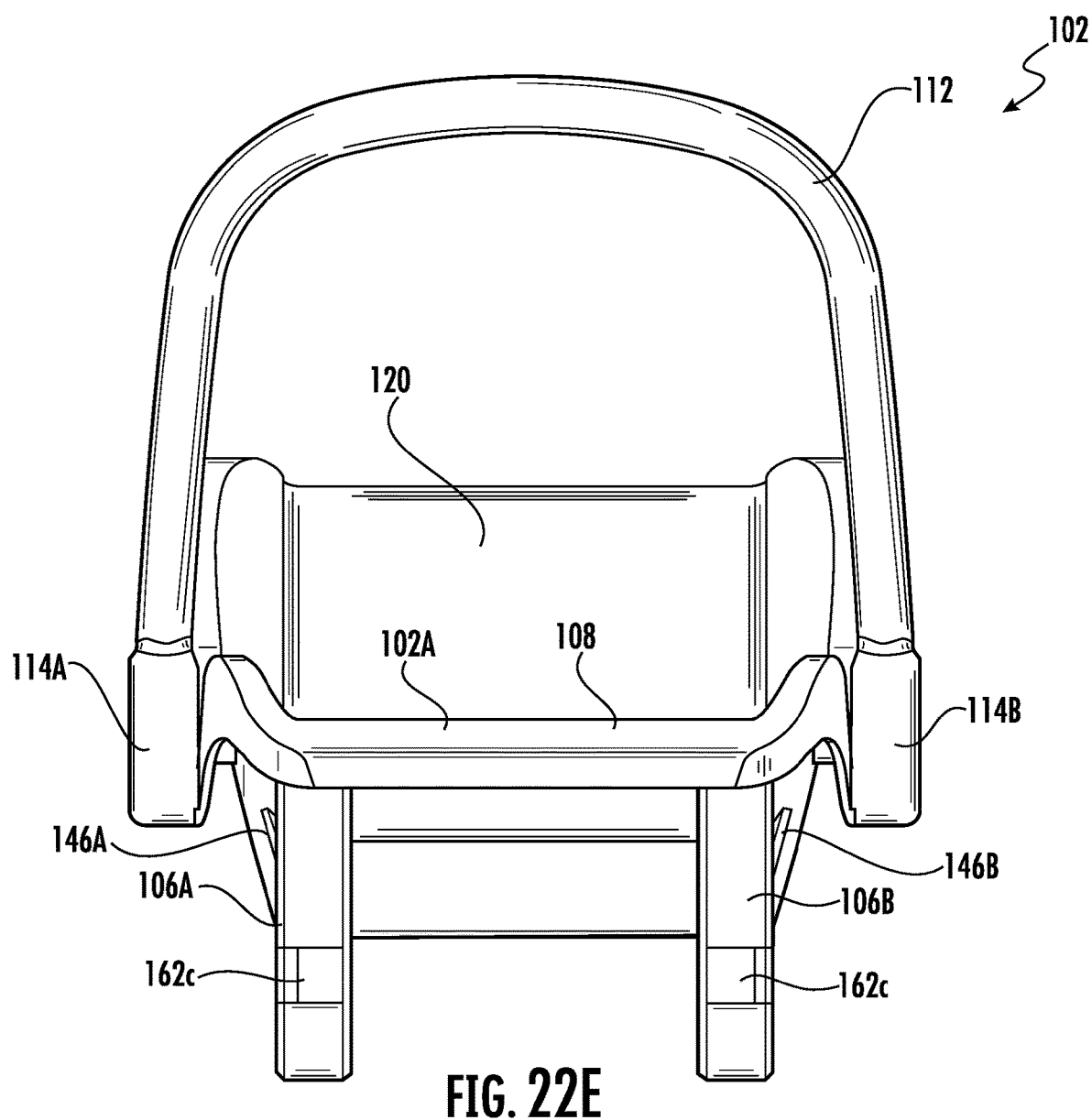
FIG. 22E shows a front view of the infant car seat of FIG. 22A.
Figure 22F:
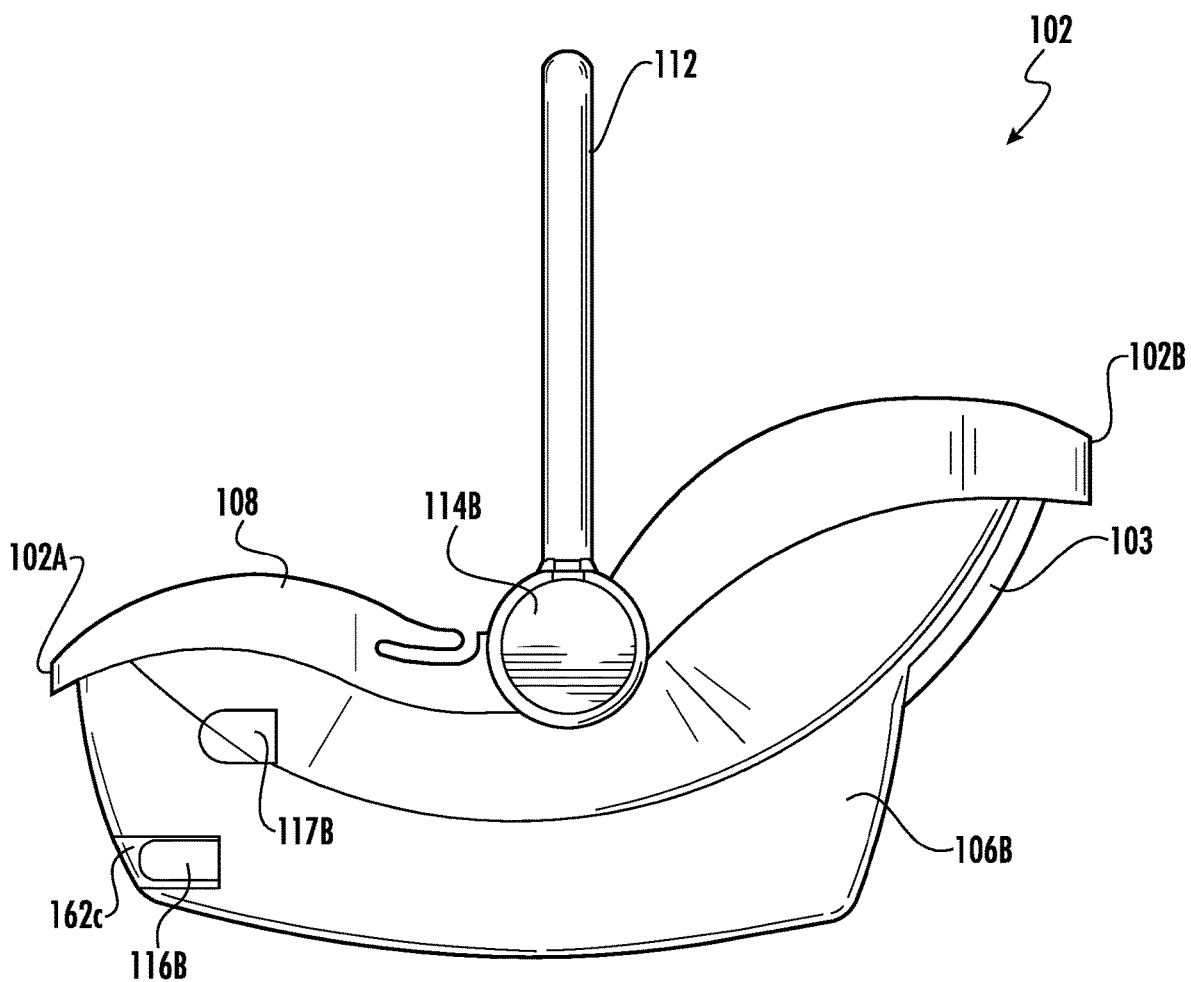
FIG. 22F shows a right-side view of the infant car seat of FIG. 22A.

FIGS. 22A-22F show several views of the infant car seat 102 without the anchor system 104*f*. FIGS. 22A and 22B show the openings 162*c* and the openings 116A and 116B may be aligned horizontally with respect to one another. The shape and/or dimensions of the openings 162c, however, may correspond with the height/thickness of the seat anchors 104A and 104B while the shape and/or dimensions of the openings 116A and 116B may correspond with the shape of the crossmember 104D. As shown, the openings 162c and the openings 116A and 116B may be separated by a portion of the seat shell rails 106A and 106B. In some examples, this area may be reinforced by extra material of the seat shell rails, and/or a plastic or metal reinforcement part. FIG. 22F further shows the infant car seat 102 may include openings 117A and 117B on the sides of the seat shell rails 106A and 106B to mount the buttons 146A and 146B.

FIGS. 23A-23G show several views of the anchor system 104f and, in particular, the telescopic guide rails 147A and 147B (collectively referred to herein as the telescopic rail guide 147). As shown, the seat anchors 104A and 104B and the crossmember 104D may be substantially the same as anchor system 104e. The rails 148 of the telescopic guide rails 147A and 147B may be coupled to portions of the crossmember 104D so that the seat anchors 104A and 104B and the crossmember 104D are slidably adjustable together with the rails 148. As shown, the rail 148 of the telescopic rail guide 147A may be rotatably coupled to the outer tube 141 and the rail 148 of the telescopic rail guide 147B may be rotatably coupled to the inner tube 142 so that the seat anchors 104A and 104B are rotationally adjustable.

Figure 23A:
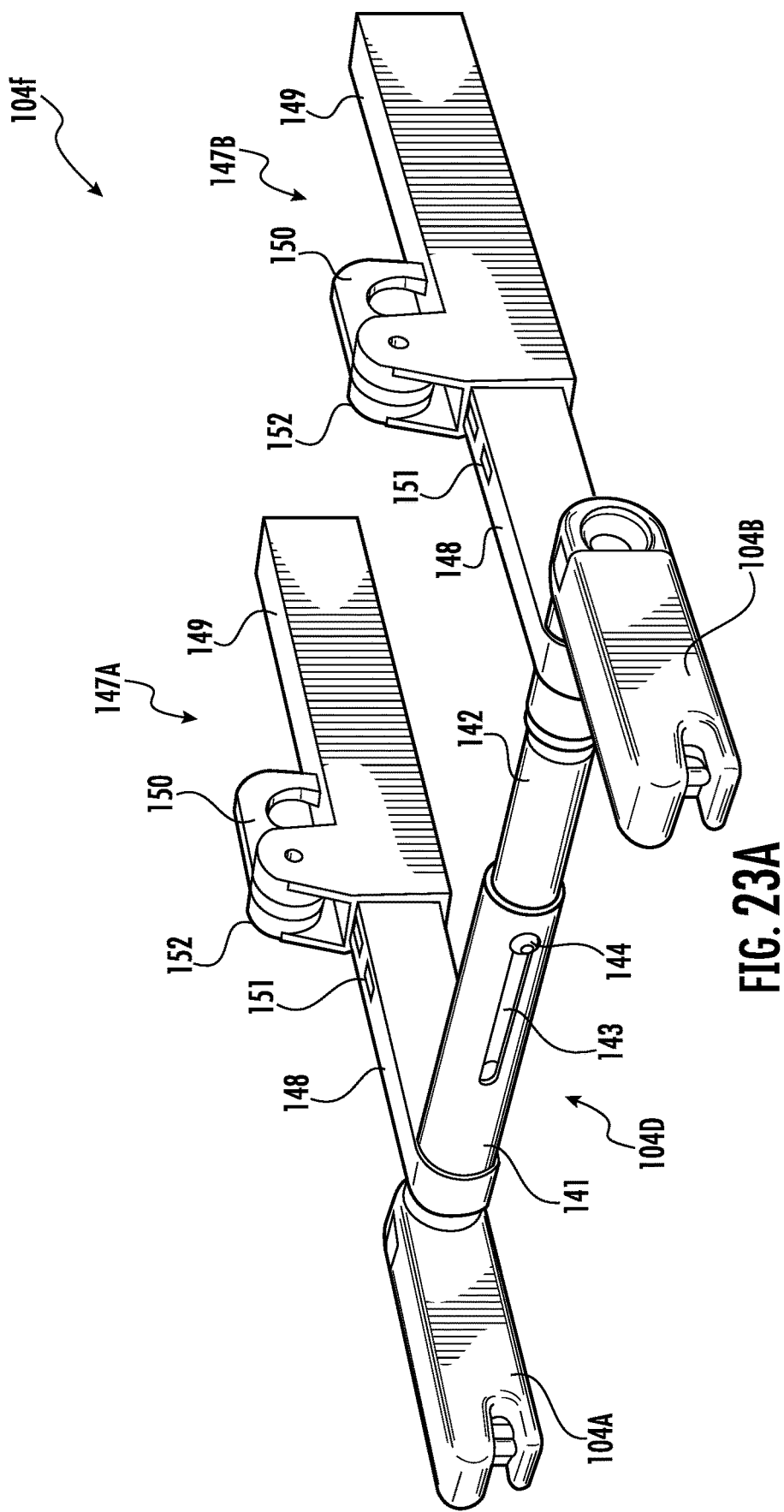
FIG. 23A shows a top perspective view of the anchor system in the infant car seat system of FIG. 21A.
Figure 23D:
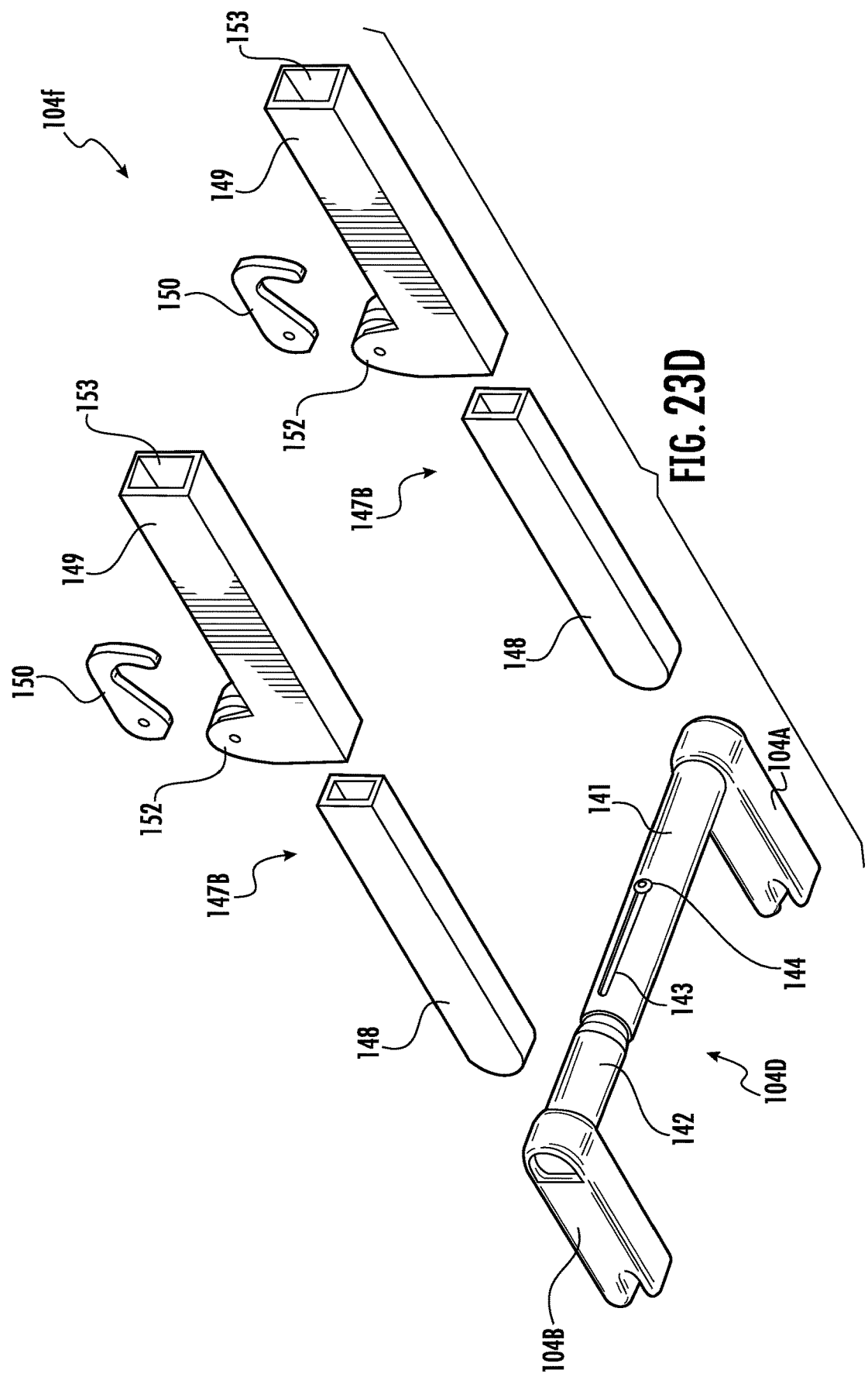
FIG. 23D shows an exploded bottom perspective view of the anchor system of FIG. 23A.
Figure 23E:
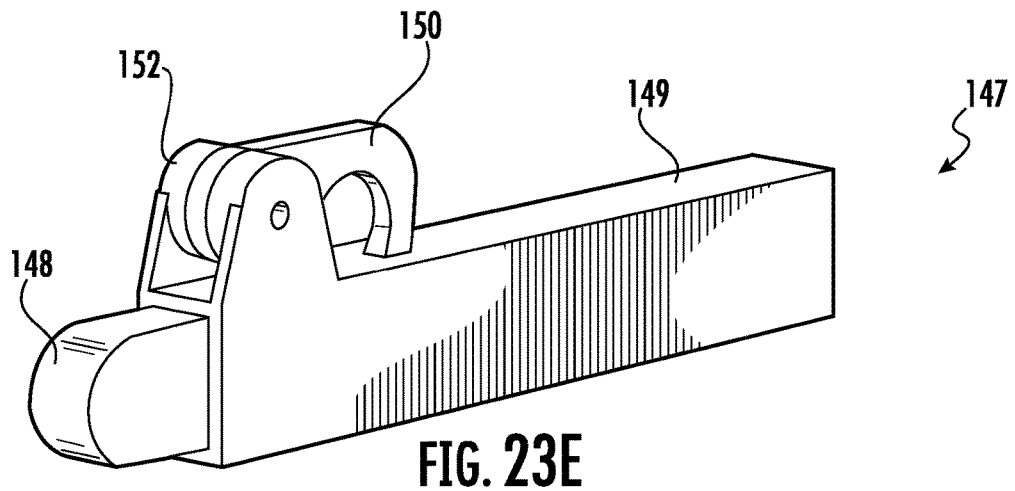
FIG. 23E shows a top perspective view of a telescopic rail guide in the anchor system of FIG. 23A in a retracted position.
Figure 23F:
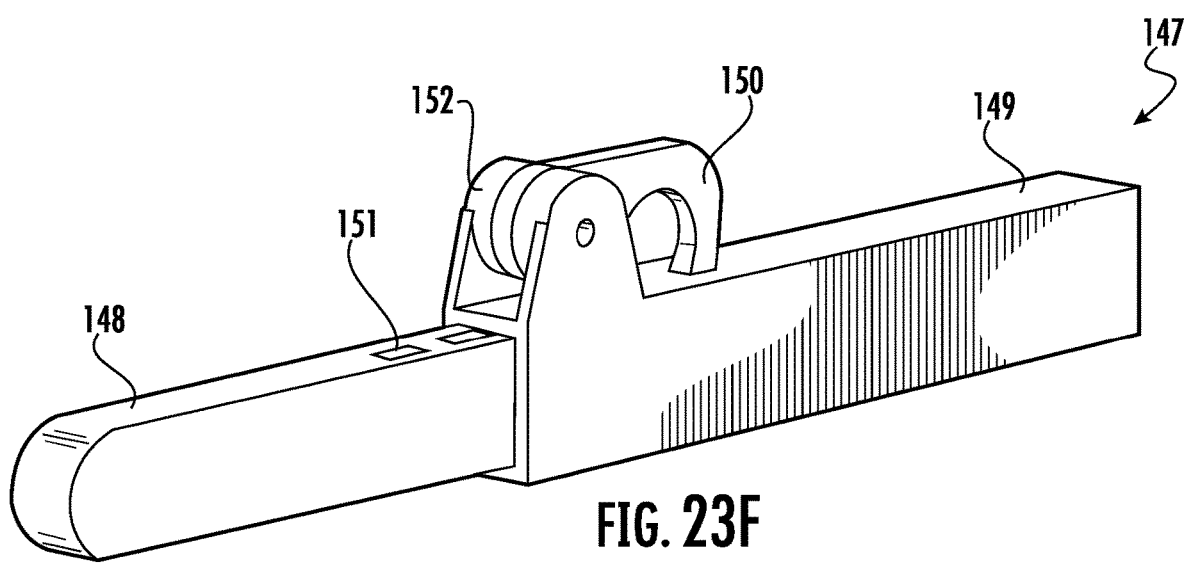
FIG. 23F shows a top perspective view of a telescopic rail guide in the anchor system of FIG. 23A in an extended position.
Figure 23G:
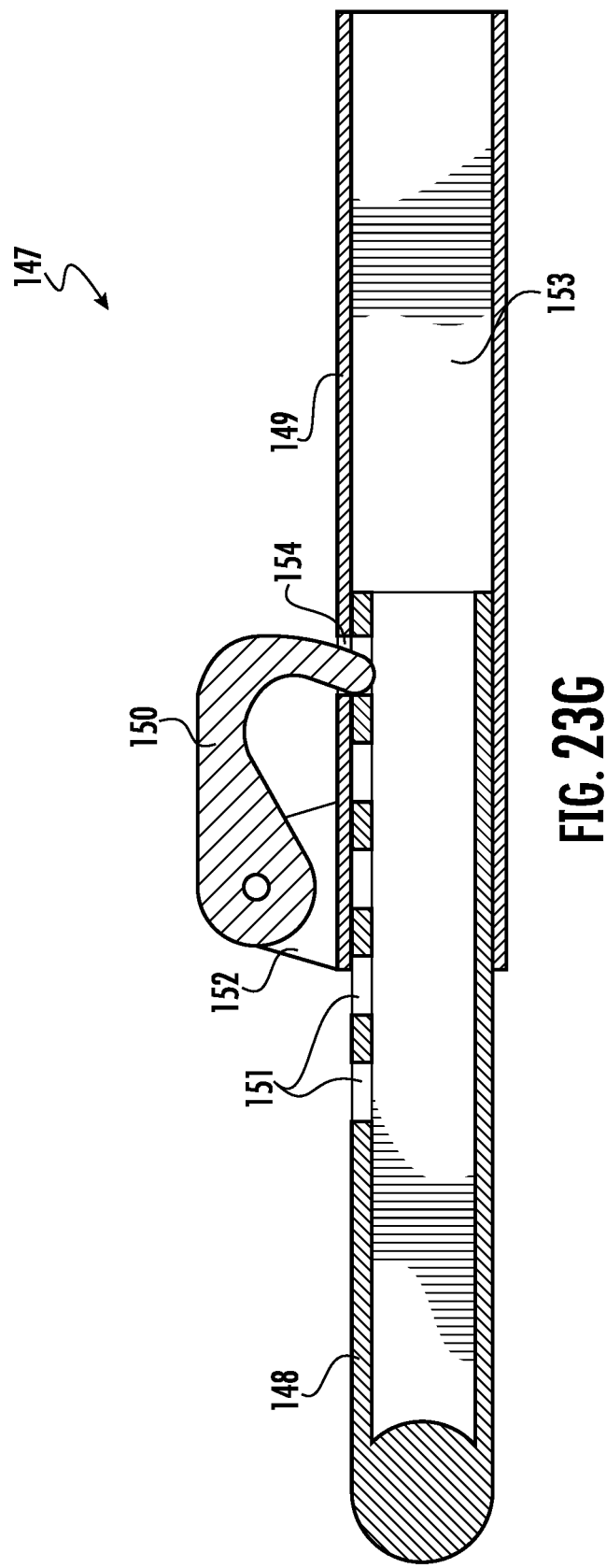
FIG. 23G shows a cross-sectional view of the telescopic rail guide of FIG. 23F corresponding to the plane A-A of FIG. 23B.
Figure 24A:
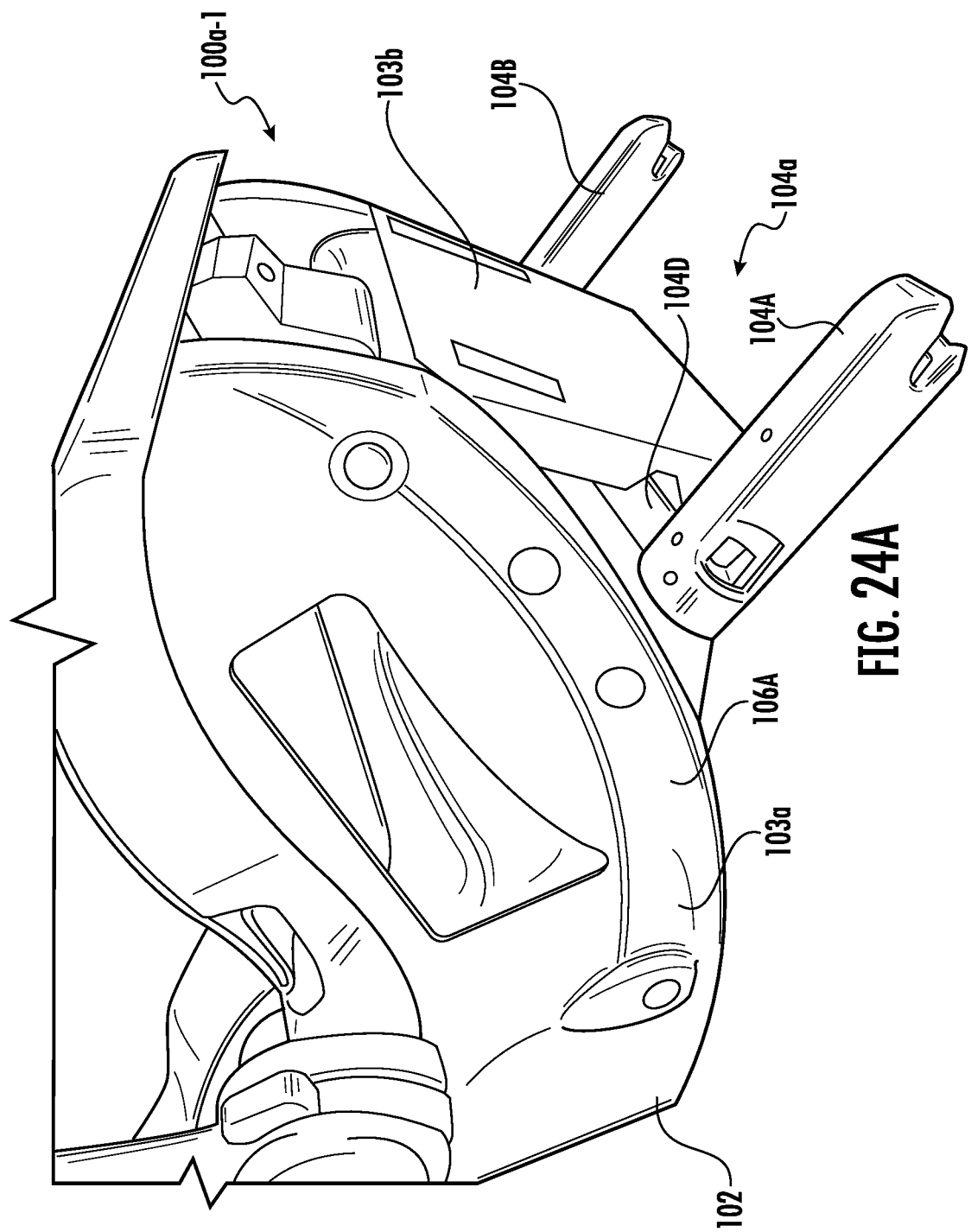
FIG. 24A shows a left-side view of a prototype infant car seat system corresponding to the infant car seat system of FIG. 6.
Figure 24B:
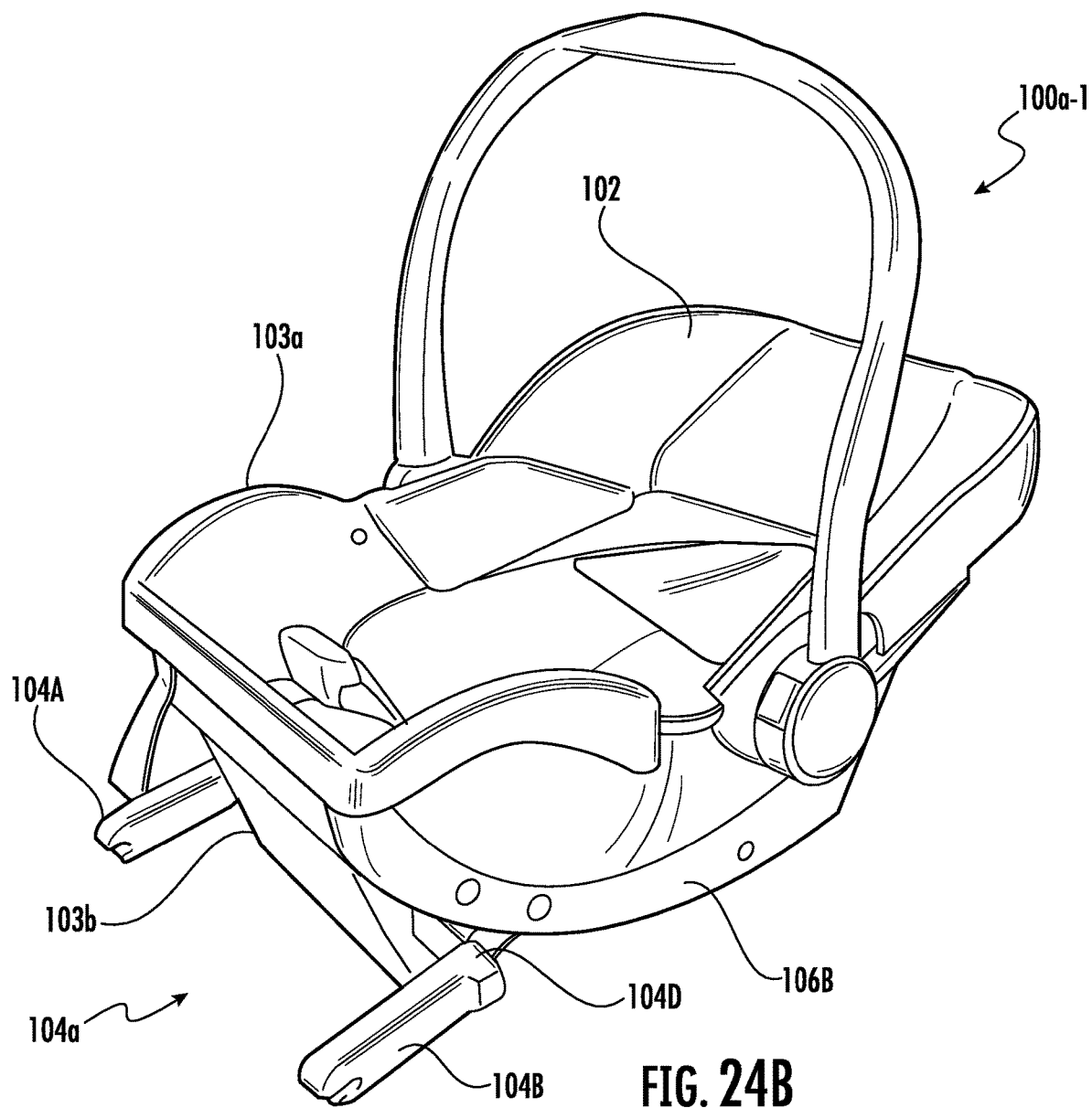
FIG. 24B shows a top perspective view of the infant car seat system of FIG. 24A.
Figure 24C:
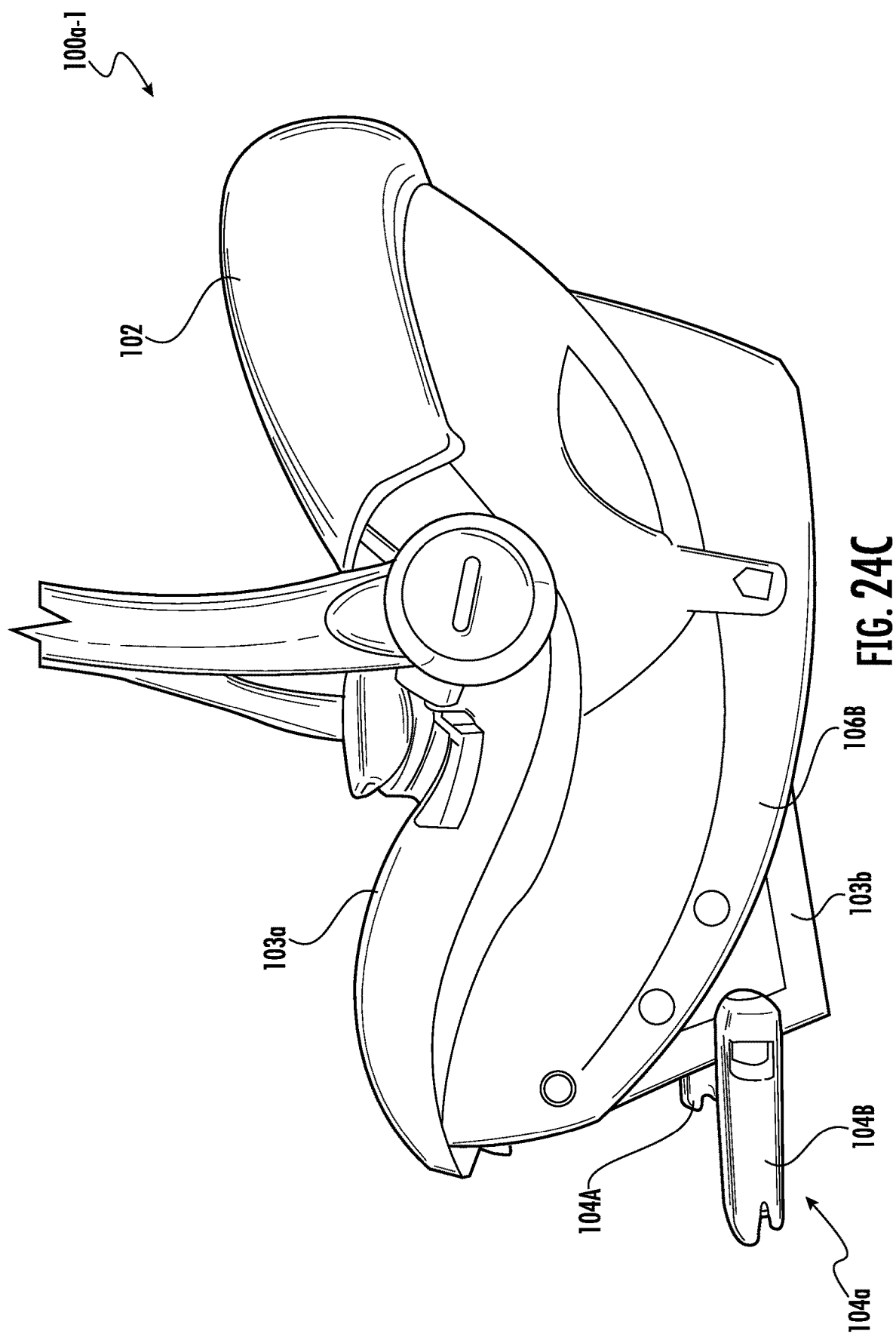
FIG. 24C shows a right-side view of the infant car seat system of FIG. 24A.
Figure 24D:
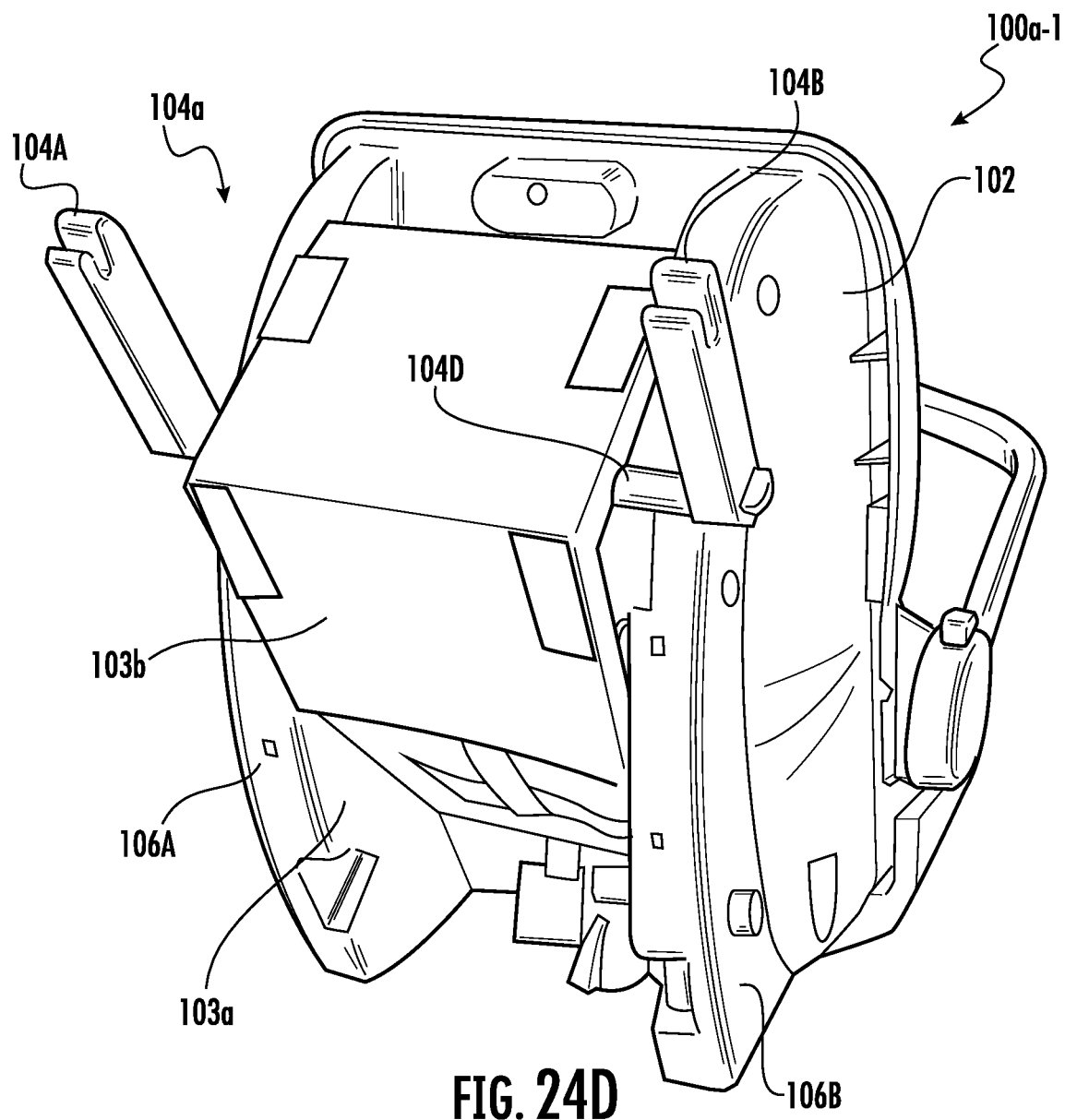
FIG. 24D shows a bottom perspective view of the infant car seat system of FIG. 24A.

The rail 148 may be shaped and/or dimensioned to fit within the guide 149 so that the rail 148 is telescopically adjustable with respect to the guide 149 along a single axis. The telescopic guide rails 147A and 147B may further include a locking mechanism that includes a rotatable hook 150 supported by a support section 152 on the guide 149. The hook 150 may be configured to pass through an opening 154 on the guide 149 in order to engage one or more slots 151 disposed along the rail 147. Thus, the slots 151 on the rail 147 may define several positions along the openings 116A and 116B in which the seat anchors 104A and 104B and the crossmember 104D may be positioned and locked. FIGS. 23E and 23F show the telescopic rail guide 147 in a retracted position and an extended position, respectively. FIG. 23G further shows a cross-sectional view of the hook 150 passing through the opening 154 on the guide 149 to engage one slot 151 on the rail 147.

In some implementations, the hook 150 of each telescopic guide rail 147A and 147B may be mechanically linked to the buttons 146A and 146B using, for example, one or more rotatably coupled linkage members (not shown). For example, the press of the button 146A may impart a force that rotates the hook 150, thus disengaging the hook 150 from the slot 151. In some implementations, a spring may be integrated into the telescopic rail guide 147 to impart a spring basis, such as a torque, that keeps the hook 150 engaged with the slot 151. In some implementations, the buttons 146A and 146B and/or the hooks 150 of the telescopic guide rail 147A and 147B may be mechanically coupled together so that the parent and/or the caregiver only has to press one of the buttons 146A and 146B to release the telescopic guide rails 147A and 147B for adjustment.

An Exemplary Demonstration of an Infant Car Seat System with a Rigid Anchor System FIGS. 24A-24D show several views of an exemplary prototype of the infant car seat system 100a with the rigid anchor system 104a. As shown, the infant car seat system 102 was assembled by attaching a seat shell section 103b to a standard seat shell 103a in order to support the integrated anchor system 104a. In this example, the seat shell section 103b is placed on the bottom of the seat shell 103a such that the seat anchors 104A and 104B are disposed below the seat shell rails 106A and 106B of the seat shell 103a. However, it should be appreciated in other implementations of the infant car seat system 100a, the crossmember 104D may protrude through openings (e.g., openings 116A and 116B) so that the seat anchors 104A and 104B protrude out the sides of the seat shell rails 106A and 106B and above the curved rocker bottoms 107A and 107B.

In some implementations, the infant car seat system 100 and, in particular, the infant car seat 102 may nevertheless be formed as a two-part assembly where the seat shell section 103b is an accessory that may be coupled to a standard seat shell 103a during assembly by the manufacturer or after purchase by the parent and/or caregiver in order to eliminate the detachable vehicle installation base. In this manner, the same seat shell 103a may be used across multiple product lines in order to reduce manufacturing costs. However, it should be appreciated that in other implementations, the infant car seat 102 may be formed as a unitary component.

Figure 25A:
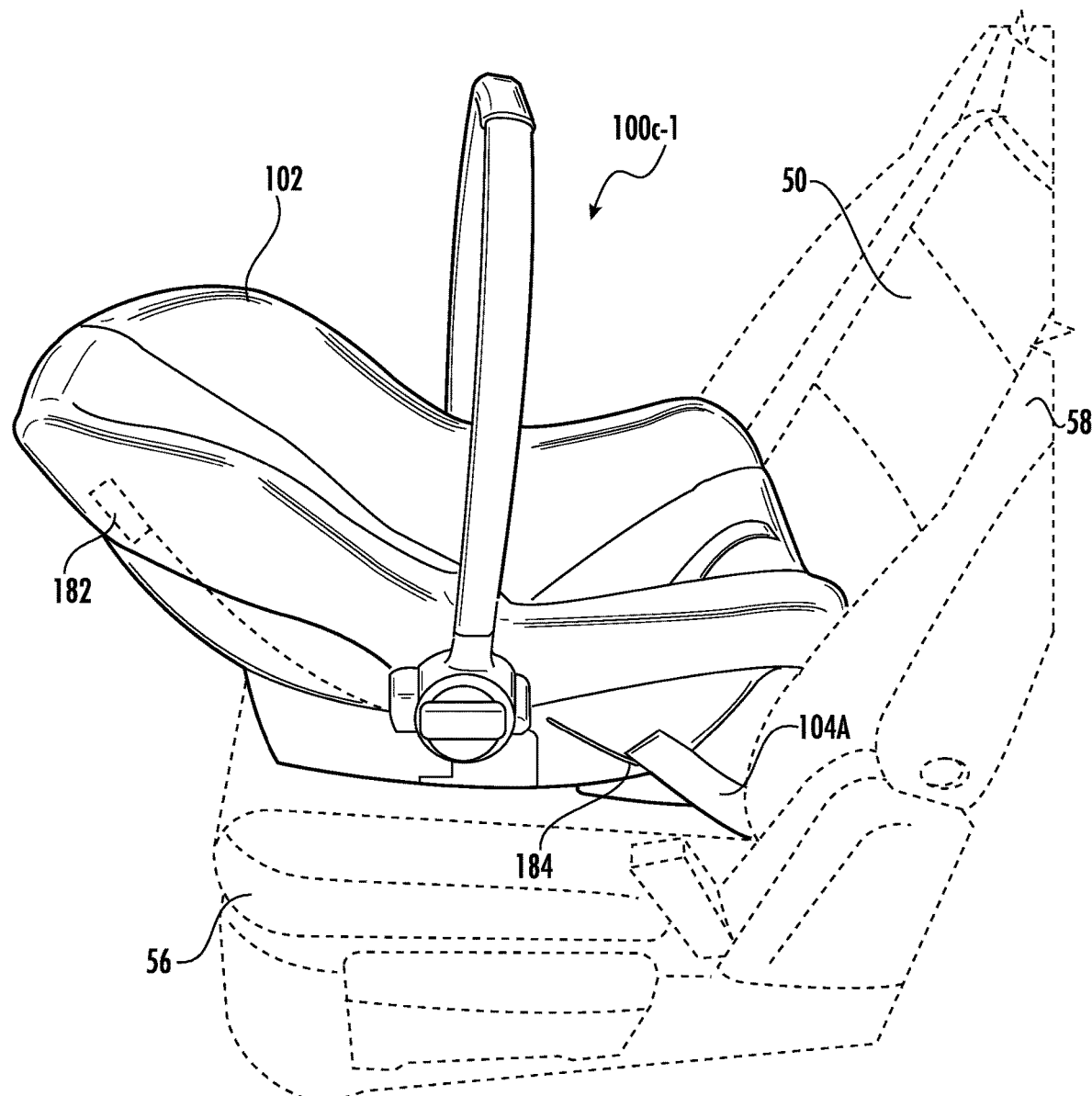
FIG. 25A shows a top, left-side perspective view of a prototype infant car seat system with a release actuator corresponding to the infant car seat system of FIG. 11 mounted to a vehicle seat.
Figure 25B:
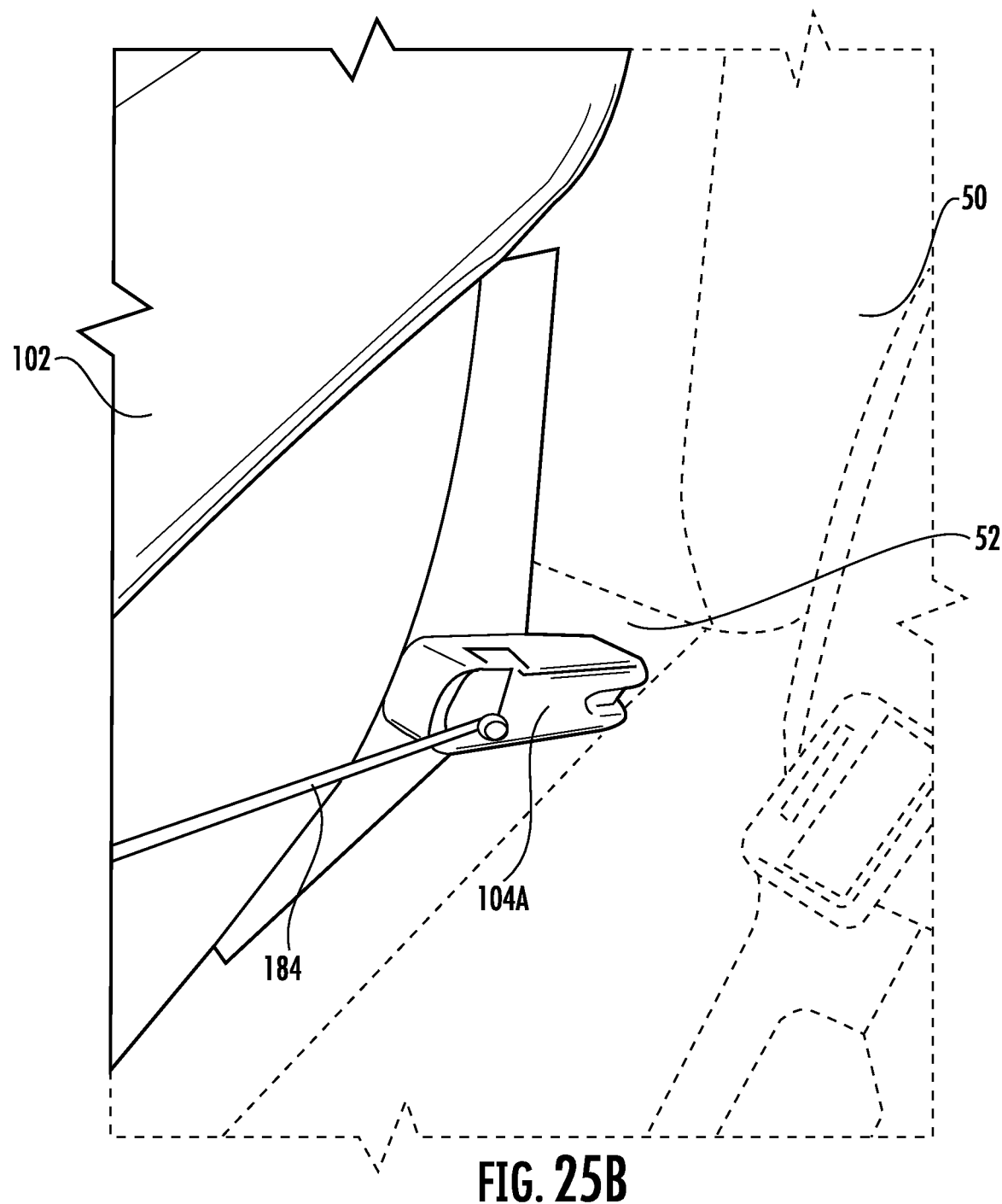
FIG. 25B shows a magnified view of the anchor system in the infant car seat system of FIG. 25A and a vehicle seat anchor.

FIGS. 25A-25E show several views of another exemplary prototype of the infant car seat system 100c-1, which includes the rigid anchor system 104a and the release actuator 180a. Similar to the prototype infant car seat system 100a-1 shown in FIGS. 24A-24D, the infant car seat 102 in the infant car seat system 100c-1 may include a seat shell section 103b mounted to a standard set shell 103a for purposes of demonstration. FIG. 25A shows the prototype infant car seat system 100c-1 coupled to a vehicle seat 50. As shown, the seat shell section 130b may support seat anchors 104A and 104B and provide surfaces against which the infant car seat system 100c-1 abuts the vehicle seat pan 56 and the vehicle seat back 58 for a tighter fit. FIG. 25B further shows the seat anchor 104A proximate to a vehicle seat anchor 52 prior to attachment.

Figure 25C:
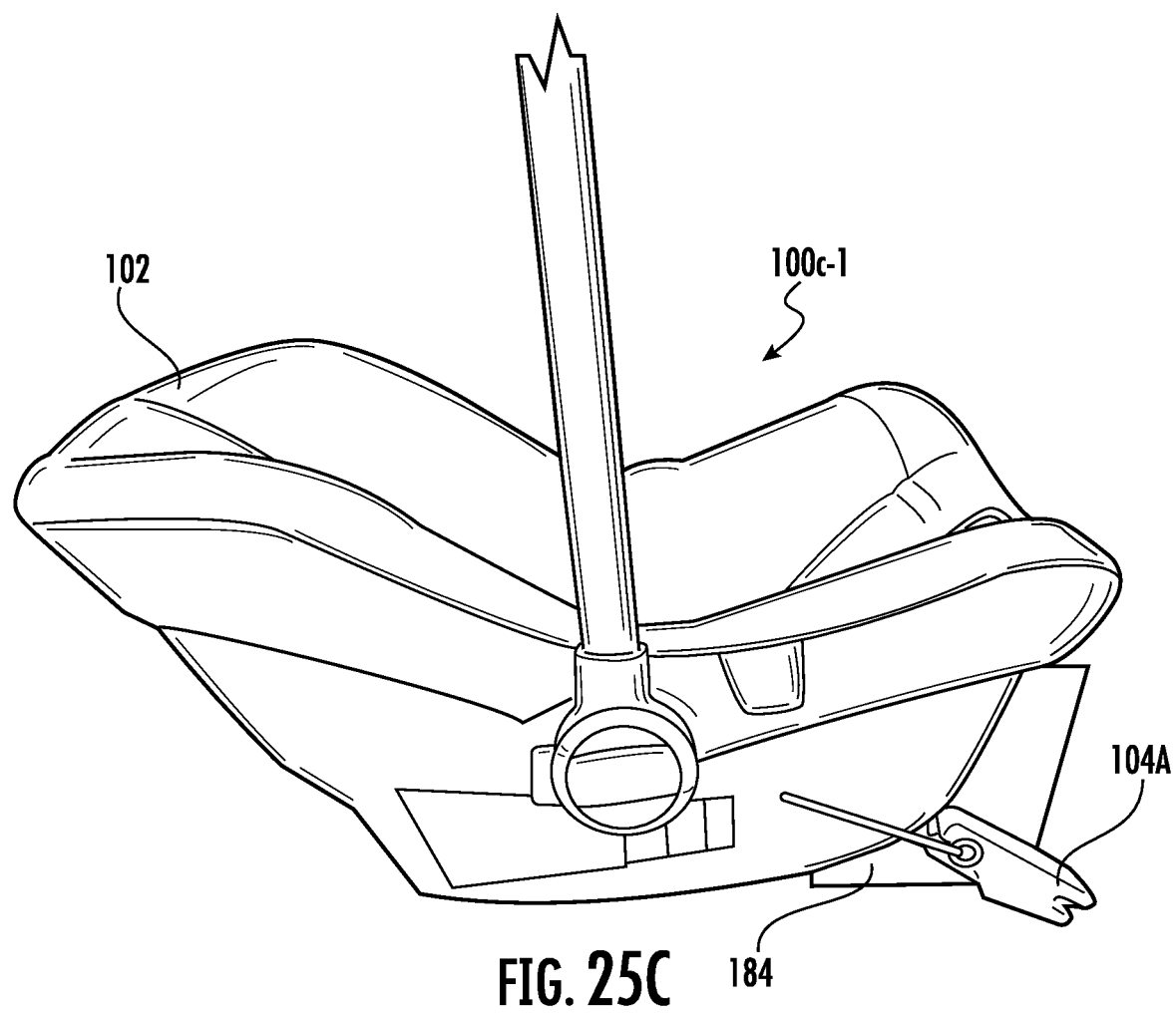
FIG. 25C shows a top, left-side perspective view of the infant car seat system of FIG. 25A removed from the vehicle seat.
Figure 25D:
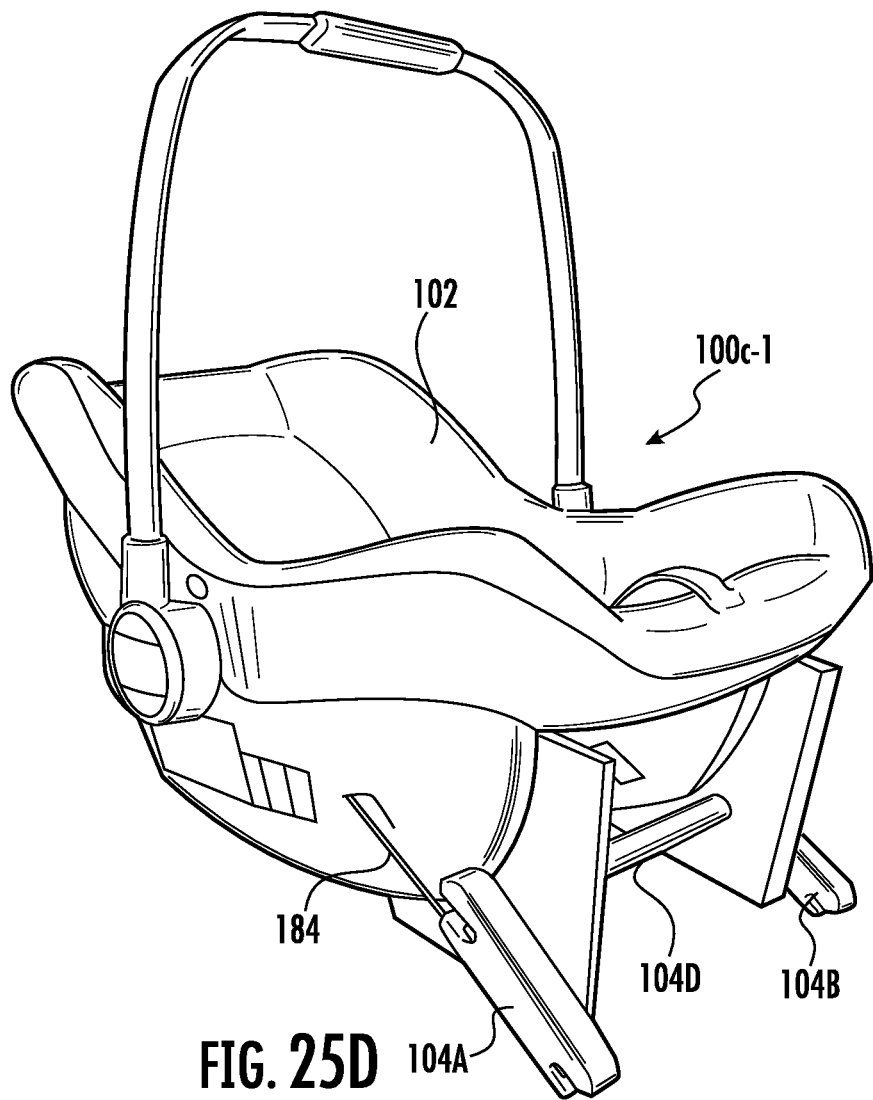
FIG. 25D shows a top, front, left-side perspective view of the infant car seat system of FIG. 25C.
Figure 25E:
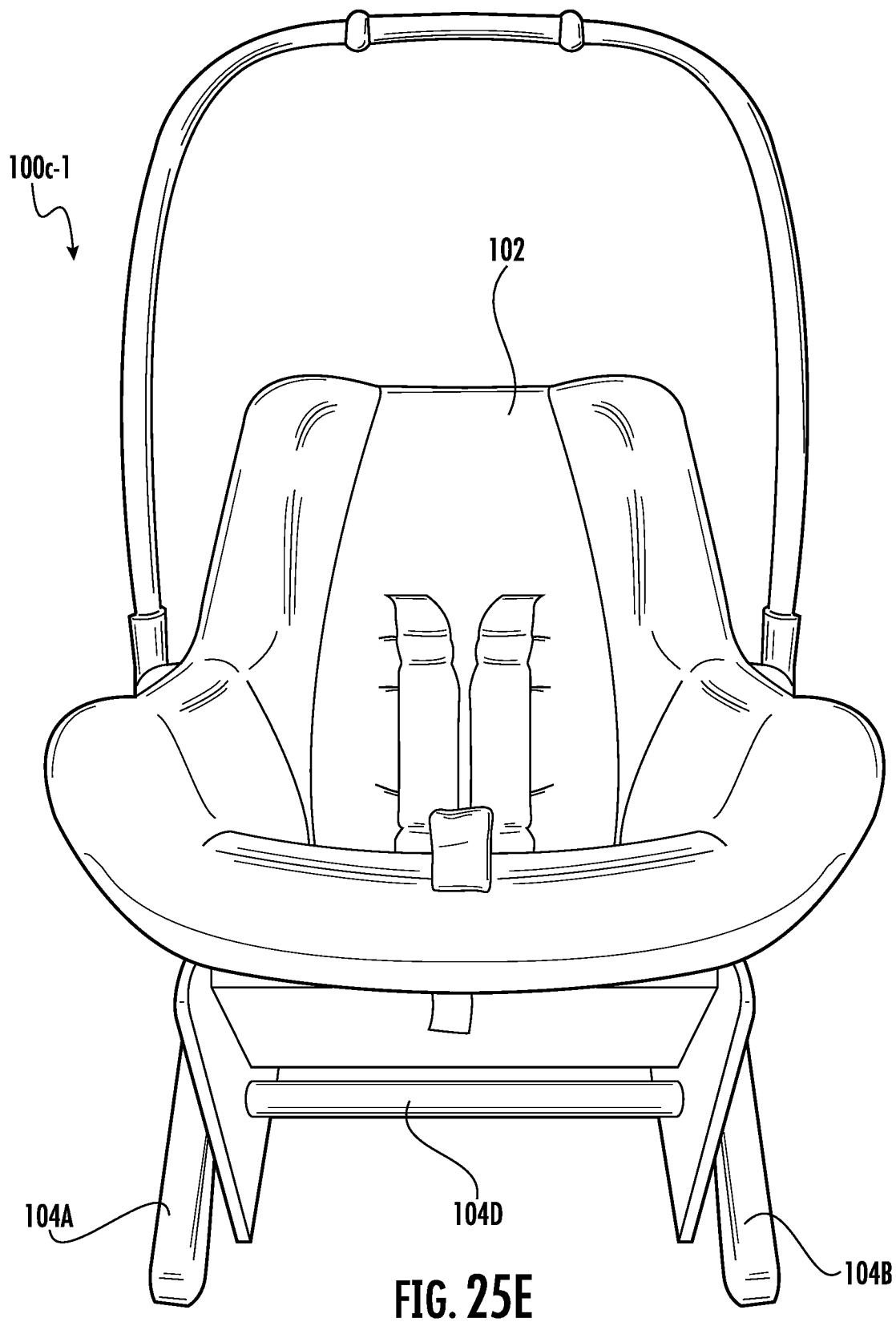
FIG. 25E shows a top, front perspective view of the infant car seat system of FIG. 25C.

FIG. 25A also shows the release actuator 180a integrated into the infant car seat 102 with a cable 184 routed from the seat anchor 104A to an actuator handle 182 located along the backside 102B of the infant car seat 102. As shown in FIGS. 25C and 25D, the cable 184 may be routed predominantly within the infant car seat 102 with a small portion protruding out from the infant car seat 102 for attachment to the seat anchor 104A. FIG. 25B further shows the cable 184 may be connected to a release mechanism of the seat anchor 104A. When the actuator handle 182 is actuated, the cable 184 may then pull on the release mechanism to open the seat anchor 104A for release.

An Infant Car Seat System with a Belted Anchor System

The various implementations of the infant car seat system 100 described above showed several examples of a rigid anchor system. However, it should be appreciated the infant car seat system 100 is not limited to rigid anchor systems, but may support other types of anchor systems 104 as well. In the following, several examples will now be described of an infant car seat system that incorporates a belted anchor system.

Figure 26:
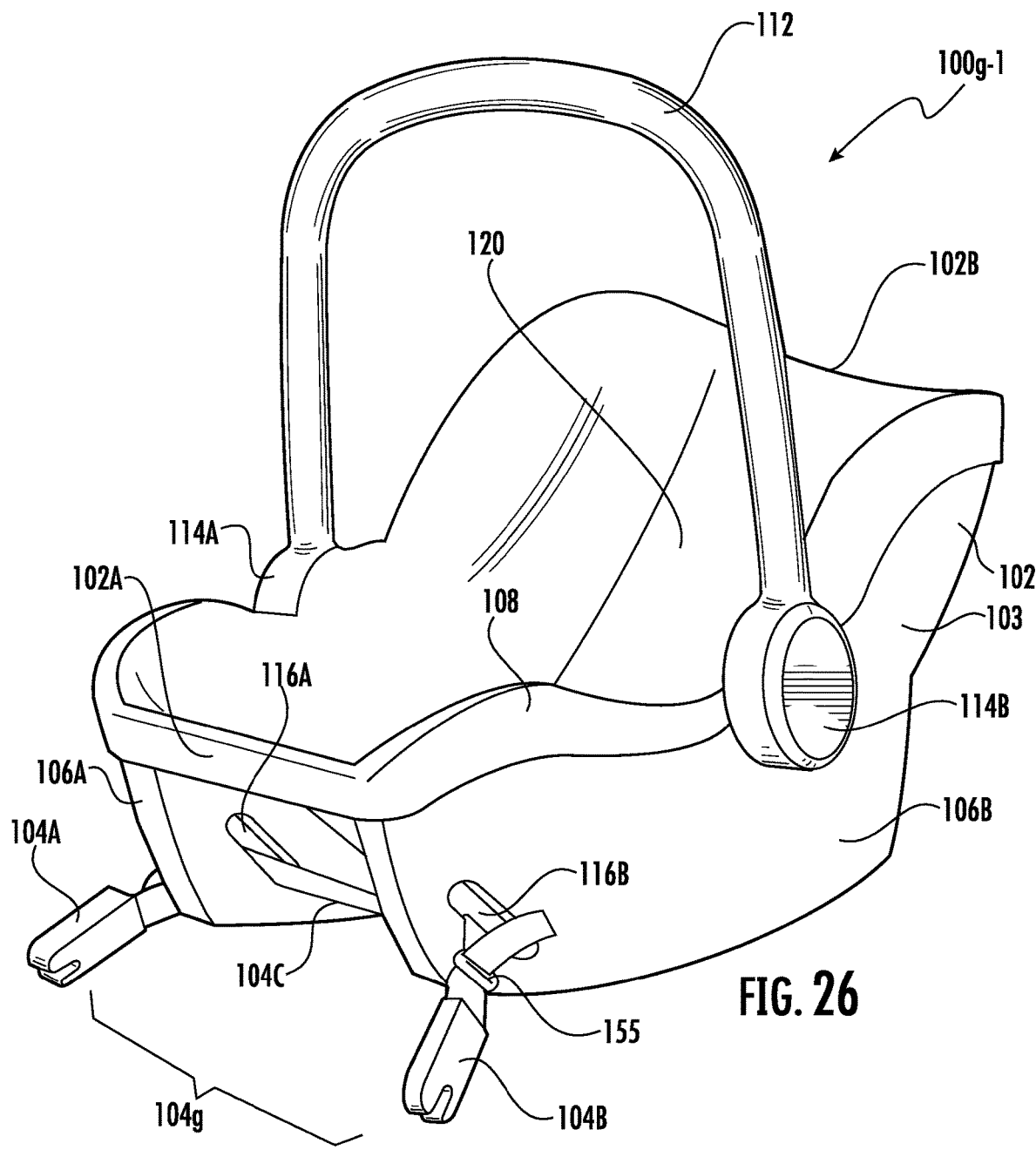
FIG. 26 shows an exemplary infant car seat system with a belted anchor system where the belt is routed through openings in the respective seat shell rails of the infant car seat.

FIG. 26 shows an exemplary infant car seat system 100g-1 with a belted anchor system 104g. The infant car seat system 100g-1 may include an infant car seat 102 with many of the same features described above with regards to other inventive implementations. For brevity, a detailed description of the various features associated with the infant car seat 102 will not be repeated here, but it should be appreciated one or more of the features described above may also be incorporated into the infant car seat 102 in the infant car seat system 100g-1.

As shown, the anchor system 104g may include the seat anchors 104A and 104B as before. In this implementation, however, the seat anchors 104A and 104B may be coupled together via a compliant belt 104C. The belt 104C may provide greater ease to the parent and/or the caregiver to position and orient the seat anchors 104A and 104B compared to the rigid anchor systems described above (i.e., the compliant properties of the belt 104C provides multiple axes of adjustment). The belt 104C may be routed through openings 116A and 116B formed on the seat shell rails 106A and 106B for attachment to the infant car seat 102. The anchor system 104g may further include a belt tightening mechanism 155 to tighten the belt 104C so that the belt 104C couples the infant car seat 102 to the vehicle seat 50 with a tight fit. In other words, the belt 104C may be under tension when sufficiently tightened to eliminate unwanted play in the belt 104C, which may otherwise allow the infant car seat 102 to move and/or jostle with respect to the vehicle seat 50.

During a typical installation, the parent and/or the caregiver may position the infant car seat system 100g-1 so that the infant car seat 102 is in a rear-facing configuration. The belt 104C may initially be loosened so that the seat anchors 104A and 104B may be readily positioned and oriented for attachment to the vehicle seat anchors 52A and 52B. Once the seat anchors 104A and 104B are installed, the parent and/or the caregiver may tighten the belt 104C using the belt tightening mechanism 155 until the infant car seat 102 is pulled against the vehicle seat back 58 and/or the vehicle seat pan 56. In some implementations, the anchor system 104g may include a single belt tightening mechanism 155 (e.g., the parent and/or the caregiver only has to pull on one strap during installation) or multiple belt tightening mechanisms 155 (e.g., a pair of belt tightening mechanisms 155 disposed proximate to the seat anchors 104A and 104B to ensure the belt is tightened similarly on both sides of the infant car seat 102).

The openings 116A and 116B may be shaped to allow at least the belt 104C and/or possibly the seat anchors 104A and 104B to pass through. Once tightened, the openings 116A and 116B may thus function as the mechanical constraining points 322A and 322B on the infant car seat 102 where the seat anchors 104A and 104B are effectively mounted. Thus, the openings 116A and 116B, which are depicted in FIG. 26 as being located along the lower, front portions of the seat shell rails 106A and 106B, may be positioned in a similar manner as a rigid anchor system to reduce the forces and rotational displacement applied to an infant during a crash event. In other words, the openings 116A and 116B may be located above the plane 310 defined by the CG 320 and the anchor points 324A and 324B or at least an approximation of the plane 310 thereof.

Figure 27:
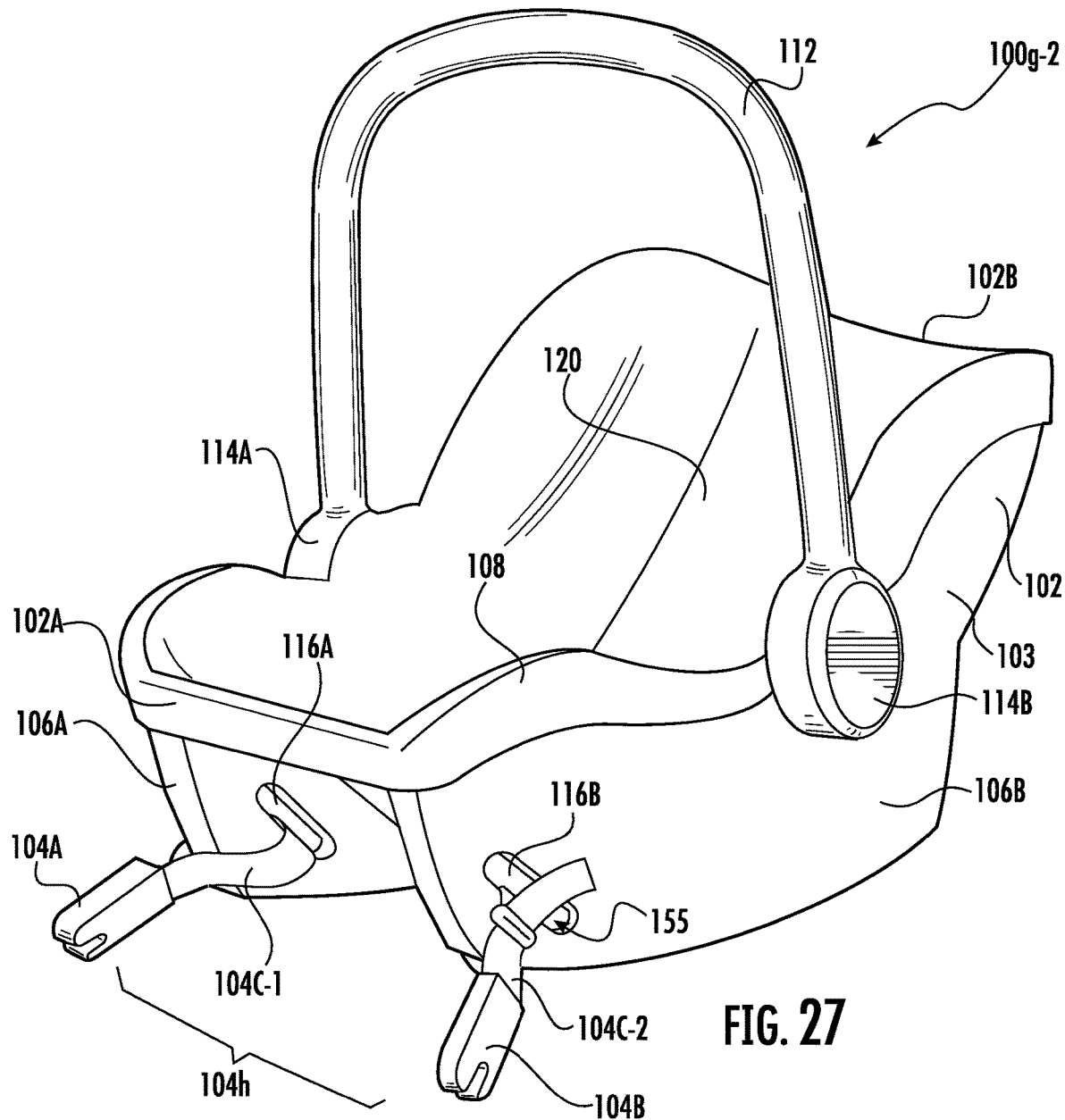
FIG. 27 shows an exemplary infant car seat system with a belted anchor system where each seat anchor has a corresponding belt that is routed through an opening of a seat shell rail of the infant car seat.

FIG. 27 shows another exemplary infant car seat system 100g-2 with a belted anchor system 104h where each seat anchor 104A and 104B has a separate belt 104C-1 and 104C-2, respectively, attached to the infant car seat 102. In this implementation, the infant car seat 102 may be substantially the same as in the infant car seat system 100g-1. As shown, the belt 104C-1 may form a closed loop around the opening 116A and, similarly, the belt 104C-2 may form a closed loop around the opening 116B. Each of the belts 104C-1 and 104C-2 may include a belt tightening mechanism 155 (e.g., a clasp), which may be used to form the loop as well as tighten the belts 104C-1 and 104C-2 for installation.

Figure 28:
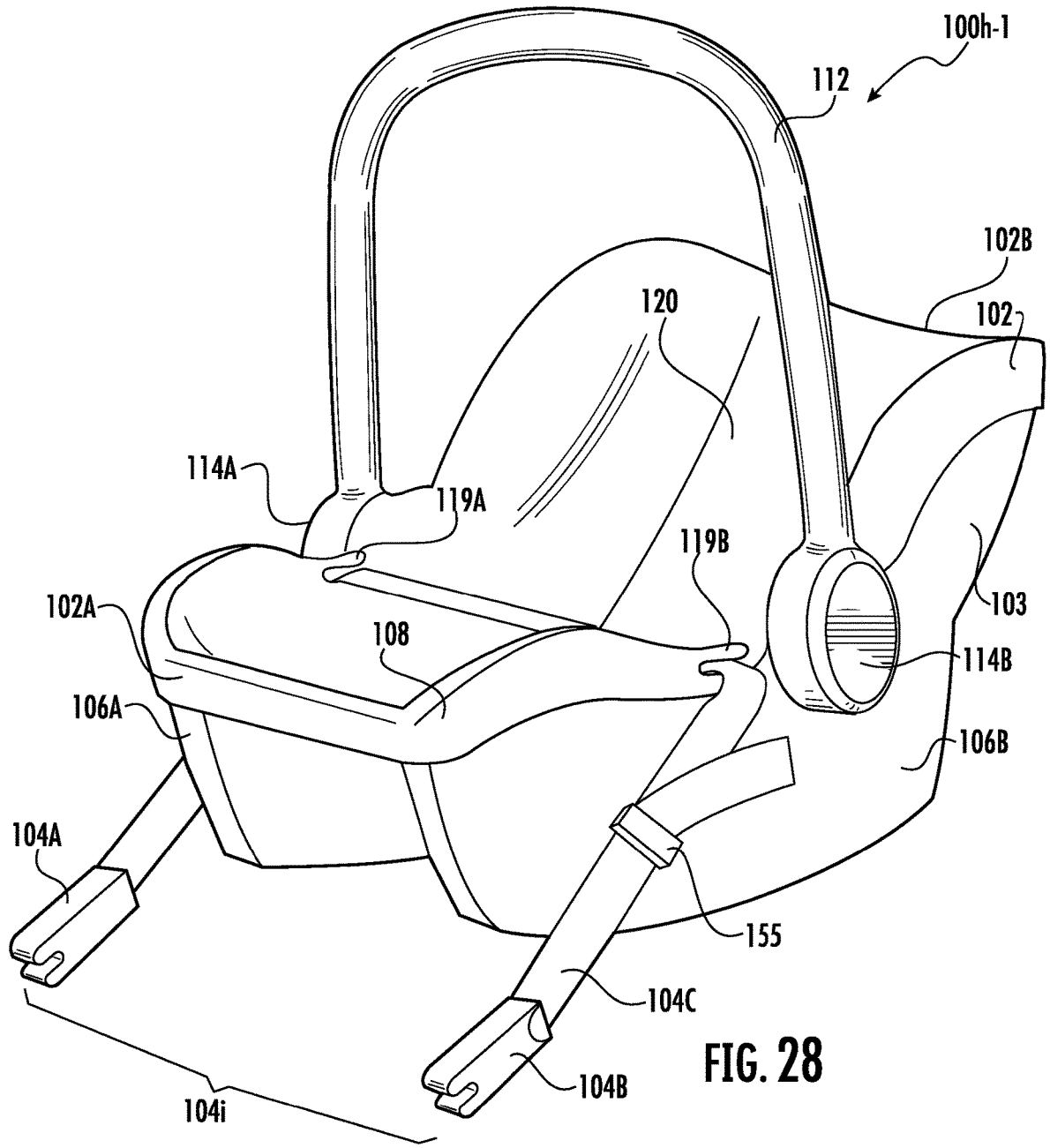
FIG. 28 shows an exemplary infant car seat system with a belted anchor system where the belt is routed through a vehicle seat path.

FIG. 28 shows another exemplary infant car seat system 100h-1 with a belted anchor system 104i where the belt 104C is routed, at least partially, along a vehicle seat belt path (i.e., a path along the infant car seat 102 where a vehicle seat belt may pass through to restrain the infant and/or the infant car seat 102). As shown, the infant car seat 102 may include belt hooks 119A and 119B disposed on the seat rim 108 proximate to the attachment mechanisms 114A and 114B. The belt 104C of the anchor system 104i may be routed through the belt hooks 119A and 119B such that a portion of the belt 104c extends across the seat pan 122 of the infant car seat 102. As before, the belt 104C may connect the seat anchors 104A and 104B together and a belt tightening mechanism 155 may be incorporated to tighten the belt 104C during installation.

The belt hooks 119A and 119B may be shaped such that a vehicle seat belt still be coupled to the infant car seat 102 together with the belt 104C in the anchor system 104i. In this manner, the belt hooks 119A and 119B may provide multiple functions in the infant car seat 102. This, in turn, may simplify the design of the infant car seat 102 by eliminating the openings 116A and 116B on the seat shell rails 106A and 106B. In this example, the belt hooks 119A and 119B may define the mechanical constraining points 322A and 322B.

Figure 29:
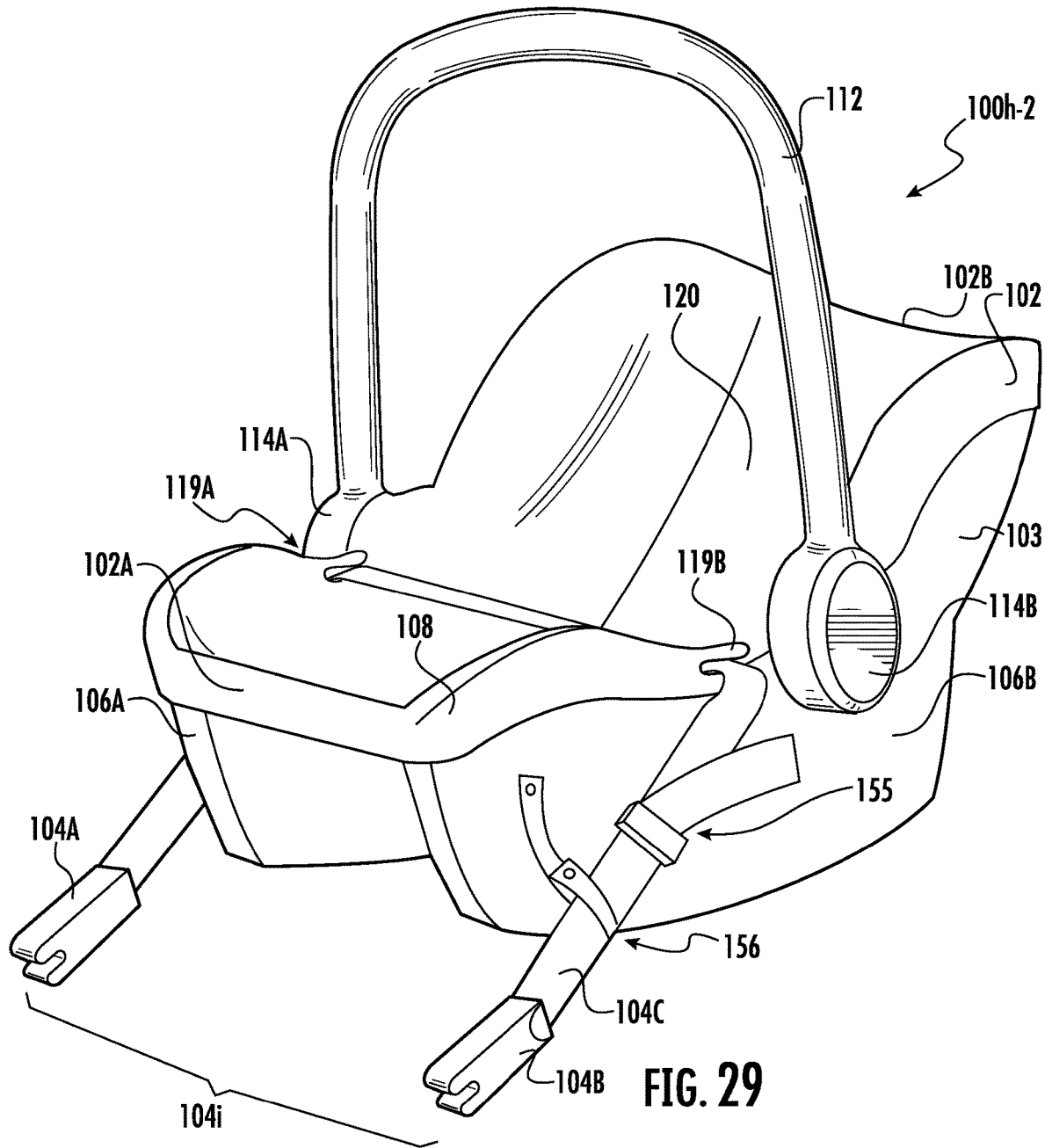
FIG. 29 shows a variant of the infant car seat system of FIG. 28 that includes a tether on each side of the infant car seat.

FIG. 29 shows another exemplary infant car seat system 100h-2, which is a variant of the infant car seat system 100h-1 that includes a tether 156 to further constrain the routing of the belt 104C. As shown, the tether 156 may be a strap and/or a belt coupled to the seat shell rail 106B that is looped around the belt 104C. In some implementations, the tether 156 may be a substantially rigid component that more tightly constrains the belt 104C to the infant car seat 102. A tether may also be disposed on the seat shell rail 106A and similarly looped around a portion of the belt 104C. The tether 156 prohibits the removal of the belt 104C from the car seat.

Figure 30:
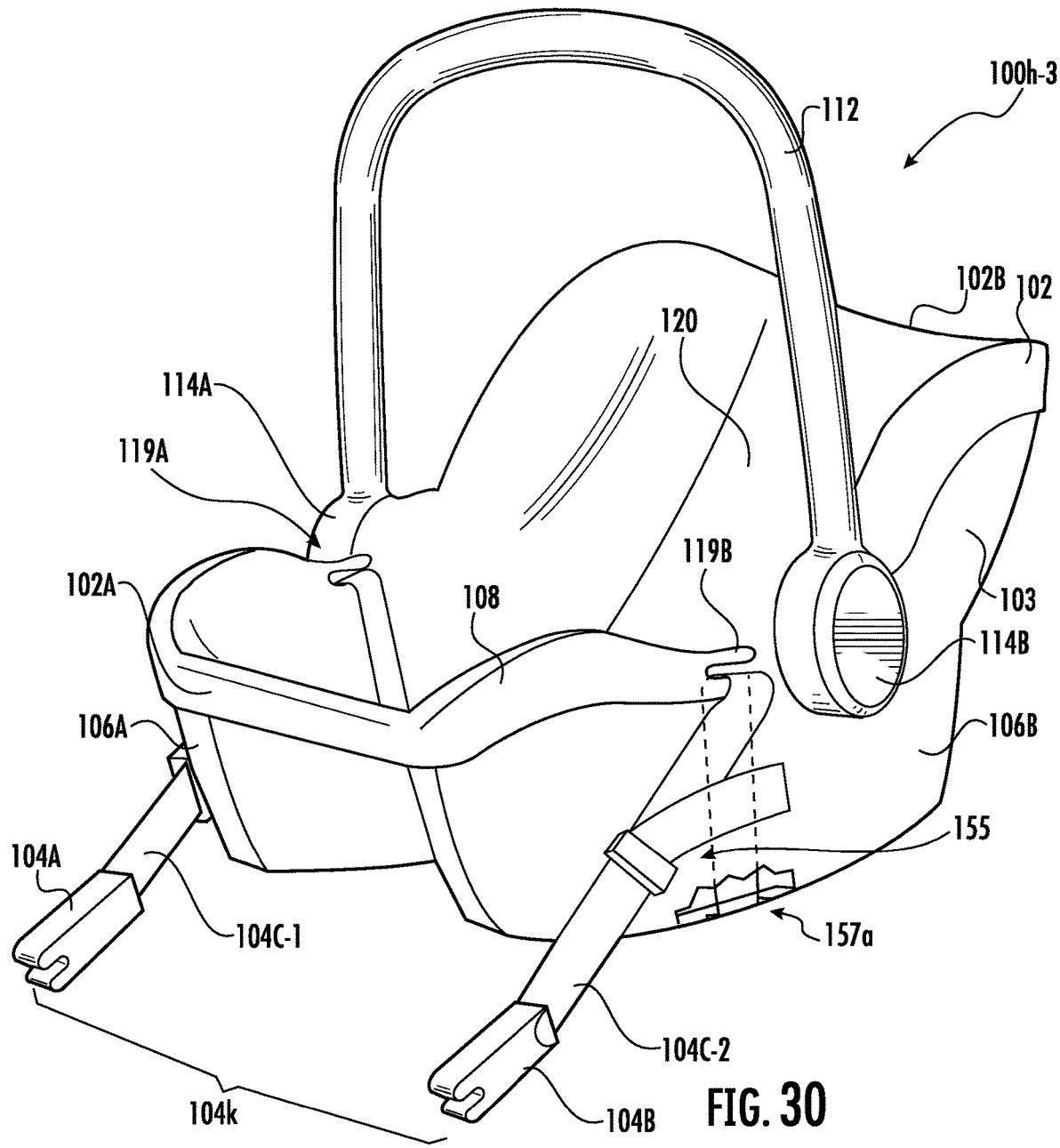
FIG. 30 shows an exemplary infant car seat system with a belted anchor system where each seat anchor has a corresponding belt that is routed through a portion of a vehicle seat path.

FIG. 30 shows another exemplary infant car seat system 100h-3 with a belted anchor system 104k where each seat anchor 104A and 104B has a corresponding belt 104C-1 and 104C-2 routed, in part, through belt hooks 119A and 119B, respectively. As shown, each of the belts 104C-1 and 104C-2 may include a corresponding belt tightening mechanism 155, similar to the infant car seat system 100g-2. In this implementation, however, the belt 104C-1 may pass through the belt hook 119A and subsequently routed downwards along the interior side of the seat shell rail 106A. The belt 104C-1 may then be anchored, for example, to the curved bottom rocker 107A via a metal bar or plate at an anchor point 157a. The belt 104C-2 may similarly be routed across the belt hook 119B and downwards along the interior side of the seat shell rail 106B where it is then anchored at another anchor point 157a on the seat shell rail 106B.

The belts 104C-1 and 104C-2 may be rigidly mounted to the infant car seat 102 at the anchor points 157a. However, by routing the belts 104C-1 and 104C-2 through the belt hooks 119A and 119B, the belt hooks 119A and 119B may still effectively define the mechanical constraining points 322A and 322B. In other words, the belts 104C-1 and 104C-2 may be constrained by the belt hooks 119A and 119B such that the belts 104C-1 and 104C-2 are unable to move relative to the infant car seat 102 when a sudden crash force is applied to the infant car seat system 100h-3.

Figure 31:
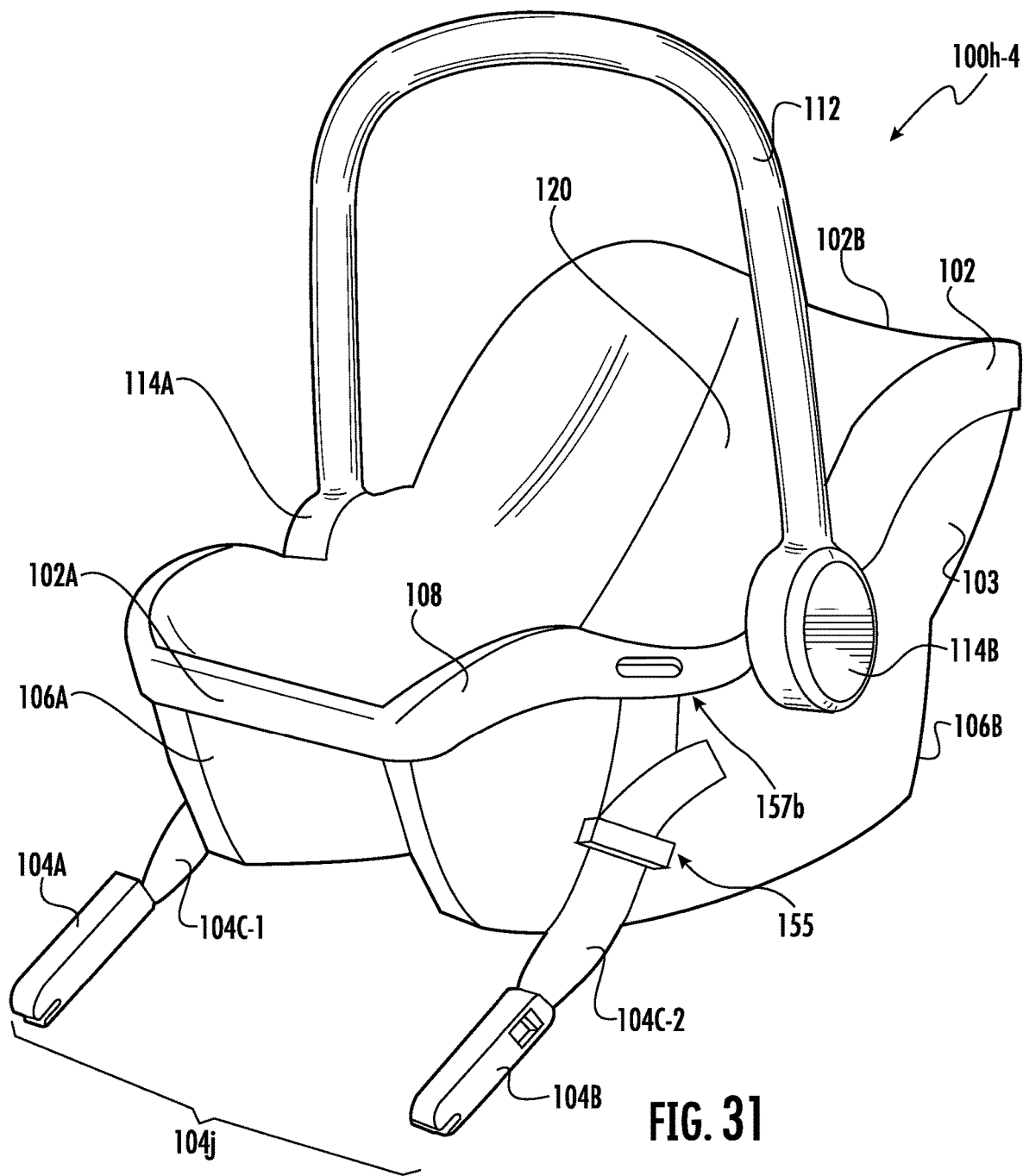
FIG. 31 shows an exemplary infant car seat system with a belted anchor system where each seat anchor has a corresponding belt that is attached to a seat rim of the infant car seat.

FIG. 31 shows another exemplary infant car seat system 100h-4 with a belted anchor system 104j. The seat anchors 104A and 104B may once again have respective belts 104C-1 and 104C-2 to separately couple the seat anchors 104A and 104B to the infant car seat 102. In this implementation, however, the belts 104C-1 and 104C-2 may be directly attached to the seat rim 108 at corresponding anchor points 157b using, for example, a metal plate or a bar that is rigidly mounted to the belts 104C-1 and 104C-2. The anchor points 157b may thus define the mechanical constraining points 322A and 322B.

Figure 32:
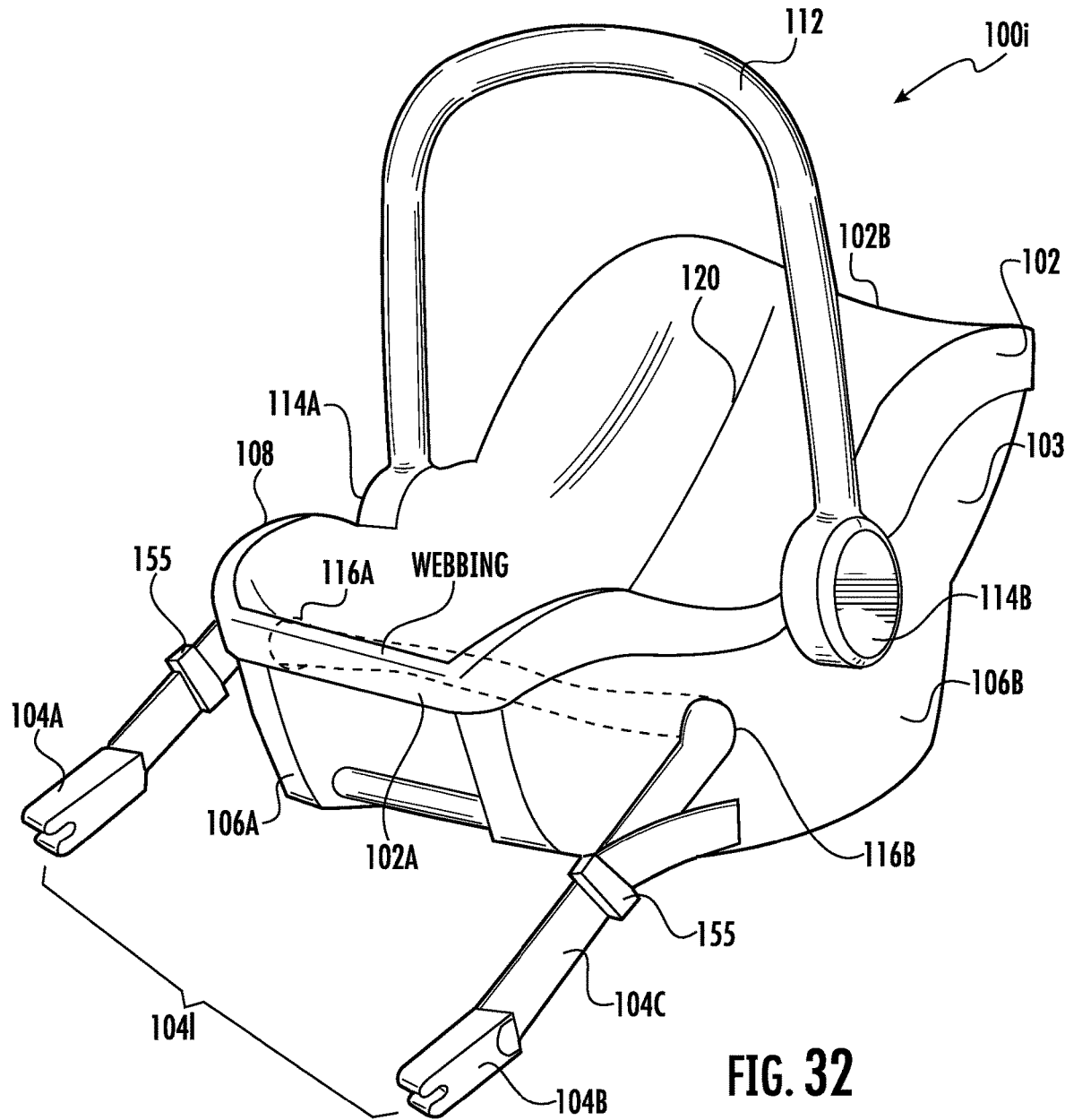
FIG. 32 shows an exemplary infant car seat system with a belted anchor system where a belt is routed through the infant car seat between a seat shell and a seat pad.

FIG. 32 shows another exemplary infant car seat system 100i with a belted anchor system 104l where the belt 104C is routed through openings 116A and 116B on the seat shell rails 106A and 106B, respectively. Compared to the infant car seat system 100g-1, the belt 104C may be routed above the seat pan 122, but below a seat pad (not shown) placed onto the seat pan 122 and the seat back 120. In some implementations, the openings 116A and 116B may be positioned along the seat shell rails 106A and 106B such that the belt 104C, when inserted through the openings 116A and 116B, may lie across the seat pan 122. In this manner, the surface of the seat pan 122 may provide a larger surface against which the belt 104C may be tightened during installation.

Said in another way, the portion of a crash force applied to the infant car seat system 100i and subsequently transferred to the belt 104C may be distributed across a larger surface due to the larger contact area between the belt 104C and the seat pan 122. This, in turn, may reduce the mechanical stresses applied to the belt 104C and/or the infant car seat 102.

Depending on the placement and configuration of the belted anchor system on the infant car seat, a variety of belt tightening mechanisms 155 may be used to facilitate a tight fit between the infant car seat 102 and the vehicle seat 50 including, but not limited to a belt clasp, a pair of O-rings and/or D-rings, and a cam lock.

Figure 33:
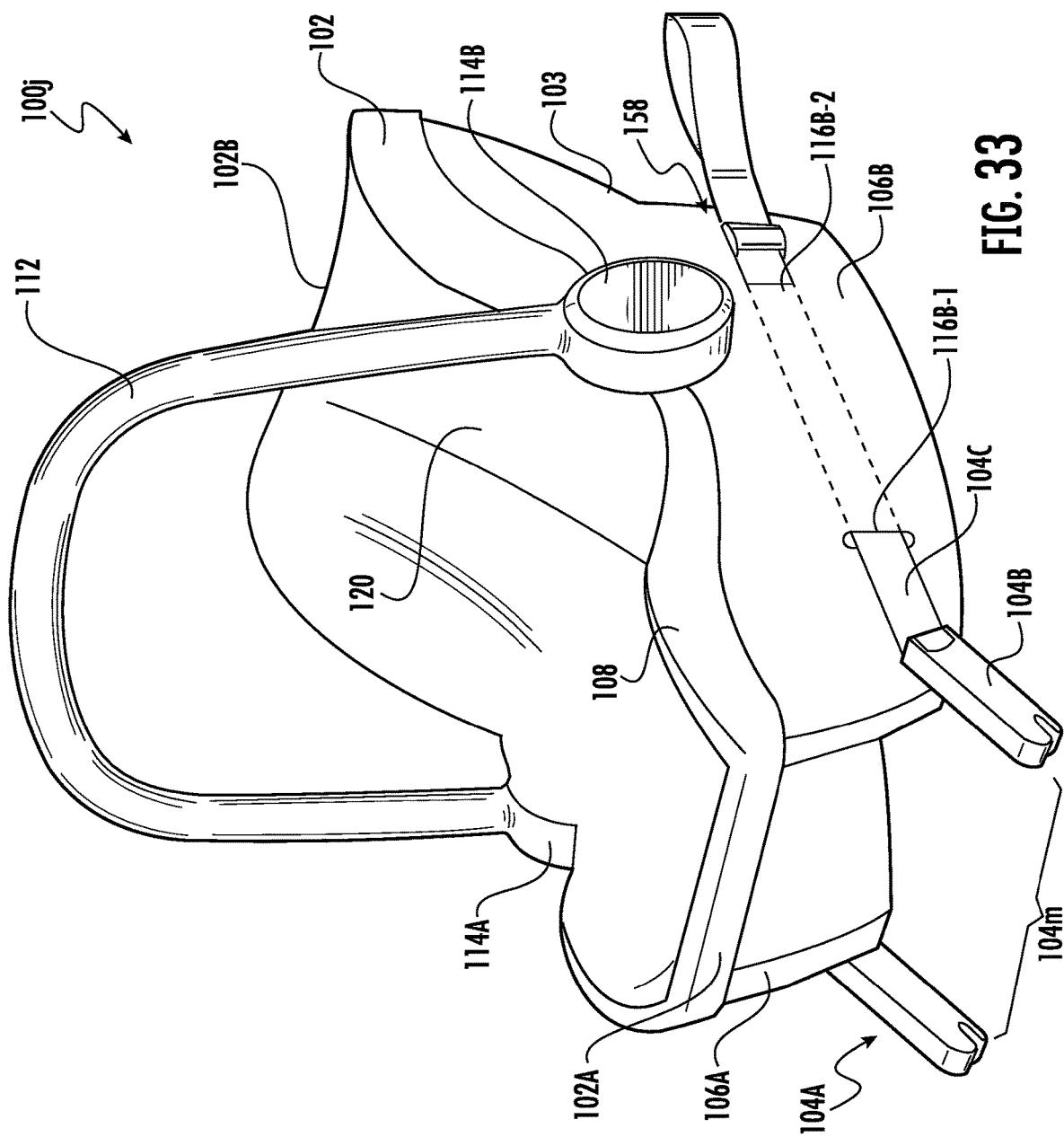
FIG. 33 shows an exemplary infant car seat system with a belted anchor system where each seat anchor has a corresponding belt that is tightened via cam lock mechanism disposed on respective sides of the infant car seat.

For example, FIG. 33 shows an exemplary infant car seat system 100j with a belted anchor system 104m where the belt tightening mechanism includes a cam lock 158. As shown, the seat anchor 104b in the anchor system 104m may have a belt 104C that is routed through a pair of openings 116B-1 and 116B-2 such that the ends of the belt 104C are disposed outside the infant car seat 102 while the center portions of the belt 104C are disposed within the infant car seat 102. In some implementations, the opening 116B-1 may define the mechanical constraining point 322B.

The portion of the belt 104C that extends outwards from the opening 116B-2 may include the cam lock 158, which is placed in-line with the belt 104C. The belt 104C may then form a loop for the parent and/or caregiver to grab (e.g., an end portion of the belt 104C may be stitched to an intermediate portion of the belt 104C to form the loop). A similar belt 104C and cam lock 158 may be separately mounted to the seat shell rail 106A for the seat anchor 104A.

The cam lock 158 may be a mechanism that allows the belt 104C to slide towards the backside 102B of the infant car seat 102 while restricting movement towards the frontside 102A. For example, the cam lock 158 may include an array of teeth that are arranged to grab the belt 104C when pulled towards the frontside 102A of the infant car seat 102. Thus, the parent and/or the caregiver may tighten the belt 104C by first positioning the infant car seat 102 onto the vehicle seat 50 as desired and then pulling the belt 104C (e.g., via the loop) until the infant car seat 102 is tightly fitted to the vehicle seat 50. The cam lock 158 may further include a release mechanism that may be manually actuated to release and loosen the belt 104C during, for example, uninstallation of the infant car seat system 100j and/or readjustment of the belts 104C.

Figure 34:
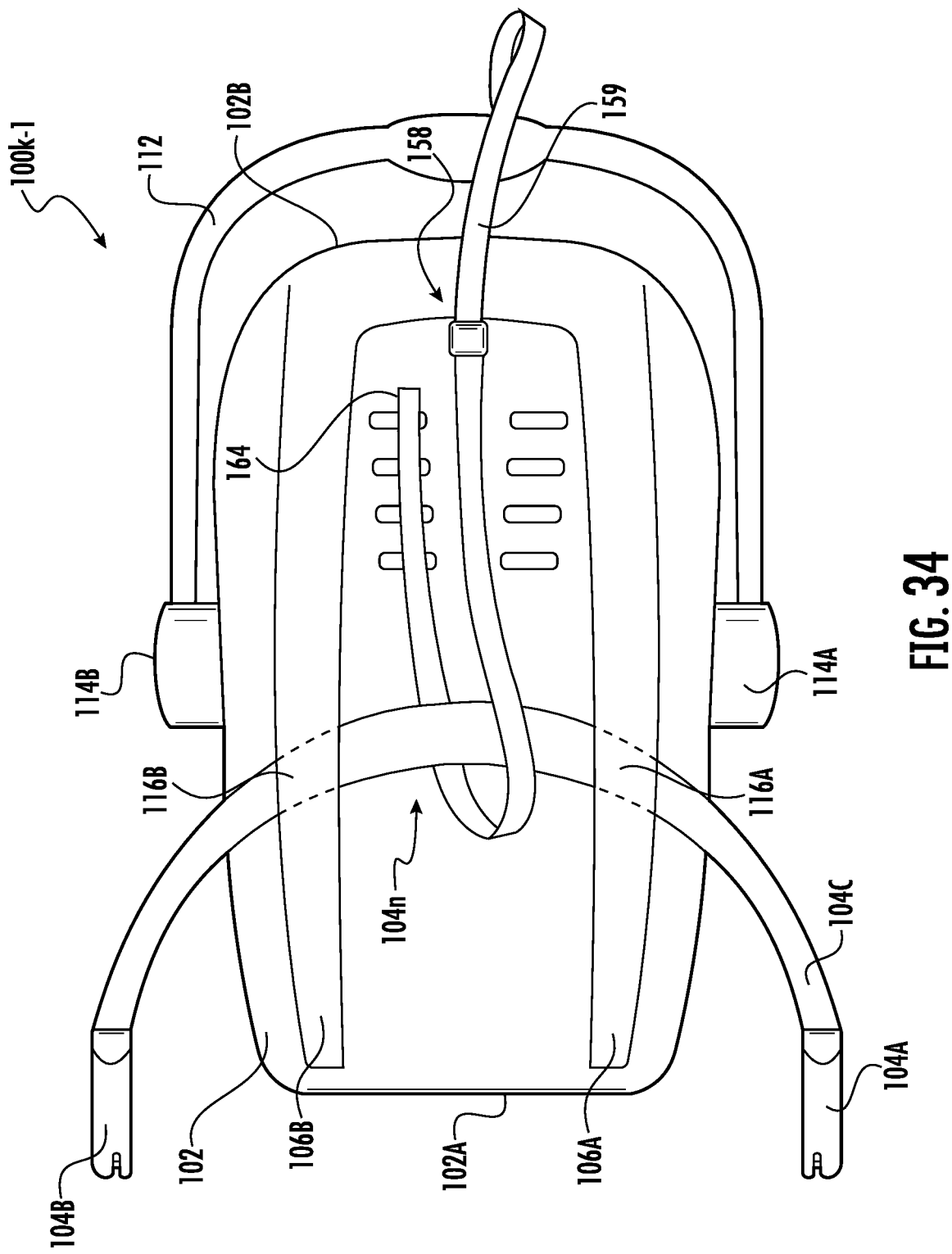
FIG. 34 shows an exemplary infant car seat system with a belted anchor system and a cam lock pulley mechanism where a strap in the cam lock pulley mechanism is anchored to the infant car seat and wrapped around a belt in the belted anchor system.

In some implementations, the cam lock 158 may be integrated using a separate strap that forms a pulley-based tightening mechanism in order to reduce the amount force to tighten the belted anchor system. For example, FIG. 34 shows another exemplary infant car seat system 100k-1 with a belted anchor system 104n that is tightened via a pulley strap 159 with a cam lock 158. The seat anchors 104A and 104B of the anchor system 104n may be coupled together via the belt 104C, which may be routed through respective openings 116A and 116B along the seat shell rails 106A and 106B, respectively. As shown, the center portions of the belt 104C may be disposed below the seat pan 122 between the seat shell rails 106A and 106B.

The pulley strap 159 may be anchored to the bottom of the seat shell 103 at an anchor point 164 and then wrapped around the center portions of the belt 104C between the seat shell rails 106A and 106B as shown in FIG. 34. The pulley strap 159 may then be fed through the cam lock 158, which is rigidly mounted to the seat shell 103. In some implementations, the pulley strap 159 may then form a loop that functions as a handle. With this arrangement, the parent and/or the caregiver may pull the pulley strap 159 towards the backside 102B of the infant car seat 102, which, in turn, causes the pulley strap 159 to pull against the belt 104C.

Figure 35:
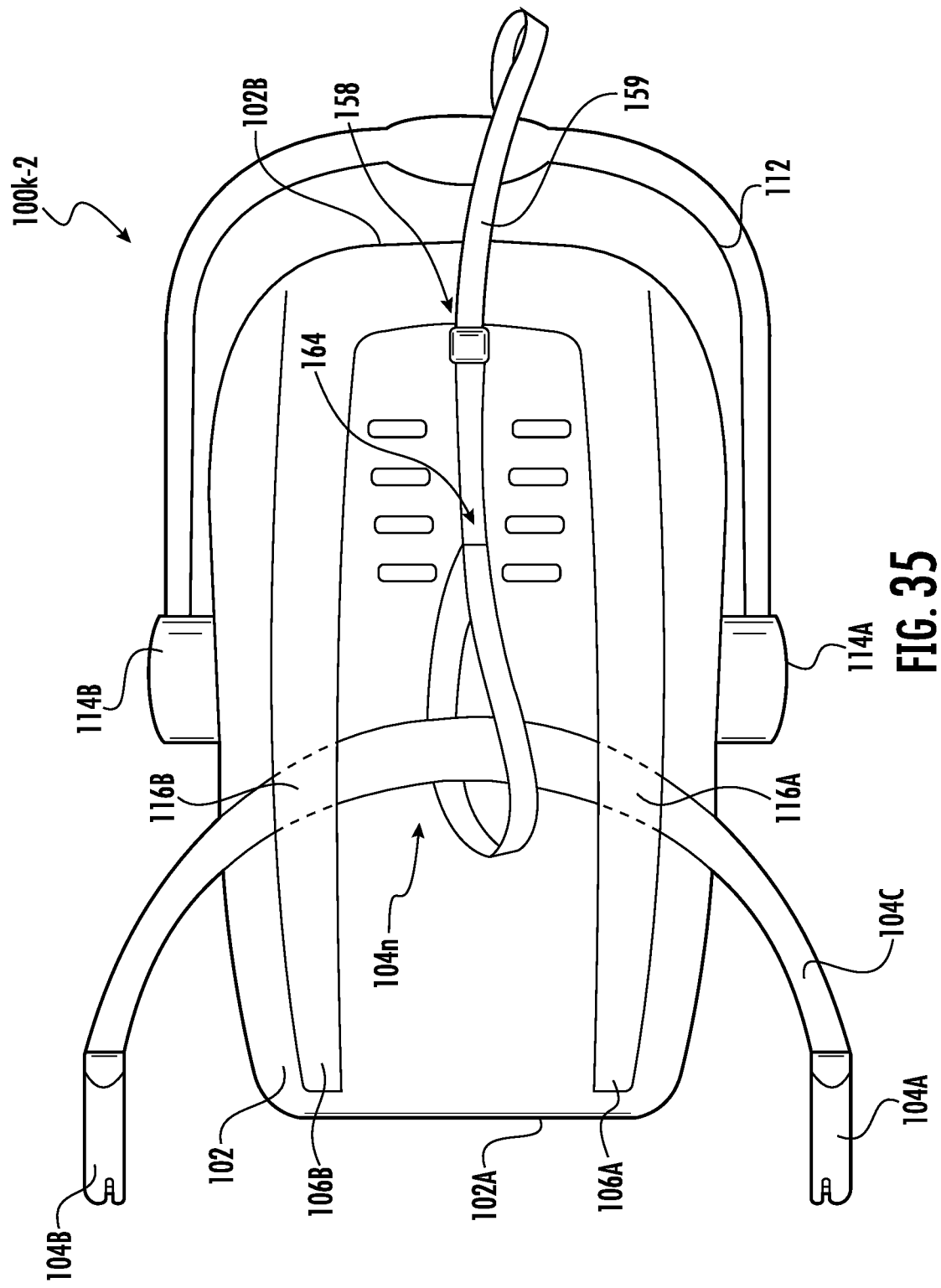
FIG. 35 shows an exemplary infant car seat system with a belted anchor system and a cam lock pulley mechanism where a strap in the cam lock pulley mechanism forms a loop that is wrapped around a belt in the belted anchor system.

FIG. 35 shows another exemplary infant car seat system 100k-2, which is a variant of the infant car seat system 100k-1 where the pulley strap 159 forms a loop around the belt 104C and, hence, is only anchored to the infant car seat 102 via the cam lock 158. As shown, one end of the pulley strap 159 may looped around the belt 104C and subsequently anchored to a center portion of the pulley strap 159 at the anchor point 164 (e.g., via stitching). As before, the pulley strap 159 may be pulled to tighten the belt 104C.

Figure 36:
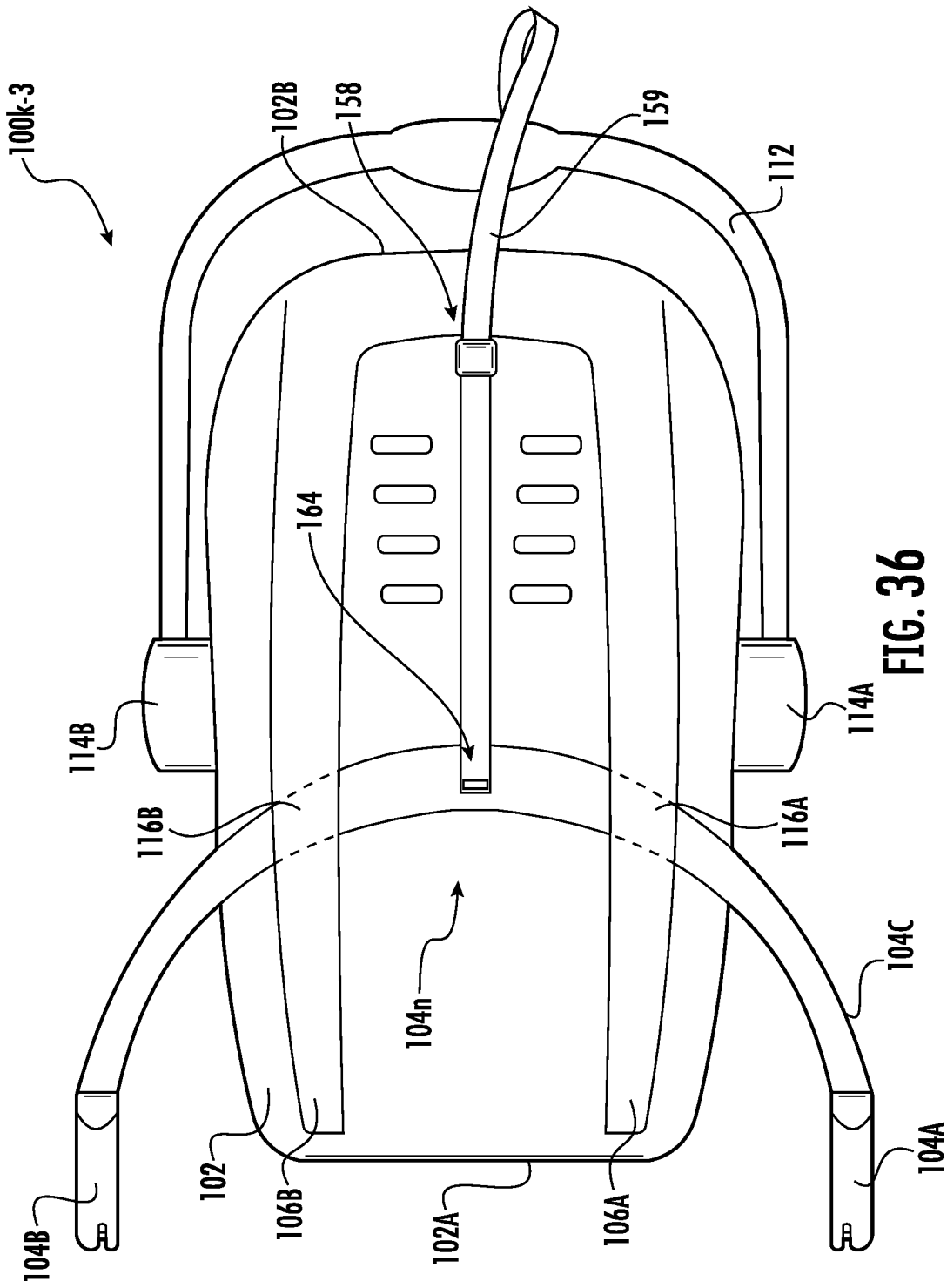
FIG. 36 shows an exemplary infant car seat system with a belted anchor system and a cam lock pulley mechanism where a strap in the cam lock pulley mechanism is stitched directly to a belt in the belted anchor system.

FIG. 36 shows an infant car seat system 100k-3, which is yet another variant of the infant car seat system 100k-1 where the pulley strap 159 is directly attached to the belt 104C. As shown, one end of the pulley strap 159 may be stitched directly to a center portion of the belt 104C at the anchor point 164 as shown. Once again, the pulley strap 159 may only be anchored to the infant car seat 102 by the cam lock 158.

Figure 37:
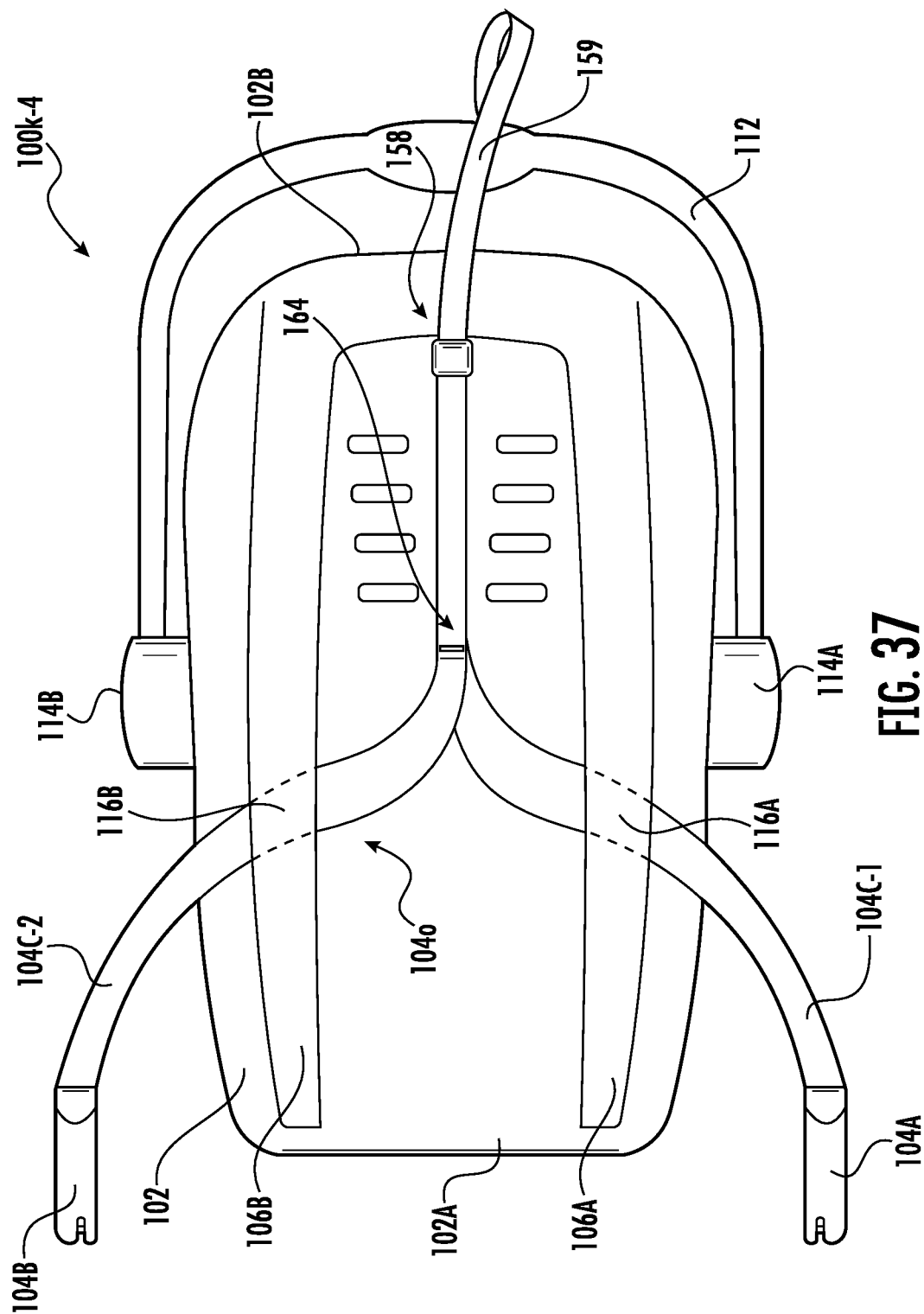
FIG. 37 shows an exemplary infant car seat system with a belted anchor system where each seat anchor has a corresponding belt and a corresponding cam lock mechanism.

In some implementations, a pulley-based tightening mechanism may be integrated even for belted anchor systems with multiple belts. For example, FIG. 37 shows an exemplary infant car seat system 100k-4 with a belted anchor system 104o. As shown, the seat anchors 104A and 104B may each be coupled to the belts 104C-1 and 104C-2, respectively. The belts 104C-1 and 104C-2, in turn, may be routed through the openings 116A and 116B, respectively, on the infant car seat 102. In this implementation, the ends of the belts 104C-1 and 104C-2 may be stitched together with the pulley strap 159 at the anchor point 164 below the seat pan 122 and between the seat shell rails 106A and 106B.

Figure 38:
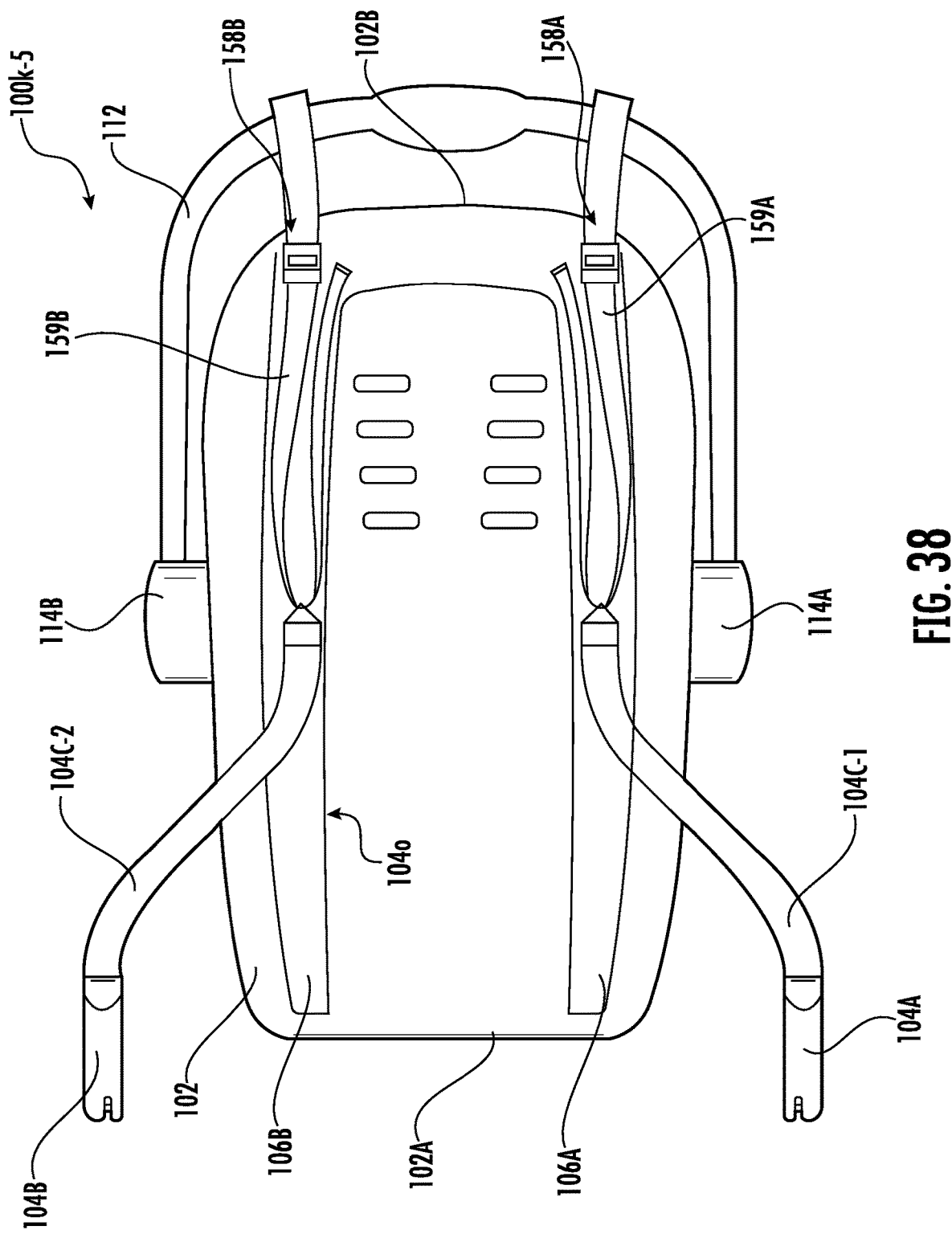
FIG. 38 shows an exemplary infant car seat system with a belted anchor system where each seat anchor has a corresponding belt that are stitched together to a single cam lock mechanism.

FIG. 38 shows another exemplary infant car seat system 100k-5 where each belt 104C-1 and 104C-2 in the anchor system 104o has its own corresponding pulley-based tightening mechanism. As shown, the belt 104C-1 may be coupled to a pulley strap 159A and, similarly, the belt 104C-2 may be coupled to a pulley strap 159B. The pulley straps 159A and 159B may each have corresponding cam locks 158A and 158B mounted to the infant car seat 102. In this configuration, the belts 104C-1 and 104C-2 may be separately tightened by pulling the pulley straps 158A and 158B, respectively.

Figure 39A:
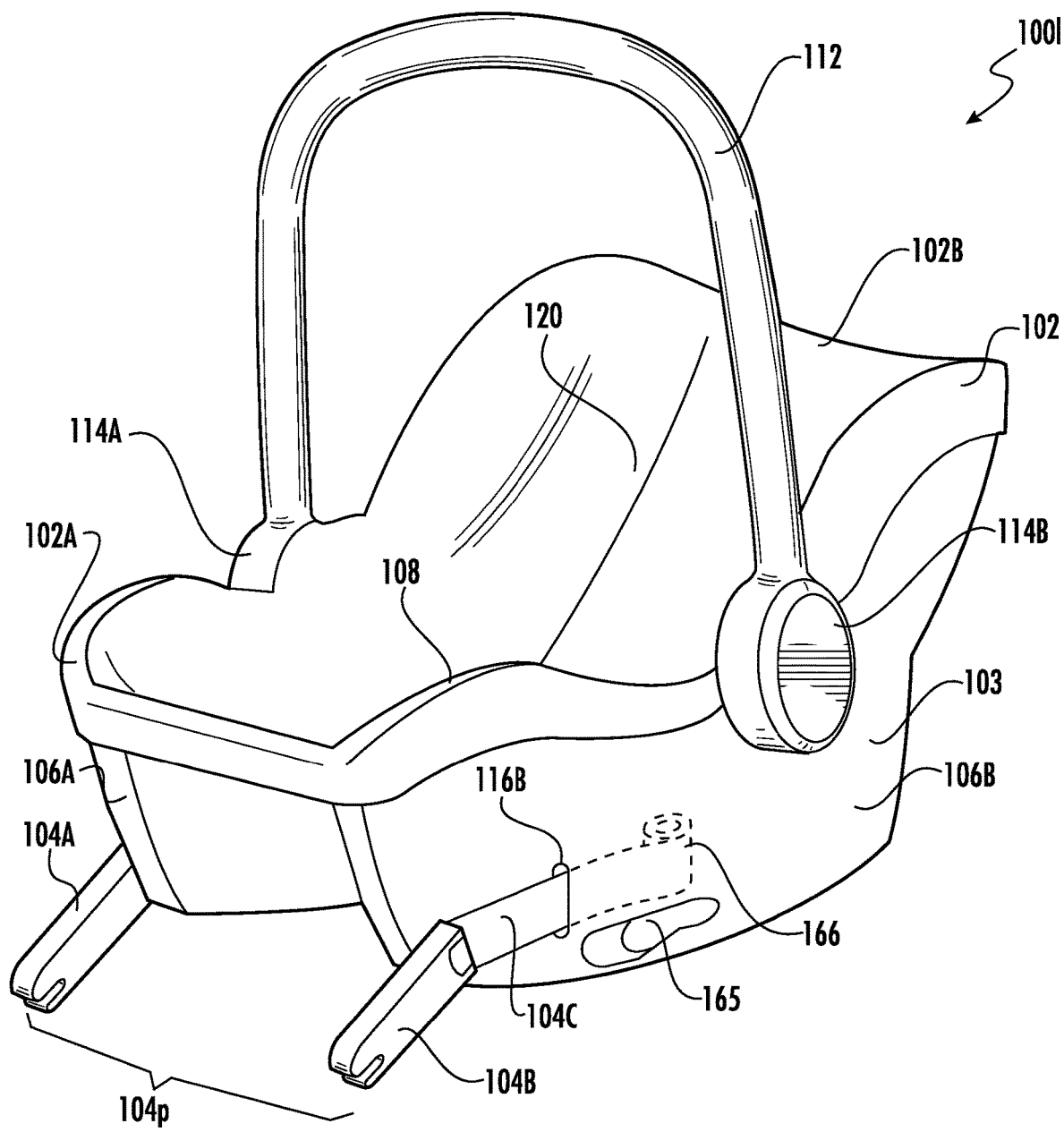
FIG. 39A shows an exemplary infant car seat system with a belted anchor system and an integrated ratcheting mechanism.
Figure 39B:
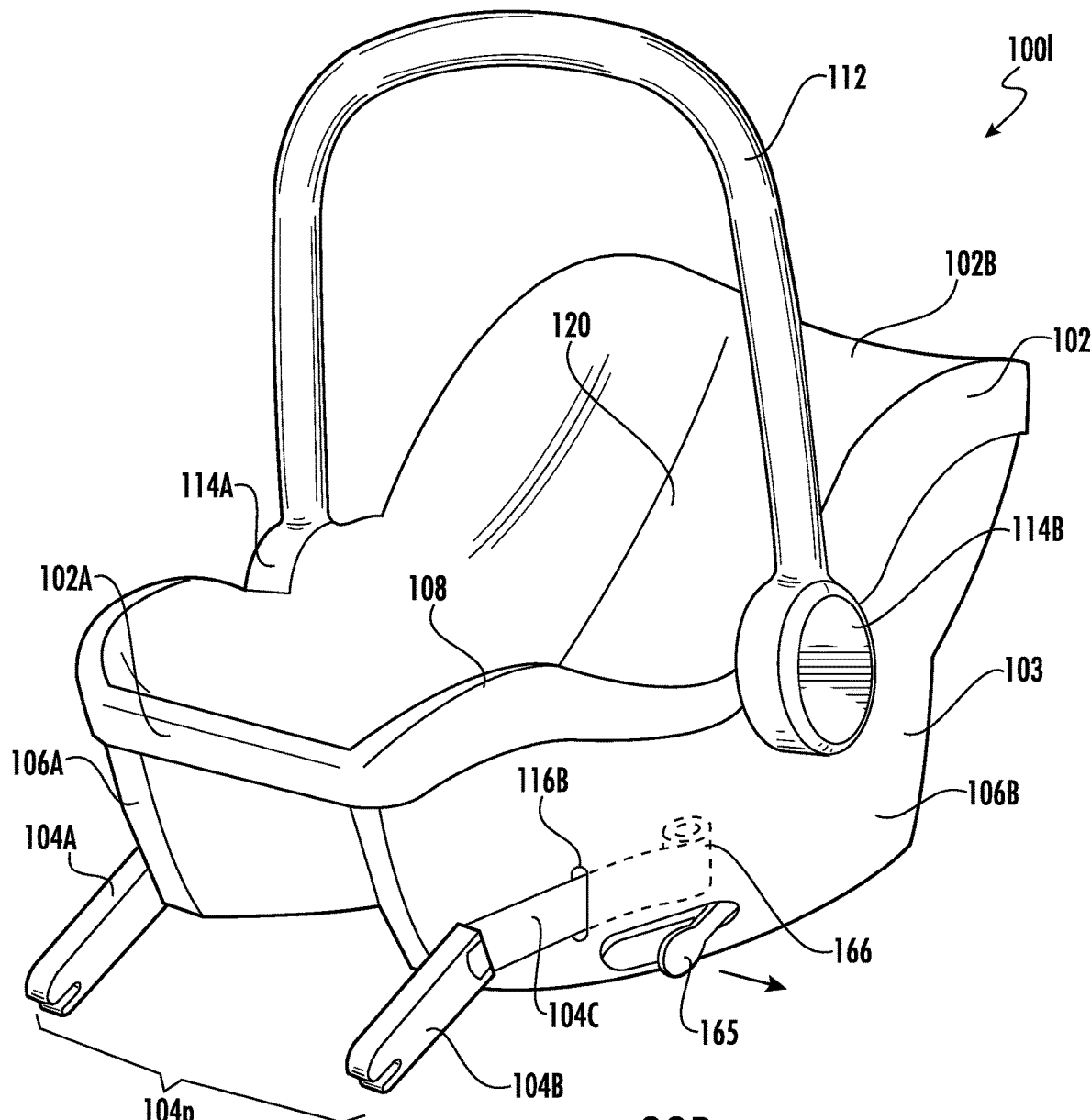
FIG. 39B shows the infant car seat system of FIG. 39A where the ratcheting mechanism is actuated.

FIGS. 39A and 39B show another exemplary infant car seat system 100l, which incorporates a ratcheting mechanism to tighten the belts in the belted anchor system. As shown, the infant car seat system 100l may include a belted anchor system 104p with the seat anchors 104A and 104B. The seat anchor 104B may be coupled to a belt 104C, which passes through an opening 116B on the seat shell rail 106B.

The belt 104C may then be spooled around a spool 166 within the infant car seat 102. The spool 166 may allow for a longer belt 104C to be used without appreciably increasing the volume the belt 104C occupies within the infant car seat 102. The seat anchor 104A may similarly include a belt 104C spooled around a second spool in the seat shell rail 106A.

The spool 166 may include a ratcheting mechanism, which only allows the belt 104C to move along a direction that spools the belt 104C while restricting movement along an opposing direction that unspools the belt 104C. The spool 166 may be mechanically coupled to a handle 165, which may be disposed on the exterior side of the seat shell rail 106B. The handle 165 may be configured so that the parent and/or the caregiver should repeatedly pull the handle 165 in order to incrementally spool the belt 104C and, hence, tighten the belt 104C as shown in FIG. 39B.

In some implementations, the spool 166 may include a release mechanism that allows the belt 104C to be loosened. The release mechanism may be triggered by a different actuation maneuver of the handle 165 (e.g., the handle 165 may be pushed inwards into the infant car seat). In some implementations, the belt 104C may be unspooled by pressing the handle 165 and pulling on the seat anchor 104B at the same time. In some implementations, the spool 166 may include a spring (not shown) that imparts a spring bias to automatically unspool the belt 104C when the parent and/or the caregiver actuates the handle 165.

Figure 40:
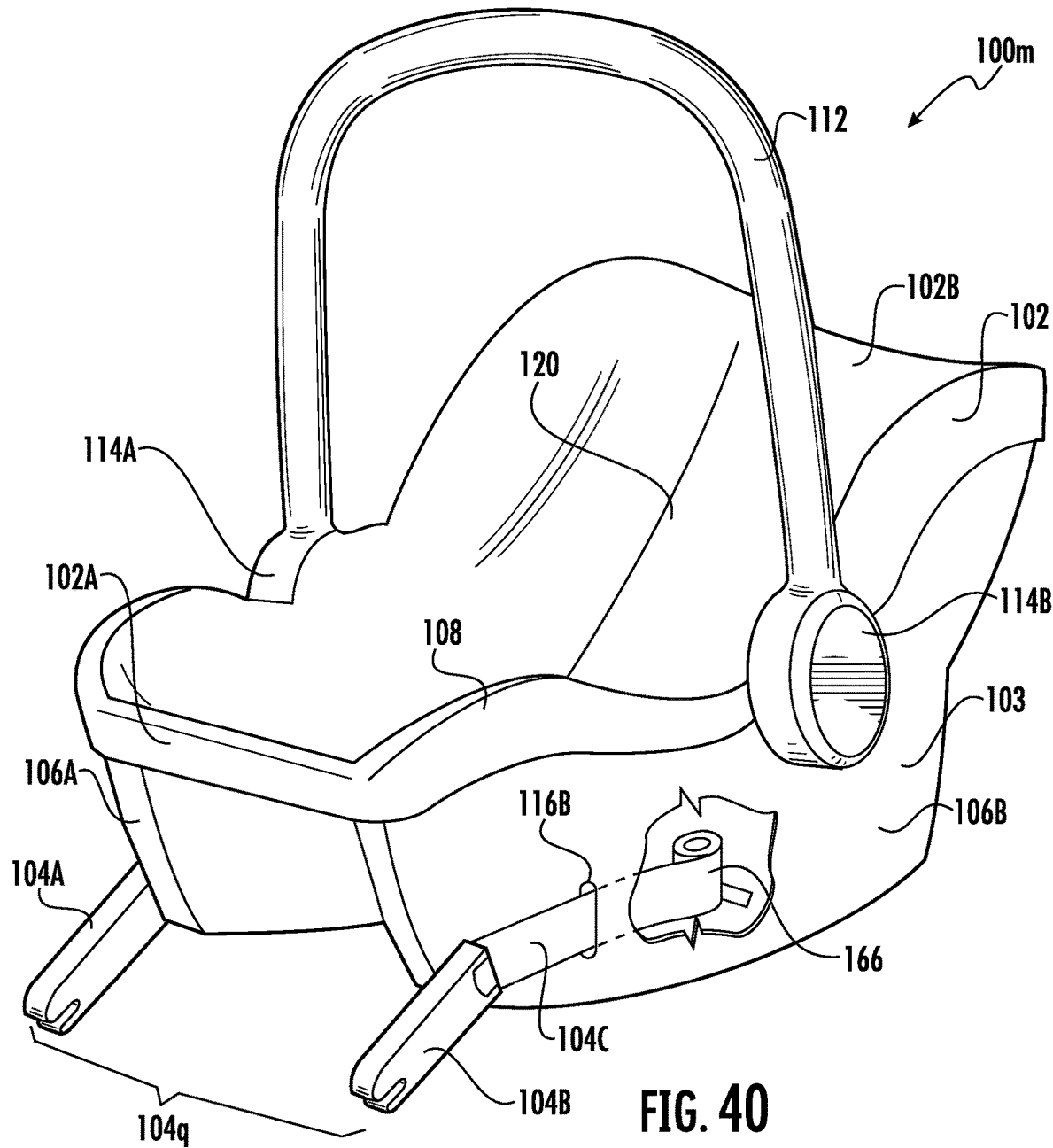
FIG. 40 shows an exemplary infant car seat system with a belted anchor system and a spring-assisted retractor and spool.

FIG. 40 shows yet another exemplary infant car seat system 100m that incorporates a spring-assisted retraction mechanism to tighten a belted anchor system. As shown, a belted anchor system 104q may include the seat anchors 104A and 104B with separate belts 104C. The belt 104C may once again may be spooled around a spool 166 disposed within the infant car seat 102. In this implementation, however, the spool 166 may include a spring configured to retract the belt without any additional inputs by the parent and/or the caregiver. A similar spring-actuated spool 166 may be separately included for the belt 104C coupled to the seat anchor 104A. Thus, the belts 104C may be automatically tightened once the seat anchors 104A and 104B are attached to the vehicle seat 50.

In order to install the infant car seat system 100m, the spool 166 may be configured to allow a parent and/or a caregiver to pull the belt 104C out from the infant car seat 102 when a sufficiently large force is applied. In some implementations, the spool 166 may be configured to prevent unspooling of the belt 104C only when a large force is applied for a short period of time (e.g., a crash force). Said in another way, the parent and/or the caregiver may unspool the belt 104C by gently pulling on the seat anchor 104B for an extended period of time. In some implementations, the infant car seat system 100m may include a button (not shown) that releases the retracting spool 166 so that the belt 104C may be unspooled more easily by pulling the seat anchor 104B with less force.

An Infant Car Seat System with a Belted Anchor System and a Release Actuator

An infant car seat system with a belted anchor system may also include a release actuator to provide a quick disconnect mechanism to release the anchor system from a vehicle seat. Like the release actuators described above for rigid anchor systems, the release actuators for belted anchor systems may be integrated into the infant car seat in different ways.

Figure 41A:
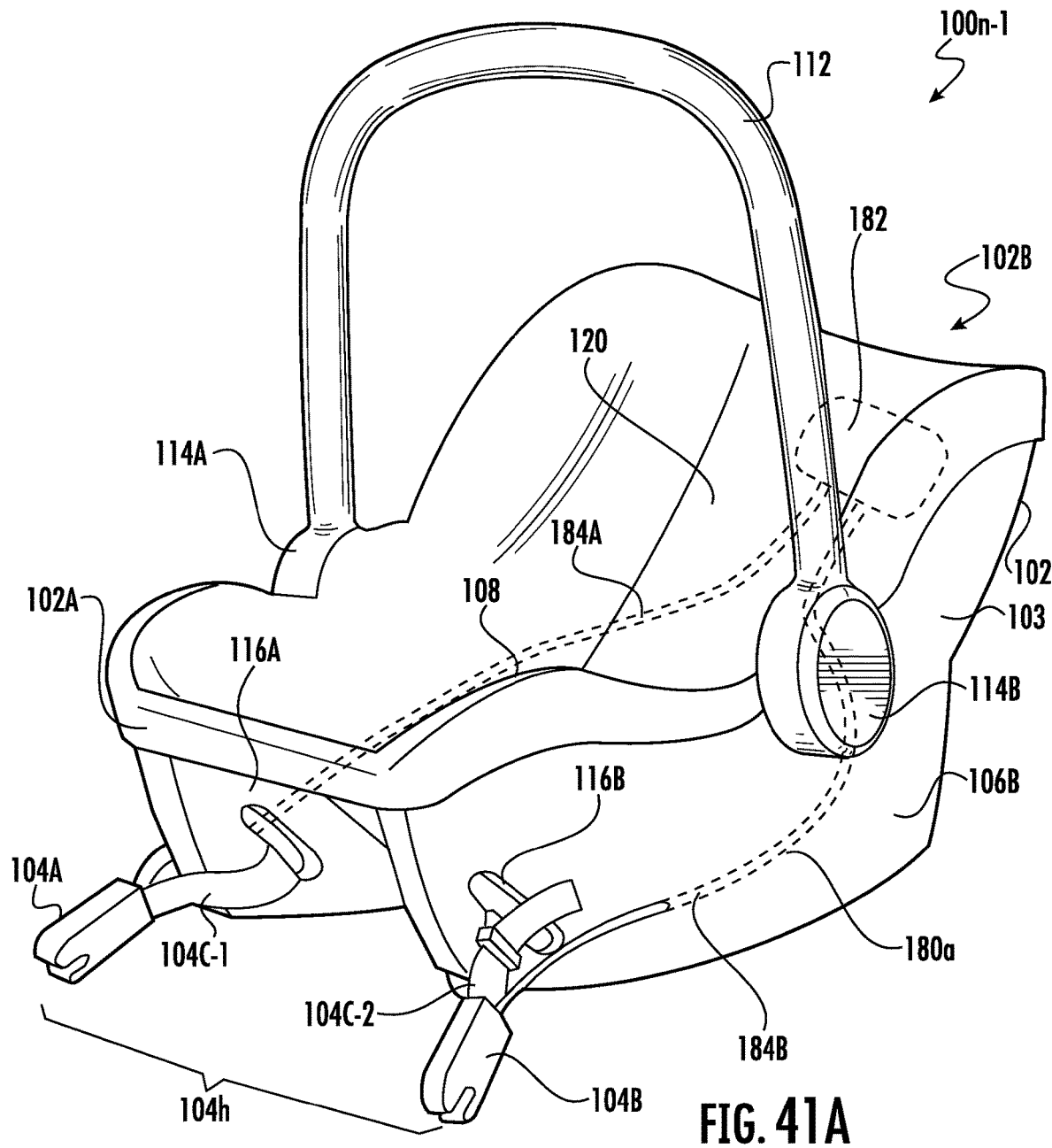
FIG. 41A shows an exemplary infant car seat system with a belted anchor system and a release actuator mounted to the backside of the infant car seat.
Figure 41B:
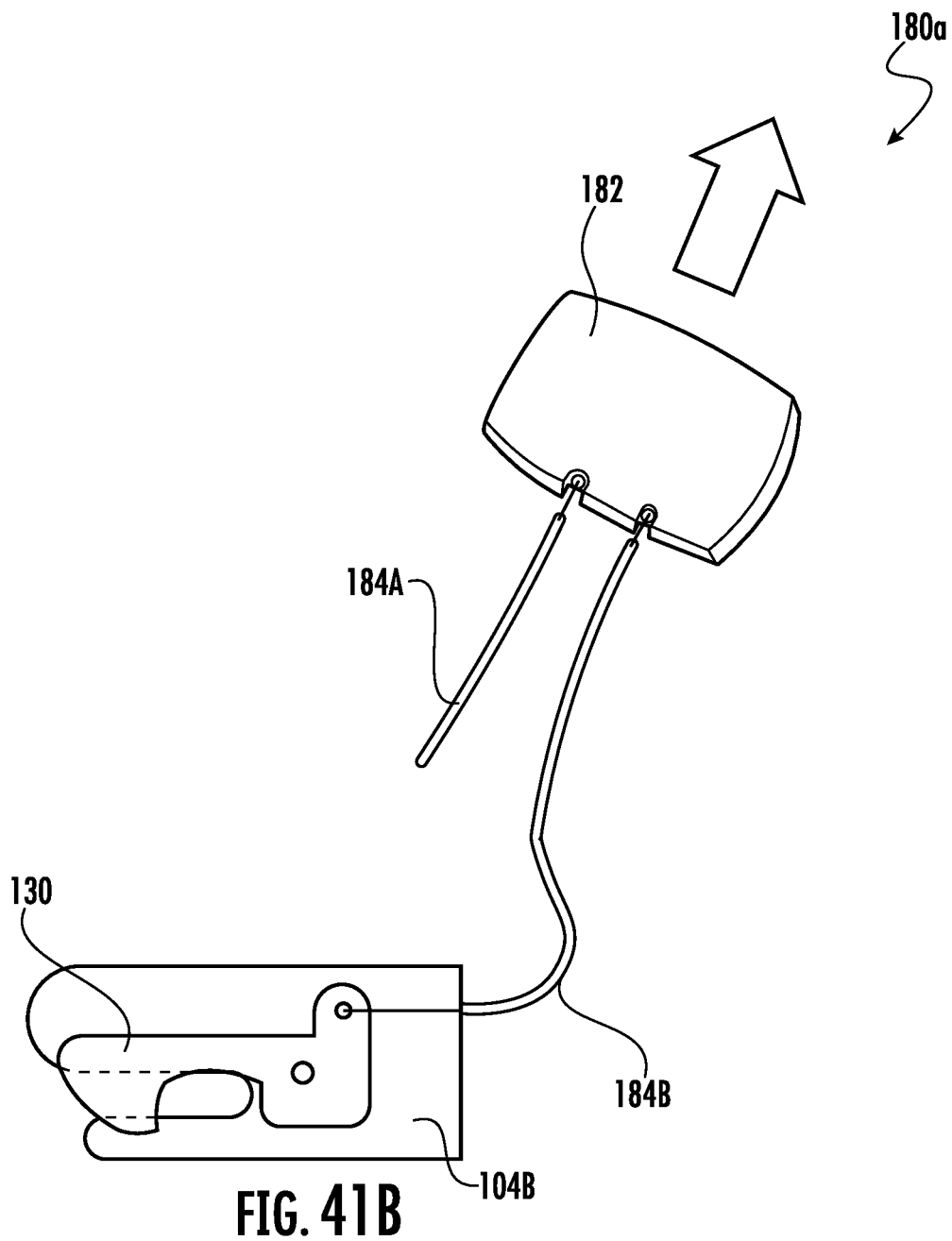
FIG. 41B shows a diagram of the release actuator in the infant car seat system of FIG. 41A.

For example, FIGS. 41A and 41B show an exemplary infant car seat system 100n-1 with the release actuator 180a in the infant car seat system 100c-1 and the belted anchor system 104h. As shown, the release actuator 180a may once again include cables 184A and 184B routed through portions of the seat shell 103 and, in particular, the seat shell rails 106A and 106B of the infant car seat 102. The cables 184A and 184B may be coupled to the actuator handle 182, which is disposed on the backside 102B of the infant car seat 102 between the seat shell rails 106A and 106B and below the seat rim 108. The cables 184A and 184B may also be routed through openings on the seat shell rails 106A and 106B for connection with the seat anchors 104A and 104B.

For belted anchor systems, the compliance of the belts 104C-1 and 104C-2 means the actuation of the release actuator 180a may cause the seat anchors 104C-1 and 104C-2 to displace instead of actuating the release mechanisms on the seat anchors 104A and 104B. Accordingly, the sheath contacts the seat shell at the actuator end and contacts the connector housing at that end. The cable inside the sheath is connected to the actuator and connected to the latch (or a part that disengages the latch) to release the connector. FIG. 41B shows the cable 184B may be directly attached to both the latch 130 and the actuator handle 182 so that movement of the actuator handle 182 may be directly be transferred to the seat anchor 104B to release the latch 130.

Figure 42:
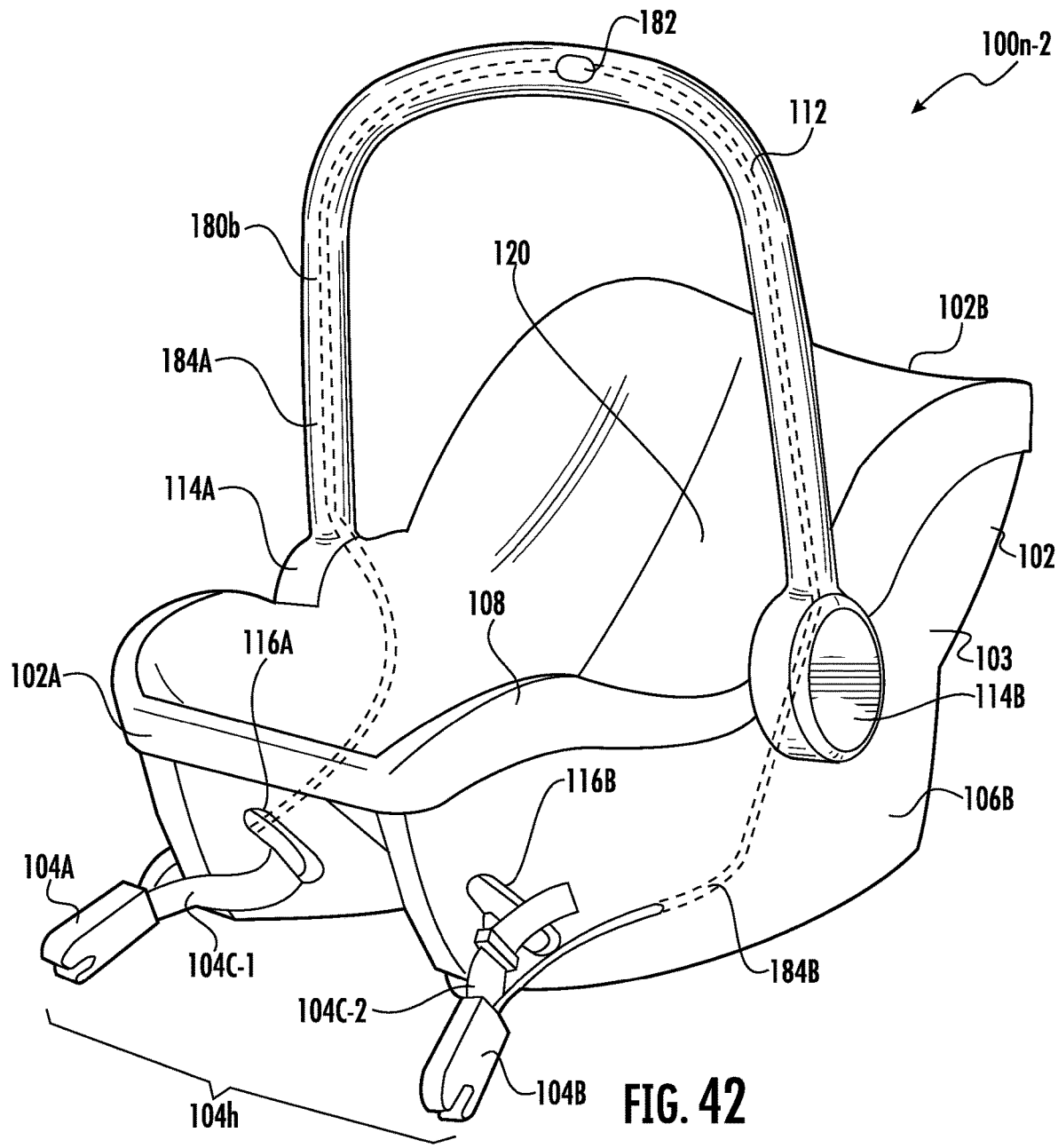
FIG. 42 shows an exemplary infant car seat system with a belted anchor system and a release actuator mounted to the carrying handle of the infant car seat.

FIG. 42 shows another exemplary infant car seat system 100n-2 that incorporates the release actuator 180b in the infant car seat system 100c-2 and the belted anchor system 1004h. The release actuator 180b may operate in the same manner as the release actuator 180a in the infant car seat system 100n-1 where the cables 184A and 184B may be directly coupled to the latches 130 of the seat anchors 104A and 104B and the actuator handle 182. The cables 184A and 184B may once again be routed through the carrying handle 112 and provided with sufficient play to accommodate changes to the rotational position of the carrying handle 112.

Figure 43:
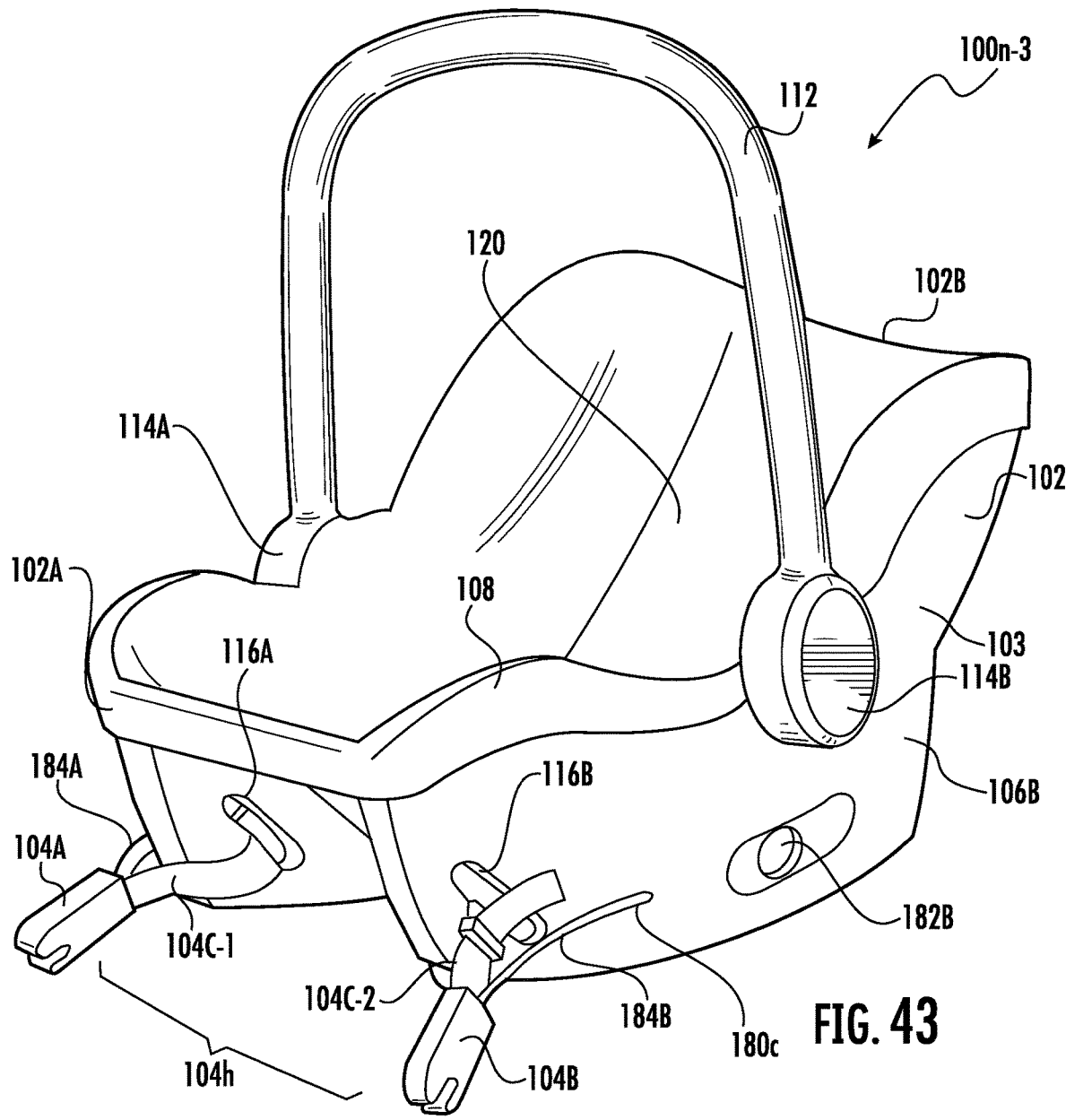
FIG. 43 shows an exemplary infant car seat system with a belted anchor system and a release actuator mounted to the side of the infant car seat.

FIG. 43 shows another exemplary infant car seat system 100n-3 with a release actuator 180c coupled to the belted anchor system 104h. In this implementation, the release actuator 180c may include two actuator handles to release the seat anchors 104A and 104B separately. As shown, the actuator handle 182B may be disposed on the side of the seat shell rail 106B and coupled to the cable 184B. In some implementations, the actuator handle 182B may be configured to be a sliding mechanism in which the parent and/or the caregiver should slide the handle 182B in order to release the seat anchor 104B. However, it should be appreciated the actuator handle 182B may also be configured to be a push/pull mechanism or a twist mechanism. The cable 184A may be connected to a similar actuator handle on the seat shell rail 106A. In some implementations, the cables 184A and 184B may be routed such that the handle 182B may release both the seat anchors 104A and 104B at the same time.

Figure 44:
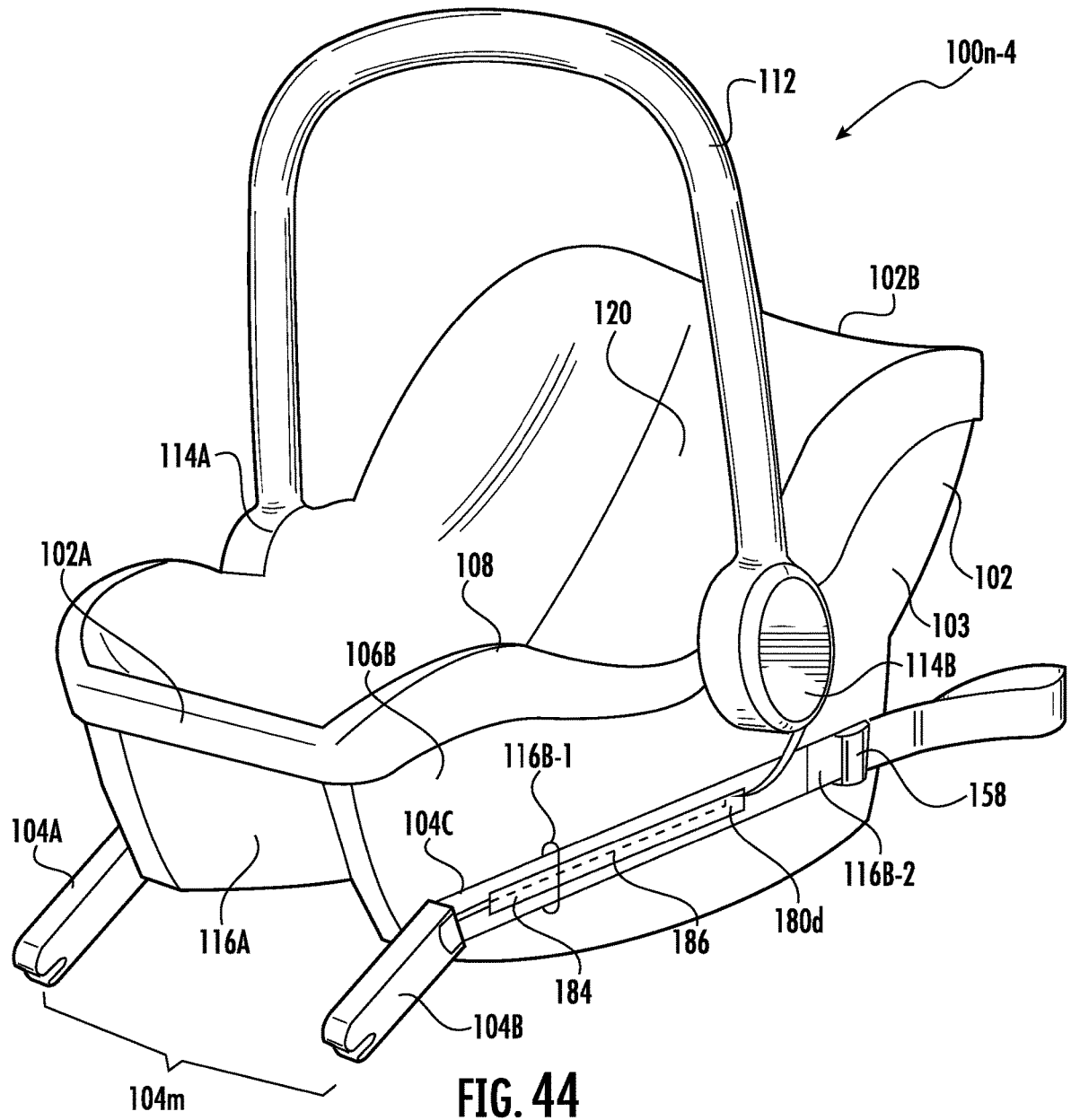
FIG. 44 shows an exemplary infant car seat system with a belted anchor system corresponding to the infant car seat system of FIG. 33 and a release actuator with a cable routed inside the webbing of a belt in the anchor system.

In some implementations, a release actuator may be integrated together with a belt tightening mechanism. For example, FIG. 44 shows another exemplary infant car seat system 100n-4 with a release actuator 180d and a belted anchor system 104m that includes an in-line cam lock 158. As shown, the cable 184 of the release actuator 180d may be routed through a webbing 186 on the belt 104C (e.g., through a webbing section disposed on the belt 104C) and then partially routed through the infant car seat 102 to an actuator handle (not shown). The cable 184 may thus move together with the belt 104C when the belt 104C is tightened. In this manner, the likelihood of an inadvertent release of the seat anchor 104B caused by the displacement of the belt 104B may be substantially reduced.

Figure 45:
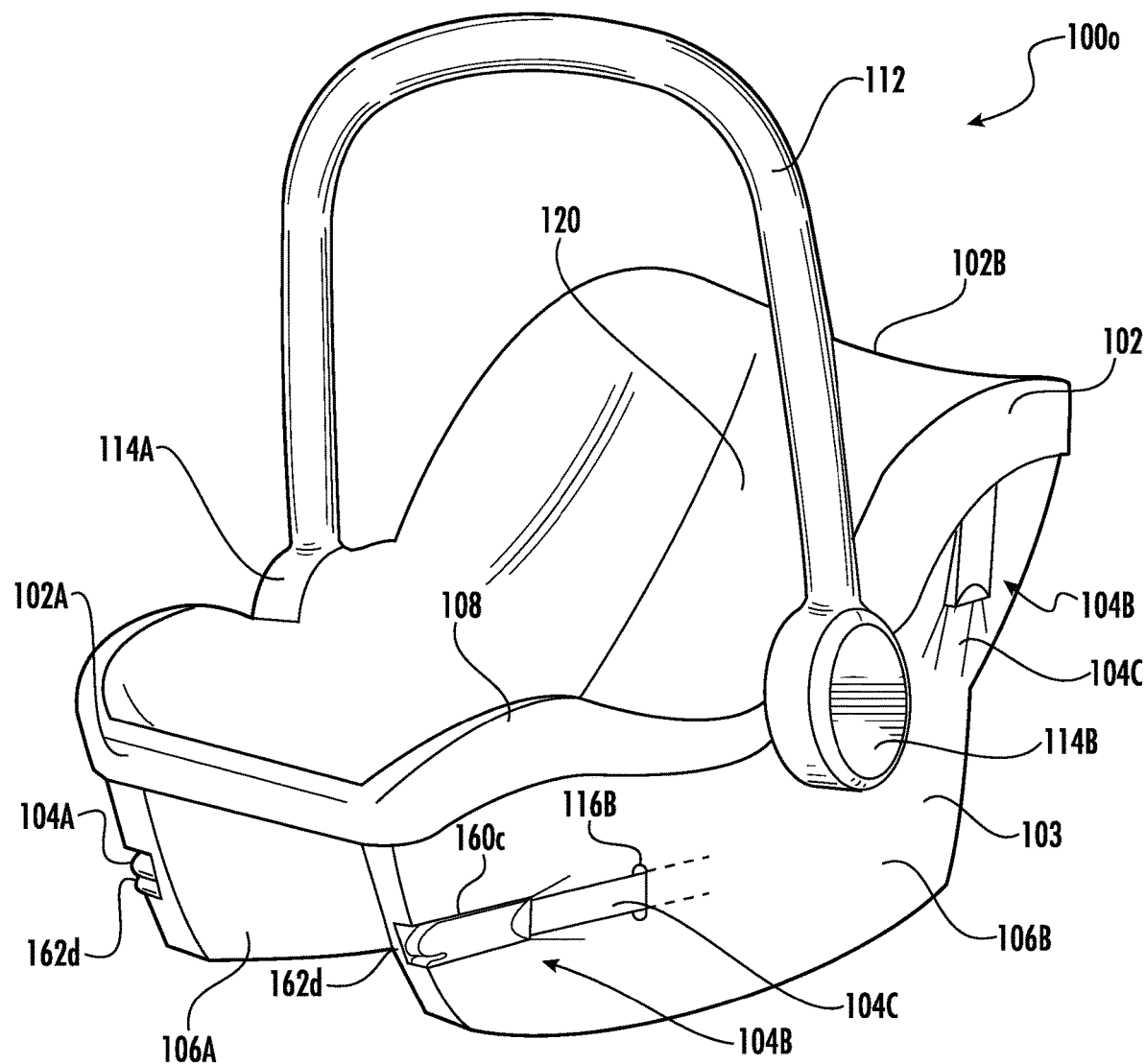
FIG. 45 shows an exemplary infant car seat system with a belted anchor system and side storage compartments in the infant car seat to store the seat anchors in the anchor system.

An Infant Car Seat System with a Belted Anchor System and a Storage Compartment An infant car seat system with a belted anchor system may also include one or more storage compartments 160 to store the seat anchors 104A and 104B and/or portions of the belt 104C. For example, FIG. 45 shows an exemplary infant car seat system 100o that includes storage compartments 160c disposed in the rocker cavities 118A and 118B of the seat shell rails 106A and 106B to store the seat anchors 104A and 104B. As shown, the infant car seat 102 may include openings 162c formed along the front, side portions of the seat shell rails 106A and 106B for the seat anchors 104A and 104B to enter or exit the storage compartments 160c.

The storage compartment 160c may be arranged such that the seat anchors 104A and 104B lie in a substantially horizontal orientation when stored. In some implementations, the seat anchor 104B (or the seat anchor 104A) may be coupled to the belt 104C, which is routed through an opening 116B on the seat shell rail 106B. Thus, the belt 104C may be partially disposed within the infant car seat 102. The belt 104C may also be routed through the storage compartment 160c such that the belt 104C moves through the storage compartment 160c when displaced. The belt 104C may also be coupled to a belt tightening mechanism (not shown). When the infant car seat system 100o is not attached to a vehicle seat, the actuation of the belt tightening mechanism may cause the belt 104C to pull the seat anchor 104B into the storage compartment 160c. For deployment, the belt tightening mechanism may include a release mechanism that allows the parent and/or the caregiver to pull the seat anchor 104B along with the belt 104C out from the storage compartment 160c.

Figure 46:
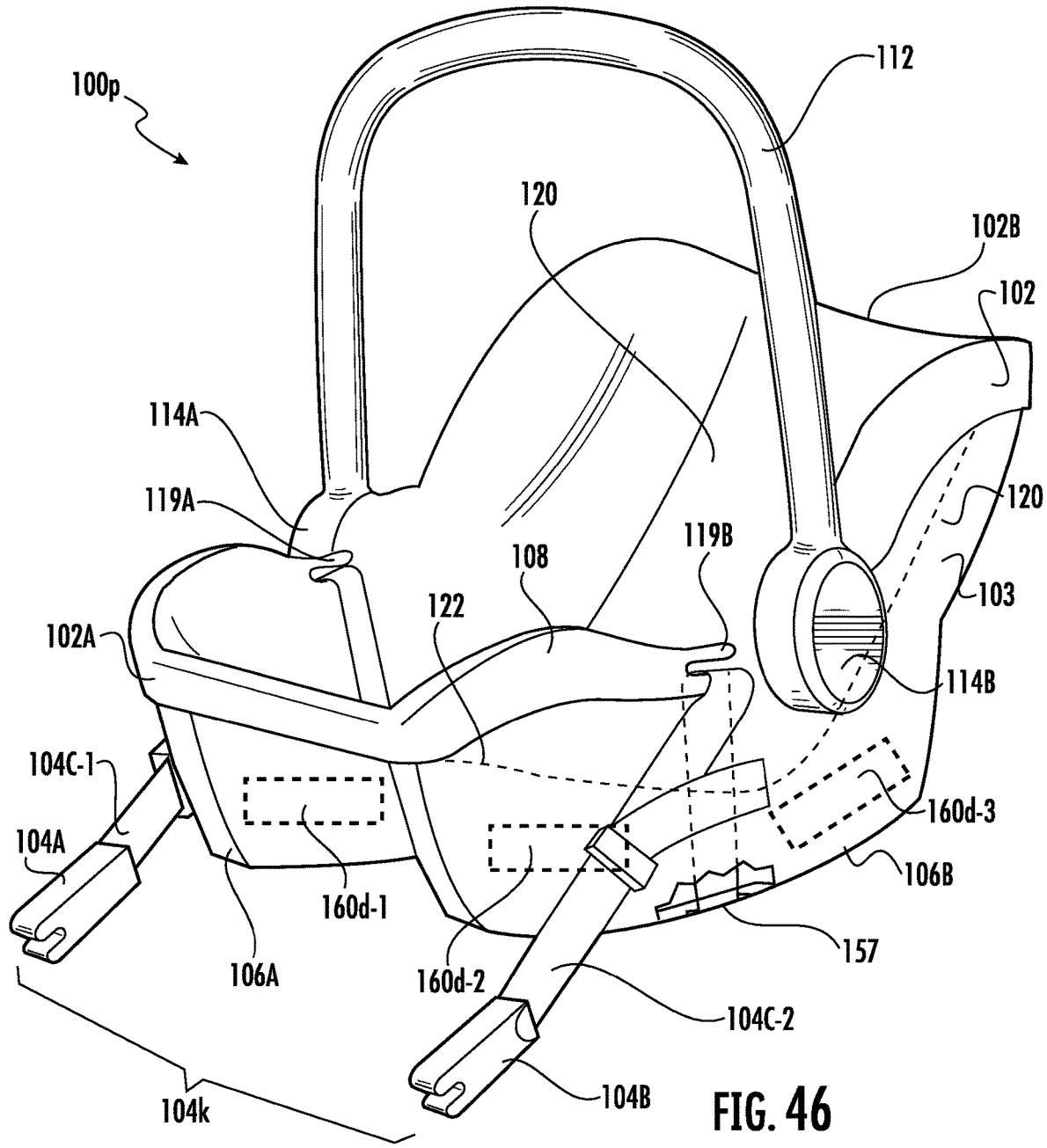
FIG. 46 shows an exemplary infant car seat system with a belted anchor system and storage compartments located in a rocker cavity of the infant car seat to store the seat anchors in the anchor system.

FIG. 46 shows another exemplary infant car seat system 100p with several storage compartments 160d-1, 160d-2, and/or 160d-3 and the belted anchor system 104k. The storage compartments 160d-1, 160d-2, and/or 160d-3 may be located within the rocker cavities 118A and 118B defined by the seat shell rails 104A and 104B. In this implementation, the parent and/or the caregiver may store the seat anchors 104A and 104B by loosening the belts 104C-1 and 104C-2, which, in some instances, may include decoupling the belts 104C-1 and 104C-2 from the belt hooks 119A and 119B, and placing the seat anchors 104A and 104B over the seat rim 108 and into the storage compartments 160d-1, 160d-2, and/or 160d-3. When stored, the seat anchors 104A and 104B (along with the belts 104C-1 and 104C-2) may be placed under the seat pad (not shown).

Figure 47:
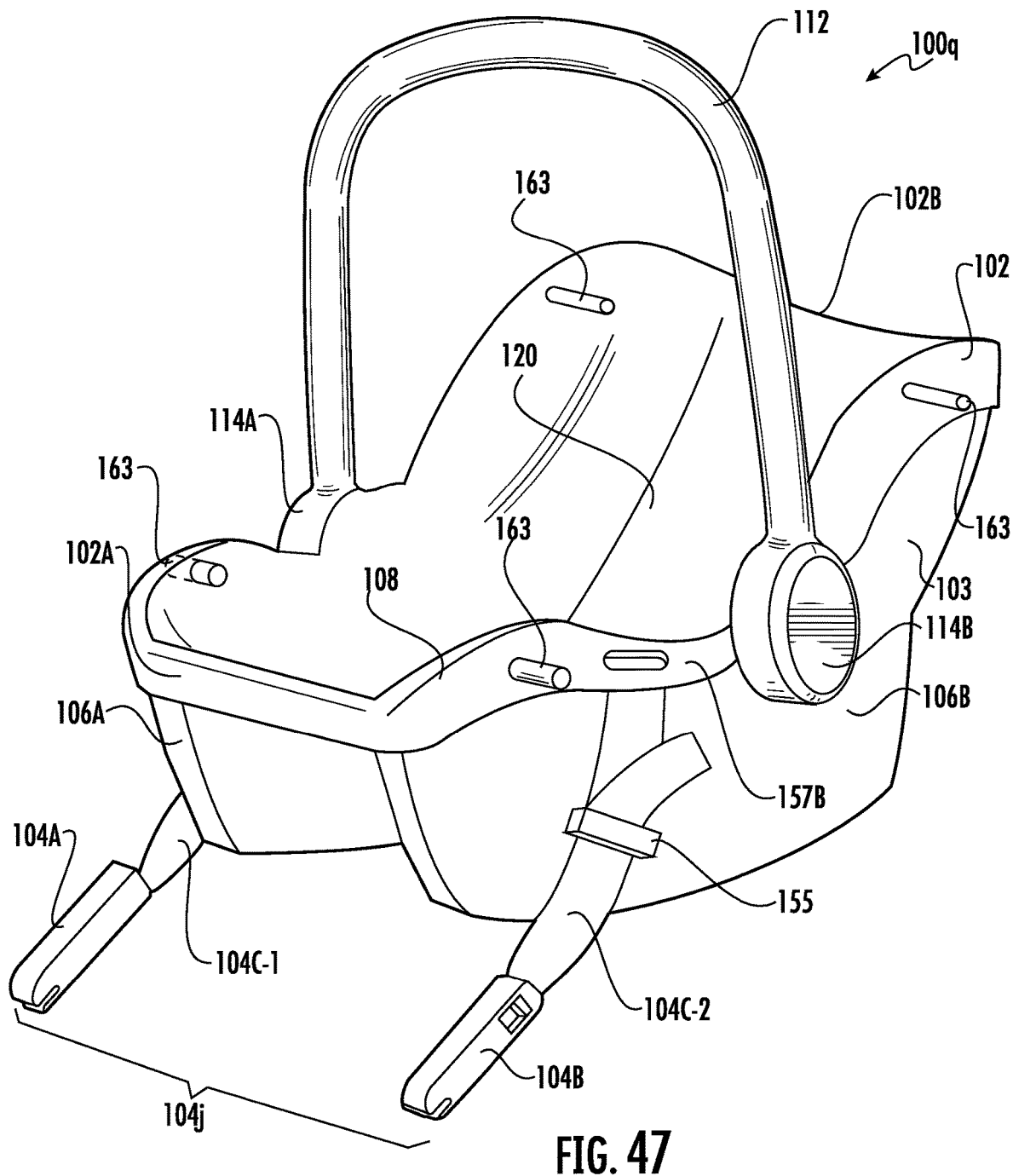
FIG. 47 shows an exemplary infant car seat system with a belted anchor system and one or more pins disposed on the sides exterior side of the infant car seat to store the seat anchors in the anchor system.

FIG. 47 shows another exemplary infant car seat system 100q with multiple pins 163 disposed along the exterior of the infant car seat 102 for storage and the belted anchor system 104j. As shown, the pins 163 may protrude outwards from the seat rim 108. When storing the seat anchors 104A and 104B, the parent and/or the caregiver may latch the seat anchors 104A and 104B onto one of the pins 163 so that the seat anchors 104A and 104B and the belts 104C-1 and 104C-2 don't dangle from the infant car seat 102.

In some implementations, the seat anchors 104A and 104B may be loosely hooked onto the pins 163 such that the seat anchors 104A and 104B are rotatably movable with respect to the pins 163. In some implementations, the seat anchors 104A and 104B may be securely attached to the pins 163 such that the seat anchors 104A and 104B are not translationally or rotationally movable relative to the infant car seat 102. Additionally, the pins 163 may also be disposed on the exterior sides of the seat shell 103 and/or the seat shell rails 106A and 106B as well as the interior sides of the seat shell rails 106A and 106B (i.e., the space below the seat pan 122).

Figure 48:
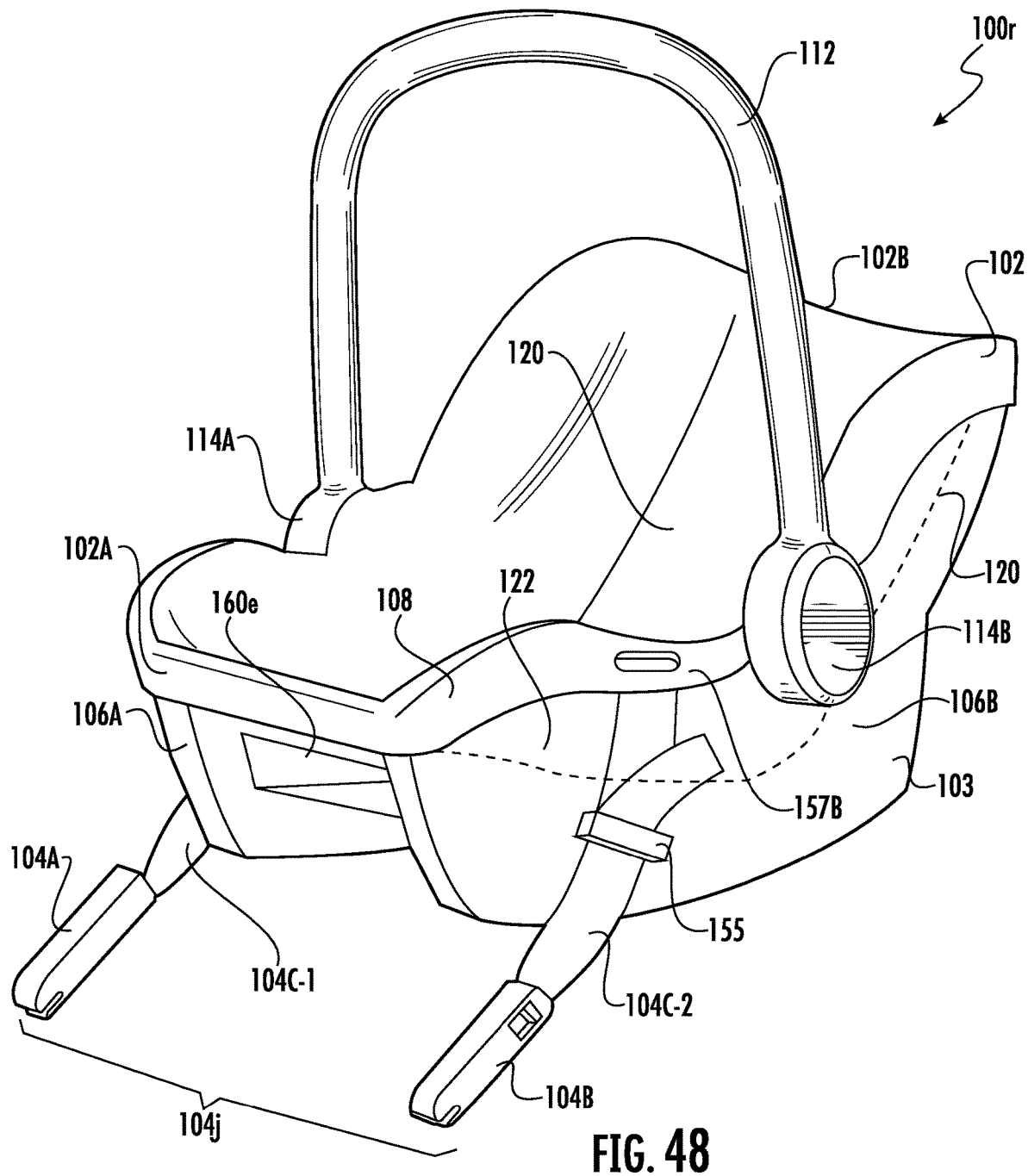
FIG. 48 shows an exemplary infant car seat system with a belted anchor system and a front storage compartment located below the seat pan and between respective seat shell rails to store the seat anchors in the anchor system.

FIG. 48 shows another exemplary infant car seat system 100r with a storage compartment 160e disposed below the seat pan 122 and between the seat shell rails 106A and 106B. As shown, the infant car seat system 100r may include the belted anchor system 104j. In this implementation, the storage compartment 160e may provide a space located near the frontside 102A of the infant car seat 102 with an opening that allows the seat anchors 104A and 104B to be manually placed into the storage compartment 160e along with portions of the belts 104C-1 and 104C-2.

Figure 49:
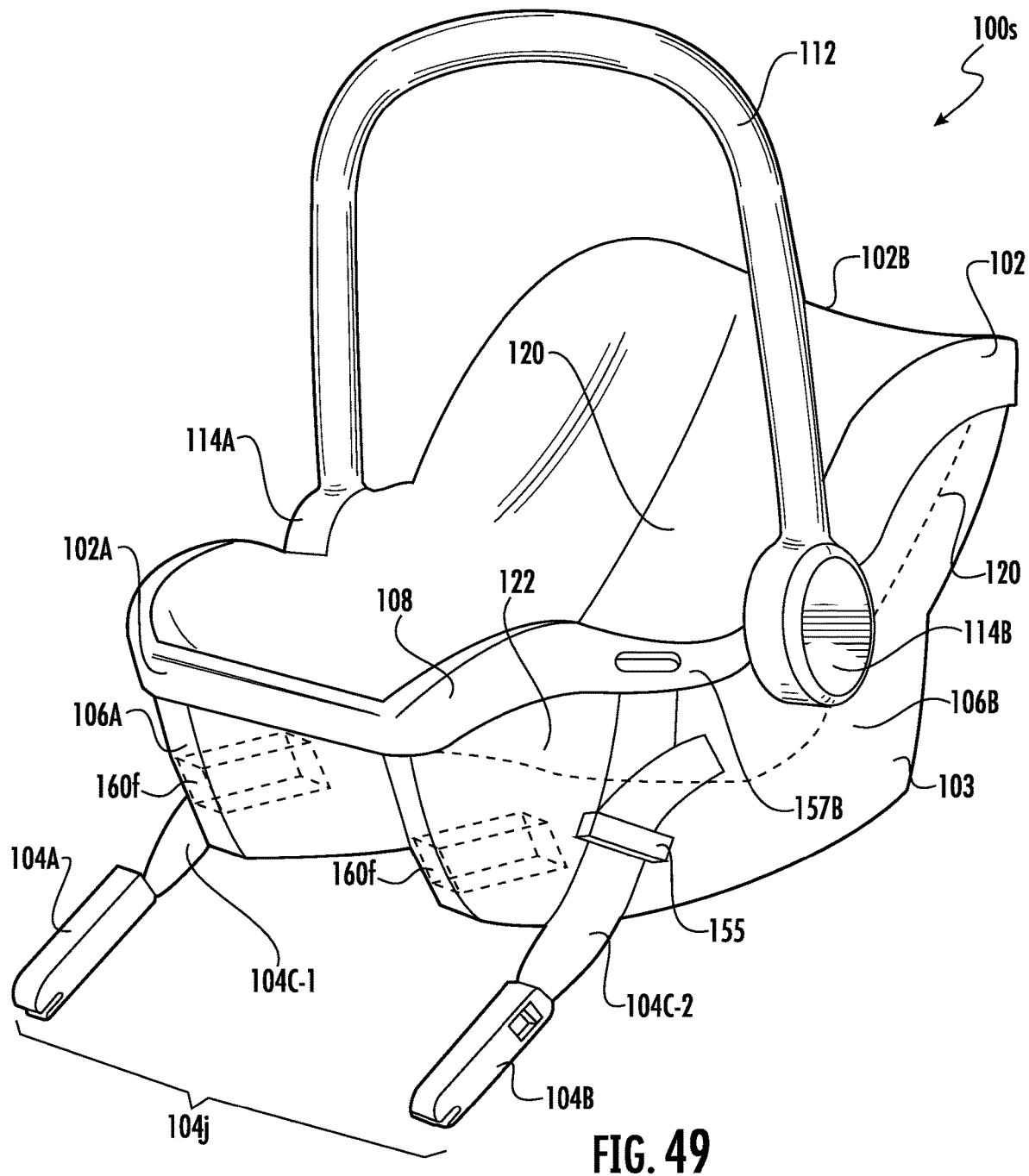

FIG. 49 shows another exemplary infant car seat system 100s with storage compartments 160f that are shaped and arranged similar to the storage compartments 160b in the infant car seat system 100f-1 and 100f-2. As shown, the storage compartments 160f may be disposed within a front portion of the rocker cavities 118A and 118B of the seat shell rails 106A and 106B. Openings on the front sides of the seat shell rails 106A and 106B may provide entry for the seat anchors 104A and 104B to be placed into the storage compartments 160f.

An Infant Car Seat System with an Adjustment Foot

As described above, the shape, orientation, and overall arrangement of the vehicle seat 50 may vary between different types of seats and/or different vehicles. This variability typically makes it challenging to install a conventional infant car seat system with a secure and tight fit. For the infant car seat system described herein, the infant car seat 102 may also have curved rocker bottoms 107A and 107B, which creates an unstable platform (e.g., the infant car seat 102 tends to rock back and forth) that may make installation even more challenging.

Figure 50:
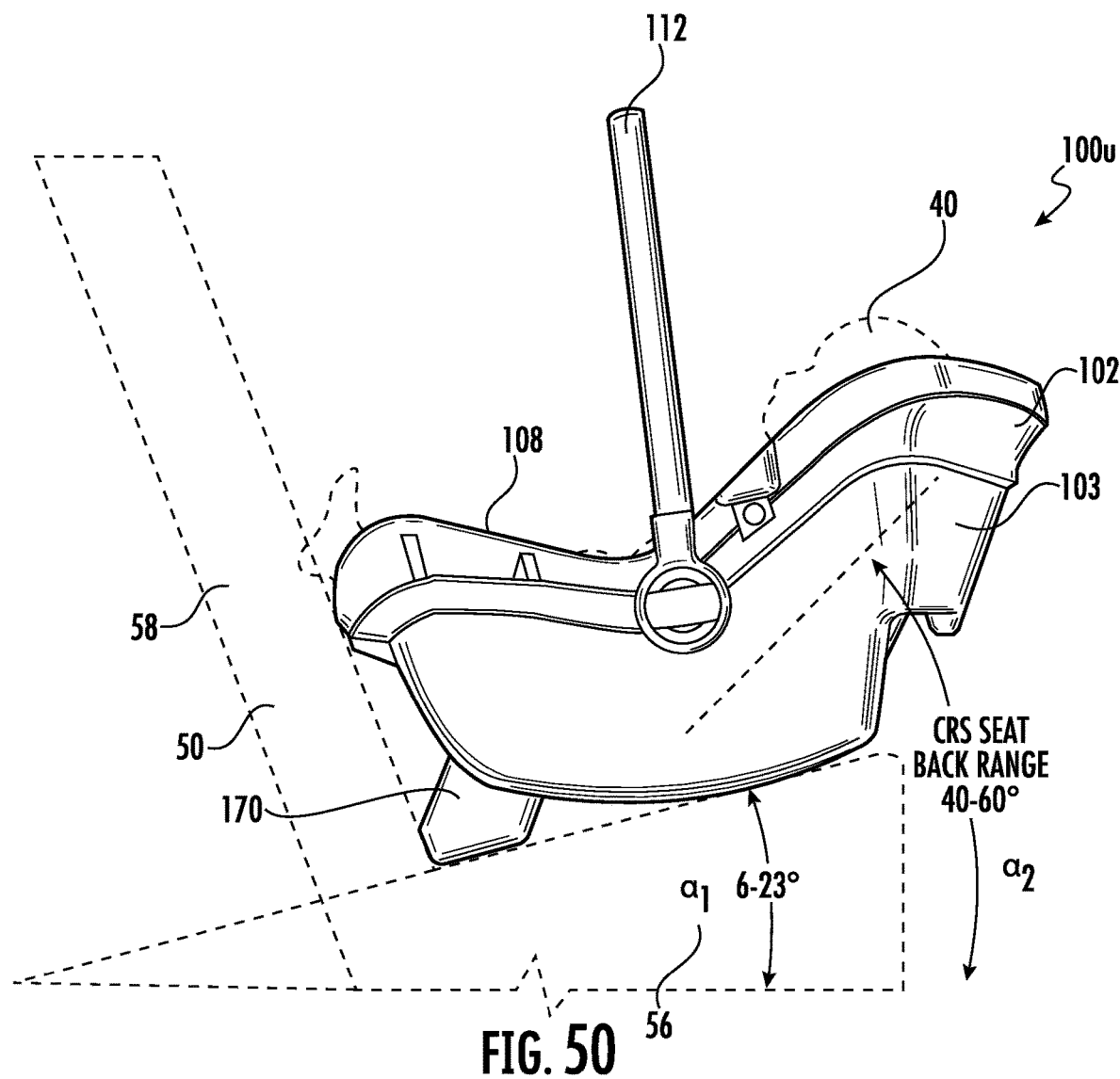

In order to accommodate different vehicle seats 50 and an infant car seat 102 with curved rocker bottoms 107A and 107B, the infant car seat system 100 may include an adjustment foot 170 to modify the recline angle of the infant car seat 102. For example, FIG. 50 shows an exemplary infant car seat system 100u where the infant car seat 102 includes an adjustment foot 170 disposed along the front, bottom portions of the seat shell 103. As shown, the seat pan angle, $\alpha_1$, of the vehicle seat pan 56 may generally vary between 6 degrees and 23 degrees relative to horizontal. Furthermore, the seat back 120 of the infant car seat 102 should preferably be oriented at a recline angle, $\alpha_2$, between about 40 degrees and about 60 degrees relative to horizontal to ensure the safety and comfort of the infant 40.

The adjustment foot 170 may work in tandem with the curved bottom rockers 107A and 107B to provide a stable platform for the infant car seat 102 to rest on the vehicle seat 50, particularly during the process of installing the infant car seat in the vehicle. In some implementations, the adjustment foot 170 may be shaped and/or adjusted to abut the vehicle seat back 58 and/or the vehicle seat pan 56 to generally provide leverage against the seat pan and/or seat back of the vehicle seat and thereby facilitate a tight and secure fit of the infant car seat to the vehicle seat (e.g., an installation that passes the CPS "inch test"). To accommodate variations in the seat pan angle, $\alpha_1$, the position and/or orientation of the adjustment foot 170 relative to the infant car seat 102 may be adjustable to change the recline angle, $\alpha_2$, accordingly. The adjustment foot 170 may further include an integrated positioning mechanism to ensure the desired recline angle is maintained once set by the parent and/or the caregiver.

The adjustment foot 170 may be integrated into the infant car seat system 100 in several ways. For example, FIGS.

52A and 52B show an exemplary infant car seat system 100u-1 with a telescopic adjustment foot 170a. As shown, the adjustment foot 170a may include a base 172 that is mounted to the infant car seat 102 and a foot 174 that is telescopically slidable with respect to the base 172 (e.g., to vary an overall height dimension of the adjustment foot). The base 172 and the foot 174 may be disposed between the seat shell rails 106A and 106B and located near the frontside 102A of the infant car seat 102 to balance the contact between the vehicle seat 50 and the curved bottom rockers 107A and 107B, which typically occurs towards the backside 102B of the infant car seat 102.

The base 172 may be oriented such that foot 174 moves along a translation axis 171. By retracting and/or extending the foot 174 from the base 172, the recline angle, $\alpha_2$, may be increased or decreased, respectively.

The base 172 may further include a positioning mechanism 176 to lock the position of the foot 174 with respect to the base 172. In some implementations, the positioning mechanism 176 may include a ratcheting mechanism that defines a discrete set of positions for the foot 174 to be set and maintained in relation to the base 172. The positioning mechanism 176 may also be actuated in several ways including, but not limited to a push button, a rotatable knob, and a sliding mechanism. Thus, a parent and/or a caregiver may actuate the positioning mechanism 176 to unlock the foot 174, which then allows the position of the foot 174 to be adjusted accordingly. Once the desired position of the foot 174 is set, the parent and/or the caregiver may release the positioning mechanism 176 to lock the foot 174 in place.

Figure 51A:
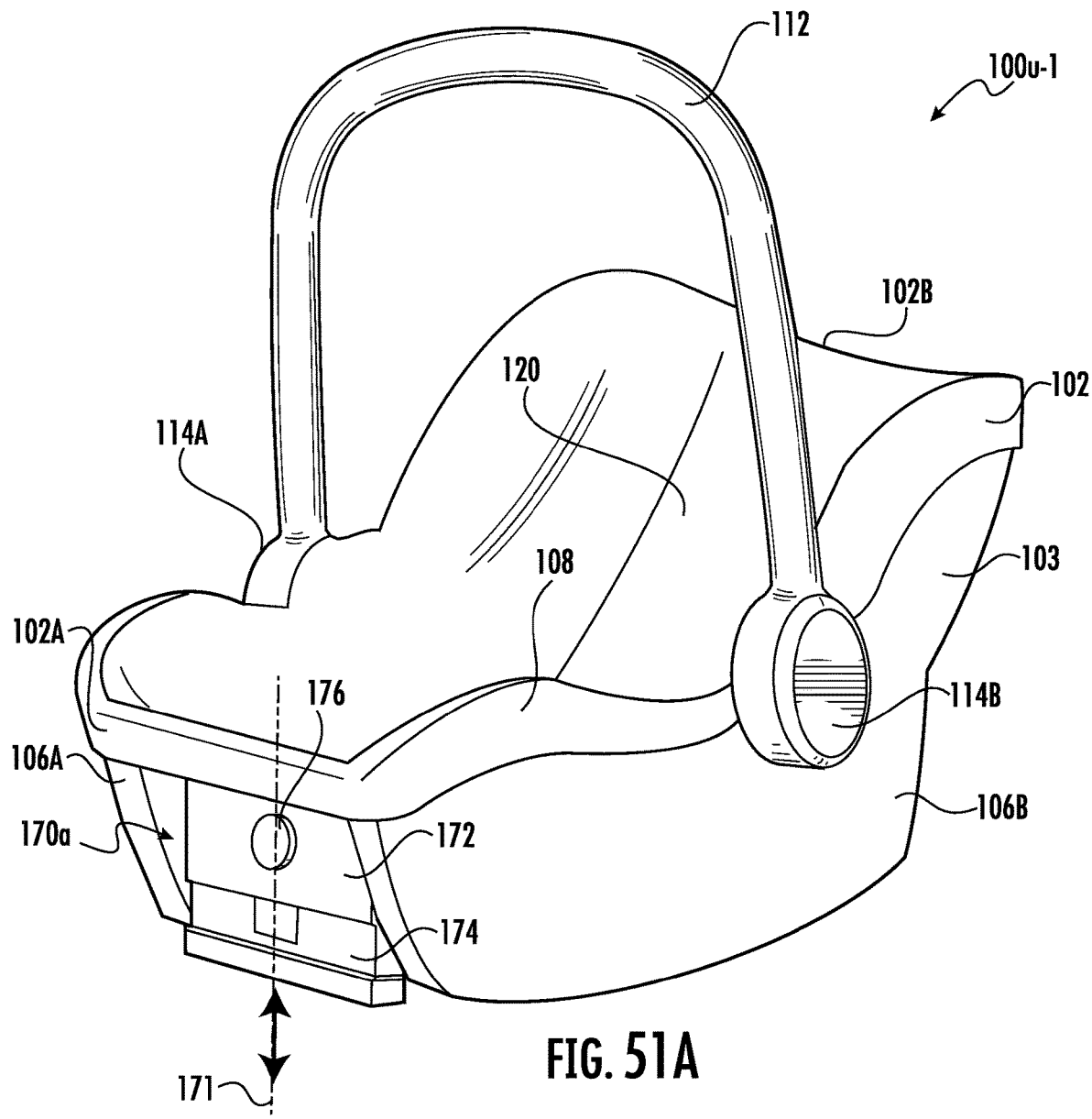
Figure 51B:
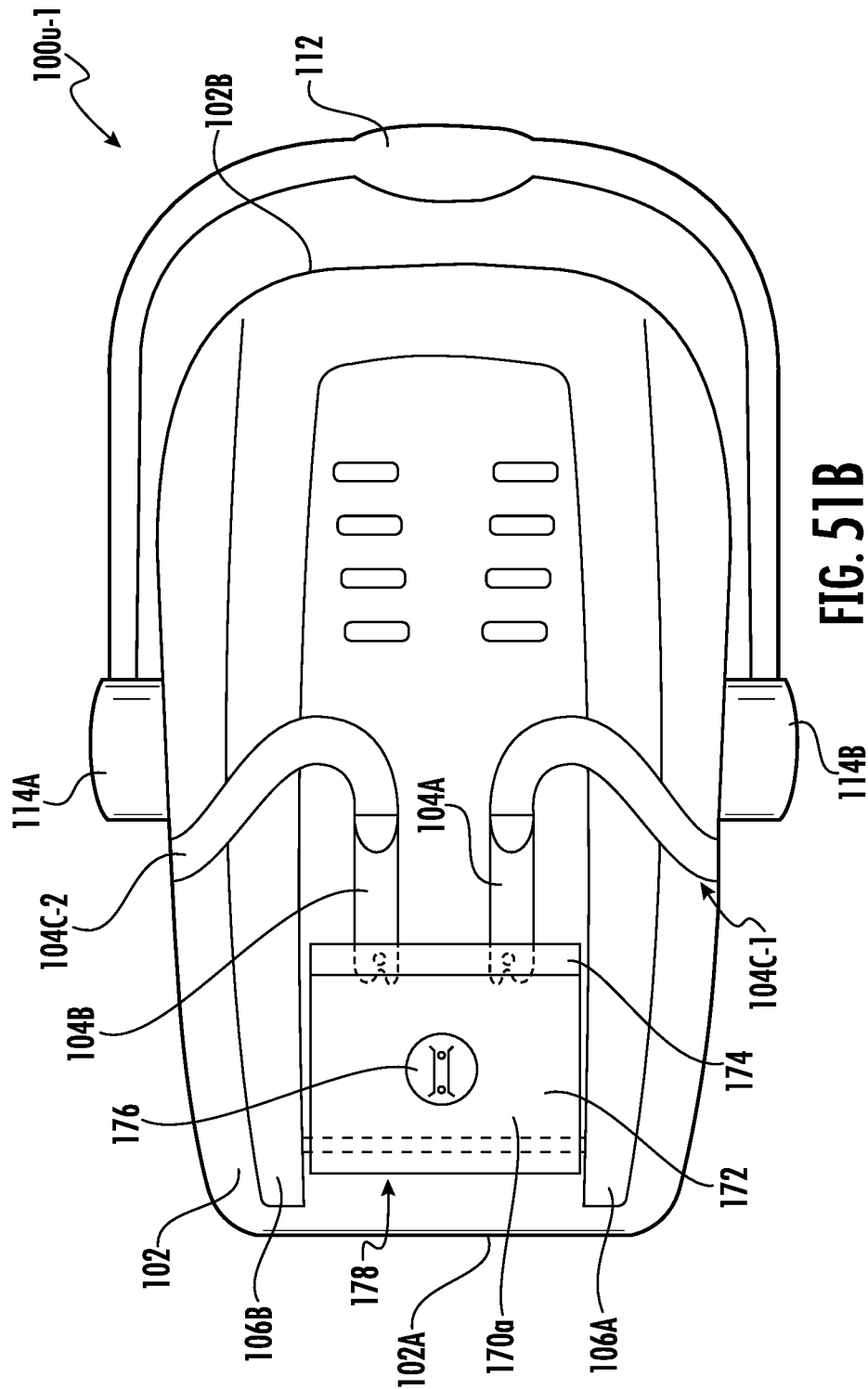

In some implementations, the adjustment foot 170a may also be rotatable with respect to the infant car seat 102. In particular, the base 172 may be mounted to the infant car seat 102 via a rod, a tube, or a bar 178 that allows the base 172 and the foot 174 to rotate between a stored position and an operational position. For instance, FIG. 51B shows the adjustment foot 170a in a stored position where the base 172 and the foot 174 lie substantially flush against the bottom of the seat pan 122. In some implementations, the adjustment foot 170a may also form a storage compartment to store the seat anchors 104A and 104B when in the stored position.

Figure 52:
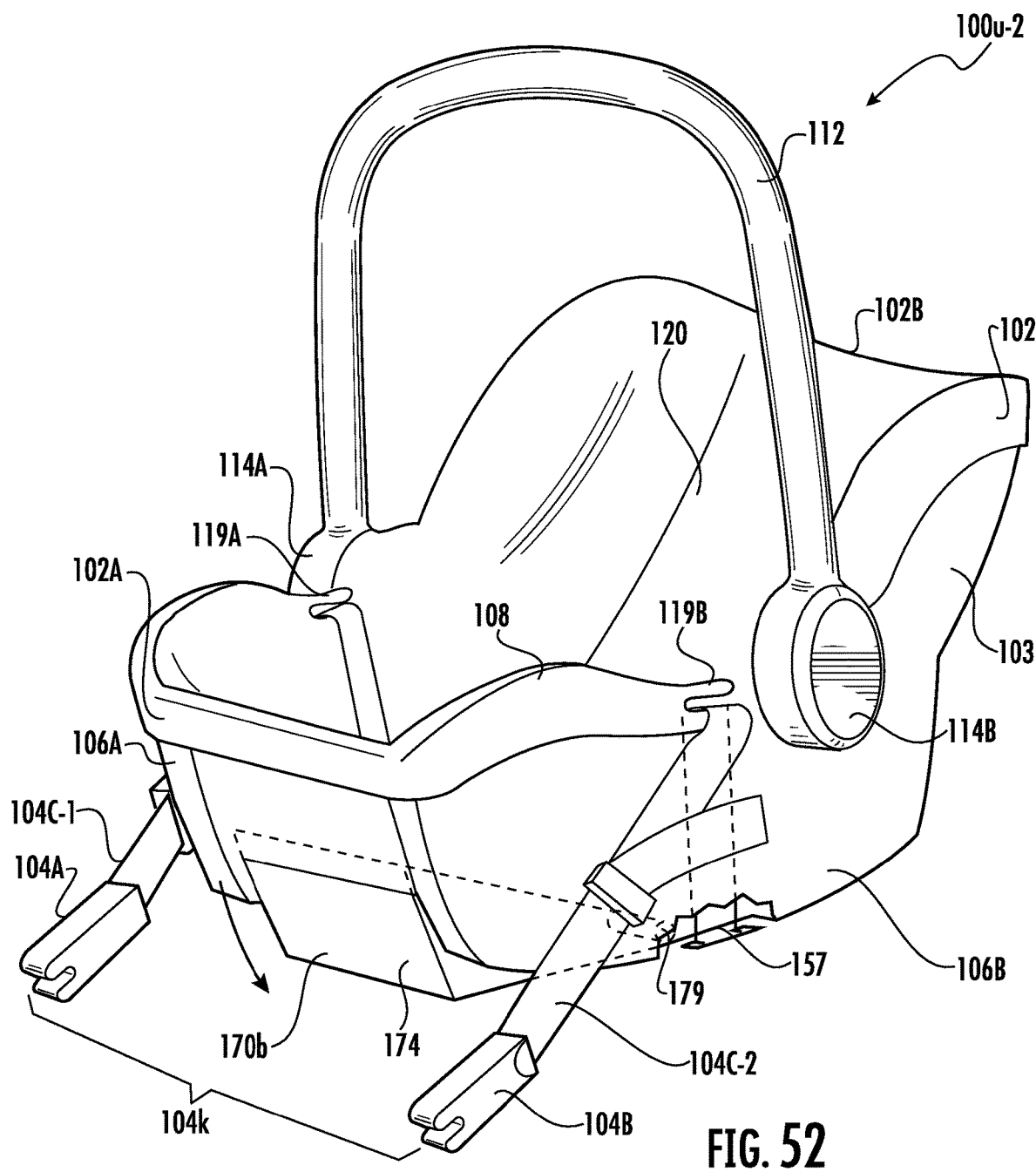

FIG. 52 shows another exemplary infant car seat system 100u-2 with a rotatable adjustment foot 170b and a belted anchor system 104k. As shown, the adjustment foot 170b may include a foot 174 that is configured to rotate about a pivot axis 179 in order to adjust the recline angle, $\alpha_2$. Specifically, the foot 174 may be rotated downwards to decrease the recline angle, $\alpha_2$. In some implementations, the adjustment foot 170b may also include a positioning mechanism (not shown) to maintain the foot 174 at set angles relative to the infant car seat 102. Similar to the adjustment foot 170a, the positioning mechanism in the adjustment foot 170b may be manually actuated to allow the parent and/or the caregiver to adjust the rotational position of the foot 174 as desired.

An Infant Car Seat System with a Rocker Foot

As described above, the infant car seat 102 may include seat shell rails 106A and 106B with curved bottom rockers 107A and 107B, which may create an unstable platform for the infant car seat 102 when placed onto the vehicle seat 50. In addition to integrating an adjustment foot 170, the infant car seat system 100 may simply incorporate seat shell rails 102 with a flat bottom side instead of the curved bottom rockers 107A and 107B. However, this approach eliminates the rocking functionality of the infant car seat 102.

Figure 53:
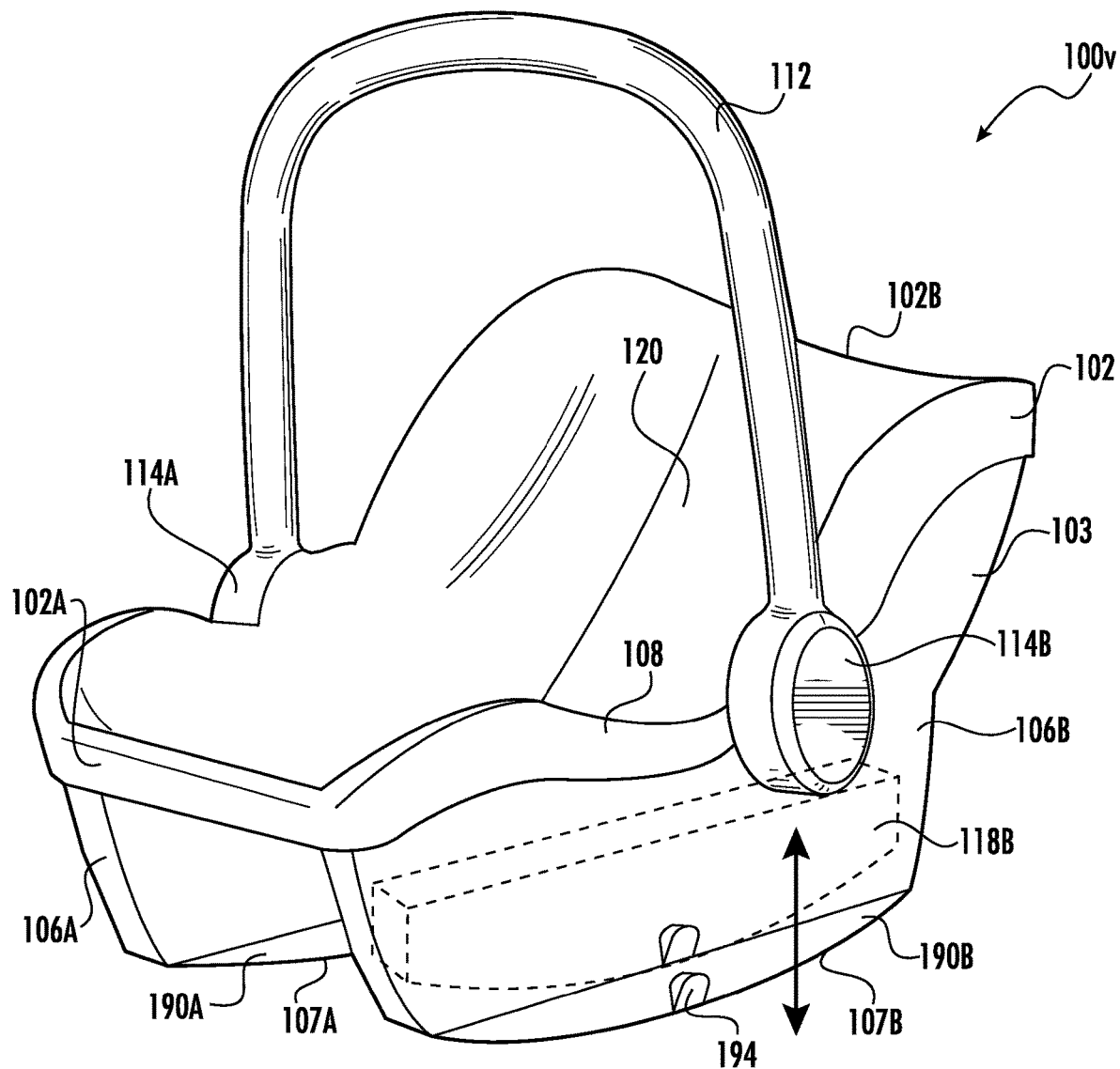

In some implementations, the infant car seat 102 may be configured to provide both rocking functionality and a flat platform by incorporating a retractable rocker foot. For example, FIG. 53 shows an exemplary infant car seat system 100v with pop out rocker feet 190A and 190B, respectively disposed within the seat shell rails 106A and 106B, to provide the curved rocker bottoms 107A and 107B. As shown in FIG. 53, the pop out rocker foot 190B may be a retractable and disposed within the rocker cavity 118B when not in use (the seat shell rail 106A may include a similar rocker cavity, not shown in FIG. 53, to store the foot 190A). When deployed, the retractable pop out rocker feet 190A and 190B may extend substantially across the bottom sides of the seat shell rails 106A and 106B, thus providing a curved platform similar to the curved bottom rockers 107A and 107B.

The retractable pop out rocker feet 190A and 190B may be coupled to their corresponding seat shell rails 106A and 106B via a sliding mechanism (e.g., a slot and a rail) that constrains the feet along a desired path (e.g., a substantially vertically-oriented path when the infant car seat 102 is supported by a horizontal surface). The seat shell rails 106A and 106B may have a bottom opening through which the retractable pop up feet 190A and 190B respectively may pass when being deployed and/or stored.

The pop out rocker feet may further include an integrated locking mechanism (not shown) to maintain the feet in either a stored or an operational position. The locking mechanism may be actuated by a tab and/or a button 194. For example, a parent and/or a caregiver may press the tab/button 194 to deploy the pop out rocker feet. For storage, the parent and/or the caregiver may press the tab/button 194 and push the retractable pop out rocker feet 190A and 190B into the corresponding rocker cavities 118A and 118B.

The pop out rocker foot 190A or 190B for each seat shell rail 106A and 106B may be individually actuated as shown in FIG. 53. However, it should be appreciated that in other implementations, the infant car seat 102 may include a pair of pop out rocker feet 190A and 190B that are mechanically coupled such that the feet are deployable and/or storable at the same time by actuating only one tab/button 194.

An Infant Car Seat System with a Mini Seat Base

Figure 1A:
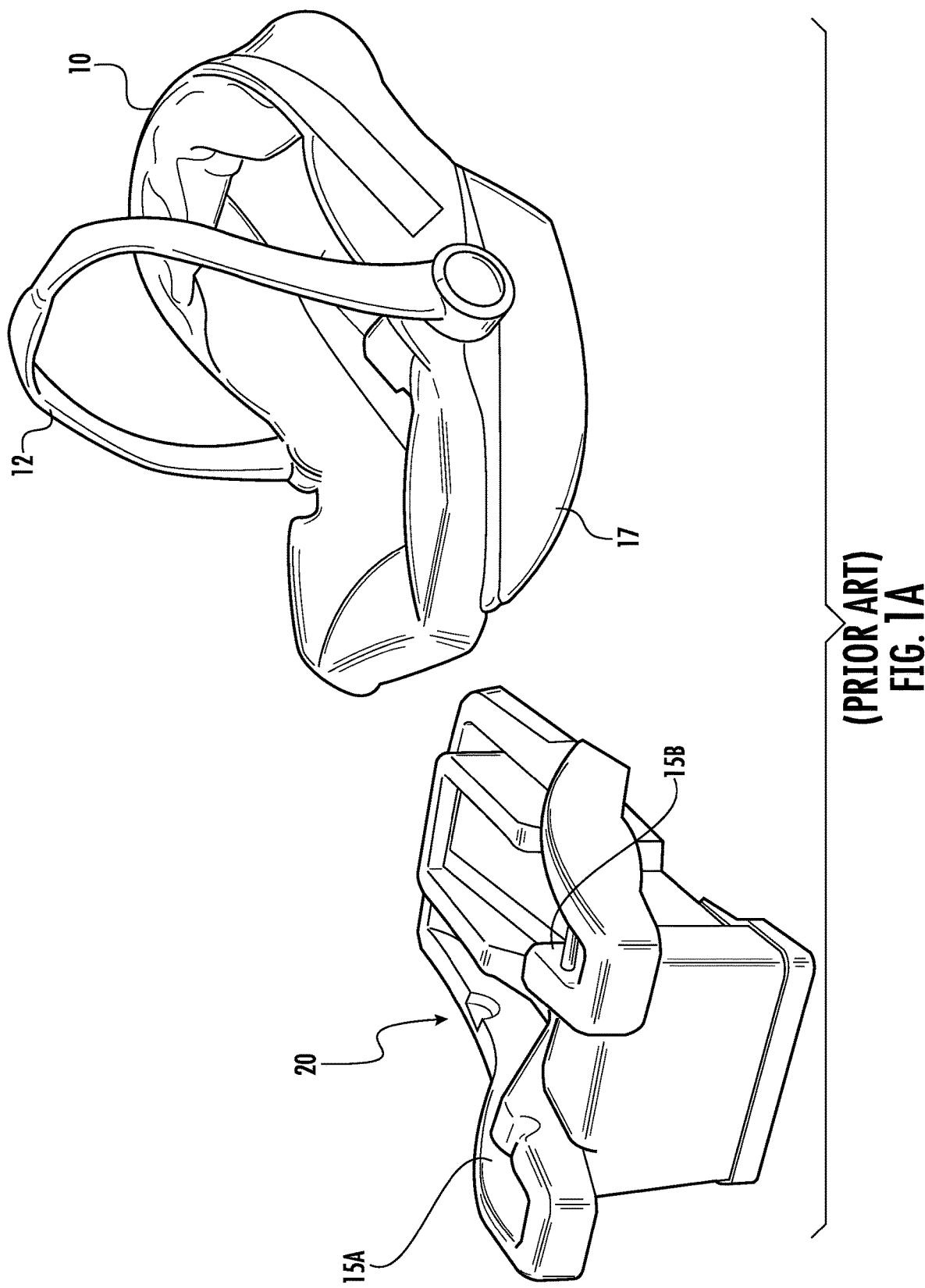
FIG. 1A shows a conventional infant car seat system.
Figure 1B:
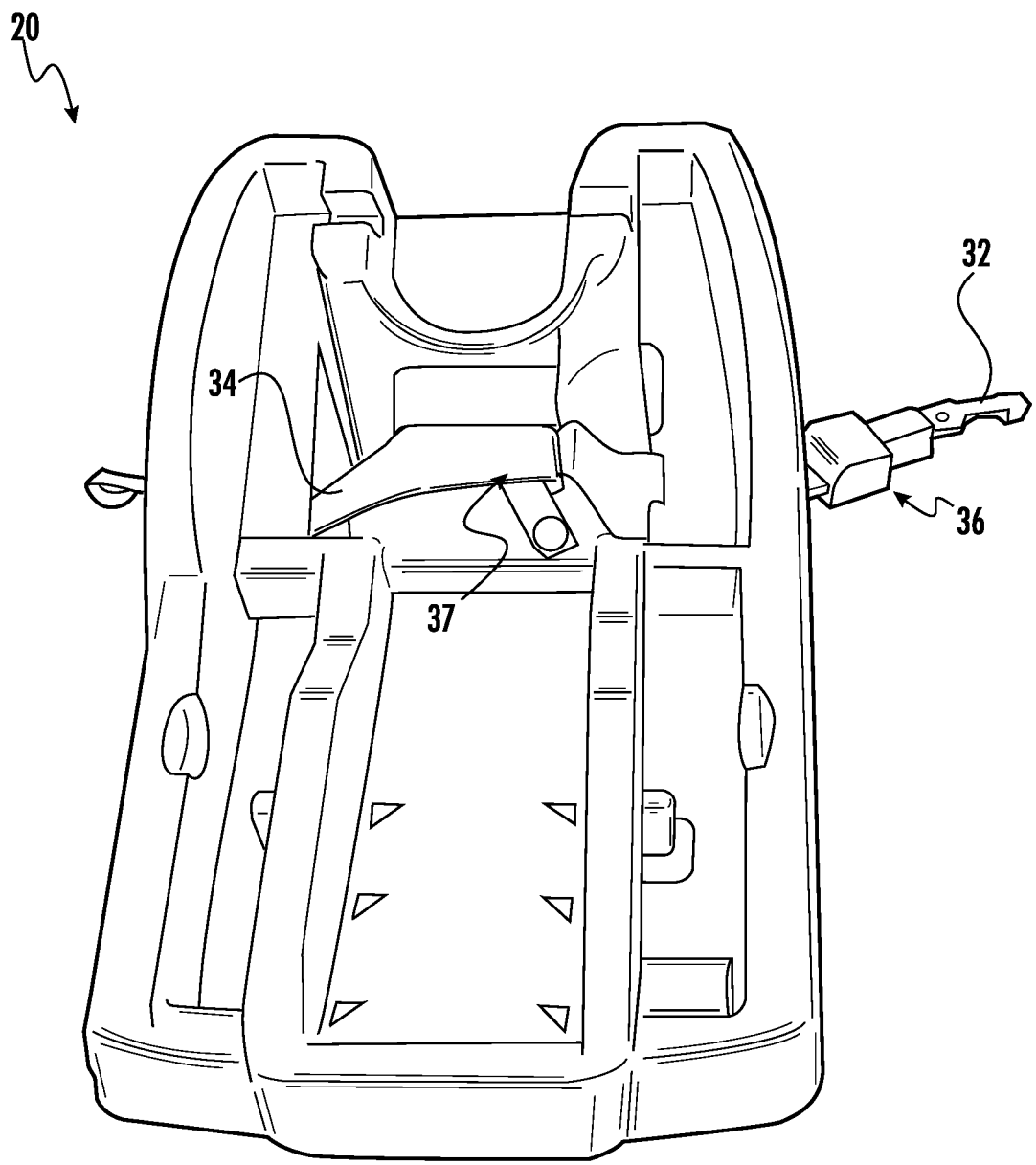
FIG. 1B shows a detachable vehicle installation base of the conventional infant car seat system of FIG. 1A.
Figure 1C:
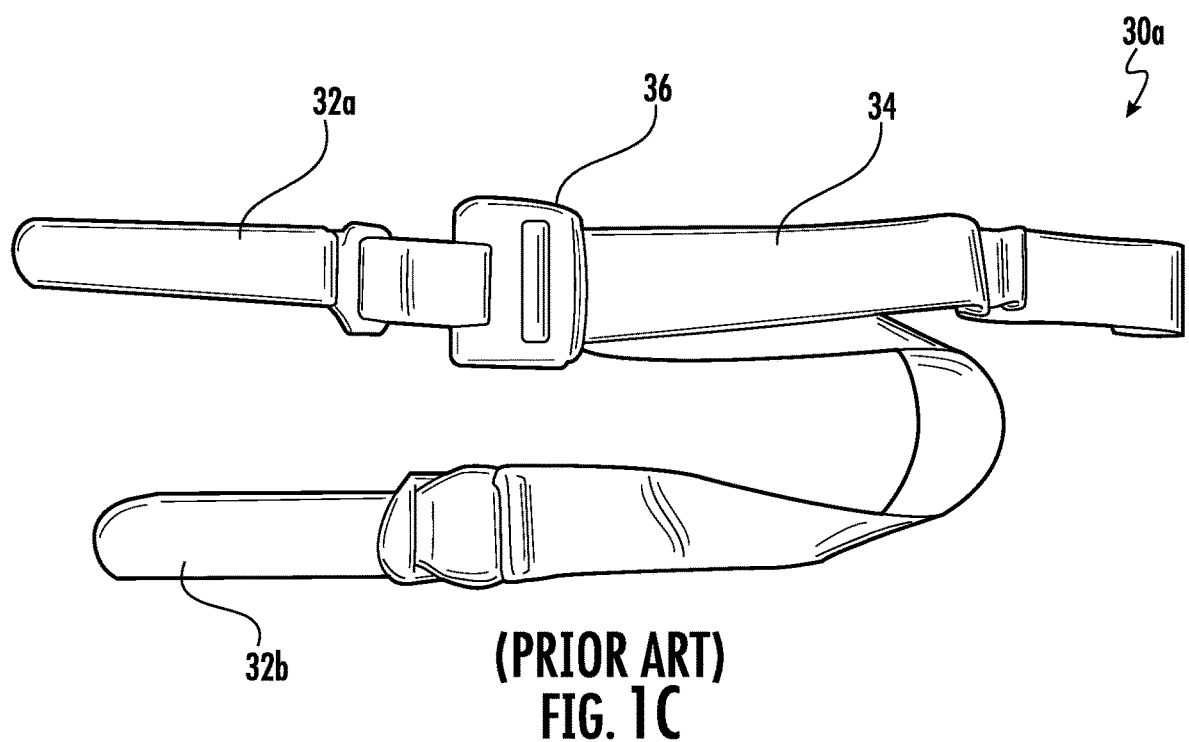
FIG. 1C shows an example of a belt anchor that may be employed in the detachable vehicle installation base shown in FIG. 1B.
Figure 1D:
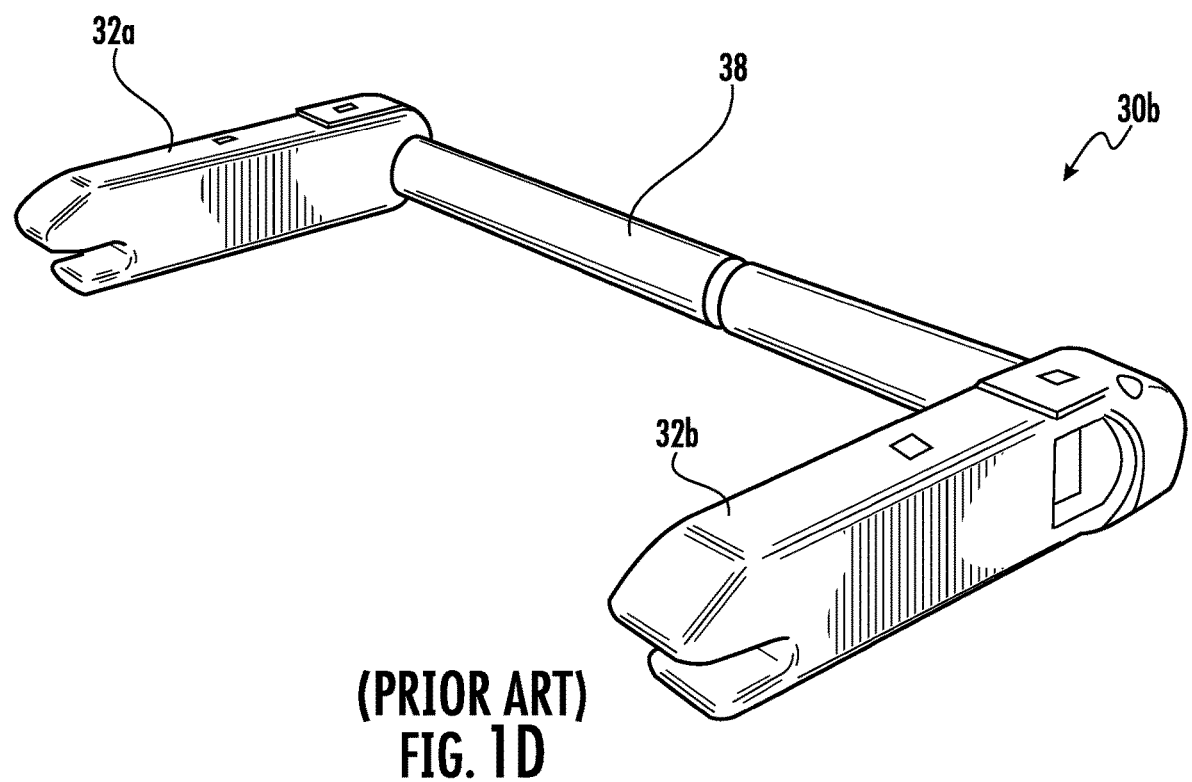
FIG. 1D shows an example of a rigid anchor that may be employed in the detachable vehicle installation base shown in FIG. 1B.
Figure 54:
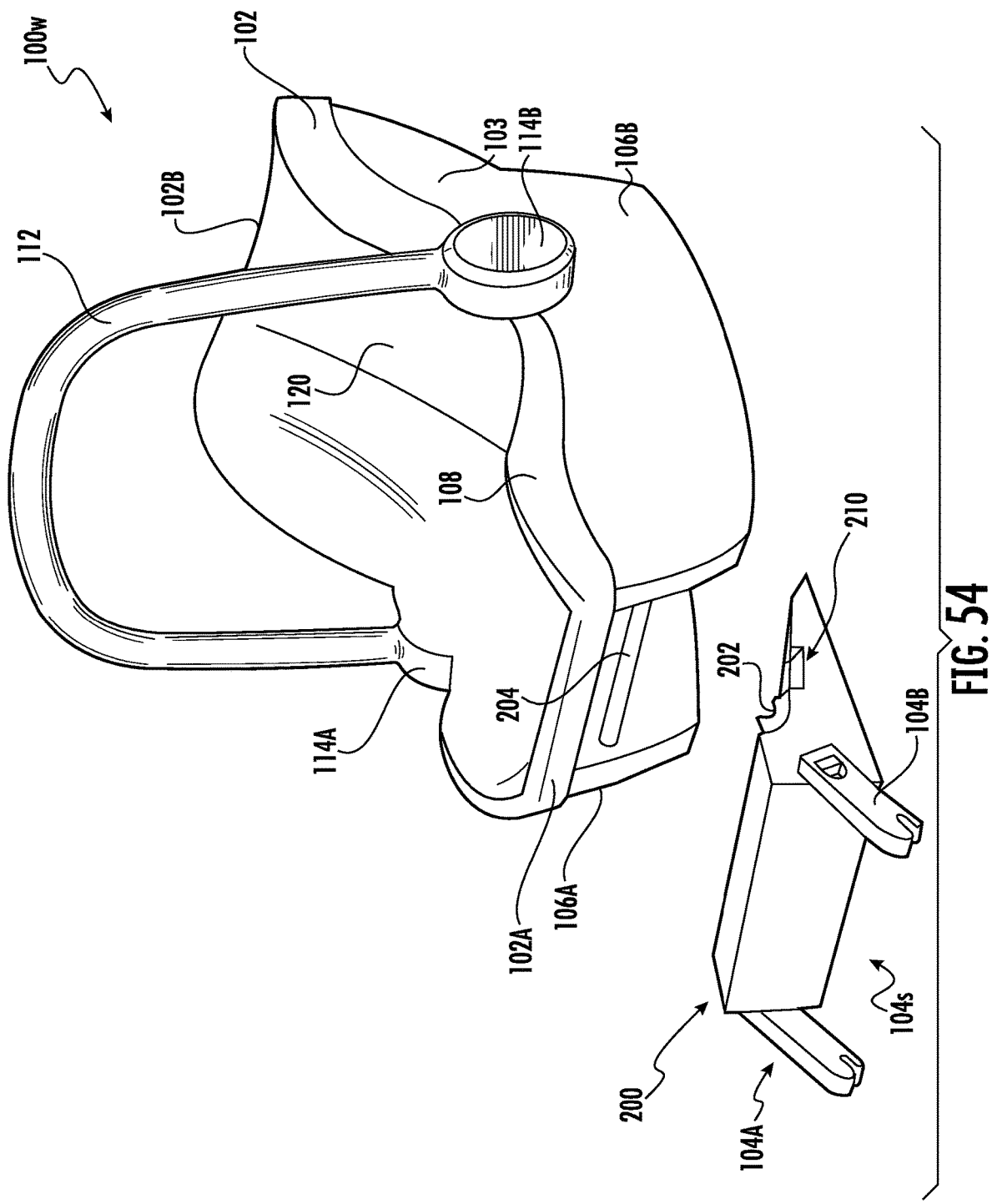

In some implementations, the challenges encountered when using a ride-hailing or ridesharing vehicle with a conventional infant car seat system may be addressed, in part, by using a smaller seat base than the conventional detachable vehicle installation base 20 shown in FIG. 1A. For example, FIG. 54 shows an exemplary infant car seat system 100w with a mini base 200 that is mounted to the vehicle seat 50 and provides a mounting interface to install the infant car seat 102.

As shown, the mini base 200 may include an anchor system 104s where the seat anchors 104A and 104B are mounted directly to the mini base 200 for attachment to the vehicle seat 50. The mini base 200 may also include a belt hook 210 to receive a vehicle seat belt (not shown) so that the vehicle seat belt may also couple the mini base 200 to the vehicle seat 50. The mini base 200 may include an engagement mechanism 202 configured to receive a rod 204 disposed on the infant car seat 102. As shown in FIG. 54, the rod 204 may be disposed between the seat shell rails 106A and 106B and below the seat pan 122.

In some implementations, the engagement mechanism 202 may include a latching mechanism to securely couple the infant car seat 102 to the mini base 200. The mini base 200 and/or the infant car seat 102 may further include a release mechanism (not shown) to release the infant car seat 102 from the mini base 200 when actuated by the parent and/or the caregiver.

With this approach, the infant car seat 102 may still substantially reside on the vehicle seat 50 via the seat shell rails 106A and 106B. In other words, the mini base 200 only provides the interface to mount the infant car seat 102 to the vehicle seat 50 and does not provide a platform to support the infant car seat 102, unlike in conventional infant car seat systems (as shown in FIG. 1A). Additionally, the seat anchors 104A and 104B may provide a quick connect and/or disconnect mechanism similar to the above inventive infant car seat systems with integrated anchor systems disclosed herein. The mini base 200 may also be dimensioned to be significantly smaller than conventional seat bases, which reduces the weight and size of the mini base 200 and, hence, the carrying burden for the parent and/or the caregiver.

In some implementations, the infant car seat 102 may be pre-installed onto the mini base 200 by the parent and/or the caregiver and subsequently installed onto the vehicle seat 50 together. Similarly, the infant car seat 102 and the mini base 200 may also be removed from the vehicle seat 50 together. In this manner, the mini base 200 may function as an accessory that is removably coupled to the infant car seat 102. This allows the infant car seat 102 to maintain a lower weight and reduces features on the infant car seat 102, which may only be used when the infant car seat system 100w is installed in a vehicle.

In some implementations, the infant car seat 102 may include one or more features described above in relation to the infant car seat systems with integrated anchor systems, such as an integrated release actuator, which may be mechanically coupled to the mini base 200 via the engagement mechanism 210, or a storage compartment 160 to store the mini base 200.

Infant Transportation Via Ride-Hailing/Ridesharing

As noted above, infant car seat systems according to the various example implementations disclosed herein significantly facilitate transportation of infants using ride-hailing or ridesharing services. In view of the foregoing, FIG. 55A illustrates a method 5500 of providing transportation for an infant and an accompanying parent/caregiver by a transportation network company (TNC; e.g., Uber, Lyft) that offers ride-hailing or ridesharing services.

At step 5510 of the method 5500, the transportation network company enters into a contract with a driver of the vehicle that includes the inventive infant car seat system 100 already installed. The contract between the TNC and the driver allows the driver to use an app executing on the driver's mobile device to receive and accept a booking for a ride-hail/rideshare journey from a party (e.g., the parent/caregiver of the infant). The contract between the transportation network company and the driver can be formed in any suitable manner that results in a legally enforceable contract such as, for example, a contract agreement provided by the transportation network company as an offer that the driver can accept using any suitable means including an app on the driver mobile device, via an app on a computing device of the vehicle of the car, via a website, and/or the like. The driver can render acceptance in any suitable manner such as clicking on an acceptance/agreement option on app on the driver's mobile device, on the computing device of the vehicle of the car, on the website, simply by downloading and using the app from an app store, and/or the like. The agreement terms can include an agreement, by the driver of the vehicle, to provide the infant car seat system 100 already installed in the vehicle. The agreement terms can further specify that, for the trip and/or time requested by the parent/caregiver (or another party acting on behalf of the parent/caregiver), a fee will be charged by the TNC for the journey and, optionally, an additional fee will be charged by the TNC for use of infant car seat in the vehicle. As part of the operation of the app on the mobile device of the driver, the driver will receive an indication of an origin and destination for the journey as provided by the booking party.

At step 5520, pursuant to the contract in step 5510, the TNC provides and/or otherwise permits electronic download of the app to the mobile device of the driver. The driver is then enabled to receive bookings for ride-hailing/ridesharing journeys in which an infant car seat is specifically requested.

Figure 55C:
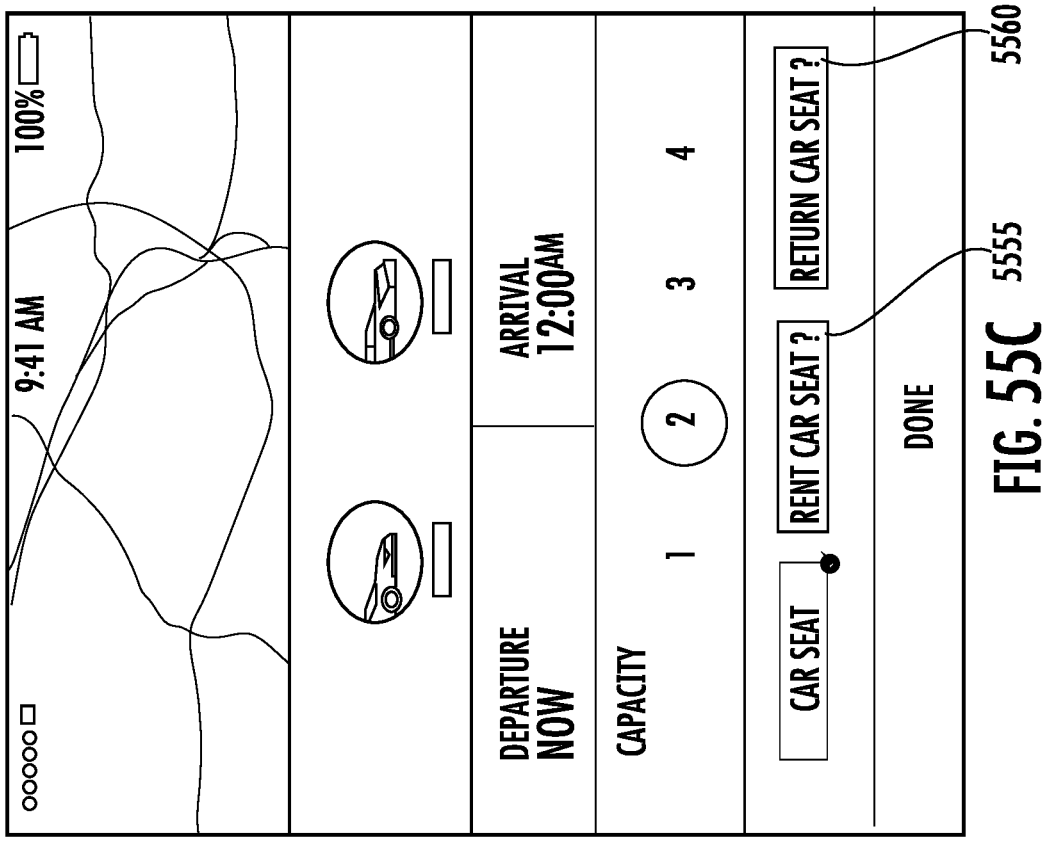
Figure 55B:
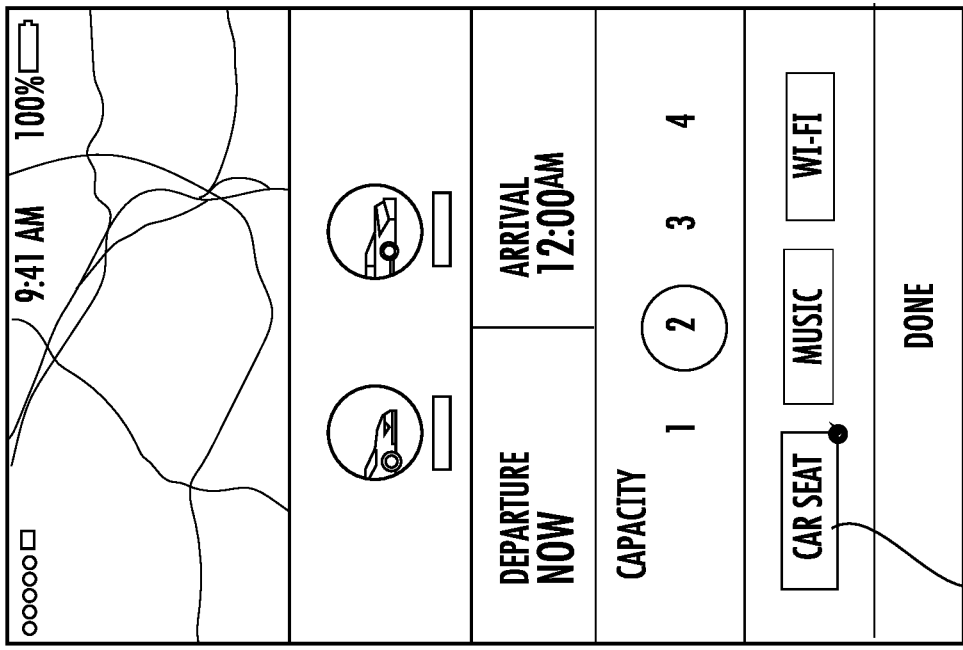

Similar to the driver of the vehicle, the parent/caregiver (or party booking on behalf of the parent/caregiver), can also download a rider-specific app from the transportation network company to request the booking of a vehicle with an infant car seat system 100. FIG. 55B illustrates an example interface of such an app that the party can use to request a vehicle with an infant car seat system, as indicated by the option 5550. In some implementations, the request/booking can include a more explicit or express indication of a parent/caregiver (and optionally, additional people) travelling with the infant, and a request for a vehicle with the infant car seat system 100 already installed. The driver-specific app can receive an indication of the request from the booking party (e.g., when the transportation network company determines that the driver's vehicle meets the criterion set out in the request/booking) and can either automatically accept the request (e.g., based on either the contract or the driver's stated preferences), or require that the driver voluntarily accept the request.

In some implementations, the rider-specific app may not only permit the booking party to request a vehicle with the infant car seat system 100; additionally or alternatively, the app may permit the user to rent the infant car seat system 100 for a duration longer than that of the journey such as, for example, a few hours, a day, several days, a week, etc. Such a feature can be useful when, for example, the parent/caregiver anticipates an extended need for the infant car seat system 100 beyond that of the requested journey. Such a need may occur, for example, if the parent/caregiver is traveling with the infant on a multi-leg journey (e.g., first ride-hail journey from home to an origin airport, air travel from the origin airport to a destination airport, second ride-hail journey from the destination airport to grandparent's home). FIG. 55C illustrates an option 5555 for the booking party to rent the infant car seat system 100 (illustrated as a selectable "Rent Car Seat" option) via the interface of the rider-specific app. In some implementations, such a selection can render one or more additional interfaces to the booking party to provide additional information, terms, pricing, and/or the like, associated with the rental of the infant car seat system 100, and require the booking party to accept such terms before confirming the rental of the infant car seat system. Once the selection of option 5555 is made and/or otherwise completed, the transportation network company can provide an indication to the driver, via the driver-specific app, that the parent/caregiver intends to take the infant car seat system 100 with them upon completion of the journey for some time period thereafter, so the driver should allow the parent/caregiver to remove the infant car seat system 100 after reaching the destination of the journey.

At step 5530, once the journey is complete, the driver can indicate, using the app executing on the mobile device of the driver, that the destination for the ride-hail or rideshare journey has been reached. For example, the driver can click on a "trip complete" option in the user interface of the app on the driver's mobile device, which is then transmitted to the transportation network company. After receiving such an indication, the transportation network company can provide to the driver a portion of the fee charged to the booking party. In this manner, the driver is compensated for providing the vehicle with the infant car seat system 100 as an amenity to the parent/caregiver. In some implementations, when the booking party selects the option 5555 to rent the infant car seat system at booking, the driver can be instructed, via the driver-specific app, to indicate confirmation of transfer of the infant car seat system 100 to the parent/caregiver.

When the parent/caregiver wishes to return the infant car seat system during a subsequent journey with the transportation network company, they can indicate this via a "return car seat" option 5560 that can become available on the rider-specific app during the course of the car seat rental. In such a case, when a driver of a vehicle contracted with the transportation network company selects and/or is selected to provide the journey, they can receive a specification, via the driver-specific app, that the parent/caregiver has elected/ requested to return the infant car seat system 100 upon completion of the subsequent journey, and that the parent/ caregiver (or party booking on behalf of the parent/caregiver) will be charged the additional fee for the rental of the infant car seat system (in addition to a fee for the subsequent journey itself). When the subsequent journey is complete, the driver can retain the infant car seat system 100, and the driver-specific app can indicate the additional fee charged by the transportation network company to the booking party for the rental of the infant car seat system. In some implementations, the driver can be instructed, via the driver-specific app, to indicate confirmation to the booking party of receipt/ return of the infant car seat system 100. In some implementations, the driver-specific app can permit the driver of the vehicle of the subsequent journey to list their vehicle as having the infant car seat system 100 available for use and/or rent to a subsequent booking party.

FIG. 56 illustrates another method 5600 of providing transportation for an infant via a transportation network company offering ride-hailing or ridesharing services, and addresses the scenario where the parent/caregiver owns and/or is otherwise in possession of an infant car seat system 100 according to any of the embodiments described herein. At step 5610, the parent/caregiver, or another party acting on behalf of the parent/caregiver, can hail, request, and/or otherwise book and pay for a ride-hail or rideshare journey in a vehicle with a transportation network company, i.e., with a vehicle and driver that contract with the transportation network company to provide such journey services, as discussed above in connection with FIGS. 55A-55C. In some implementations, the payment is not made up front, but after the journey is completed. The request can be made by the booking party via a rider-specific app provided by the transportation network company, and received/accepted by the driver via a driver-specific app provided by the transportation network company as generally detailed in connection with FIGS. 55A-55C. In making the request the booking party can specify, via the rider-specific app, an origin and a destination for the journey. In some implementations, the request can include an indication of the booking party being, or requesting the journey on behalf of, a parent/caregiver accompanying an infant in the infant car seat system. In some implementations, providing such an indication results in an increased charge/cost for the journey to the booking party.

In some implementations, the parent/caregiver is in possession of the infant car seat system by virtue of rental of the infant car seat system from an earlier journey with the transportation network company as discussed above in connection with FIGS. 55A-55C. In such implementations, the request made by the booking party may include an indication that the parent/caregiver intends to retain the car seat after the journey, i.e., to continue their rental of the infant car seat system from the transportation network company. In some implementations, the continuance of the rental of the infant car seat system is implied when (see FIG. 55C) the booking party does not elect the "return car seat" option 5560. In some implementations, an indication of such election to retain the infant car seat system, or omission of election to retain, can be provided to the driver of the vehicle via the driver-specific app.

At step 5620, the method 5600 further includes, upon arrival of the vehicle at the origin specified by the booking party, the parent/caregiver carrying the infant in the infant car seat system to the vehicle and the parent/caregiver and/or the driver installing the infant car seat system in the vehicle with the front of the infant car seat facing the rear of the vehicle. In some implementations, as discussed above, the infant car seat does not include a detachable vehicle installation base, and can be installed in the vehicle without using a vehicle seat belt of the vehicle. In some implementations, the infant car seat includes a set of seat shell rails (e.g., the rails 106A and 106B, or structurally/functionally similar variants thereof) having corresponding curved rocker bottoms (e.g., the bottoms 107A and 107B, or structurally/ functionally similar variants thereof), and a carrying handle (e.g., the handle 112, or structurally/functionally similar variants thereof). The infant car seat can also include handle attachment mechanisms (e.g., the mechanisms 114A and 114B, or structurally/functionally similar variants thereof) to attach the handle to the seat shell rails. The infant car seat system can also include an anchor system (e.g. the anchor system 104, or structurally/functionally similar variants thereof) coupled to the infant car seat to secure the infant car seat directly to a vehicle seat (e.g., similar to the vehicle seat 50, or structurally/functionally similar variants thereof) of the vehicle with a tight fit, and with the front of the infant car seat facing the rear of the vehicle.

The anchor system can include seat anchors (e.g. the seat anchors 104A and 104B, or structurally/functionally similar variants thereof) that mechanically couple to portions of corresponding seat shell rails. In this way, each anchor is constrained by its corresponding seat shell rail between the front of the infant car seat and the corresponding handle attachment mechanism on each side of the infant car seat. In this position/setting, each infant car seat anchor then mechanically engages with a vehicle lower anchor (e.g., the vehicle lower anchors 52A and 52B) of the vehicle seat.

At step 5630, and upon arrival of the vehicle at the destination, the parent/caregiver and/or the driver can release both the seat anchors from mechanical engagement with their corresponding vehicle lower anchors by employing an actuator (e.g., the actuator 180, or structurally/ functionally similar variants thereof) that is coupled to the infant car seat and to the anchor system. In some implementations, where the booking party is charged extra for the ability to bring the infant and the infant car seat system on the journey, an indication of the total charge to the booking party from the transportation network company can be provided to the driver via the driver-specific app.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An infant car seat system for installation on a vehicle seat, comprising:

an infant car seat having a seat shell including a seat back, a seat pan, a first side with a first seat shell rail, a second side with a second seat shell rail, and a seat front that faces a vehicle seat back of the vehicle seat when the infant car seat is installed on the vehicle seat, the infant car seat being portable via a carrying handle while an infant is in the infant car seat, the carrying handle being attached to the first side of the seat shell via a first carrying handle attachment mechanism and the second side of the second side of the seat shell via a second carrying handle attachment mechanism;

a center of gravity of the infant car seat system disposed proximate an axis passing through the first carrying handle attachment mechanism and the second carrying handle attachment mechanism;

wherein the second seat shell rail spaced from the first seat shell rail to define a space therebetween, the first seat shell rail and the second seat shell rail extending from the seat shell in a direction away from the seat pan, wherein the first seat shell rail and the second seat shell rail directly support the infant car seat on the vehicle seat without using an infant car seat detachable base arranged between the first and second seat shell rails and the vehicle seat, and wherein the seat shell, the first seat shell rail, and the second seat shell rail form a unitary and non-separable structure, positions of the first seat shell rail and second seat shell rail being fixed relative to a remainder of the seat shell;

wherein the first carrying handle attachment mechanism and the second carrying handle attachment mechanism are disposed above portions of the first seat shell rail and the second seat shell rail in direct contact with the vehicle seat when the first seat shell rail and the second seat shell rail are supporting the infant car seat on the vehicle seat; and an anchor system coupled to the seat shell and configured to attach the infant car seat directly to the vehicle seat without using an infant car seat detachable base, the anchor system comprising:

a first infant car seat anchor coupled to the infant car seat via a first belt portion, the first infant car seat anchor extending from the first side of the seat shell to an area outside of the space via the first belt portion, the first car seat anchor being mechanically engageable with a first vehicle anchor of the vehicle seat; and a second infant car seat anchor coupled to the infant car seat via a second belt portion, the second infant car seat anchor extending from the second side of the seat shell to an area outside of the space via the second belt portion, the second car seat anchor being mechanically engageable with a second vehicle anchor of the vehicle seat.

2. The system of claim 1, wherein the first belt portion extends from an area of the first side proximate a front of the seat shell, and wherein the second belt portion extends from an area of the second side proximate a front of the seat shell.

3. The system of claim 1, wherein the first belt portion and the second belt portion are a single belt.

4. The system of claim 3, wherein the single belt includes an intermediate portion that extends between the first belt portion and the second belt portion, the intermediate portion being disposed within at least one of the space and the seat shell.

5. The system of claim 1, wherein the first belt portion extends from the first seat shell rail of the first side of the seat shell, and wherein the second belt portion extends from the second seat shell rail of the second side of the seat shell.

6. The system of claim 1, wherein the first belt portion and the second belt portion are adjustable.

7. The infant car seat system of claim 1, wherein:
the vehicle seat includes a pair of LATCH system lower anchors;
the first infant car seat anchor includes a first infant car seat LATCH system connector;
the first vehicle anchor is a first vehicle LATCH system anchor of the pair of LATCH system lower anchors of the vehicle seat;
the second infant car seat anchor includes a second infant car seat LATCH system connector; and
the second vehicle anchor is a second vehicle LATCH system anchor of the pair of LATCH system lower anchors of the vehicle seat.

8. The infant car seat system of claim 1, wherein:
the vehicle seat includes a pair of ISOFIX system lower anchors;
the first infant car seat anchor includes a first infant car seat ISOFIX system connector;
the first vehicle anchor is a first vehicle ISOFIX system anchor of the pair of ISOFIX system lower anchors of the vehicle seat;
the second infant car seat anchor includes a second infant car seat ISOFIX system connector; and
the second vehicle anchor is a second vehicle ISOFIX system anchor of the pair of ISOFIX system lower anchors of the vehicle seat.

9. The infant car seat system of claim 1, wherein the first side of the seat shell defines a first opening, and the second side of the seat shell defines a second opening, the first belt portion extending through the first opening to the area outside of the space, and the second belt portion extending through the second opening to the area outside of the space.

10. The infant car seat system of claim 9, wherein the first belt portion and the second belt portion compose a single belt, the single belt extending from the first infant car seat anchor to the second infant car seat anchor through both of the first opening and the second opening.

11. The infant car seat system of claim 10, wherein a portion of the single belt that extends between the first opening and the second opening is positioned within an interior of the infant car seat.

12. An infant car seat system for installation on a vehicle seat, comprising:

an infant car seat having a seat shell including a seat back, a seat pan, a first side with a first seat shell rail, a second side with a second seat shell rail, and a seat front that faces a vehicle seat back of the vehicle seat when the infant car seat is installed on the vehicle seat, the infant car seat being portable via a carrying handle while an infant is in the infant car seat, the carrying handle being attached to the first side of the seat shell via a first carrying handle attachment mechanism and the second side of the second side of the seat shell via a second carrying handle attachment mechanism;

a center of gravity of the infant car seat system disposed proximate an axis passing through the first carrying handle attachment mechanism and the second carrying handle attachment mechanism;

wherein first seat shell rail and the second seat shell rail extend from the seat shell in a direction away from the seat pan, wherein the first seat shell rail and the second seat shell rail directly support the infant car seat on the vehicle seat without using an infant car seat detachable base arranged on the vehicle seat, and wherein the seat shell, the first seat shell rail, and the second seat shell rail form a unitary and non-separable structure;

wherein the first carrying handle attachment mechanism and the second carrying handle attachment mechanism are disposed above portions of the first seat shell rail and the second seat shell rail in direct contact with the vehicle seat when the first seat shell rail and the second seat shell rail are supporting the infant car seat on the vehicle seat; and an anchor system configured to attach the infant car seat directly to the vehicle seat without using an infant car seat detachable base, the anchor system comprising:

a first infant car seat anchor coupled to the first side of the seat shell via a first belt portion, the first infant car seat anchor being mechanically engageable with a first vehicle anchor of the vehicle seat; and a second infant car seat anchor coupled to the second side of the seat shell via a second belt portion, the second infant car seat anchor being mechanically engageable with a second vehicle anchor of the vehicle seat.

13. The infant car seat system of claim 12, wherein the first side of the seat shell defines a first opening, and the second side of the seat shell defines a second opening, the first belt portion extending through the first opening to an exterior of the infant car seat, and the second belt portion extending through the second opening to the exterior of the infant car seat.

14. The infant car seat system of claim 13, wherein the first belt portion and the second belt portion compose a single belt, the single belt extending from the first infant car seat anchor to the second infant car seat anchor through both of the first opening and the second opening.

15. The infant car seat system of claim 12, wherein the first belt portion extends from an area of the first side proximate a front of the seat shell, and wherein the second belt portion extends from an area of the second side proximate a front of the seat shell.

16. The infant car seat of claim 12, wherein the first infant car seat anchor extends from a first constraining point at the first side of the seat shell,
wherein the second infant car seat anchor extends from a second constraining point at the second side of the seat shell,
wherein the first constraining point is located between the seat front and the first attachment mechanism, and
wherein the second constraining point is located between the seat front and the second attachment mechanism.

17. The infant car seat of claim 1, wherein the first infant car seat anchor extends from a first constraining point at the first side of the seat shell,
wherein the second infant car seat anchor extends from a second constraining point at the second side of the seat shell,
wherein the first constraining point is located between the seat front and the first attachment mechanism, and
wherein the second constraining point is located between the seat front and the second attachment mechanism.

* * * * *